(12) United States Patent
Ando et al.

(10) Patent No.: US 8,427,916 B2
(45) Date of Patent: *Apr. 23, 2013

(54) INFORMATION STORAGE MEDIUM, REPRODUCING METHOD, AND RECORDING METHOD

(75) Inventors: Hideo Ando, Hino (JP); Seiji Morita, Yokohama (JP); Koji Takazawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/233,866

(22) Filed: Sep. 15, 2011

(65) Prior Publication Data

US 2012/0002531 A1    Jan. 5, 2012

Related U.S. Application Data

(60) Division of application No. 11/564,711, filed on Nov. 29, 2006, now Pat. No. 8,127,323, which is a continuation of application No. 11/514,239, filed on Sep. 1, 2006, now Pat. No. 8,040,786, which is a continuation of application No. PCT/JP2006/301910, filed on Jan. 30, 2006.

(30) Foreign Application Priority Data

Jan. 31, 2005  (JP) .................................. 2005-024303

(51) Int. Cl.
    *G11B 7/00*    (2006.01)
(52) U.S. Cl.
    USPC .................................... 369/53.22; 369/47.27

(58) Field of Classification Search ............... 369/275.2, 369/47.1, 275.3, 53.22, 44.26, 47.27, 47.28, 369/53.1, 59.25
    See application file for complete search history.

(56) References Cited

U.S. PATENT DOCUMENTS

| | | | |
|---|---|---|---|
| 6,534,636 B2 | 3/2003 | Wang et al. | |
| 6,554,972 B1 | 4/2003 | Ichihara et al. | |
| 6,815,033 B2 | 11/2004 | Miyazawa et al. | |
| 7,046,605 B1 * | 5/2006 | Ko | 369/53.2 |
| 7,113,475 B2 * | 9/2006 | Lee et al. | 369/275.3 |
| 7,193,959 B2 * | 3/2007 | Lee et al. | 369/275.3 |
| 7,369,475 B2 * | 5/2008 | Nagai | 369/53.27 |
| 7,526,185 B2 * | 4/2009 | Lee et al. | 386/239 |
| 7,554,899 B2 * | 6/2009 | Lee | 369/275.3 |
| 7,885,172 B2 * | 2/2011 | Erickson et al. | 369/275.3 |

(Continued)

FOREIGN PATENT DOCUMENTS

| | | |
|---|---|---|
| JP | 5-28505 | 2/1993 |
| JP | 6-43147 | 6/1994 |

(Continued)

OTHER PUBLICATIONS

Japanese Office Action issued Apr. 24, 2012, in Patent Application No. 2011-138332 (with English-language translation).

(Continued)

*Primary Examiner* — Nabil Hindi
(74) *Attorney, Agent, or Firm* — Oblon, Spivak, McClelland, Maier & Neustadt, L.L.P.

(57) ABSTRACT

According to one embodiment, an information storage medium includes an organic dye material which records information with a light beam having a wavelength equal to or smaller than 620 nm.

5 Claims, 86 Drawing Sheets

U.S. PATENT DOCUMENTS

| | | |
|---|---|---|
| 2002/0028918 A1 | 3/2002 | Kasada et al. |
| 2002/0034605 A1 | 3/2002 | Matsui et al. |
| 2003/0090989 A1 | 5/2003 | Sawada et al. |
| 2003/0194646 A1 | 10/2003 | Ogiso et al. |
| 2004/0028869 A1 | 2/2004 | Terao et al. |
| 2004/0161701 A1 | 8/2004 | Hohsaka et al. |
| 2005/0002318 A1 | 1/2005 | Murakami et al. |
| 2005/0052986 A1 | 3/2005 | Morita et al. |
| 2005/0074577 A1 | 4/2005 | Takishita et al. |
| 2005/0081230 A1 | 4/2005 | Mizushima et al. |
| 2005/0083830 A1 | 4/2005 | Martens et al. |
| 2005/0100704 A1 | 5/2005 | Horai et al. |
| 2005/0142490 A1 | 6/2005 | Shinkai et al. |
| 2005/0227178 A1 | 10/2005 | Morita et al. |
| 2005/0237910 A1 | 10/2005 | Martens |
| 2005/0240019 A1 | 10/2005 | Kasada et al. |
| 2005/0254795 A1 | 11/2005 | Muramatsu et al. |
| 2006/0088786 A1 | 4/2006 | Tamada et al. |
| 2006/0210925 A1 | 9/2006 | Ando et al. |
| 2006/0223004 A1 | 10/2006 | Nakai et al. |
| 2006/0233093 A1 | 10/2006 | Ando et al. |
| 2006/0233094 A1 | 10/2006 | Ando et al. |
| 2007/0053279 A1 | 3/2007 | Magnitskii et al. |
| 2007/0098949 A1 | 5/2007 | Ando et al. |
| 2008/0002550 A1 | 1/2008 | Noda et al. |

FOREIGN PATENT DOCUMENTS

| | | |
|---|---|---|
| JP | 10-44610 A | 2/1998 |
| JP | 10-222874 | 8/1998 |
| JP | 11-34499 A | 2/1999 |
| JP | 2000-168237 A | 6/2000 |
| JP | 2000-298877 | 10/2000 |
| JP | 2002-124038 | 4/2002 |
| JP | 2002-133724 | 5/2002 |
| JP | 2003-16697 | 1/2003 |
| JP | 2003-300384 A | 10/2003 |
| JP | 2003-338080 A | 11/2003 |
| JP | 2004-47055 | 2/2004 |
| JP | 2004-86932 | 3/2004 |
| JP | 2004-98541 | 4/2004 |
| JP | 2004-98673 | 4/2004 |
| JP | 2004-127472 A | 4/2004 |
| JP | 2004-160742 | 6/2004 |
| JP | 2004-213753 | 7/2004 |
| JP | 2004-241055 | 8/2004 |
| JP | 2005-7632 | 1/2005 |
| JP | 2005-149655 | 6/2005 |
| JP | 2005-327447 | 11/2005 |
| JP | 2007-502494 | 2/2007 |
| JP | 2007-184096 | 7/2007 |
| JP | 2009-43411 | 2/2009 |
| WO | 01/44374 | 6/2001 |
| WO | WO 03/003361 A1 | 1/2003 |
| WO | WO 03074282 A1 | 9/2003 |
| WO | WO 03107334 A1 | 12/2003 |
| WO | WO 2004/084201 A1 | 9/2004 |

OTHER PUBLICATIONS 80 mm (1,46 Gbytes per side) and 120 mm (4,70 Gbytes per side) DVD Recordable Disk (DVD-R), Standard ECMA-359, 1st Edition / Dec. 2004, 145 pages.

Office Action issued Nov. 29, 2011, in Japanese Patent Application No. 2011-138332 (with English-language translation).

\* cited by examiner

| Blue violet light-compatible write-once type information storage medium | | | |
|---|---|---|---|
| A) Organic dye based recording film | B) Pre-format | C) Wobble condition | D) Formats |
| A1) Maximum absorption wavelength λmax<br>A2) Recording mark polarity<br>A3) Azo metal complex + Cu<br>A4) Azo metal complex : Anion + dye : Cation<br>A5) Arbitrary coat-type recording film | B1) Pre-groove shape (for track pitch)<br>B2) Pre-pit shape (for track pitch)<br>B3) Arbitrary groove shape and arbitrary pit shape | C1) PSK<br>C2) FSK<br>C3) STW<br>C4) Arbitrary modulation system<br>C5) Wobble amplitude amount<br>C6) Arbitrary amplitude amount | D1) Write-once recording method<br>D1) H format<br>D2) B format<br>D3) Another format<br>D4) Arbitrary write-once recording method and format |

(Constituent elements / Specific contents)

FIG. 1

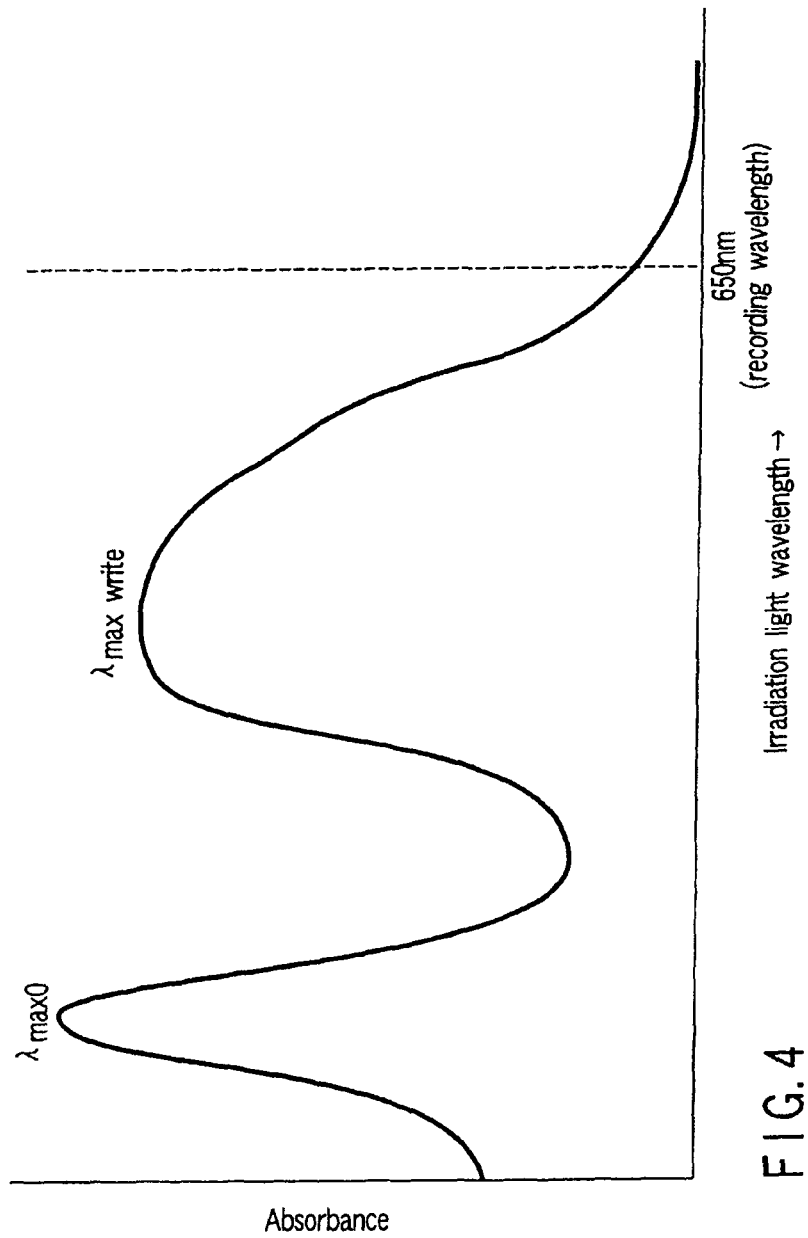

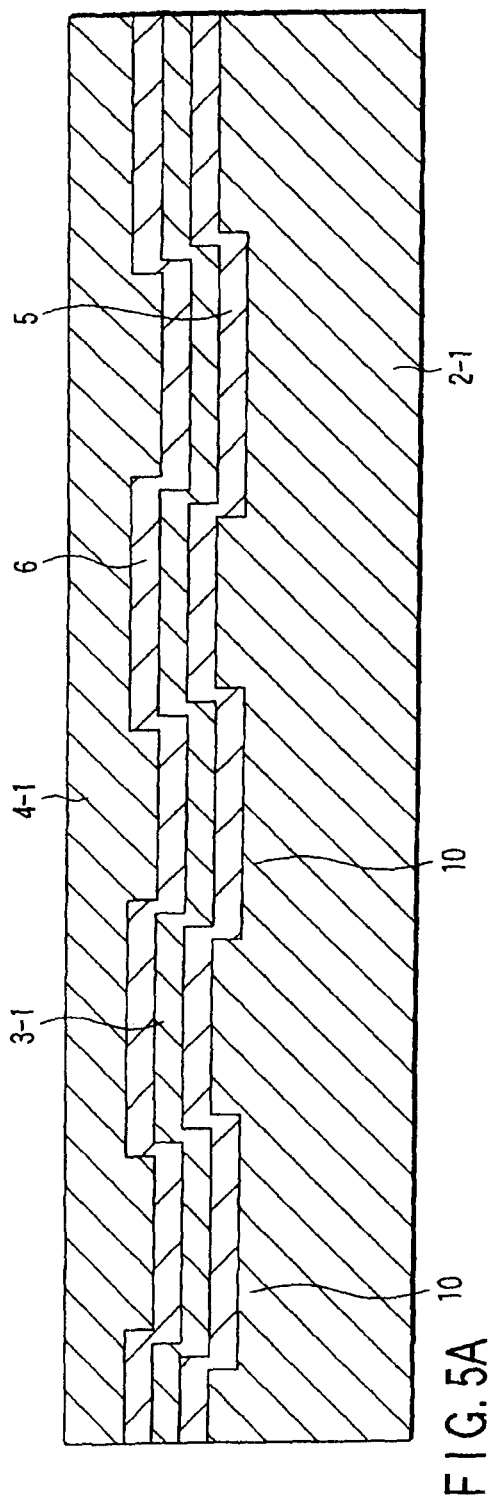
F I G. 5A
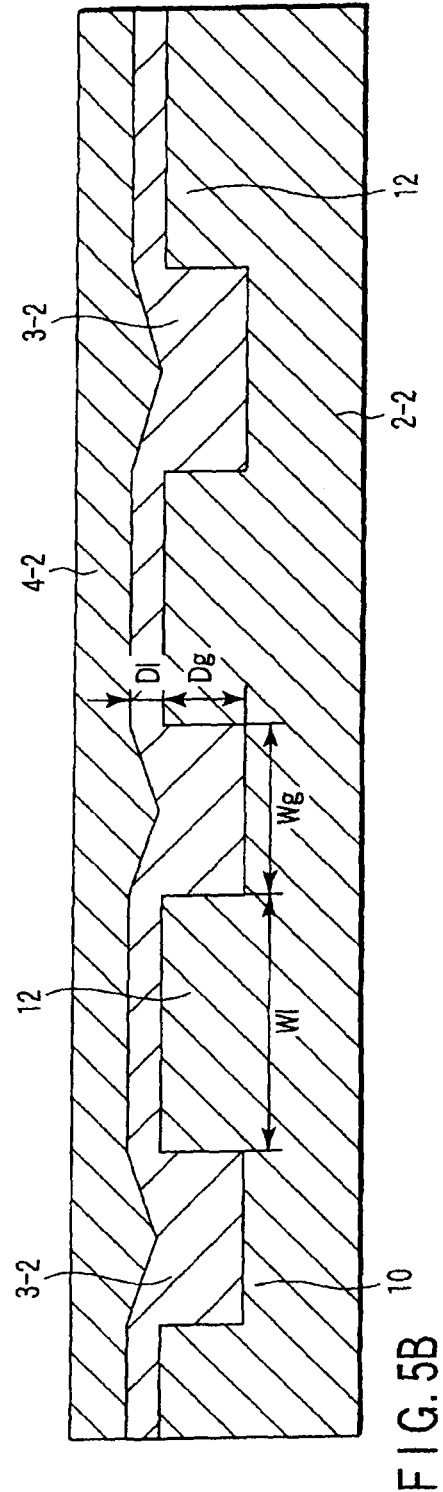
F I G. 5B

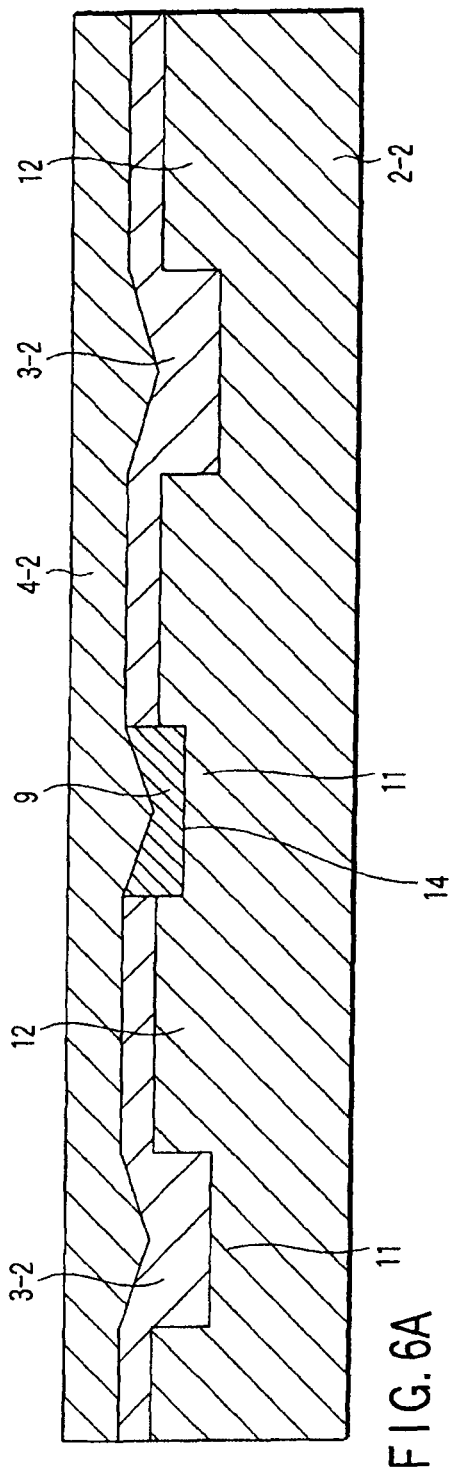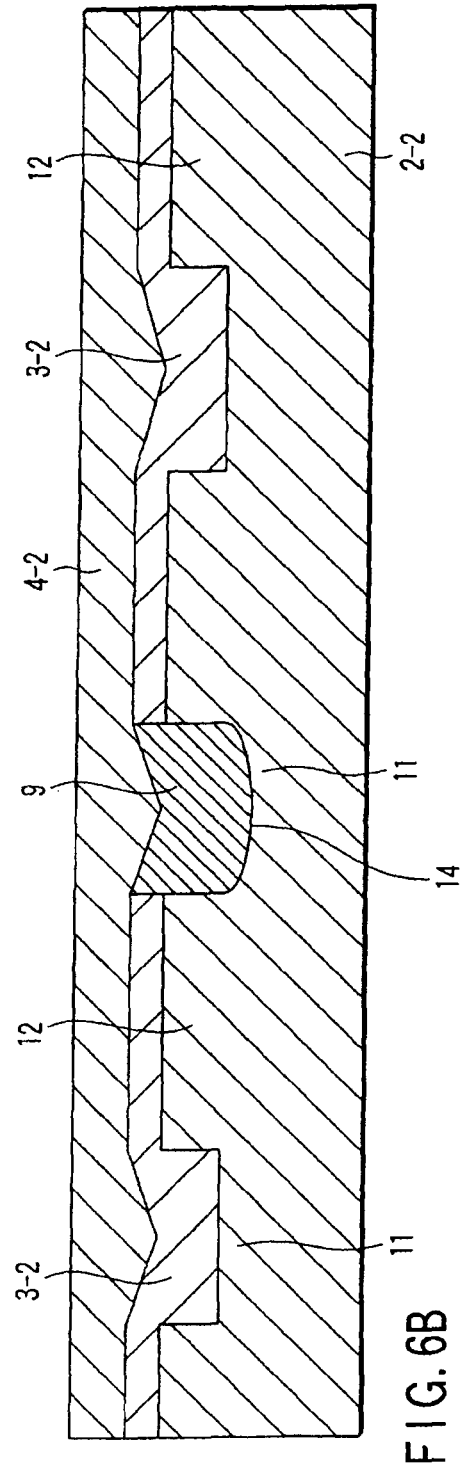

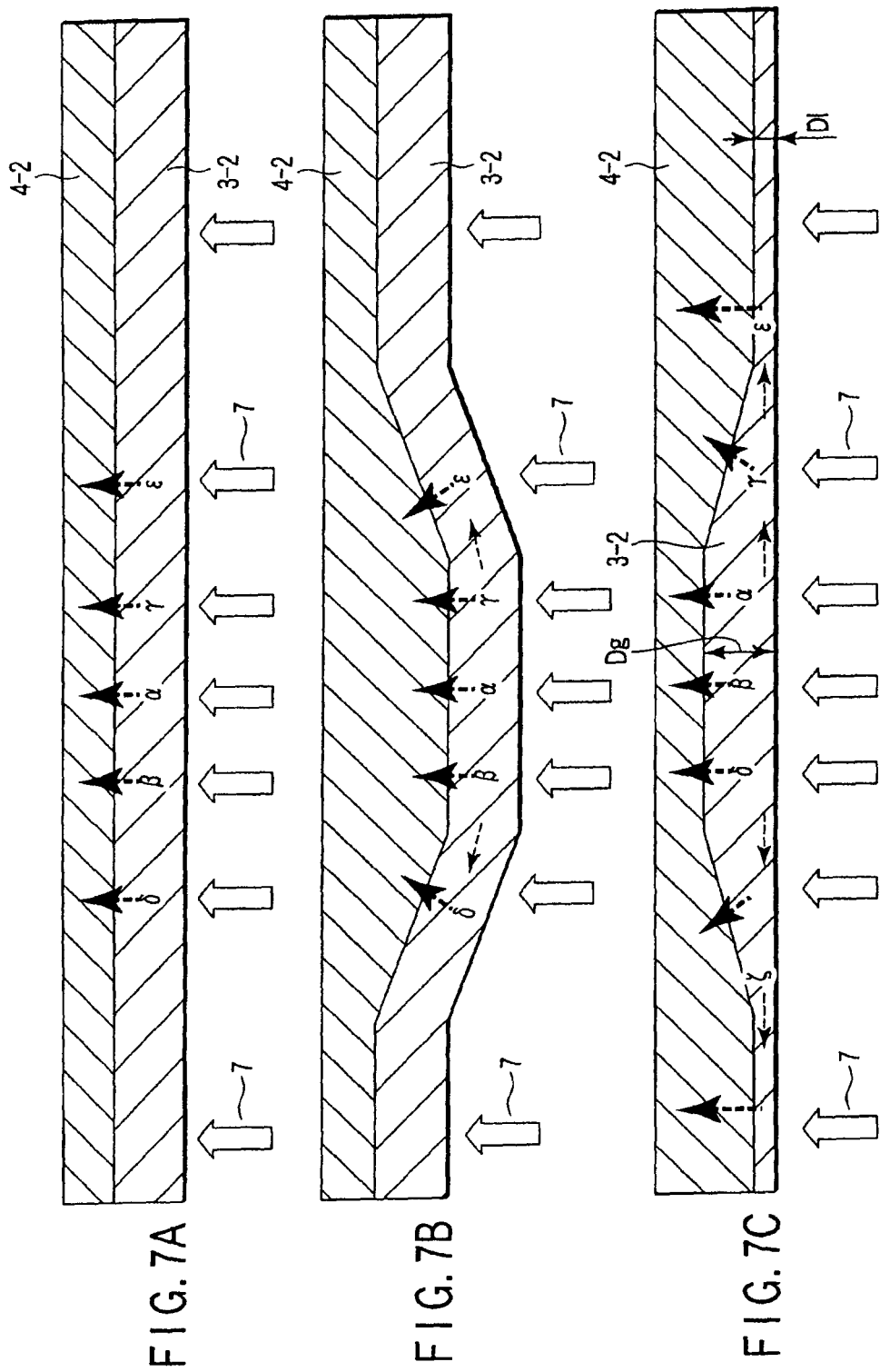

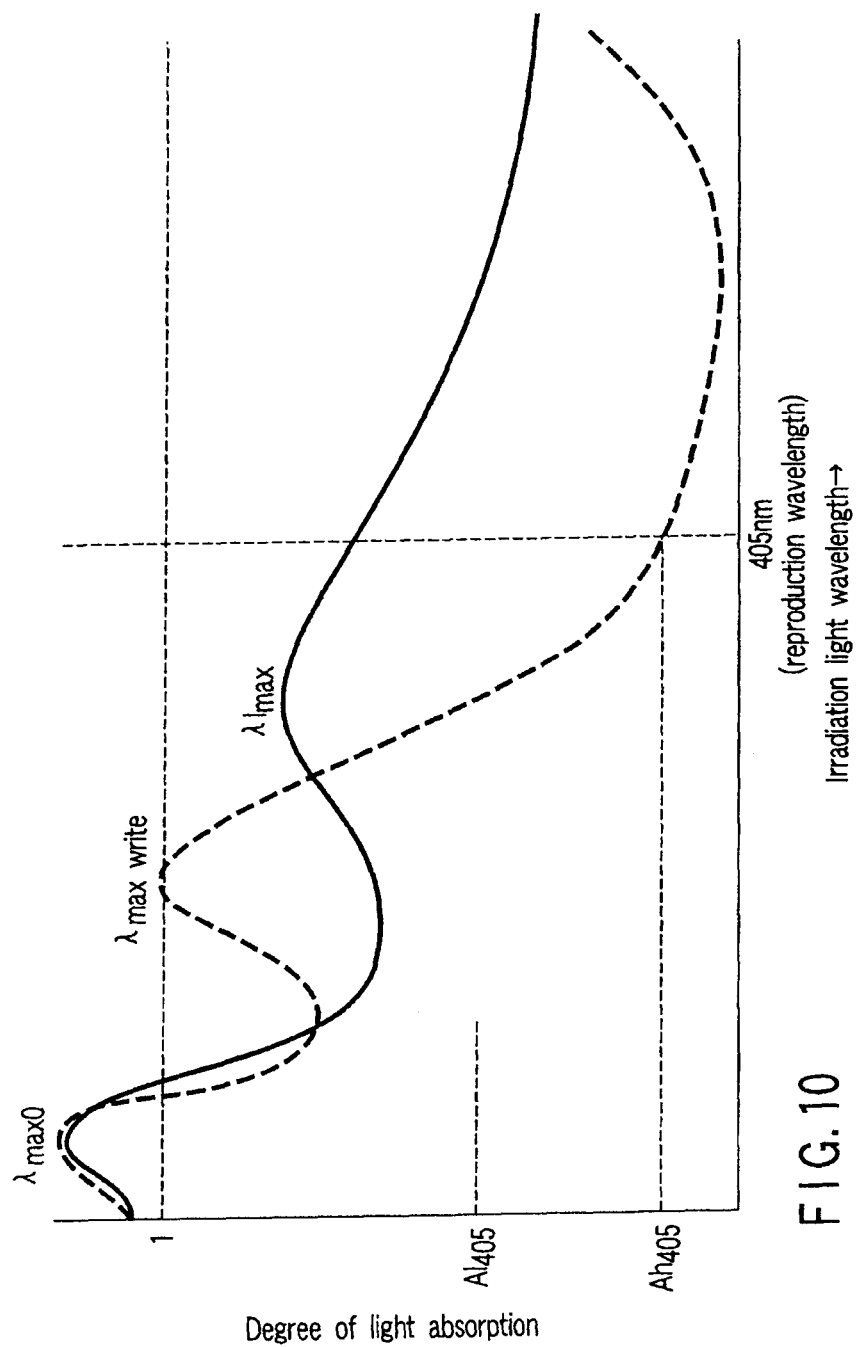
F I G. 10

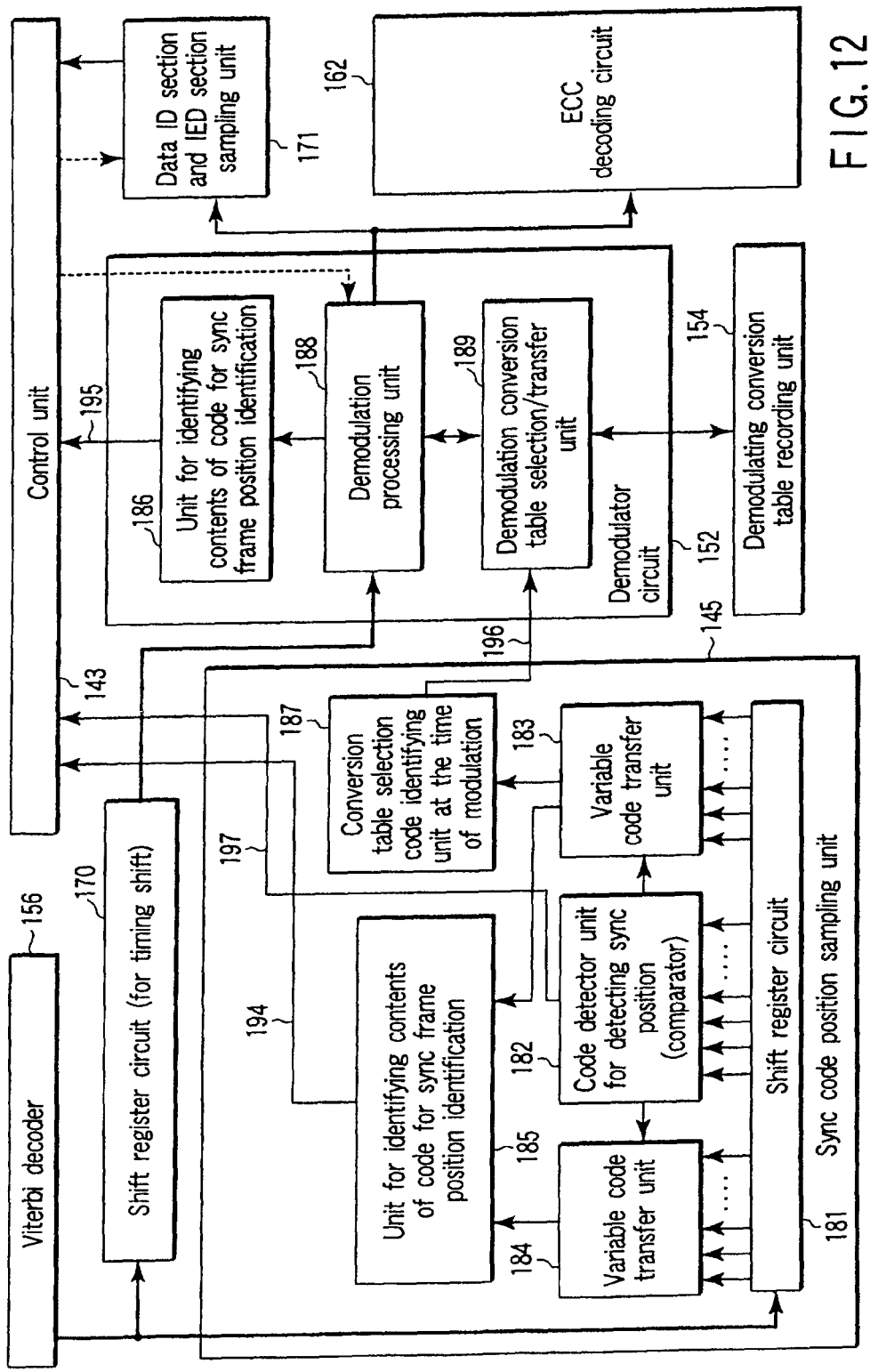
F I G. 12

FIG. 20A

| T_LC table | Mark length | | |
|---|---|---|---|
| | 2T | 3T | ≥4T |
| | a | b | c |

FIG. 20B

| T_SFP table | | Mark length | | |
|---|---|---|---|---|
| | | 2T | 3T | ≥4T |
| Leading space length | 2T | d | e | f |
| | 3T | g | h | i |
| | ≥4T | j | k | l |

FIG. 20C

| T_ELP table | | Mark length | | |
|---|---|---|---|---|
| | | 2T | 3T | ≥4T |
| Trailing space length | 2T | m | n | o |
| | 3T | p | q | r |
| | ≥4T | s | t | u |

FIG. 21A (Unit : ns)

| T_LC table | Mark length | | |
|---|---|---|---|
| | 2T | 3T | ≥4T |
| | 2.0 | 2.0 | 2.0 |

FIG. 21B (Unit : ns)

| T_SFP table | | Mark length | | |
|---|---|---|---|---|
| | | 2T | 3T | ≥4T |
| Leading space length | 2T | 11.0 | 12.0 | 13.0 |
| | 3T | 10.5 | 11.5 | 12.0 |
| | ≥4T | 10.0 | 11.0 | 12.0 |

FIG. 21C (Unit : ns)

| T_ELP table | | Mark length | | |
|---|---|---|---|---|
| | | 2T | 3T | ≥4T |
| Trailing space length | 2T | 11.5 | 10.5 | 11.5 |
| | 3T | 9.0 | 8.0 | 8.5 |
| | ≥4T | 8.5 | 7.5 | 7.5 |

| Specifying method | | L-H medium | | H-L medium | | ROM (double-layer) | |
|---|---|---|---|---|---|---|---|
| | | Max. | Min. | Max. | Min. | Max. | Min. |
| System lead-in area | I11H Reflection factor | 32% | 18% | 85% | 40% | 32% | 18% |
| Track level (groove) | Ratio between system lead-in area and I11H | 60% | 40% | 60% | 40% | | |
| User recording data | I11H Reflection factor | 32% | 18% | 85% | 40% | 32% | 18% |

FIG. 24

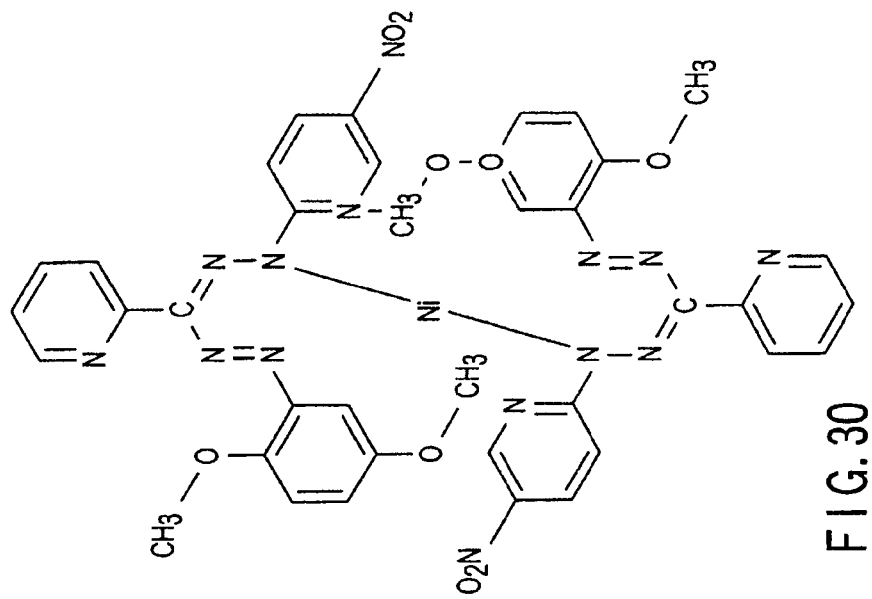
F I G. 30
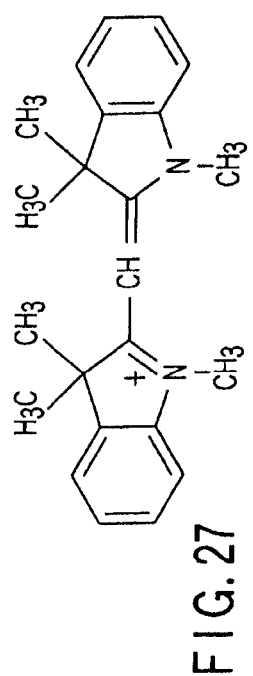
F I G. 27
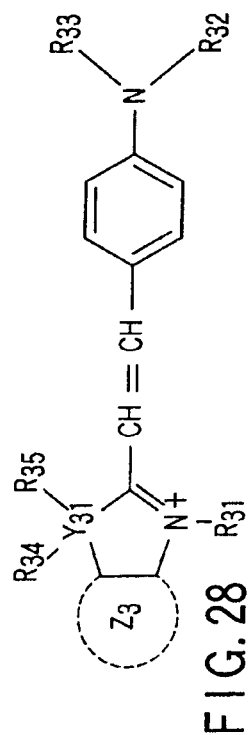
F I G. 28
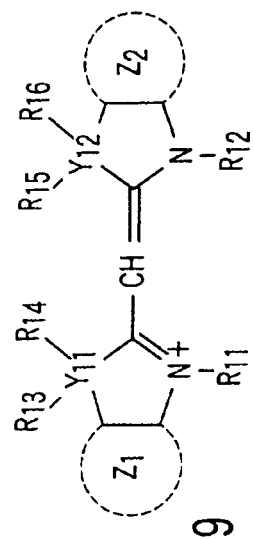
F I G. 29

| Parameter | | Single-layered structure | Double-layered structure |
|---|---|---|---|
| User available recording capacity | | 15Gbytes/side | 30Gbytes/side |
| Use wavelength | | 405nm | |
| NA (Numerical Aperture) value of objective lens | | 0.65 | |
| Data bit length | (A) | 0.306μm | |
| | (B) | 0.153μm | |
| Channel bit length | (A) | 0.204μm | |
| | (B) | 0.102μm | |
| Minimum pit length (2T) | (A) | 0.408μm | |
| | (B) | 0.204μm | |
| Maximum pit length (13T) | (A) | 2.652μm | |
| | (B) | 1.326μm | |
| Track pitches | (A) | 0.68μm | |
| | (B) | 0.40μm | |
| Outer diameter of information storage medium | | 120mm | |
| Total thickness of information storage medium | | 0.60×2mm | |
| Diameter of center hole | | 15.0mm | |
| Inner diameter of data area DTA | | 24.1mm | |
| Outer diameter of data area DTA | | 58.0mm | |
| User data size per sector | | 2048bytes | |
| ECC (Error Correction Code) | | Reed-Solomon product code RS(208,192,17)×RS(182,172,11) | |
| ECC block size | | 32 physical sectors | |
| Modulation system | | ETM,RLL(1,10) | |
| Correctable error length | | 7.1mm | |
| Line speed | | 6.61m/s | |
| Channel bit transfer rate | (A) | 32.40Mbps | |
| | (B) | 64.80Mbps | |
| User data transfer rate | (A) | 18.28Mbps | |
| | (B) | 36.55Mbps | |

(A) Denotes numeric values in system lead-in area SYLDI and system lead-out area SYLDO (B) Denotes numeric values on data lead-in area DTLDI, data area DTA, data lead-out area DTLDO, and middle area MDA

FIG. 32

| Parameter | | Single-layered structure |
|---|---|---|
| User available recording capacity | | 15Gbytes/side |
| Use wavelength | | 405nm |
| NA (Numerical Aperture) value of objective lens | | 0.65 |
| Data bit length | (A) | 0.306μm |
| | (B) | 0.153μm |
| Channel bit length | (A) | 0.204μm |
| | (B) | 0.102μm |
| Minimum mark/pit length (2T) | (A) | 0.408μm |
| | (B) | 0.204μm |
| Maximum mark/pit length (13T) | (A) | 2.652μm |
| | (B) | 1.326μm |
| Track pitches | (A) | 0.68μm |
| | (B) | 0.40μm |
| Physical address setting method | (B) | Wobble address |
| Outer diameter of information storage medium Total thickness of information storage medium Diameter of center hole Inner diameter of data area DTA Outer diameter of data area DTA | | 120mm 1.20mm 15.0mm 24.1mm 58.0mm |
| User data size per sector ECC (Error Correction Code) ECC block size Modulation system | | 2048bytes Reed-Solomon product code RS(208,192,17)×RS(182,172,11) 32 physical sectors ETM,RLL(1,10) |
| Correctable error length | | 7.1mm |
| Line speed | | 6.61m/s |
| Channel bit transfer rate | (A) | 32.40Mbps |
| | (B) | 64.80Mbps |
| User data transfer rate | (A) | 18.28Mbps |
| | (B) | 36.55Mbps |

(A) Denotes numeric values in system lead-in area SYLDI and system lead-out area SYLDO (B) Denotes numeric values on data lead-in area DTLDI, data area DTA, data lead-out area DTLDO, and middle area MDA

FIG. 33

| Parameter | | Single-layered structure |
|---|---|---|
| User available recording capacity | | 20Gbytes/side |
| Use wavelength | | 405nm |
| NA (Numerical Aperture) value of objective lens | | 0.65 |
| Data bit length | (A) | 0.306 μm |
| | (B) | 0.130 to 0.140 μm |
| Channel bit length | (A) | 0.204 μm |
| | (B) | 0.087 to 0.093 μm |
| Minimum mark/pit length (2T) | (A) | 0.408 μm |
| | (B) | 0.173 to 0.187 μm |
| Maximum mark/pit length (13T) | (A) | 2.652 μm |
| | (B) | 1.126 to 1.213 μm |
| Track pitches | (A) | 0.68 μm |
| | (B) | 0.34 μm |
| Physical address setting method | (B) | Wobble address |
| Outer diameter of information storage medium Total thickness of information storage medium Diameter of center hole Inner diameter of data area DTA Outer diameter of data area DTA | | 120mm 0.60×2mm 15.0mm 24.1mm 57.89mm |
| User data size per sector ECC (Error Correction Code) ECC block size Modulation system | | 2048bytes Reed-Solomon product code RS (208,192,17) ×RS (182,172,11) 32 physical sectors ETM,RLL(1,10) |
| Correctable error length | (A) | 7.1mm |
| | (B) | 6.0mm |
| Line speed | (A) | 6.61m/s |
| | (B) | 5.64 to 6.03m/s |
| Channel bit transfer rate | (A) | 32.40Mbps |
| | (B) | 64.80Mbps |
| User data transfer rate | (A) | 18.28Mbps |
| | (B) | 36.55Mbps |

(A) Denotes numeric values in system lead-in area SYLDI and system lead-out area SYLDO (B) Denotes numeric values on data lead-in area DTLDI, data area DTA, data lead-out area DTLDO, and middle area MDA

| System lead-in area SYLDI | | | | Connection area CNA | Data lead-in area DTLDI | | Data area DTA |
|---|---|---|---|---|---|---|---|
| Initial zone INZ | Buffer zone 1 BFZ1 | Control data zone CDZ | Buffer zone 2 BFZ2 | Connection zone CNZ | Reserved area RSA | Reference code recording zone RCZ | |
| Emboss pit area | | | | Mirror surface | Emboss pit area | | |
| 211 | | | | | 211 | | |

| System lead-in area SYLDI | | | | Connection area CNA | Data lead-in area DTLDI | | | | | | Data area DTA |
|---|---|---|---|---|---|---|---|---|---|---|---|
| Initial zone INZ | Buffer zone 1 BFZ1 | Control data zone CDZ | Buffer zone 2 BFZ2 | Connection zone CNZ | Guard track zone 1 GTZ1 | Disk test zone DKTZ | Drive test zone DRTZ | Guard track zone 2 GTZ2 | Disk identification zone DIZ | Defect management area 1 DMA1 | Defect management area 2 DMA2 |
| Emboss pit area | | | | Mirror surface | Land area and groove area | | | | | | |
| 211 | | | | | 213 | | | | | | |

| System lead-in area SYLDI | | | | Connection area CNA | Data lead-in area DTLDI | | | | | | | Data area DTA |
|---|---|---|---|---|---|---|---|---|---|---|---|---|
| Initial zone INZ | Buffer zone 1 BFZ1 | Control data zone CDZ | Buffer zone 2 BFZ2 | Connection zone CNZ | Guard track zone 1 GTZ1 | Disk test zone DKTZ | Drive test zone DRTZ | Guard track zone 2 GTZ2 | RMD duplication zone RDZ | Recording management zone RMZ | R-physical information zone R-PFIZ | Reference code recording zone RCZ |
| Emboss pit area | | | | Mirror surface | Groove area | | | | | | | |
| 211 | | | | | 214 | | | | | | | |

| Data lead-in area DTLDI | Data area DTA | Data lead-out area DTLDO | System lead-out area SYLDO |
|---|---|---|---|
| | Area for recording user data in advance | All main data = "00h" | All main data = "00h" |

| Data lead-in area DTLDI | Data area DTA | | | Data lead-out area DTLDO | | | | |
|---|---|---|---|---|---|---|---|---|
| | Spare area SPA | User data rewritable range | | Defect management area 3 DMA3 | Defect management area 4 DMA4 | Guard track zone 3 GTZ3 | Drive test zone DRTZ | Disk test zone DKTZ | Guard track zone 4 GTZ4 | Servo calibration zone SCZ |

| Data lead-in area DTLDI | Data area DTA | | | Data lead-out area DTLDO | | | | | |
|---|---|---|---|---|---|---|---|---|---|
| | Spare area SPA | User data rewritable range | Expanded spare area ESPA | Defect management area 3 DMA3 | Defect management area 4 DMA4 | Guard track zone 3 GTZ3 | Drive test zone DRTZ | Disk test zone DKTZ | Guard track zone 4 GTZ4 | Servo calibration zone SCZ |

203 ↑α(start position address)  211 Emboss pit

FIG. 37D

| Data lead-in area DTLDI | Data area DTA | | Data lead-out area DTLDO | | | |
|---|---|---|---|---|---|---|
| | Spare area SPA | User data write-once recordable range | Drive test zone DRTZ | Disk test zone DKTZ | Guard track zone 4 GTZ4 | Servo calibration zone SCZ |

| Data lead-in area DTLDI | Data area DTA | | | | | | Data lead-out area DTLDO | | | |
|---|---|---|---|---|---|---|---|---|---|---|
| | Spare area SPA | User data additional writing enable range | Expanded spare area 2 ESPA2 | Expanded drive test zone 2 EDRTZ2 | Expanded spare area 1 ESPA1 | Expanded drive test zone 1 EDRTZ1 | Drive test zone DRTZ | Disk test zone DKTZ | Guard track zone 4 GTZ4 | Servo calibration zone SCZ |

↑ζ  ↑ε  ↑σ  ↑γ  ↑β  211 ⟶ Emboss pit

Start position address of each area →

| Data lead-in area DTLDI | Data area DTA | | Data lead-out area DTLDO | | | | |
|---|---|---|---|---|---|---|---|
| | Spare area SPA | User data additionally recordable range | Expanded spare area ESPA | Expanded drive test zone EDRTZ | Drive test zone DRTZ | Disk test zone DKTZ | Guard track zone 4 GTZ4 | Servo calibration zone SCZ |

205

(a)

| System lead-in area SYLDI | | | | Connection area CNA | Data lead-in area DTLDI | | | | | | | Data area DTA |
|---|---|---|---|---|---|---|---|---|---|---|---|---|
| Initial zone INZ | Buffer zone 1 BFZ1 | Control data zone CDZ | Buffer zone 2 BFZ2 | Connection zone CNZ | Guard track zone 1 GTZ1 | Disk test zone DKTZ | Drive test zone DRTZ | Guard track zone 2 GTZ2 | RMD duplication zone RDZ | Recording management zone RMZ | R-physical information zone R-PFIZ | Reference code recording zone RCZ |

∼271

(b) RMD duplication zone RDZ

| RDZ lead-in area RDZLI | Recording management data RMD recording area at the end of corresponding RMZ | | | |
|---|---|---|---|---|
| System reservation field SRSF | Unique ID field UIDF | Recording management data RMD#A at the end of corresponding RMZ | Recording management data RMD#B at the end of corresponding RMZ | Reserved area |
| 48KB | 16KB | One physical segment block size (64KB) | One physical segment block size (64KB) | |

∼272

Recording management zone RMD corresponding to first bordered area ∼273

| Recording management data RMD#1 corresponding to first bordered area | Recording management data RMD#2 corresponding to first bordered area | Recording management data RMD#3 corresponding to first bordered area | Reserved area |
|---|---|---|---|
| One physical segment block size | 64KB | 64KB | |

(c)

| RMD field name | RMD field 0 | RMD field 1 | RMD field 2 | RMD field 3 | RMD field 4 - 21 | Reserved |
|---|---|---|---|---|---|---|
| Contents of recording information | Reserved area | Disk state/ data area allocation | Used test zone/ recording waveform information | User available area | Border area start position/expanded RMZ position | R-zone positional information | Reserved area |
| Used data size (bytes) | 2048 | 2048 | 2048 | 2048 | 2048 | 36864 | 18432 |
| Relative physical sector number | 0 | 1 | 2 | 3 | 4 | 5 - 22 | 23 - 31 |

FIG. 38

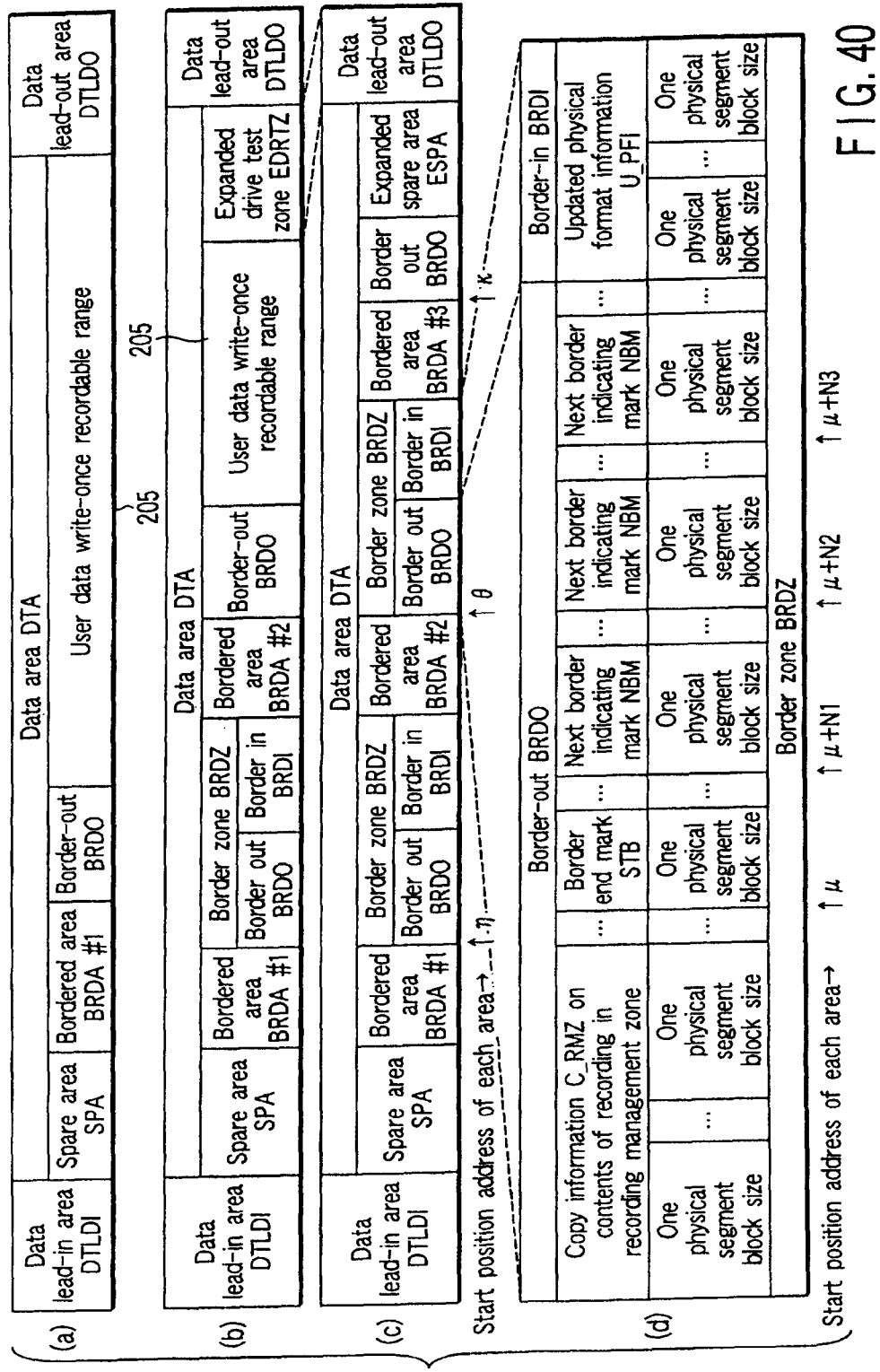
F I G. 40

(a)

| System lead-in area SYLDI | | | | | | | Connection area CNA | Data lead-in area DTLDI | | | | | | Data area DTA |
|---|---|---|---|---|---|---|---|---|---|---|---|---|---|---|
| Initial zone INZ | Buffer zone 1 BFZ1 | Control data zone CDZ | Buffer zone 2 BFZ2 | Connection zone CNZ | Guard track zone 1 GTZ1 | ... | ... | Disk test zone DKTZ | Drive test zone DRTZ | Guard track zone 2 GTZ2 | Recording management zone RMZ | R-physical information zone RIZ | Reference code recording zone RCZ | |

(b)

| Control data zone CDZ | | |
|---|---|---|
| ... | Physical format information PFI | Disc manufacture related information DMI |

R-physical information zone RIZ

| Disc manufacture related information DMI | R-physical format information R_PFI |
|---|---|

(c)

| Disc manufacture related information DMI | | | Physical format information PFI or R-format information R_PFI | | | |
|---|---|---|---|---|---|---|
| Information relating disc manufacture country name | Disc manufacturer country information | Other disc manufacture related information | Common information in DVD family | Common information in HD_DVD family | Type of each specification and version specific information | Contents of information which can be set specific to each revision |
| 251 | 252 | 253 | 261 | 262 | 263 | 264 |

| Information name | Type of recording information |
|---|---|
| Byte location | 0 – 31 | 32 – 127 | 128 – 511 | 512 – 2047 |

(d)

| Byte position | 0 – 16 | 17 – 31 |
|---|---|---|
| Type of recording information | Information which can be recorded common to all of read-only type, rewritable-type, and write-once type | Information recorded common to rewritable type and write-once type (not recorded in read-only type) |
| | 267 | 268 |

FIG. 41

| Type of recording information | Byte position | Physical format information PFI ||| R-physical format information |
|---|---|---|---|---|---|
| | | Read-only type | Rewritable type | Write-once type | |
| 267 — Information common to all of read-only type, rewritable type, and write-once type | 0 | Type of specification (read-only, rewritable, and write-once) information and version number information ||||
| | 1 | Medium size (diameter) and maximum allowable data transfer rate information ||||
| | 2 | Medium structure (single layer or double layer. Presence or absence of emboss pit, write-once recording area, or rewritable area) ||||
| | 3 | Recording density (line density and track density) information ||||
| | 4-15 | Data area DTA allocation location information ||||
| | 16 | Information on the presence or absence of burst cutting area BCA (This area is always present in the present embodiment.) ||||
| 268 — Common Rewritable type and write-once type contained in DVD family | 17 | | Revision number information defining maximum recording speed |||
| | 18 | | Revision number information defining minimum recording speed |||
| | 19-25 | Reserved area | Revision number table (applicable revision number) |||
| | 26 | | Class state information |||
| | 27 | | Expanded (part) version information |||
| | 28-31 | | Reserved area |||
| HD_DVD | 31-127 | | Reserved area |||
| 263 — Unique data on the type and version of each standard | 128-175 | Medium manufacturer's name information ||||
| | 176-191 | Additional information from medium manufacturer ||||
| | 192 | Recording mark polarity information (identification of H → L or L → H) ||||
| | 193 | Line speed information at the time of recording or at the time of reproduction ||||
| | 194 | Rim intensity value of optical system along circumferential direction ||||
| | 195 | Rim intensity value of optical system along radial direction ||||
| | 196 | Recommended laser power at the time of reproduction (light amount value on recording surface) ||||
| | 197-511 | Reserved area ||||
| 264 — Contents of data uniquely settable in each revision | 512 | Reserved area | Peak power in land area | Peak power ||
| | 513 | | Bias power 1 in land area | Bias power 1 ||
| | 514 | | Bias power 2 in land area | Bias power 2 ||
| | 515 | | Bias power 3 in land area | Bias power 3 ||
| | 516 | | Peak power in groove area | End time of first pulse ($T_{EFP}$ in FIG. 18) ||
| | 517 | | Bias power 1 in groove area | Multi-pulse interval ($T_{MP}$ in FIG. 18) ||
| | 518 | | Bias power 2 in groove area | Starting time of last pulse ($T_{SLP}$ in FIG. 18) ||
| | 519 | | Bias power 3 in groove area | Period of bias power 2 of 2T mark ($T_{LC}$ in FIG. 18) ||
| | 520-196 | ............... | ............... ||
| | 197-204 | Reserved area | Start position information on border zone ||
| | 204-2047 | Reserved area ||||

FIG. 42

| In read-only type information storage medium | Physical format information PFI | | R-physical format information R_PFI |
|---|---|---|---|
| | In rewritable-type information storage medium | In Write-once type information storage medium | |
| "00h" | "00h" | "00h" | "00h" |
| Data area start position information (physical sector number or ECC block number) | Start position information on data area DTA in land area (physical sector number or ECC block number) | Data area start position information (physical sector number or ECC block number) | Data area start position information (physical sector number or ECC block number) |
| "00h" | "00h" | "00h" | "00h" |
| Data area end position information (physical sector number or ECC block number) | End position information on data area DTA in land area (physical sector number or ECC block number) | End position information on user data write-once recording range [position that immediately precedes point ζ in FIG. 37E] (physical sector number or ECC block number) | End position information on recorded data in the corresponding bordered area (physical sector number or ECC block number) |
| "00h" | "00h" | "00h" | "00h" |
| "0-layer end address information (physical sector number or ECC block number) | Differential value of start position information between land area and groove area (physical sector number or ECC block number) | | |

FIG. 43

| RMD field number | | | Contents of recorded information |
|---|---|---|---|
| | | | Reserved area of 2048 bytes |
| | Recording management data format code information | | |
| | Medium state information (unrecorded state, midway of recording before finalization, or after finalization) | | |
| | Unique disk ID (disk identification information) | | |
| 0 | Allocation position information on data area DTA | | Allocation position information on data area DTA (described in physical sector number, ECC block address, or data segment address) |
| | | | End position of user data recordable range 204 at an initial state (described in physical sector number, ECC block address, or data segment address) [This indicates a position that immediately precedes point β in embodiment shown in FIG. 37E.] |
| | | | Information for identifying the presence or absence of expanded drive test zone EDRTZ |
| | | | Identification information on the presence or absence of expanded spare area ESPA |
| | | | Start position information of data area DTA (described in physical sector number, ECC block address, or data segment address) |
| | Allocation position information on latest (updated) data area DTA | | End position of latest user data recordable range 205 (described in physical sector number, ECC block address, or data segment address) [This indicates a position that immediately precedes point ζ in embodiment shown in FIG. 37E.] |
| | | | Residual amount which can be recorded (write-once) in the future in user data recordable range 205 (described in physical sector number, ECC block address, or data segment address) |
| | | | Start position information of data lead-out area DTLDO (described in physical sector number, ECC block address, or data segment address) |
| | Allocation position information on recording management data RDM | | Size information for which recording management zone RMZ has been set (physical segment block unit = ECC block unit = data segment unit) |
| | | | Number information on current recording management data number in recording management zone RMZ or recording management data RMD which has already been recorded in recording management zone RMZ (physical segment block unit (= ECC block unit = data segment unit) ["2" is obtained in RMD#2 shown in FIG. 36(b)] |
| | | | Residual amount information contained in recording management zone RMZ (information on (item number of recording management data RMD which can be further added) (Physical segment block unit (= ECC block unit = data segment unit)) |

FIG. 44

| RMD field number | Contents of recorded information |
|---|---|
| 1 | #1: Manufacturer identification information on information recording/reproducing apparatus |
| | #1: Serial number of information recording/reproduction apparatus (described in ASCII codes) |
| | #1: Model number of information recording/reproduction apparatus (described in ASCII codes) |
| | #1: Date and time information when recording power adjustment has been made by using drive test zone |
| | #1: All recording condition information in information 264 (FIG. 42) which can be set specific to each revision |
| | .......... |
| | #4: Manufacturer identification information on information recording/reproducing apparatus |
| | #4: Serial number of information recording/reproduction apparatus (described in ASCII codes) |
| | #4: Model number of information recording/reproduction apparatus (described in ASCII codes) |
| | #4: Date and time information when recording power adjustment has been made by using drive test zone |
| | #4: All recording condition information in information 264 (FIG. 42) which can be set specific to each revision |
| 2 | User available area |
| 3 | Start position information on first border out BRDO (physical sector number) [This indicates positional information on point η in embodiment shown in FIG. 39(c)] |
| | Start position information on second border out BRDO (physical sector number) [This indicates positional information on point θ in embodiment shown in FIG. 39(c)] |
| | .......... |
| | Start position information on 50th border out BRDO (Physical sector number) |

F I G. 45

| RMD field number | Contents of recorded information |
|---|---|
| 4 | End position information on location which has already been used for test writing in drive test zone DRTZ which exists in data lead-in area DTLDI (physical sector number or ECC block address) |
| | Flag information indicating a size of an area which can be used to further test writing in drive test zone DRTZ which exists in data lead-in area DTLDI or whether or not the drive test zone DRTZ has been used up |
| | End position information in location which has already been used for test writing in drive test zone DRTZ which exists in data lead-out area DTLDO (described in physical sector number or ECC block address/data segment address) |
| | Flag information indicating a size of an area which can be used to further test writing in drive test zone DRTZ which exists in data lead-out area DTLDO or whether or not the drive test zone DRTZ has been used up |
| | Additional setting count information on expanded drive test zone EDRTZ |
| | Start position information on first set expanded drive test zone EDRTZ (described in physical sector number or ECC block address/data segment) |
| | Start position information on first set expanded drive test zone EDRTZ (described in physical sector number or ECC block address/data segment) or size information on first set expanded drive test zone EDRTZ |
| | End position information on location which has already been used for test writing in first set expanded drive test zone EDRTZ (physical sector number or ECC block/data segment address) |
| | Flag information indicating a size of an area which can be used to further test writing in the first set expanded drive test zone EDRTZ or whether or not the expanded drive test zone EDRTZ has been used up |
| | Start position information on second set expanded drive test zone EDRTZ (described in physical sector number or ECC block address/data segment address) |
| | ......... |

F I G. 46

| RMD field number | Contents of recorded information |
|---|---|
| 5 | ECC block number information or physical segment block number information which has already been used for substitution in spare area SPA adjacent to data lead-in area DTLDI or end position information on location which has been used for substitution (ECC block/data segment address) |
| | Residual amount information contained in spare area SPA adjacent to data lead-in area DTLDI (number information on ECC block in an unused location available for use in future substitution or physical segment block number/data segment number information) |
| | Additional setting count information on expanded spare ESPA |
| | Start position information on first set expanded spare area ESPA (described in physical sector number or ECC block address/data segment address) |
| | End position information on first set expanded spare area ESPA (described in physical sector number or ECC block address/data segment address) |
| | ECC block number information or physical segment number information which has already been used for substitution in first set expanded spare area ESPA or end position information on used location for substitution (ECC block/data segment address) |
| | Residual amount information contained in first set expanded spare area ESPA (ECC block number information or physical segment block number information on unused location available for use in future substitution) |
| | Start position information on second set expanded spare area ESPA (described in physical sector number or ECC block address/data segment address) |
| | End position information on second set expanded spare area ESPA (described in physical sector number or ECC block address/data segment address) |
| | ECC block number information or physical segment number information which has already been used for substitution in second set expanded spare area ESPA or end position information on used location for substitution (ECC block/data segment address) |
| | Residual amount information contained in second set expanded spare area ESPA (ECC block number information or physical segment block number information on unused location available for use in future substitution) |

FIG. 47

| RMD field number | | | | Contents of recorded information |
|---|---|---|---|---|
| 6 | | | | Size information on RMD field 6 |
| | | Secondary defect list identification information | | |
| | | Secondary defect list update counter (update count) | | |
| | | Number information on secondary defect list entries | | |
| | Secondary defect list information SDL | First secondary defect list entry information | | Information on presence or absence of replacing process of defect block with substitute block |
| | | | | Type information on defect management process (whether replacement source ECC block has been replaced due to defect or whether replacement source ECC block is non-defect and is subjected to multiplication recording) |
| | | | | Positional information on replacement source ECC block (ECC block address, ECC block address, data segment address, or physical sector number of ECC block start position) |
| | | | | Positional information on replacement source ECC block (ECC block address, ECC block address, data segment address, or physical sector number of ECC block start position) |
| | | ......... | | |
| | | Last secondary defect list entry information | | Information on presence or absence of replacing process of defect block with substitute block |
| | | | | Type information on defect management process (whether replacement source ECC block has been replaced due to defect or whether replacement source ECC block is non-defect and is subjected to multiplication recording) |
| | | | | Positional information on replacement source ECC block (ECC block address, ECC block address, data segment address, or physical sector number of ECC block start position) |
| | | | | Positional information on replacement source ECC block (ECC block address, ECC block address, data segment address, or physical sector number of ECC block start position) |

FIG. 48

| RMD field number | Contents of recorded information |
|---|---|
| | Number information on whole R zone |
| | Number information on first "open R zone" |
| | Number information on second "open R zone" |
| | Start position information on first "complete R zone" (physical sector number) |
| | End position information on first "complete R zone" (physical sector number) |
| 7 | ............ |
| | Start position information on 254-th "complete R zone" (physical sector number) |
| | End position information on 254-th "complete R zone" (physical sector number) |
| | Start position information on 255-th "complete R zone" (physical sector number) |
| | End position information on 255-th "complete R zone" (physical sector number) |
| 8 and subsequent | ............ |
| | Start position information on n-th "complete R zone" (physical sector number) |
| | End position information on n-th "complete R zone" (physical sector number) |

F I G. 49

(a) Data frame (b) | Data ID | IED | Reserved RSV | Main data D0 to D2047 | EDC |

(c) Data frame information | Data frame number (= physical sector number)

(d)
| 931 | 932 | 933 | 934 | 935 | 936 | 937 |
|---|---|---|---|---|---|---|
| Format type | Tracking method | Reflection factor of recording film | Recording type information | Area type information | Data type information | Layer number |
| 0 CLV | 0 Pit-compatible | 0 40% or more | 0 General data | 00 Data area DTA | 0 Read-only | 0 Layer 0 |
| 1 Zone | 1 Groove-compatible | 1 40% or less | 1 Real time (AV) data | 01 System lead-in area SYLDI or data lead-in area DTLDI | 1 Rewritable | 1 Layer 1 |
| | | | | 10 Data lead-out area DTLDO or system lead-out area SYLDO | | |
| | | | | 11 Middle area MDA | | |

FIG. 50

| RMD field number | Contents of recorded information |
|---|---|
| 0 | Same as FIG. 44 (All positional information is described in physical sector numbers) |
| 1 | A detailed description is given in FIG. 53 |
| 2 | Same as FIG. 45 |
| | ............... |
| | Physical sector number indicating start position of first border out BRDO |
| | Physical sector number indicating start position of second border out BRDO |
| | ............... |
| | Physical sector number indicating start position of 128th border out BRDO. If 128th border out BRDO does not exist, "00h" is set |
| | Recording position management zone RMZ number currently used (which is open and which can be additionally RMD- written) and recording management zone RMZ in which latest recording management data RDD is recorded |
| | Reserved area (main data is set to "00h") |
| 3 | Physical sector number indicating start position of first expanded recording management zone RMZ |
| | Size information on first expanded recording management zone RMZ (described in number of occupying physical sectors) |
| | Physical sector number indicating start position of second expanded recording management zone RMZ |
| | Size information on second expanded recording management zone RMZ (displayed in number of occupying physical sectors) |
| | ............... |
| | Physical sector number indicating start position of 128th expanded recording management zone RMZ. If 128-th expanded recording management zone RMZ does not exist, "00h" is set |
| | Size information on 128th expanded recording management zone RMZ (displayed in number of occupying physical sectors) If 129th expanded recording management zone RMZ does not exist, "00h" is set. Reserved area (Main data is set to "00h") |
| | Reserved area (main data is set to "00h") |

FIG. 51

| RMD field number | Contents of recorded information |
|---|---|
| | Total number of unspecified R zone number, open R zone number, and complete R zone number and area in which area reservation for data recording is not made in unspecified R zone data area DTA (invisible R Zone) |
| | Number information on first open R zone and R zone having unrecorded area in which write-once recording can be carried out after open R zone |
| | Number information on second open R zone and R zone having unrecorded area in which write-once recording can be carried out after open R zone |
| | Reserved area (main data is set to "00h") |
| 4 | Physical sector number indicating start position of first R zone |
| | Physical sector number indicating last recording end position in first R zone (LRA: Last Recorded Address) |
| | Physical sector number indicating start position of second R zone |
| | Physical sector number indicating last recording end position in second R zone (LRA: Last Recorded Address) |
| ⋮ | ………… |
| | Physical sector number indicating start position of 254th R zone |
| | Physical sector number indicating last recording end position in 254th R zone (LRA: Last Recorded Address) |
| ⋮ | ………… |
| | Physical sector number indicating start position of 4351st R zone |
| | Physical sector number LRA indicating last recording end position in 4351st R zone |
| | Physical sector number indicating start position of 4351+1th R zone |
| | Physical sector number LRA indicating last recording end position in 4351+1th R zone |
| ⋮ | ………… |
| 21 | Physical sector number indicating start position of 4351+255th R zone. If the corresponding R zone is not set, main data is set to "00h" |
| | Physical sector number LRA indicating last recording end position in 4351+255th R zone. If the corresponding R zone is not set, main data is set to "00h" |
| | Reserved area |

FIG. 52

| RMD field number | Contents of recorded information |
|---|---|
| 1 | #1: Manufacturer identification information on information recording/reproducing apparatus |
| | #1: Serial number of information recording/reproducing apparatus (described in ASCII codes) |
| | #1: Model number of information recording/reproducing apparatus (described in ASCII codes) |
| | #1: Date and time information when recording condition adjustment has been made by using drive test zone DRTZ |
| | #1: Address information in location in which recording condition adjustment has been made in inner drive test zone DRTZ Address in drive test zone DRTZ which belongs to data lead-in area DTLDI is described in physical segment block address number |
| | #1: Address information in location in which recording condition adjustment has been made in outer drive test zone DRTZ Address in drive test zone DRTZ which belongs to data lead-out area DTLDO is described in physical segment block address number |
| | #1: Information relating to method for automatically adjusting recording condition (running OPC) |
| | #1: Last DSV (Digital Sum Value) at the end of recording |
| | ............ |
| | #4: Manufacturer identification information on information recording/reproducing apparatus |
| | #4: Serial number of information recording/reproducing apparatus (described in ASCII codes) |
| | #4: Model number of information recording/reproducing apparatus (described in ASCII codes) |
| | #4: Date and time information when recording condition adjustment has been made by using drive test zone DRTZ |
| | #4: Address information in location in which recording condition adjustment has been made in inner drive test zone DRTZ Address in drive test zone DRTZ which belongs to data lead-in area DTLDI is described in physical segment block address number |
| | #4: Address information in location in which recording condition adjustment has been made in outer drive test zone DRTZ Address in drive test zone DRTZ which belongs to data lead-out area DTLDO is described in physical segment block address number |
| | #4: Information relating to method for automatically adjusting recording condition (running OPC) |
| | #4: Last DSV (Digital Sum Value) at the end of recording |

F I G. 53

| Type of recording information | Byte position | Physical format information PFI | | | R-physical format information | Updated physical format information |
|---|---|---|---|---|---|---|
| | | Read-only type | Rewritable type | Write-once type | | |
| 269 — Common information contained in DVD family | 0 | Type of specification (read-only, rewritanle, and write-once) information and version number information | | | | |
| | 1 | Medium size (diameter) and maximum allowable data transfer rate information | | | | |
| | 2 | Medium structure (single layer or double layer. Presence or absence of emboss pit, write-once recording area, or rewritable area) | | | | |
| | 3 | Recording density (line density and track density) information | | | | |
| | 4-15 | Data area DTA allocation location information | | | | |
| | 16 | Information on the presence or absence of burst cutting area BCA (This area is always present in the present embodiment.) | | | | |
| | 17 | Revision number information defining maximum recording speed | | | | |
| | 18 | Revision number information defining minimum recording speed | | | | |
| | 19-25 | Revision number table (applicable revision number) | | | | |
| | 26 | Class state information | | | | |
| | 27 | Expanded (part) version information | | | | |
| | 28-31 | Reserved area | | | | |
| 265 — Contents of information which can be set specific to each specification | 31-127 | Reserved area | | | | |
| | 128 | Recording mark polarity information (identification of H → L or L → H) | | | | |
| | 129 | Line speed information at the time of recording or at the time of playback | | | | |
| | 130 | Rim intensity value of optical system along circumferential direction | | | | |
| | 131 | Rim intensity value of optical system along radial direction | | | | |
| | 132 | Recommended laser power at the time of playback (light amount value on recording surface) | | | | |
| | 133-140 | Reserved area | Reserved area | Border zone start position (PSN) | | Updated start position (PSN) |
| | 141-511 | | Reserved area | | | |
| 264 — Contents of information which can be set specific to each revision | 512 | Peak power in land area | Peak power | | | |
| | 513 | Bias power in land area | Bias power 1 | | | |
| | 514 | Bias power in land area | Bias power 2 | | | |
| | 515 | Bias power in land area | Bias power 3 | | | |
| | 516 | Peak power in groove area | End time of first pulse ($T_{EFP}$ in FIG. 18) | | | |
| | 517 | Bias power in groove area | Multi-pulse interval (bias power 1) ($T_{MP}$ in FIG. 18) | | | |
| | 518 | Bias power in groove area | Starting time of last pulse (Bias power 2) ($T_{SLP}$ in FIG. 18) | | | |
| | 519 | Bias power in groove area | Period of bias power 2 of 2T mark ($T_{LC}$ in FIG. 18) | | | |
| | 520-2047 | ............ | ............ | | | |

(a)
| Initial zone INZ | Buffer zone 1 BFZ1 | Control zone CDZ | Buffer zone 2 BFZ2 | Connection zone CNZ | Guard track zone 1 GTZ1 | Disk test zone DKTZ | Drive test zone DRTZ | Guard track zone 2 GTZ2 | Recording management zone RMZ | R-physical information zone R-RFIZ | Reference code recording zone RCZ |
|---|---|---|---|---|---|---|---|---|---|---|---|
| System lead-in area SYLDI ||||| Connection area CNA | Data lead-in area DTLDI |||||| Data area DTA |

(b)
| Control data section CTDS | Copyright data section CPDS | Reserved area RSV | Control data section CTDS | Copyright data section CPDS |
|---|---|---|---|---|
| 16 data segments | 16 data segments | 128 data segments | 16 data segments | 16 data segments |
| Control data zone CDZ |||||

(c)
| Physical format information PFI | Medium manufacturing related information DMI | Copyright protection information CPI | Reserved area RSZ |
|---|---|---|---|
| Relative physical sector number = 0 | Relative physical sector number = 1 | Relative physical sector number = 2 | Relative physical sector number = 3-31 |
| Control data section CTDS ||||

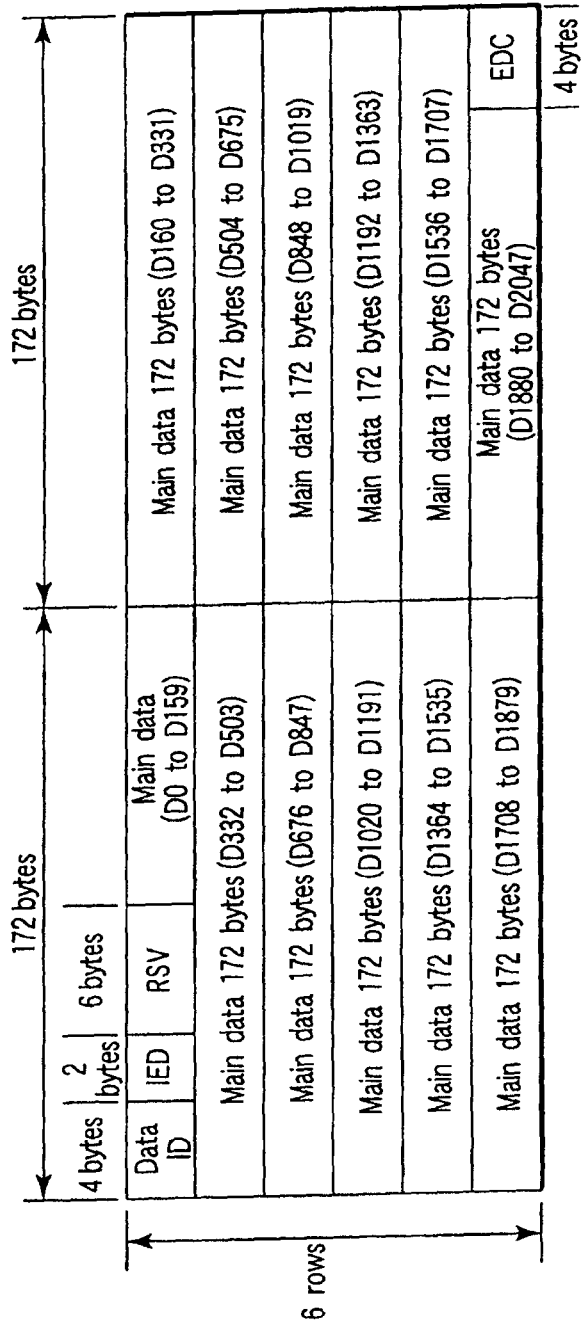
F I G. 57

| Default preset number | Default preset value | Default preset number | Default preset value |
|---|---|---|---|
| 0h | 0001h | 8h | 0010h |
| 1h | 5500h | 9h | 5000h |
| 2h | 0002h | Ah | 0020h |
| 3h | 2A00h | Bh | 2001h |
| 4h | 0004h | Ch | 0040h |
| 5h | 5400h | Dh | 4002h |
| 6h | 0008h | Eh | 0080h |
| 7h | 2800h | Fh | 0005h |

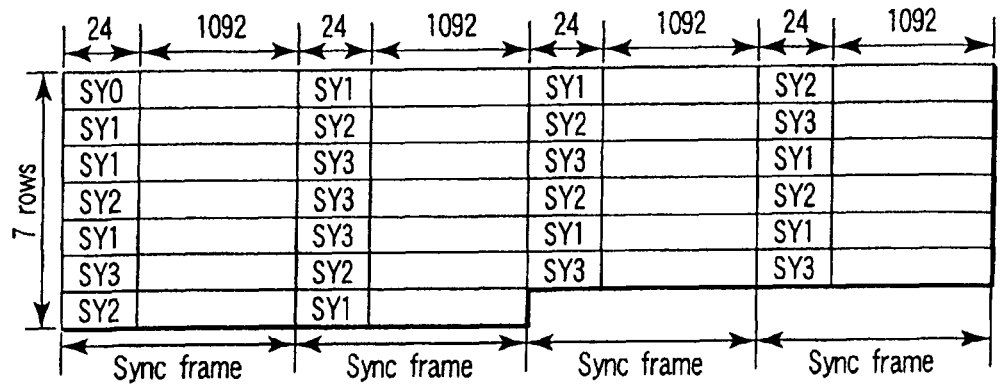
F I G. 62A
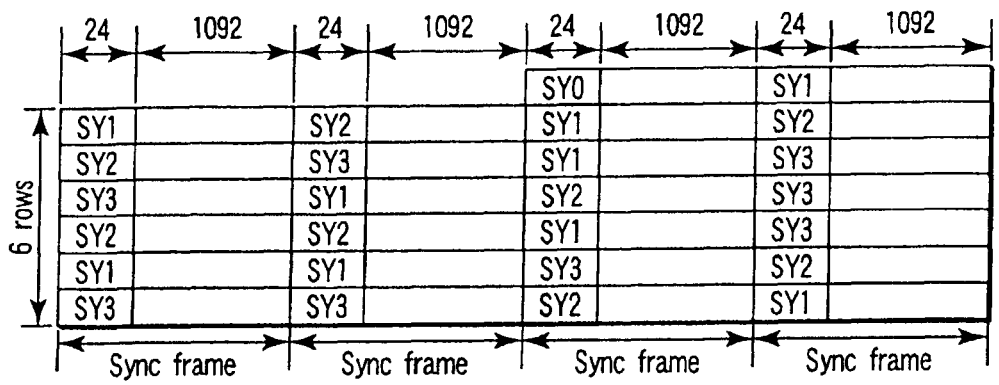
F I G. 62B
|  | State 0 | State 1 or State 2 |
|---|---|---|
| SY0 | 1000#0 010000 000000 001001 | 0100#0 010000 000000 001001 |
| SY1 | 10100# 010000 000000 001001 | 00100# 010000 000000 001001 |
| SY2 | 10010# 010000 000000 001001 | 00010# 010000 000000 001001 |
| SY3 | 00000# 010000 000000 001001 | 00#010 010000 000000 001001 |
F I G. 63

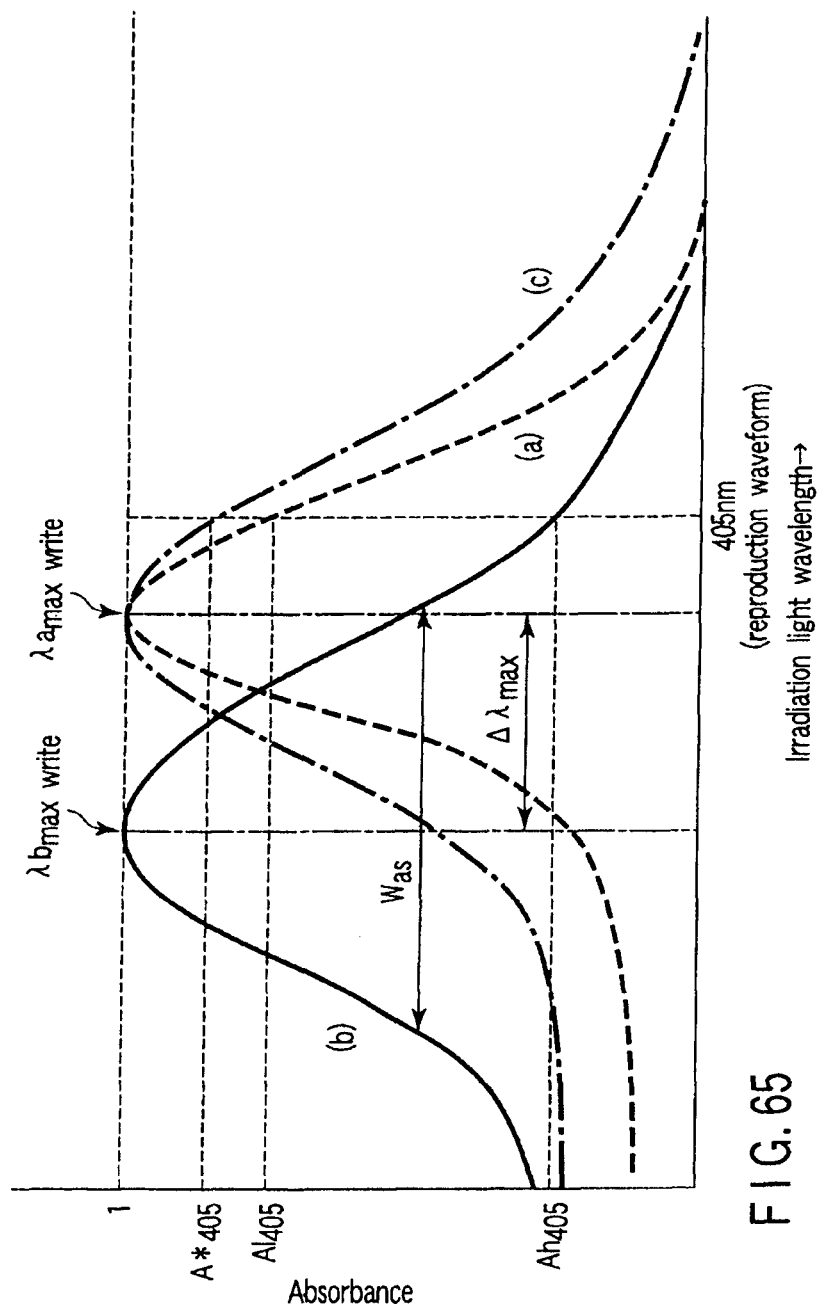
F I G. 65

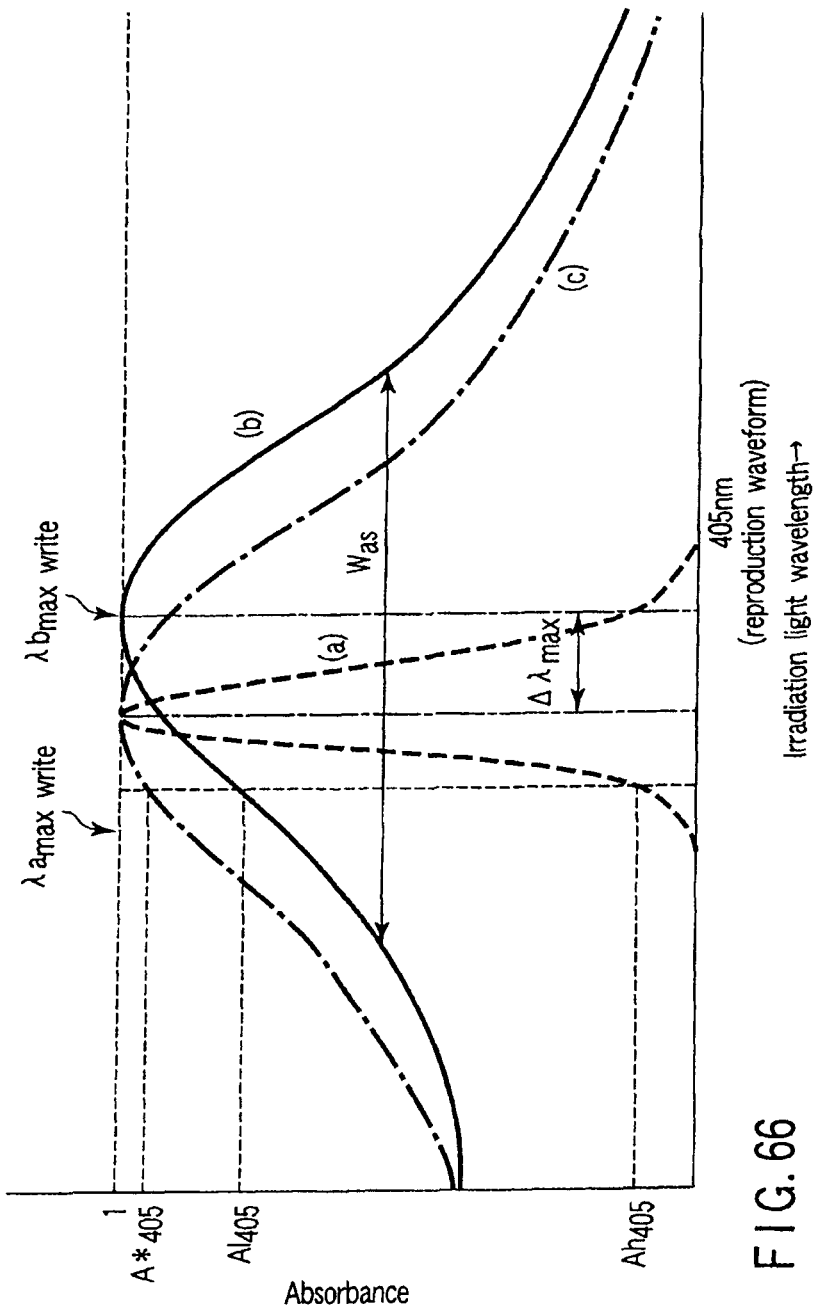
F I G. 66

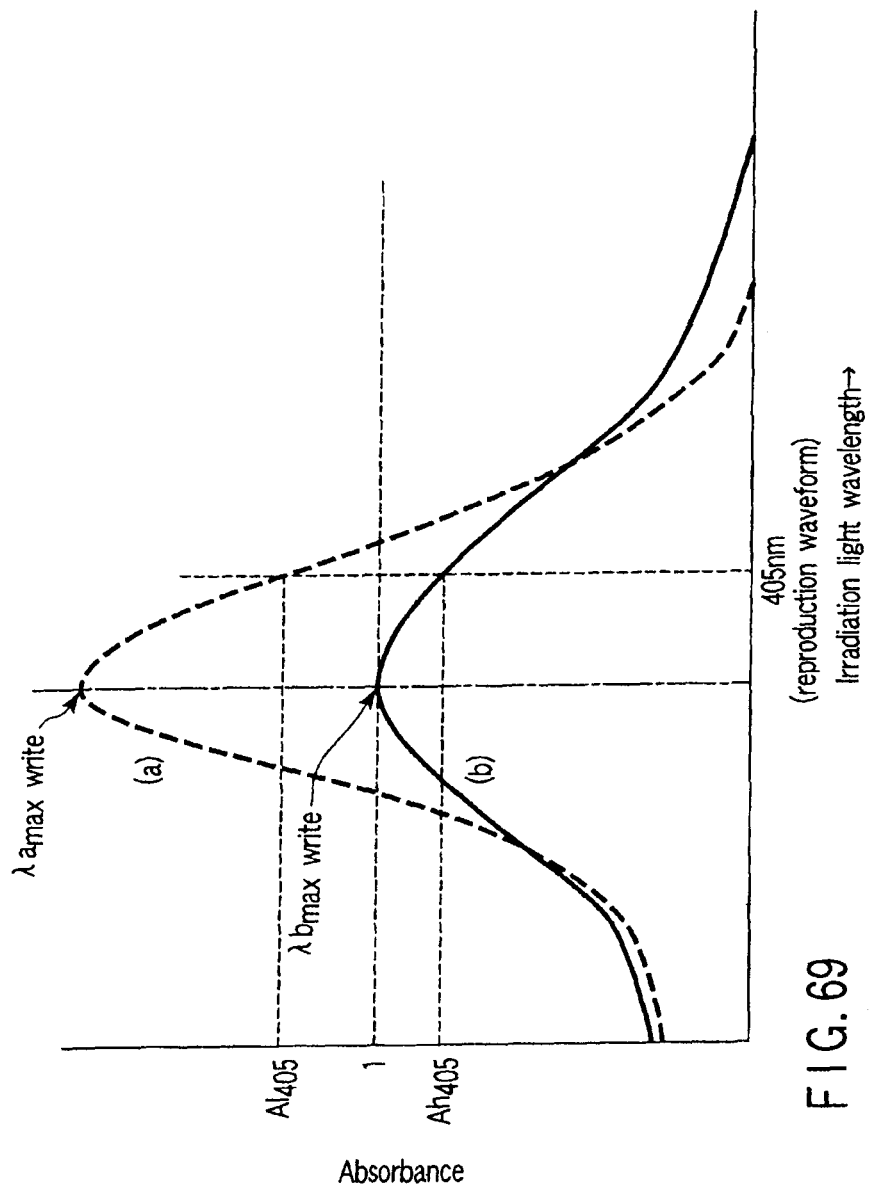
F I G. 69

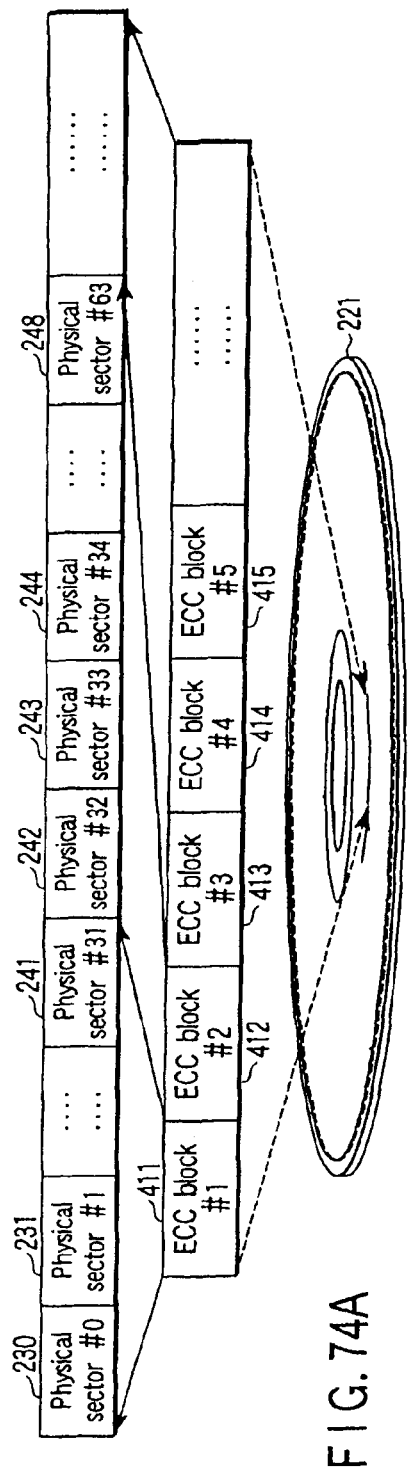
F I G. 74A
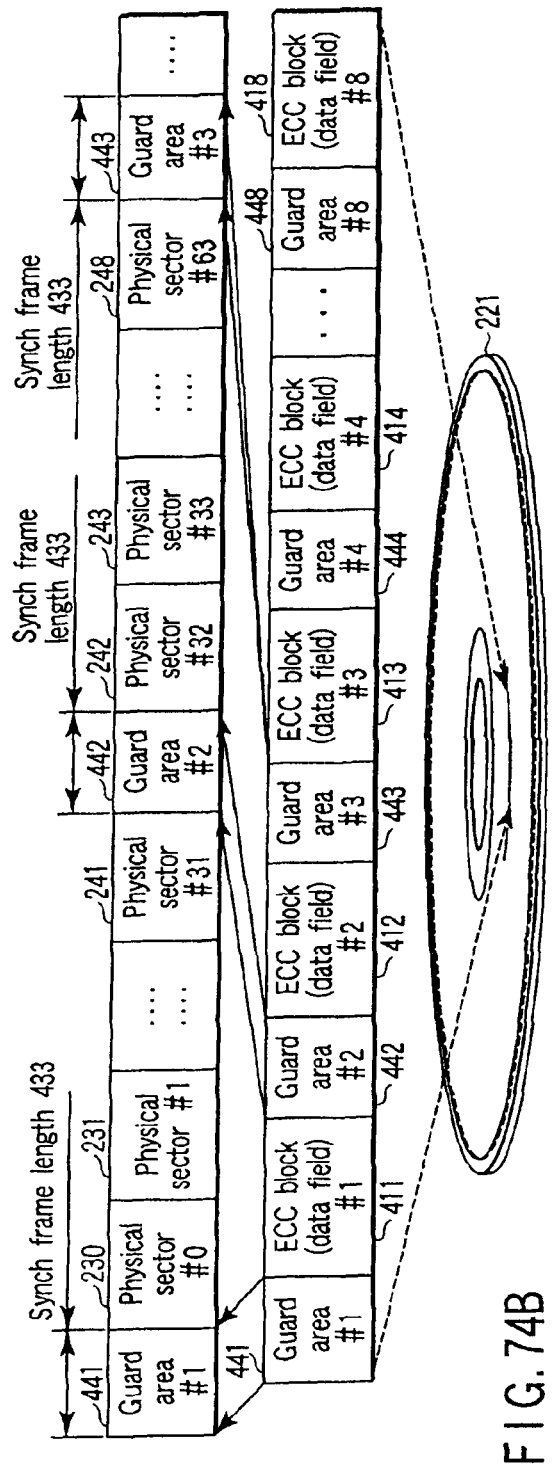
F I G. 74B

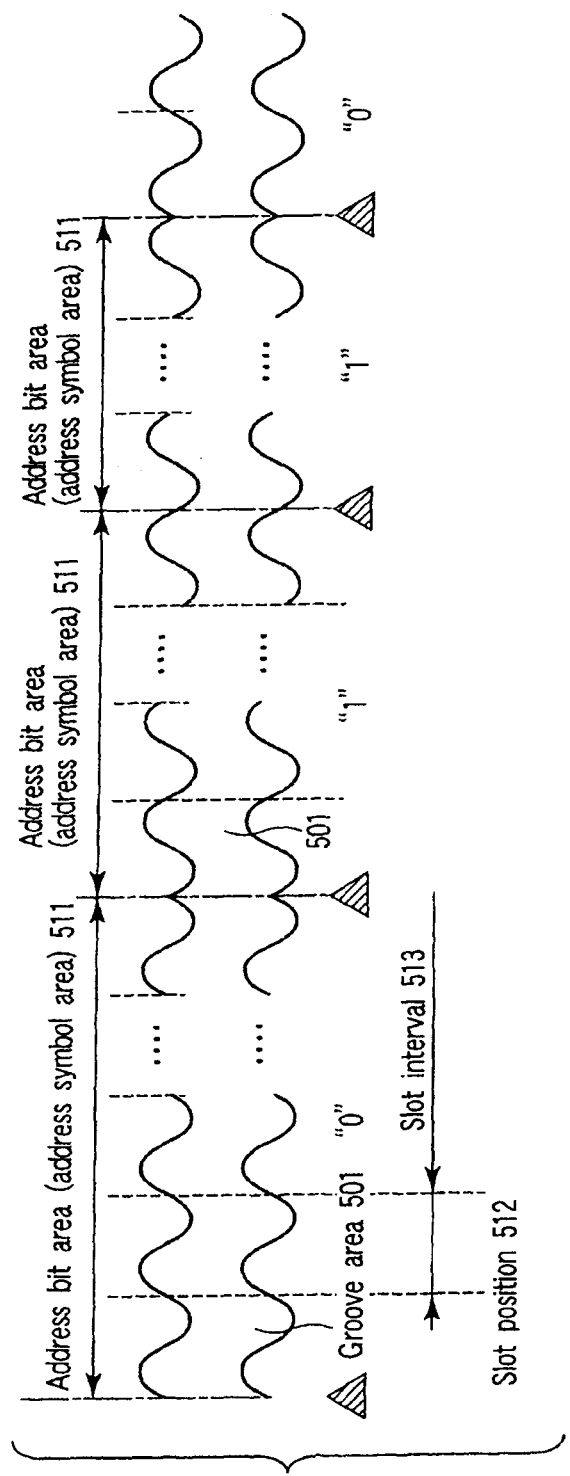
F I G. 76

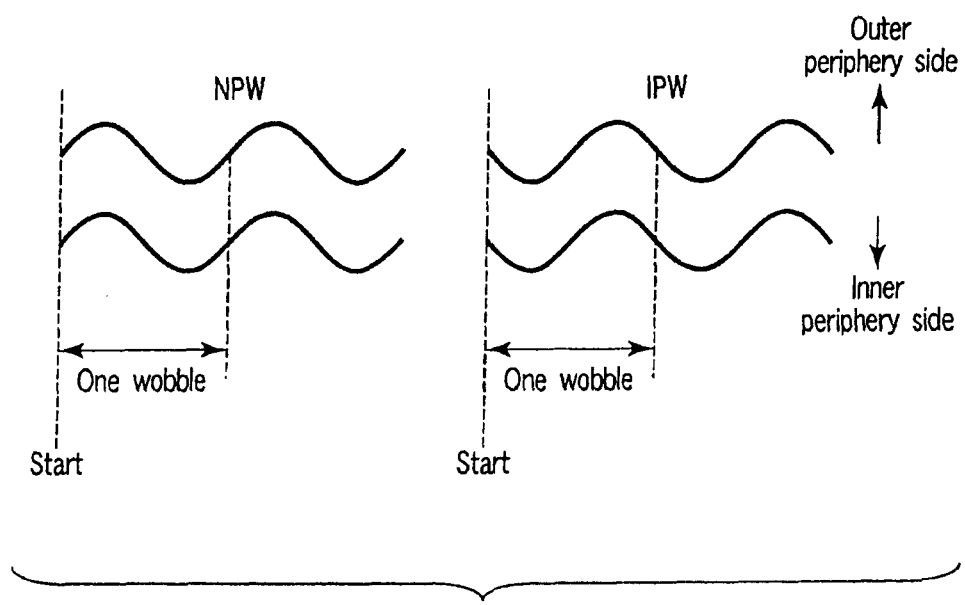
F I G. 77

FIG. 78A

| IPW | Modulation area | | Wobble data unit #0 | Non-modulation area | |
|---|---|---|---|---|---|
| | NPW | IPW | | NPW | IPW |
| 6 wobbles | 4 wobbles | 6 wobbles | 560 | 68 wobbles | 6 wobbles |
| | 592 | 598 | | 593 | |

FIG. 78B

| Non-modulation area | Modulation area | | Wobble data unit #0 | Non-modulation area |
|---|---|---|---|---|
| NPW | IPW | NPW | | NPW |
| 42 wobbles | 4 wobbles | 4 wobbles | 560 | 68 wobbles |
| 598 | | | | 593 |

FIG. 78C

| IPW | Modulation area | | | Wobble data units #1~#11 | Non-modulation area |
|---|---|---|---|---|---|
| | Address bit #2 | IPW | Address bit #1 | | NPW |
| 6 wobbles | 4 wobbles | 4 wobbles | 4 wobbles | 561~571 | 68 wobbles |
| | 592 | 598 | | | 593 |

FIG. 78D

| Non-modulation area | Modulation area | | | Wobble data units #1~#11 | Non-modulation area |
|---|---|---|---|---|---|
| NPW | Address bit #2 | IPW | Address bit #1 | | Address bit #0 | NPW |
| 42 wobbles | 4 wobbles | 4 wobbles | 4 wobbles | 561~571 | 4 wobbles | 26 wobbles |
| 598 | | | | | | 593 |

| (a) | Sync field | Address field | | | | | | | | | | | Unity field | | | | |
|---|---|---|---|---|---|---|---|---|---|---|---|---|---|---|---|---|---|
| | 711 | 712 | | | | | | | | | | | 713 | | | | |
| | 0 | 1 | 2 | 3 | 4 | 5 | 6 | 7 | 8 | 9 | 10 | 11 | 12 | 13 | 14 | 15 | 16 |

(b) All of the physical segment is filled with primary positions

| P | P | P | P | P | P | P | P | P | P | P | P | U | U | U | U | U |
|---|---|---|---|---|---|---|---|---|---|---|---|---|---|---|---|---|

(c) All of the physical segment is filled with secondary positions

| S | S | S | S | S | S | S | S | S | S | S | S | U | U | U | U | U |
|---|---|---|---|---|---|---|---|---|---|---|---|---|---|---|---|---|

(d) Primary positions and secondary positions are mixed in the physical segment

| P | P | P | P | P | P | S | P | P | S | S | S | U | U | U | U | U |
|---|---|---|---|---|---|---|---|---|---|---|---|---|---|---|---|---|

F I G. 81

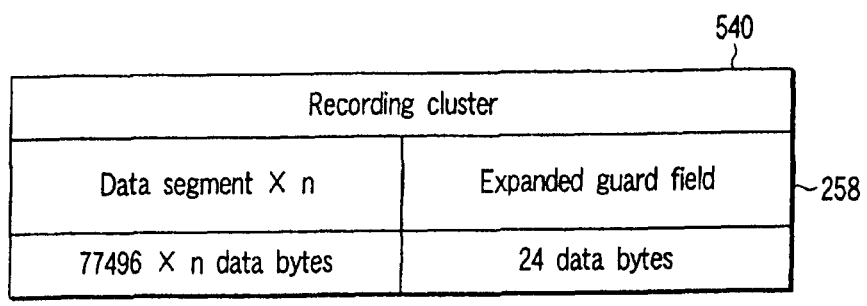
F I G. 82A
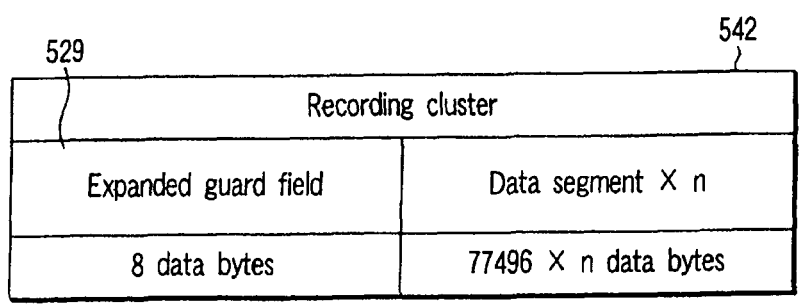
F I G. 82B

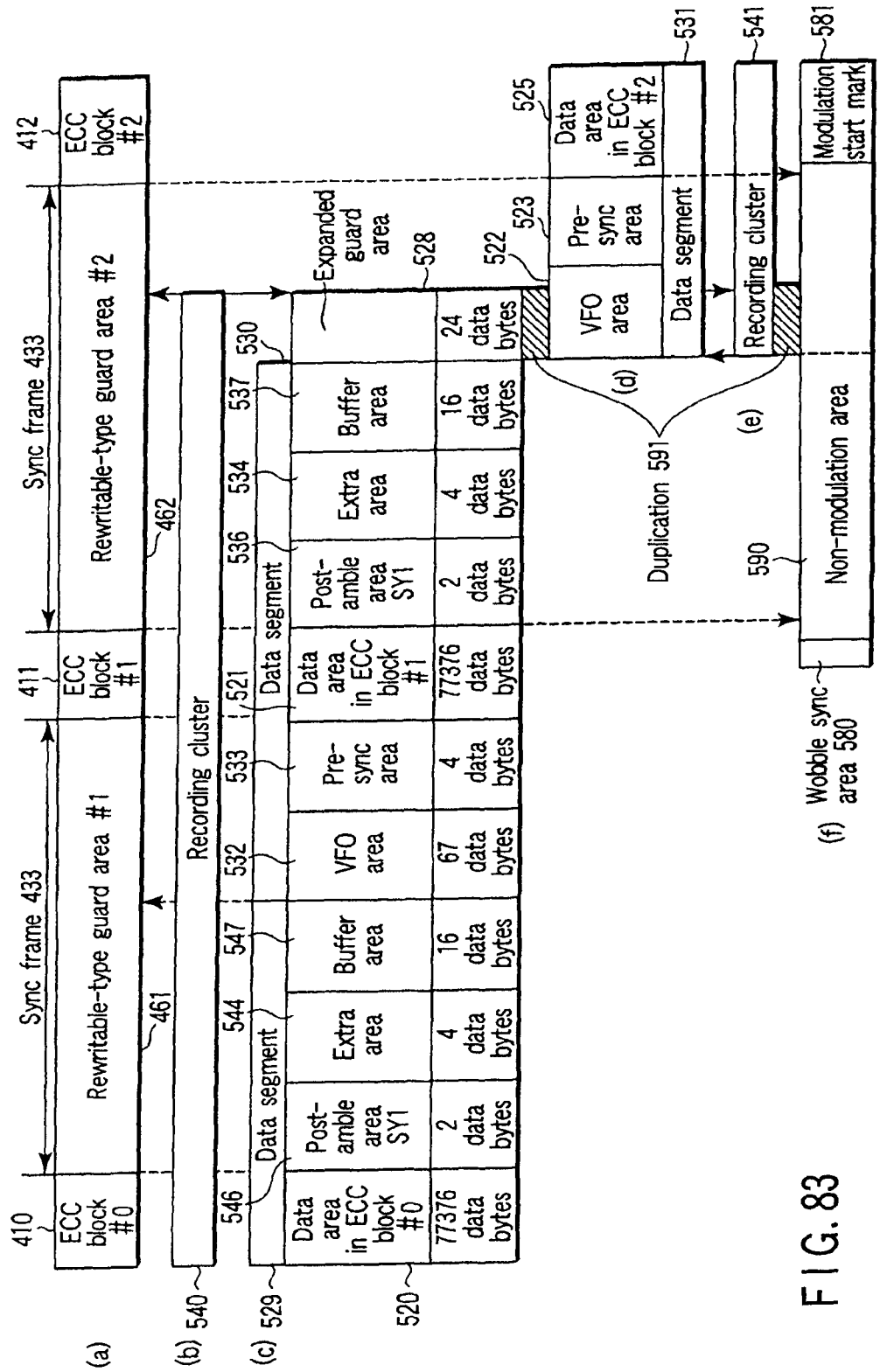
F I G. 83

| | RE | ROM | R |
|---|---|---|---|
| Recording capacity | 23.3/25/ (27) GB (Single-layered medium) 46.6/50/ (54) GB (Double-layered medium) | | |
| NA | 0.85 | | |
| Standard oscillation wavelength of light source | 405nm | | |
| Diameter (D) and thickness (t) | D=120mm, t=1.2mm | | |
| Thickness of cover layer for covering recording film | 100μm (Single-layered medium) L0:100μm  L1:75μm (Double-layered medium) | | |
| Recording encoding system | 1-7PP | | |
| Error correction system | LDC and BIS combining system | | |
| Shortest recording mark length | 0.16/0.149/(0.138)μm | | |
| Track pitches | 0.32μm | | |
| Recording track system | Groove | | Pit |
| Standard data transfer speed | V1.0: 36Mbps V2.0: 36 – 72Mbps | 36 – 72Mbps | 54Mbps (video application) |

F I G. 86

| ADIP unit number | Contents | ADIP unit number | Contents |
|---|---|---|---|
| 0 | Mono-tone | 13 | Reference |
| 1 | Sync_0 | 14 | data_x |
| 2 | Mono-tone | 15 | data_x |
| 3 | Sync_1 | 16 | data_x |
| 4 | Mono-tone | 17 | data_x |
| 5 | Sync_2 | ... | ... |
| 6 | Mono-tone | ... | ... |
| 7 | Sync_3 | ... | ... |
| 8 | Reference | 78 | Reference |
| 9 | data_x | 79 | data_x |
| 10 | data_x | 80 | data_x |
| 11 | data_x | 81 | data_x |
| 12 | data_x | 82 | data_x |

| Nibble | Bit 3 | Bit 2 | Bit 1 | Bit 0 | |
|---|---|---|---|---|---|
| n0 | AA23 | AA22 | AA21 | AA20 | ↑ |
| n1 | AA19 | AA18 | : | : | 6 nibbles ADIP address |
| : | : | : | : | : | |
| n5 | AA3 | : | : | AA0 | ↓ |
| n6 | AX11 | : | : | : | ↑ 3 nibbles Auxiliary data |
| : | : | : | : | : | |
| n8 | AX3 | : | : | AX0 | ↓ |

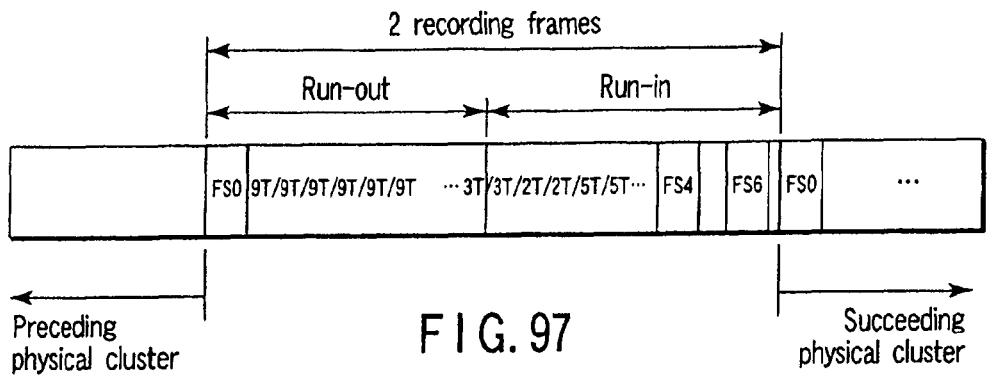
F I G. 97
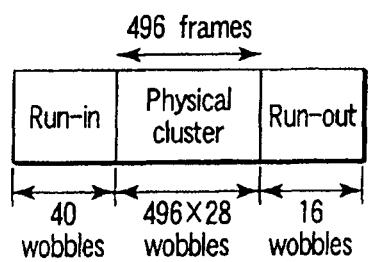
F I G. 98
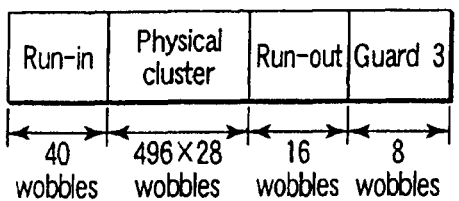
F I G. 99A
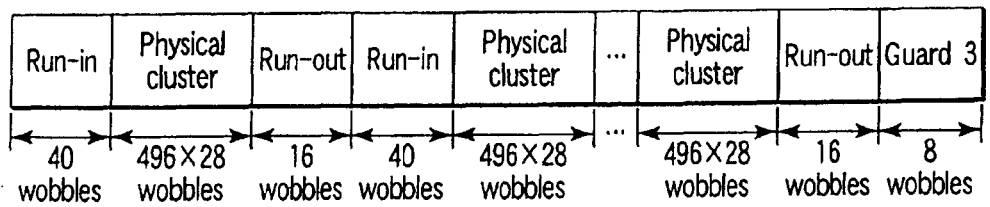
F I G. 99B

INFORMATION STORAGE MEDIUM, REPRODUCING METHOD, AND RECORDING METHOD

CROSS-REFERENCE TO RELATED APPLICATIONS

This is a Divisional Application of U.S. application Ser. No. 11/564,711, filed Nov. 29, 2006, the entire contents of which are incorporated herein by reference. U.S. application Ser. No. 11/564,711 is a Continuation Application of U.S. application Ser. No. 11/514,239, filed Sep. 1, 2006, which is a Continuation Application of PCT Application No. PCT/JP2006/301910, filed Jan. 30, 2006, which was published under PCT Article 21(2) in English.

This application is based upon and claims the benefit of priority from Japanese Patent Application No. 2005-024303, filed Jan. 31, 2005, the entire contents of which are incorporated herein by reference.

BACKGROUND

1. Field

One embodiment of the invention relates to an information storage medium such as an optical disk and a method for reproducing and recording the storage medium.

2. Description of the Related Art

As a write-once type optical disk using an organic dye material for a recording layer, there has been commercially available a CD-R disk using a recording/reproducing laser light source wavelength of 780 nm and a DVD-R disk using a recording/reproducing laser light beam wavelength of 650 nm. There is proposed that a cyanine dye thin film capable of changing a physical property with a comparatively long wavelength, for example, with light having 790 nm is used for a recording layer (for example, refer to Jpn. Pat. Appln. KOKOKU Publication No. 6-43147).

On the other hand, in principle, density is increased in inverse proportion to a square of a recording/reproducing laser light source wavelength, and it is desirable that a shorter laser light source wavelength be used for recording/reproducing application. In recent years, a next-generation optical disk with high density has been developed. Here, it is presumed that a recording or reproducing laser light source wavelength close to 405 nm (namely, in the range from 355 nm to 455 nm) is used. With respect to an organic dye recording material optimized with light of 650 nm, recording/reproducing characteristics significantly change if light to be used is shorter than 620 nm in wavelength. Thus, an organic dye material for 620 nm can be used as a recording later of a next-generation optical disk.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary view of the contents of constituent elements of an information storage medium and a combination method in the present embodiment;

FIGS. 2A and 2B show exemplary views of difference in principle of obtaining reproduction signal between phase change type recording film and organic dye based recording film in which FIG. 2A shows a phase change type recording film and FIG. 2B shows an organic dye based recording film;

FIG. 4 is an exemplary view showing an example of light absorption spectrum characteristics of an organic dye recording material used for a current DVD-R disk;

FIGS. 5A and 5B show exemplary views of difference of light reflection layer shape in pre-pit/pre-groove areas between phase change type recording film and organic dye based recording film in which FIG. 5A shows a phase change recording film and FIG. 5B shows an organic dye recording film;

FIGS. 6A and 6B are exemplary views each showing a plastic deformation situation of a specific transparent substrate 2-2 at a position of a recording mark 9 in a write-once type information storage medium using a conventional organic dye material;

FIGS. 7A, 7B and 7C are exemplary views which relate to a shape or dimensions relating to a recording film, which easily causes a principle of recording;

FIG. 10 is an exemplary view of light absorption spectrum characteristics in a recording mark in the "H-L" recording film;

FIG. 12 is an exemplary view showing a detailed structure of peripheral sections including a sync code position sampling unit 145 shown in FIG. 11;

FIGS. 20A, 20B and 20C are exemplary views of a recording pulse timing parameter setting table;

FIGS. 21A, 21B and 21C are exemplary views relating to values of each parameter used when optimal recording power is checked;

FIG. 24 is an exemplary view showing a comparison in light reflection factor between the "H-L" recording film and the "L-H" recording film;

FIG. 27 is an exemplary general structural formula of a cyanine dye utilized for a cation portion of the "L-H" recording film;

FIG. 28 is an exemplary general structural formula of a styril dye utilized for a cation portion of the "L-H" recording film;

FIG. 29 is an exemplary general structural formula of a monomethine cyanine dye utilized for a cation portion of the "L-H" recording film;

FIG. 30 an exemplary general structural formula of a formazane metal complex utilized for an anion portion of the "L-H" recording film;

FIG. 32 is an exemplary view showing a value of a general parameter in a read-only type information storage medium;

FIG. 33 is an exemplary view showing a value of a general parameter in a write-once type information storage medium;

FIG. 34 is an exemplary view showing a value of a general parameter in a rewritable type information storage medium;

FIGS. 35A, 35B and 35C are exemplary views comparing a detailed data structure in a system lead-in area SYLDI and a data lead-in area DTLDI in a variety of information storage mediums;

FIG. 36 is an exemplary view showing a data structure in an RMD deprecation zone RDZ and a recording position management zone RMZ, which exist in the write-once type information storage medium;

FIGS. 37A, 37B, 37C, 37D, 37E and 37F are exemplary views each showing a comparison of a data structure in a data area DTA and a data lead-out area DTLDO in a variety of information storage mediums;

FIG. 38 is an exemplary view showing a data structure in recording position management data RMD;

FIG. 40 is an exemplary view showing a structure of a border area in a write-once type information storage medium;

FIG. 41 is an exemplary view showing a data structure in a control data zone CDZ and an R physical information zone RIZ;

FIG. 42 is an exemplary view showing specific information contents in physical format information PFI and R physical information format information R_PFI;

FIG. 43 is an exemplary view showing a comparison of the contents of detailed information recorded in allocation place information on a data area DTA;

FIG. 44 is an exemplary view showing a detailed data structure in recording position management data RMD;

FIG. 45 is an exemplary view showing a detailed data structure in recording position management data RMD;

FIG. 46 is an exemplary view showing a detailed data structure in recording position management data RMD;

FIG. 47 is an exemplary view showing a detailed data structure in recording position management data RMD;

FIG. 48 is an exemplary view showing a detailed data structure in recording position management data RMD;

FIG. 49 is an exemplary view showing a detailed data structure in recording position management data RMD;

FIG. 50 is an exemplary view showing a data structure in a data ID;

FIG. 51 is an exemplary view adopted to explain another embodiment relevant to a data structure in recording position management data RMD;

FIG. 52 is an exemplary view adopted to explain the other embodiment relevant to a data structure in recording position management data RMD;

FIG. 53 is an exemplary view showing another data structure in an RMD field 1;

FIG. 54 is an exemplary view of another embodiment relating to physical format information and R physical format information.

FIG. 55 is an exemplary view showing another embodiment relating to a data structure in a control data zone;

FIG. 57 is an exemplary view showing a structure in a data frame;

FIGS. 62A and 62B are exemplary views each showing a structure in a physical sector;

FIG. 63 is an exemplary view of the contents of a sync code pattern;

FIG. 65 is an exemplary view showing an example of a light absorption spectrum characteristic change before and after recorded, in an "H-L" recording film;

FIG. 66 is an exemplary view showing an example of a light absorption spectrum characteristic change before and after recorded, in an "L-H" recording film;

FIG. 69 is an exemplary view showing another example of a light absorption spectrum change before and after recorded, in an "H-L" recording film;

FIGS. 74A and 74B are exemplary views of a comparison with a conventional example of a data structure in a variety of information storage mediums;

FIG. 76 is an exemplary view of 180-degree phase modulation and an NRZ technique in wobble modulation;

FIG. 77 is an exemplary view of a relationship between a wobble shape and an address bit in an address bit area;

FIGS. 78A, 78B, 78C and 78D are comparative exemplary views of a positional relationship in a wobble sink pattern and a wobble data unit;

FIG. 81 is an exemplary view showing an allocation place in a physical segment on a write-once type information storage medium;

FIGS. 82A and 82B are exemplary views of a layout in a recording cluster;

FIG. 83 is an exemplary view showing a data recording method for rewritable data recorded on a rewritable-type information storage medium;

FIG. 86 is an exemplary view of specification of an optical disk in B format;

FIG. 97 is an exemplary view showing data run in and data run out structures;

FIG. 98 is an exemplary view showing allocation of data relating to a wobble address; and FIGS. 99A and 99B are exemplary views each showing an area of guard 3 arranged at the end of a data run out area.

DETAILED DESCRIPTION

Various embodiments according to the invention will be described hereinafter with reference to the accompanying drawings. In general, according to one embodiment of the invention, an information storage medium includes an organic dye material which records information with a light beam having a wavelength equal to or smaller than 620 nm.

Hereinafter, embodiments of a recording medium and a method for recording and reproducing the recording medium according to the invention will be described with reference to the accompanying drawings.

Summary of Characteristics and Advantageous Effect of the Invention (1) Relationship Between Track Pitch/Bit Pitch and Optimal Recording Power:

Conventionally, in the case of a principle of recording with a substrate shape change, if a track pitch is narrowed, a "cross-write" or a "cross-erase" occurs, and if bit pitches are narrowed, an inter-code crosstalk occurs. As in the present embodiment, since a principle of recording without a substrate shape change is devised, it becomes possible to achieve high density by narrowing track pitches/bit pitches. In addition, at the same time, in the above described principle of recording, recording sensitivity is improved, enabling high speed recording and multi-layering of a recording film because optimal recording power can be lowly set.

Figure 2A:
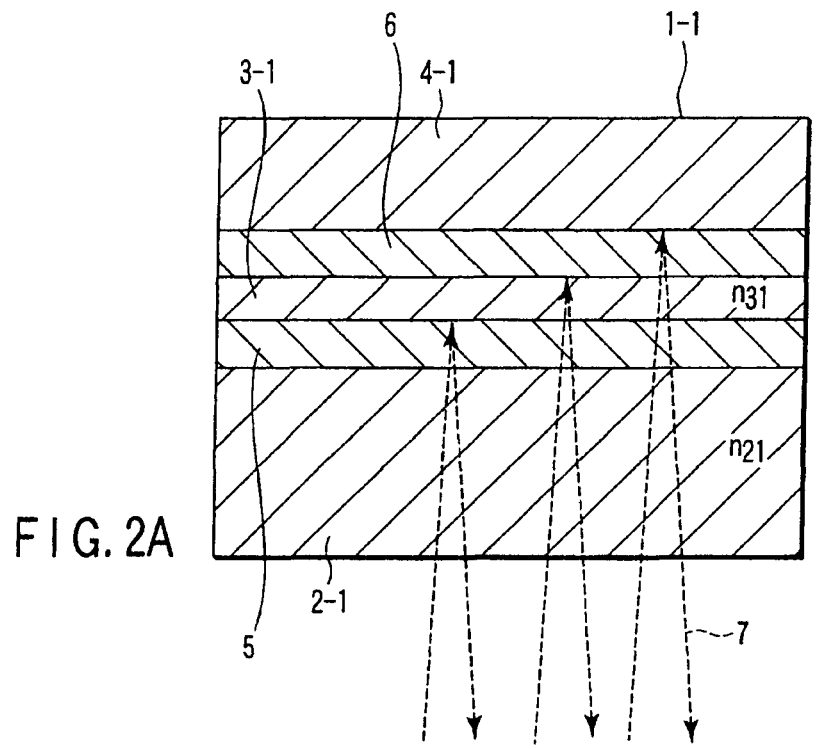
Figure 2B:
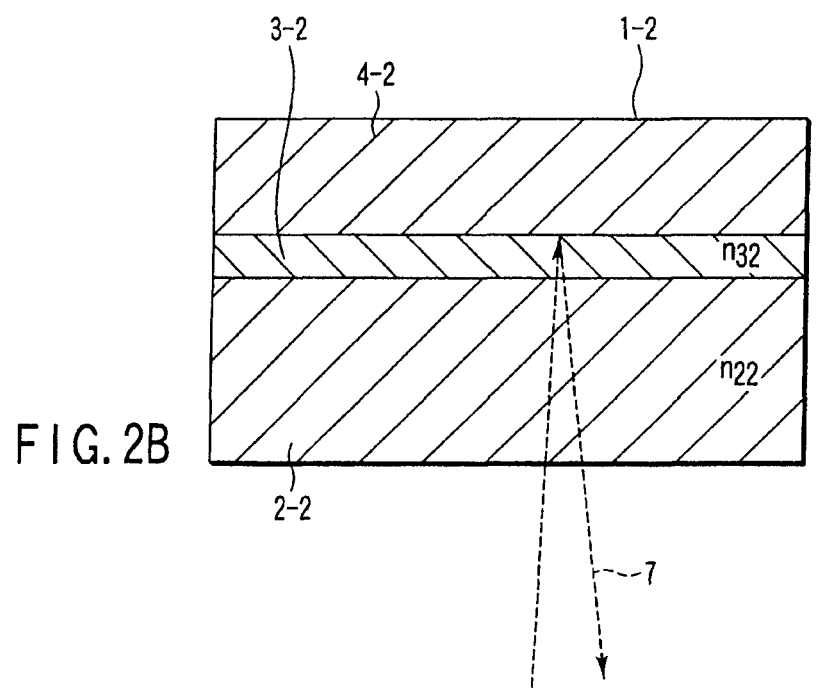

(2) In Optical Recording with a Wavelength of 620 nm or less, an ECC Block is Composed of a Combination of a Plurality of Small ECC Blocks and Each Item of Data ID Information in Two Sectors is Disposed in a Small ECC Block which is Different from Another:

According to the invention, as shown in FIG. 2B, a local optical characteristic change in a recording layer 3-2 is a principle of recording, and thus, an arrival temperature in the recording layer 3-2 at the time of recording is lower than that in the conventional principle of recording due to plastic deformation of a transparent substrate 2-2 or due to thermal decomposition or gasification (evaporation) of an organic dye recording material. Therefore, a difference between an arrival temperature and a recording temperature in a recording layer 3-2 at the time of playback is small. In the present embodiment, an interleaving process between small ECC blocks and data ID allocation are contrived in one ECC block, thereby improving reproduction reliability in the case where a recording film is degraded at the time of repetitive playback.

(3) Recording is Carried Out by Light Having a Wavelength which is Shorter than 620 nm, and a Recorded Portion has a Higher Reflection Factor than a Non-Recording Portion:

Under the influence of absorption spectrum characteristics of a general organic dye material, under the control of light having a wavelength which is shorter than 620 nm, the light absorbance is significantly lowered, and recording density is lowered. Therefore, a very large amount of exposure is required to generate a substrate deformation which is a principle of recording in a conventional DVD-R. By employing an "Low to High (hereinafter, abbreviated to as L-H) organic dye recording material" whose reflection factor is increased more significantly than that of an unrecorded portion in a portion (recording mark) recorded as in the present embodiment, a substrate deformation is eliminated by forming a recording mark using a "discoloring action due to dissociation of electron coupling", and recording sensitivity is improved.

(4) "L-H" Organic Dye Recording Film and PSK/FSK Modulation Wobble Groove:

Wobble synchronization at the time of playback can be easily obtained, and reproduction reliability of a wobble address is improved.

(5) "L-H" Organic Dye Recording Film and Reproduction Signal Modulation Degree Rule:

A high C/N ratio relating to a reproduction signal from a recording mark can be ensured, and reproduction reliability from the recording mark is improved.

(6) Light Reflection Factor Range in "L-H" Organic Dye Recording Film and Mirror Section:

A high C/N ratio relating to a reproduction signal from a system lead-in area SYLDI can be ensured and high reproduction reliability can be ensured.

(7) "L-H" Organic Dye Recording Film and Light Reflection Factor Range from Unrecorded Area at the Time of On-Track:

A high C/N rate relating to a wobble detection signal in an unrecorded area can be ensured, and high reproduction reliability relevant to wobble address information can be ensured.

(8) "L-H" Organic Dye Recording Film and Wobble Detection Signal Amplitude Range:

A high C/N ratio relating to a wobble detection signal can be ensured, and high reproduction reliability relevant to wobble address information can be ensured.

<<Table of Contents>>

Chapter 0: Description of Relationship between Wavelength and the Present Embodiment Wavelength used in the present embodiment.

Chapter 1: Description of Combination of Constituent Elements of Information Storage Medium in the Present Embodiment:

FIG. 1 shows an illustration of the contents of constituent elements of the information storage medium in the present embodiment.

Chapter 2: Description of Difference in reproduction signal between Phase Change Recording Film and Organic Dye Recording Film 2-1) Difference in Principle of Recording/Recording Film and Difference in Basic Concept Relating to Generation of Reproduction Signal . . . . Definition of $\lambda_{max\ write}$ 2-2) Difference of Light Reflection Layer Shape in Pre-pit/Pre-groove Area Optical reflection layer shape (difference in spin coating and sputtering vapor deposition) and influence on a reproduction signal.

Chapter 3: Description of Characteristics of Organic Dye Recording Film in the Present Embodiment 3-1) Problem(s) relevant to achievement of high density in write-once type recording film (DVD-R) using conventional organic dye material 3-2) Description of basic characteristics common to organic dye recording films in the present embodiment:

Lower limit value of recording layer thickness, channel bit length/track pitch in which advantageous effect is attained in the invention, repetitive playback enable count, optimal reproduction power, Rate between groove width and land width . . . Relationship with wobble address format Relationship in recording layer thickness between groove section and land section Technique of improving error correction capability of recording information and combination with PRML 3-3) Recording characteristics common to organic dye recording films in the present embodiment Upper limit value of optimal recording power 3-4) Description of characteristics relating to a "High to Low (hereinafter, abbreviated to as H-L)" recording film in the present embodiment:

Upper limit value of reflection factor in unrecorded layer

Relationship between a value of $\lambda_{max\ write}$ and a value of $\lambda_{max}$ (absorbance maximum wavelength at unrecorded/recorded position)

Relative values of reflection factor and degree of modulation at unrecorded/recorded position and light absorption values at reproduction wavelength . . . n·k range Relationship in upper limit value between required resolution characteristics and recording layer thickness Chapter 4: Description of Reproducing Apparatus or Recording/Reproducing Apparatus and Recording Condition/Reproducing Circuit 4-1) Description of structure and characteristics of reproducing apparatus or recording/reproducing apparatus in the present embodiment: Use wavelength range, NA value, and RIM intensity 4-2) Description of reproducing circuit in the present embodiment 4-3) Description of recording condition in the present embodiment Chapter 5: Description of Specific Embodiments of Organic Dye Recording Film in the Present Embodiment 5-1) Description of characteristics relating to "L-H" recording film in the present embodiment Principle of recording and reflection factor and degree of modulation at unrecorded/recorded position 5-2) Characteristics of light absorption spectra relating to "L-H" recording film in the present embodiment:

Condition for setting maximum absorption wavelength $\lambda_{max\ write}$, value of $Al_{405}$ and a value of $Ah_{405}$ 5-3) Anion portion: Azo metal complex+cation portion: Dye 5-4) Use of "copper" as azo metal complex+main metal:

Light absorption spectra after recorded is widen in a "H-L" recording film, and is narrowed in a "L-H" recording film.

Upper limit value of maximum absorption wavelength change amount before and after recording:

A maximum absorption wavelength change amount before and after recording is small, and absorbance at a maximum absorption wavelength changes.

Chapter 6: Description Relating to Pre-groove shape/pre-pit shape in coating type organic dye recording film and on light reflection layer interface 6-1) Light reflection layer (material and thickness):

Thickness range and passivation structure . . . . Principle of recording and countermeasures against degradation (Signal is degraded more easily than substrate deformation or than cavity)

6-2) Description relating to pre-pit shape in coating type organic dye recording film and on light reflection layer interface:

Advantageous effect achieved by widening track pitch/channel bit pitch in system lead-in area:

Reproduction signal amplitude value and resolution in system lead-in area:

Rule on step amount at land portion and pre-pit portion in light reflection layer 4-2:

6-3) Description relating to pre-groove shape in coating type organic dye recording film and on light reflection layer interface:

Rule on step amount at land portion and pre-groove portion in light reflection layer 4-2:

Push-pull signal amplitude range:

Wobble signal amplitude range (combination with wobble modulation system)

Chapter 7: Description of First Next-Generation Optical Disk: HD DVD System (Hereinafter, Referred to as H Format):

Principle of recording and countermeasure against reproduction signal degradation (Signal is degraded more easily than substrate deformation or than cavity):

Error Correction Code (ECC) structure, PRML (Partial Response Maximum Likelihood) System:

Relationship between a wide flat area in the groove and wobble address format.

In the write-once recording, overwriting is carried out in a VFO area which is non-data area.

Influence of DC component change in overwrite area is reduced. In particular, advantageous effect on "L-H" recording film is significant.

Chapter 8: Description of Second Next-Generation Optical Disk: B format

Principle of recording and countermeasures against reproduction signal degradation (Signal is degraded more easily than substrate deformation or cavity.)

Relationship between a wide flat area in the groove and wobble address format

In the write-once recording, overwriting is carried out in a VFO area which is a non-data area.

Influence of DC component change in overwrite area is reduced. In particular, advantageous effect in "L-H" recording film is significant.

Now, a description of the present embodiment will be given here.

Chapter 0: Description of Relationship Between Use Wavelength and the Present Embodiment As a write-once type optical disk obtained by using an organic dye material for a recording medium, there has been commercially available a CD-R disk using a recording/reproducing laser light source wavelength of 780 nm and a DVD-R disk using a recording/reproducing laser light beam wavelength of 650 nm. Further, in a next-generation write-once type information storage medium having achieved high density, it is proposed that a laser light source wavelength for recording or reproducing, which is close to 405 nm (namely, in the range of 355 nm to 455 nm), is used in either of H format (D1) and B format (D2) of FIG. 1 described later. In a write-once type information storage medium using an organic dye material, recording/reproducing characteristics sensitively changes due to a slight change of a light source wavelength. In principle, density is increased in inverse proportion to a square of a laser light source wavelength for recording/reproducing, and thus, it is desirable that a shorter laser light source wavelength be used for recording/reproducing. However, for the above described reason, an organic dye material utilized for a CD-R disk or a DVD-R disk cannot be used as a write-once type information storage medium for 405 nm. Moreover, because 405 nm is close to an ultraviolet ray wavelength, there can easily occur a disadvantage that a recording material "which can be easily recorded with a light beam of 405 nm", is easily changed in characteristics due to ultraviolet ray irradiation, lacking a long period stability. Characteristics are significantly different from each other depending on organic dye materials to be used, and thus, it is difficult to determine the characteristics of these dye materials in general. As an example, the foregoing characteristics will be described by way of a specific wavelength. With respect to an organic dye recording material optimized with a light beam of 650 nm in wavelength, the light to be used becomes shorter than 620 nm, recording/reproducing characteristics significantly change. Therefore, in the case where a recording/reproducing operation is carried out with a light beam which is shorter than 620 nm in wavelength, there is a need for new development of an organic dye material which is optimal to a light source wavelength of recording light or reproducing light. An organic dye material of which recording can be easily carried out with a light beam shorter than 530 nm in wavelength easily causes characteristic degradation due to ultraviolet ray irradiation, lacking long period stability. In the present embodiment, a description will be given with respect to an embodiment relevant to an organic recording material suitable to use in close to 405 nm. Namely, a description will be given with respect to an embodiment relating to an organic recording material which can be stably used in the range of 355 nm to 455 nm in consideration of a fluctuation of a light emitting wavelength which depends on manufacturers of semiconductor laser light sources. That is, the scope of the present embodiment corresponds to a light beam which is adapted to a light source of 620 nm in wavelength, and desirably, which is shorter than 530 nm in wavelength (ranging from 355 nm to 455 nm in a definition in the narrowest range).

In addition, the optical recording sensitivity due to light absorption spectra of an organic dye material is also influenced by a recording wavelength. An organic dye material suitable for long period stability is easily reduced in light absorbance relevant to a light beam which is shorter than 620 nm in wavelength. In particular, the light absorbance is significantly lowered with respect to a light beam which is shorter than 620 nm in wavelength, and in particular, is drastically reduced with respect to a light beam which is shorter than 530 nm in wavelength. Therefore, in the case where recording is carried out with a laser light beam ranging from 355 nm to 455 nm in wavelength, which is the severest condition, recording sensitivity is impaired because the light absorbance is low, and there is a need for a new design employing a new principle of recording as shown in the present embodiment.

The size of a focusing spot used for recording or reproducing application is reduced in proportion to a wavelength of a light beam to be used. Therefore, from only a standpoint of the focusing spot size, in the case where a wavelength is reduced to the above described value, an attempt is made to reduce a track pitch or channel bit length by a wavelength component with respect to a current DVD-R disk (use wavelength: 650 nm) which is a conventional technique. However, as described later in "3-2-A] Scope requiring application of technique according to the present embodiment", as long as a principle of recording in a conventional write-once type information storage medium such as a DVD-R disk is used, there is a problem that a track pitch or a channel bit length cannot be reduced. A track pitch or a channel bit length can be reduced in proportion to the above described wavelength by utilizing a technique devised in the present embodiment described below.

Chapter 1: Description of Combination of Constituent Elements of Information Storage Medium in the Present Embodiment In the present embodiment, there exists a great technical feature in that an organic recording medium material (organic dye material) adapted to a light source of 620 nm or less in wavelength has been devised. Such an organic recording medium (organic dye material) has a unique characteristic (Low to High characteristic) that a light reflection factor increases in a recording mark, which does not exist in a conventional CD-R disk or a DVD-R disk. Therefore, a technical feature of the present embodiment and a novel effect attained thereby occurs in a structure, dimensions, or format (information recording format) combination of the information storage medium which produces more effectively the characteristics of the organic recording material (organic dye materials) shown in the present embodiment. FIG. 1 shows a combination, which produces a new technical feature and advantageous effect in the present embodiment. That is the information storage medium in the present embodiment has the following constituent elements:

A] an organic dye recording film;

B] a pre-format (such as pre-groove shape/dimensions or pre-pit shape/dimensions);

C] a wobble condition (such as wobble modulation method and wobble change shape, wobble amplitude, and wobble allocating method); and D] a format (such as format for recording data which is to be recorded or which has been recorded in advance in information storage medium).

Specific embodiments of constituent elements correspond to the contents described in each column of FIG. 1. A technical feature and a unique advantageous effect of the present embodiment occur in combination of the specific embodiments of the constituent elements shown in FIG. 1. Hereinafter, a description will be given with respect to a combination state of individual embodiments at a stage of explaining the embodiments. With respect to constituent elements, which do not specify a combination, it denotes that the following characteristics are employed:

A5) an arbitrary coating recording film;

B3) an arbitrary groove shape and an arbitrary pit shape;

C4) an arbitrary modulation system;

C6) an arbitrary amplitude amount; and

D4) an arbitrary recording method and a format in a write-once medium.

Chapter 2: Description of Difference in Reproduction Signal Between Phase Change Recording Film and Organic Dye Recording Film 2-1) Difference in Principle of Recording/Recording Film and Difference in Basic Concept Relating to Generation of Reproduction Signal FIG. 2A shows a standard phase change recording film structure (mainly used for a rewritable-type information storage medium), and FIG. 2B shows a standard organic dye recording film structure (mainly used for a write-once type information storage medium). In the description of the present embodiment, a whole recording film structure excluding transparent substrates 2-1 and 2-2 shown in FIGS. 2A and 2B (including light reflection layers 4-1 and 4-2) is defined as a "recording film", and is discriminated from recording layers 3-1 and 3-2 in which a recording material is disposed. With respect to a recording material using a phase change, in general, an optical characteristic change amount in a recorded area (in a recording mark) and an unrecorded area (out of a recording mark) is small, and thus, there is employed an enhancement structure for enhancing a relative change rate of a reproduction signal. Therefore, in a phase change recording film structure, as shown in FIG. 2A, an undercoat intermediate layer 5 is disposed between the transparent substrate 2-1 and a phase change type recording layer 3-1, and an upper intermediate layer 6 is disposed between the light reflection layer 4-2 and the phase change type recording layer 3-1. In the invention, as a material for the transparent substrates 2-1 and 2-2, there is employed a polycarbonate PC or an acrylic PMMA (poly methyl methacrylate) which is a transparent plastic material. A center wavelength of a laser light beam 7 used in the present embodiment is 405 nm, and refractive index $n_{21}$, $n_{22}$ of the polycarbonate PC at this wavelength is close to 1.62. Standard refractive index $n_{31}$ and absorption coefficient $k_{31}$ in 405 nm at GeSbTe (germanium antimony tellurium) which is most generally used as a phase change type recording material are $n_{31} \cong 1.5$ and $k_{31} \cong 2.5$ in a crystalline area, whereas they are $n_{31} \cong 2.5$ and $k_{31} \cong 1.8$ in an amorphous area. Thus, a refractive index (in the amorphous area) of a phase change type recording medium is different from a refractive index of the transparent substrate 2-1, and reflection of a laser light beam 7 on an interface between the layers is easily occurred in a phase change recording film structure. As described above, for the reasons why (1) a phase change recording film structure takes an enhancement structure; and (2) a refractive index difference between the layers is great or the like, a light reflection amount change at the time of reproduction from a recording mark recorded in a phase change recording film (a differential value of a light reflection amount from a recording mark and a light reflection amount from an unrecorded area) can be obtained as an interference result of multiple reflection light beams generated on an interface between the undercoat intermediate layer 5, the recording layer 3-1, the upper intermediate layer 6, and the light reflection layer 4-2. In FIG. 2A, although the laser light beam 7 is apparently reflected on an interface between the undercoat intermediate layer 5 and the recording layer 3-1, an interface between the recording layer 3-1 and the upper intermediate layer 6, and an interface between the upper intermediate layer 6 and the light reflection layer 4-2, in actuality, a reflection light amount change is obtained as an interference result between a plurality of multiple reflection light beams.

In contrast, an organic dye recording film structure takes a very simple laminate structure made of an organic dye recording layer 3-2 and a light reflection layer 4-2. An information storage medium (optical disk) using this organic dye recording film is called a write-once type information storage medium, which enables only one time of recording. However, unlike a rewritable-type information storage medium using the phase change recording medium, this medium cannot carry out an erasing process or a rewriting process of information which has been recorded once. A refractive index at 405 nm of a general organic dye recording material is often close to $n_{32} \cong 1.4$ ($n_{32}=1.4$ to 1.9 in the refractive index range at 405 nm of a variety of organic dye recording materials) and an absorption coefficient is often close to $k_{32} \cong 0.2$ ($k_{32} \cong 0.1$ to 0.2 in the absorption coefficient range at 405 nm of a variety of organic dye recording materials). Because a refractive index difference between the organic dye recording material and the transparent substrate 2-2 is small, there hardly occurs a light reflection amount on an interface between the recording layer 3-2 and the transparent substrate 2-2. Therefore, an optical reproduction principle of an organic color recording film (reason why a reflection light amount change occurs) is not "multiple interference" in a phase change recording film, and a main factor is a "light amount loss (including interference) midway of an optical path with respect to the laser light beam 7 which comes back after being reflected in the light reflection layer 4-2". Specific reasons which cause a light amount loss midway of an optical path include an "interference phenomenon due to a phase difference partially caused in the laser light 7" or an "optical absorption phenomenon in the recording layer 3-2". The light reflection factor of the organic dye recording film in an unrecorded area on a mirror surface on which a pre-groove or a pre-pit does not exist is featured to be simply obtained by a value obtained by subtracting an optical absorption amount when the recording layer 3-2 is passed from the light reflection factor of the laser light beam 7 in the light reflection layer 4-2. As described above, this film is different from a phase change recording film whose light reflection factor is obtained by calculation of "multiple interference".

First, a description will be given with respect to a principle of recording, which is used in a current DVD-R disk as a conventional technique. In the current DVD-R disk, when a recording film is irradiated with the laser light beam 7, the recording layer 3-2 locally absorbs energy of the laser light beam 7, and becomes hot. If a specific temperature is exceeded, the transparent substrate 2-2 is locally deformed. Although a mechanism, which induces deformation of the transparent substrate 2-2, is different depending on manufacturers of DVD-R disks, it is said that this mechanism is caused by:

(1) local plastic deformation of the transparent substrate 2-2 due to gasification energy of the recording layer 3-2; and (2) transmission of a heat from the recording layer 3-2 to the transparent substrate 2-2 and local plastic deformation of the transparent substrate 2-2 due to the heat.

If the transparent substrate 2-2 is locally plastically deformed, there changes an optical distance of the laser light beam 7 reflected in the light reflection layer 4-2 through the transparent substrate 2-2, the laser light beam 7 coming back through the transparent substrate 2-2 again. A phase difference occurs between the laser light beam 7 from a recording mark, the laser light beam coming back through a portion of the locally plastically deformed transparent substrate 2-2, and a laser light beam 7 from the periphery of the recording mark, the laser light beam coming back through a portion of a transparent substrate 2-2 which is not deformed, and thus, a light amount change of reflection light beam occurs due to interference between these light beams. In addition, in particular, in the case where the above described mechanism of (1) has occurred, a change of a substantial refractive index $n_{32}$ produced by cavitation of the inside of the recording mark in the recording layer 3-2 due to gasification (evaporation), or alternatively, a change of a refractive index $n_{32}$ produced due to thermal decomposition of an organic dye recording material in the recording mark, also contributes to the above described occurrence of a phase difference. In the current DVD-R disk, until the transparent substrate 2-2 is locally deformed, there is a need for the recording layer 3-2 becoming hot (i.e., at a gasification temperature of the recording layer 3-2 in the above described mechanism of (1) or at an internal temperature of the recording layer 3-2 required for plastically reforming the transparent substrate 2-2 in the mechanism of (2)) or there is a need for a part of the recording layer 3-2 becoming hot in order to cause thermal decomposition or gasification (evaporation). In order to form a recording mark, there is a need for large amount of power of the laser light beam 7.

In order to form the recording mark, there is a necessity that the recording layer 3-2 can absorb energy of the laser light beam 7 at a first stage. The light absorption spectra in the recording layer 3-2 influence the recording sensitivity of an organic dye recording film. A principle of light absorption in an organic dye recording material which forms the recording layer 3-2 will be described with reference to (A3) of the present embodiment.

Figure 3:
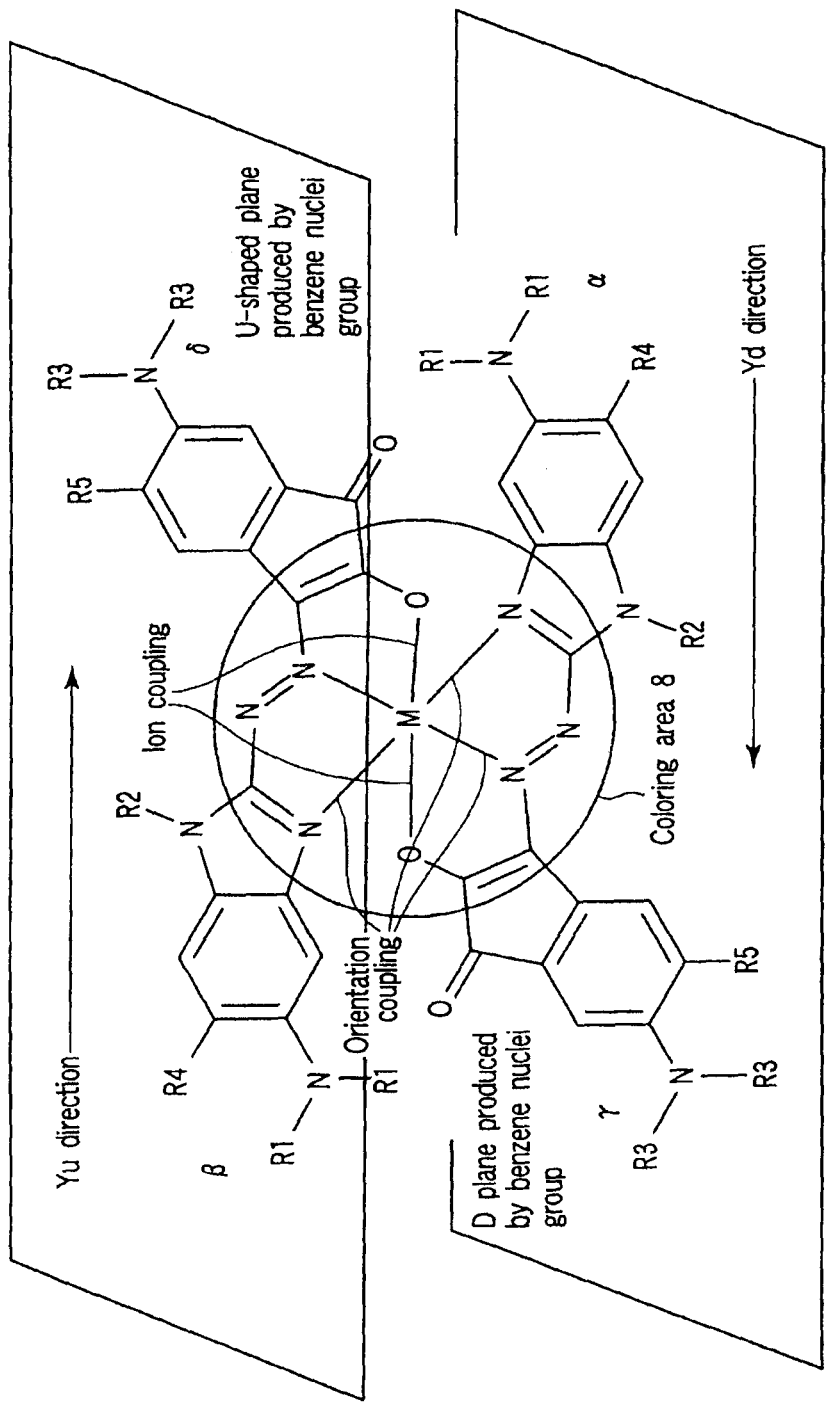
FIG. 3 is an exemplary view showing a specific structural formula of the specific content "(A3) azo-metal complex+Cu" of the information storage medium constituent elements shown in FIG. 1.

FIG. 3 shows a specific structural formula of the specific contents "(A3) azo metal complex+Cu" of the constituent elements of the information storage medium shown in FIG. 1. A circular periphery area around a center metal M of the azo metal complex shown in FIG. 3 is obtained as a light emitting area 8. When a laser light beam 7 passes through this light emitting area 8, local electrons in this light emitting area 8 resonate to an electric field change of the laser light beam 7, and absorbs energy of the laser light beam 7. A value converted to a wavelength of the laser light beam with respect to a frequency of an electric field change at which these local electrons resonate most and easily absorbs the energy is called a maximum absorption wavelength, and is represented by $\lambda_{max}$. As a range of the light emitting area 8 (resonation range) as shown in FIG. 3 increases, the maximum absorption wavelength $\lambda_{max}$ is shifted to the long wavelength side. In addition, in FIG. 3, the localization range of local electrons around the center metal M (how large the center metal M can attract the local electrons to the vicinity of the center) is changed by changing atoms of the center metal M, and the value of the maximum absorption wavelength $\lambda_{max}$ changes.

Although it can be predicted that the light absorption spectra of the organic dye recording material in the case where there exists only one light emitting area 8 which is absolute 0 degree at a temperature and high in purity draws narrow linear spectra in close to a maximum absorption wavelength $\lambda_{max}$, the light absorption spectra of a general organic recording material including impurities at a normal temperature, and further, including a plurality of light absorption areas exhibit a wide light absorption characteristic with respect to a wavelength of a light beam around the maximum absorption wavelength $\lambda_{max}$.

FIG. 4 shows an example of light absorption spectra of an organic dye recording material used for a current DVD-R disk. In FIG. 4, a wavelength of a light beam to be irradiated with respect to an organic dye recording film formed by coating an organic dye recording material is taken on a horizontal axis, and absorbance obtained when an organic dye recording film is irradiated with a light beam having a respective wavelength is taken on a vertical axis. The absorbance used here is a value obtained by entering a laser light beam having incident intensity Io from the side of the transparent substrate 2-2 with respect to a state in which a write-once type information storage medium has been completed (or alternatively, a state in which the recording layer 3-2 has been merely formed on the transparent substrate 2-2 (a state that precedes forming of the optical reflection layer 4-2 with respect to a structure of FIG. 2B)), and then, measuring reflected laser light intensity Ir (light intensity It of the laser light beam transmitted from the side of the recording layer 3-2). The absorbance Ar (At) is represented by:

$$Ar=-\log_{10}(Ir/Io) \quad (A-1)$$

$$At=-\log_{10}(It/Io) \quad (A-2)$$

Unless otherwise specified, although a description will be given assuming that the absorbance denotes absorbance Ar of a reflection shape expressed by formula (A-1), it is possible to define absorbance At of a transmission shape expressed by formula (A-2) without being limited thereto in the present embodiment. In the embodiment shown in FIG. 4, there exist a plurality of light absorption areas, each of which includes the light emitting area 8, and thus, there exist a plurality of positions at which the absorbance becomes maximal. In this case, there exist a plurality of maximum absorption wavelength $\lambda_{max}$ when the absorbance takes a maximum value. A wavelength of the recording laser light in the current DVD-R disk is set to 650 nm. In the case where there exist a plurality of the maximum absorption wavelengths $\lambda_{max}$ in the present embodiment, a value of the maximum absorption wavelength $\lambda_{max}$ which is the closest to the wavelength of the recording laser light beam becomes important. Therefore, only in the description of the present embodiment, the value of the maximum absorption wavelength $\lambda_{max}$ set at a position which is the closest to the wavelength of the recording laser light beam is defined as "$\lambda_{max\ write}$"; and is discriminated from another $\lambda_{max}$ ($\lambda_{max\ 0}$).

2-2) Difference of Light Reflection Layer Shape in Pre-Pit/Pre-Groove Area

FIGS. 5A and 5B each show a comparison in shape when a recording film is formed in a pre-pit area or a pre-groove area 10. FIG. 5A shows a shape relevant to a phase change recording film. In the case of forming any of the undercoat intermediate layer 5, the recording layer 3-1, the upper intermediate layer 6, and the light reflection layer 4-1 as well, any of methods of sputtering vapor deposition, vacuum vapor deposition, or ion plating is used in vacuum. As a result, in all of the layers, irregularities of the transparent substrate 2-1 are duplicated comparatively faithfully. For example, in the case where a sectional shape in the pre-pit area or pre-groove area 10 of the transparent substrate 2-1 is rectangular or trapezoidal, the sectional shape of the recording layer 3-1 and the light reflection layer 4-1 each is also rectangular or trapezoidal.

FIG. 5B shows a general recording film sectional shape of a current DVD-R disk which is a conventional technique as a recording film in the case where an organic dye recording film has been used. In this case, as a method for forming the recording film 3-2, there is used a method called spin coating (or spinner coating) which is completely different from that shown in FIG. 5A. The spin coating used here denotes a method for dissolving in an organic solvent an organic dye recording material which forms the recording layer 3-2; applying a coating onto the transparent substrate 2-2; followed by rotating the transparent substrate 2-2 at a high speed to spread a coating agent to the outer periphery side of the transparent substrate 2-2 by a centrifugal force; and gasifying the organic solvent, thereby forming the recording layer 3-2. Using this method, a process for coating the organic solvent is used, and thus, a surface of the recording layer 3-2 (an interface with the light reflection layer 2-2) is easily flattened. As a result, the sectional shape on the interface between the light reflection layer 2-2 and the recording layer 3-2 is obtained as a shape which is different from the shape of the surface of the transparent substrate 2-2 (an interface between the transparent substrate 2-2 and the recording layer 3-2). For example, in a pre-groove area in which the sectional shape of the surface of the transparent substrate 2-2 (an interface between the transparent substrate 2-2 and the recording layer 3-2) is rectangular or trapezoidal, the sectional shape on the interface between the light reflection layer 2-2 and the recording layer 3-2 is formed in a substantially V-shaped groove shape. In a pre-pit area, the above sectional shape is formed in a substantially conical side surface shape. Further, at the time of spin coating, an organic solvent is easily collected at a recessed portion, and thus, the thickness Dg of the recording layer 3-2 in the pre-pit area or pre-groove area 10 (i.e., a distance from a bottom surface of the pre-pit area or pre-groove area to a position at which an interface relevant to the light reflection layer 2-2 becomes the lowest) is larger than the thickness D1 in a land area 12 (Dg>D1). As a result, an amount of irregularities on an interface between the transparent substrate 2-2 and the recording area 3-2 in the pre-pit area or pre-groove area 10 becomes substantially smaller than an amount of irregularities on the transparent substrate 2-2 and the recording layer 3-2.

As described above, the shape of irregularities on the interface between the light reflection layer 2-2 and the recording layer 3-2 becomes blunt and an amount of irregularities becomes significantly small. Thus, in the case where the shape and dimensions of irregularities on a surface of the transparent substrate 2 (pre-pit area or pre-groove area 10) are equal to each other depending on a difference in method for forming a recording film, the diffraction intensity of the reflection light beam from the organic dye recording film at the time of laser light irradiation is degraded more significantly than the diffraction intensity of the reflection light beam from the phase change recording film. As a result, in the case where the shape and dimensions of irregularities on the surface of the transparent substrate 2 (pre-pit area or pre-groove area 10) are equal to each other, as compared with use of the phase change recording film, use of the conventional organic dye recording film is disadvantageously featured in that:

(1) a degree of modulation of a light reproduction signal from the pre-pit area is small, and signal reproduction reliability from the pre-pit area is poor;

(2) a sufficiently large track shift detecting signal is hardly obtained in accordance with a push-pull technique from the pre-groove area; and (3) a sufficient large wobble detecting signal is hardly obtained in the case where wobbling occurs in the pre-groove area.

In addition, in a DVD-R disk, specific information such as address information is recorded in a small irregular (pit) shape in a land area, and thus, a width Wl of the land area 12 is larger than a width Wg of the pre-pit area or pre-groove area 10 (Wg>Wl).

Chapter 3: Description of Characteristics of Organic Dye Recording Film in the Present Embodiment 3-1) Problem(s) Relevant to Achievement of High Density in Write-Once Type Recording Film (DVD-R) Using Conventional Organic Dye Material As has been described in "2-1) Difference in recording principle/recording film structure and difference in basic concept relating to generation of reproducing signal", a general principle of recording of a current DVD-R and CD-R, which is a write-once type information storage medium using a conventional organic dye material includes "local plastic deformation of transparent substrate 2-2" or "local thermal decomposition or "gasification" in recording layer 3-2". FIGS. 6A and 6B each show a plastic deformation state of a specific transparent substrate 2-2 at a position of a recording mark 9 in a write-once type information storage medium using a conventional organic dye material. There exist two types of typical plastic deformation states. There are two cases, i.e., a case in which, as shown in FIG. 6A, a depth of a bottom surface 14 of a pre-groove area at the position of the recording mark 9 (an amount of step relevant to an adjacent land area 12) is different from a depth of a bottom surface of a pre-groove area 11 in an unrecorded area (in the example shown in FIG. 6A, the depth of the bottom surface 14 in the pre-groove area at the position of the recording mark 9 is shallower than that in the unrecorded area); and a case in which, as shown in FIG. 6B, a bottom surface 14 in a pre-groove area at the position of the recording mark 9 is distorted and is slightly curved (the flatness of the bottom surface 14 is distorted: In the example shown in FIG. 6B, the bottom surface 14 in the pre-groove area at the position of the recording mark 9 is slightly curved toward the lower side). Both of these cases are featured in that a plastic deformation range of the transparent substrate 2-2 at the position of the recording mark 9 covers a wide range. In the current DVD-R disk which is a conventional technique, a track pitch is 0.74 µm, and a channel bit length is 0.133 µm. In the case of a large value of this degree, even if the plastic deformation range of the transparent substrate 2-2 at the position of the recording mark 9 covers a wide range, comparatively stable recording and reproducing processes can be carried out.

However, if the track pitch is narrower than 0.74 µm described above, the plastic deformation range of the transparent substrate 2-2 at the position of the recording mark 9 covers a wide range, and thus, the adjacent tracks are adversely affected, and the recording mark 9 of the existing adjacent track is substantially erased (cannot be reproduced) due to a "cross-write" or overwrite in which the recording mark 9 widens to the adjacent tracks. In addition, in a direction (circumferential direction) along the tracks, if the channel bit length is narrower than 0.133 µm, there occurs a problem that inter-code interference appears; an error rate at the time of reproduction significantly increases; and the reliability of reproduction is lowered.

3-2) Description of Basic Characteristics Common to Organic Dye Recording Film in the Present Embodiment 3-2-A] Range Requiring Application of Technique According to the Present Embodiment As shown in FIGS. 6A and 6B, in a conventional write-once type information storage medium including plastic deformation of the transparent substrate 2-2 or local thermal decomposition or gasification phenomenon in the recording film 3-2, a description will be given below with respect to what degree of track pitch is narrowed when an adverse affect appears or what degree of channel pit length is narrowed when an adverse effect appears and a result obtained after technical discussion has been carried out with respect to a reason for such an adverse effect. A range in which an adverse effect starts appearing in the case of utilizing the conventional principle of recording indicates a range (suitable for the achievement of high density) in which advantageous effect is attained due to a novel principle of recording shown in the present embodiment.

(1) Condition of Thickness Dg of Recording Layer 3-2

When an attempt is made to carry out thermal analysis in order to theoretically identify a lower limit value of an allowable channel bit length or a lower limit value of allowable track pitch, a range of the thickness Dg of a recording layer 3-2 which can be substantially thermally analyzed becomes important. In a conventional write-once type information storage medium (CD-R or DVD-R) including plastic deformation of the transparent substrate 2-2 as shown in FIGS. 6A and 6B, with respect to a change of light reflection amount in the case where an information reproduction focusing spot is provided in the recording mark 8 and in the case where the spot is in an unrecorded area of the recording layer 3-2, the largest factor is "an interference effect due to a difference in optical distance in the recording mark 9 and in unrecorded area". In addition, a difference in its optical difference is mainly caused by "a change of the thickness Dg of a physical recording layer 3-2 due to plastic deformation of the transparent substrate 2-2 (a physical distance from an interface between the transparent substrate 2-2 and the recording layer 3-2 to an interface between the recording layer 3-2 and a light reflection layer 4-2) and "a change of refractive index $n_{32}$ of the recording layer 3-2 in the recording mark 9". Therefore, in order to obtain a sufficient reproduction signal (change of light reflection amount) between the recording mark 9 and the unrecorded area, when a wavelength in vacuum of laser light beam is defined as $\lambda$, it is necessary for the value of the thickness 3-2 in the unrecorded area has a size to some extent as compared with $\lambda/n_{32}$. If not, a difference (phase difference) in optical distance between the recording mark 9 and the unrecorded area does not appear, and light interference effect becomes small. In reality, a minimum condition:

$$Dg \geq \lambda/8n_{32} \quad (1)$$

must be met, and desirably, a condition that:

$$Dg \geq \lambda/4n_{32} \quad (2)$$

must be met.

At a time point of current discussion, the vicinity of $\lambda=405$ nm is assumed. A value of refractive index $n_{32}$ of an organic dye recording material at 405 nm ranges from 1.3 to 2.0. Therefore, as a result of substituting $n_{32}=2.0$ in formula (1), it is conditionally mandatory that a value of the thickness Dg of the recording layer 3-2 is:

$$Dg \geq 25 \text{ nm} \quad (3)$$

Here, discussion is made with respect to a condition when an organic dye recording layer of a conventional write-once type information storage medium (CD-R or DVD-R) including plastic deformation of the transparent substrate 2-2 has been associated with a light beam of 405 nm. As described later, in the present embodiment, although a description is given with respect to a case in which plastic deformation of the transparent substrate 2-2 does not occur and a change of an absorption coefficient $k_{32}$ is a main factor of a principle of recording, it is necessary to carry out track shift detection by using a DPD (Differential Phase Detection) technique from the recording mark 9, and thus, in reality, the change of the refractive index $n_{32}$ is caused in the recording mark 9. Therefore, the condition for formula (3) becomes a condition, which should be met, in the present embodiment in which plastic deformation of the transparent substrate 2-2 does not occur.

From another point of view as well, the range of the thickness Dg can be specified. In the case of a phase change recording film shown in FIG. 5A, when a refractive index of the transparent substrate is $n_{21}$, a step amount between a pre-pit area and a land area is $\lambda/(8n_{21})$ when the largest track shift detection signal is obtained by using a push-pull technique. However, in the case of an organic dye recording film shown in FIG. 5B, as described previously, the shape on an interface between the recording layer 3-2 and the light reflection layer 4-2 becomes blunt, and a step amount becomes small. Thus, it is necessary to increase a step amount between a pre-pit area and a land area on the transparent substrate 2-2 more significantly than $\lambda/(8n_{22})$. For example, the refractive index at 405 nm in the case where polycarbonate has been used as a material for the transparent substrate 2-2 is $n_{22} \approx 1.62$, and thus, it is necessary to increase a step amount between the pre-pit area and the land area more significantly than 31 nm. In the case of using a spin coating technique, if the thickness Dg of the recording layer 3-2 in the pre-groove area is greater than a step amount between the pre-pit area and the land area on the transparent substrate 2-2, there is a danger that thickness D1 of the recording layer 3-2 in a land area 12 is eliminated. Therefore, from the above described discussion result, it is necessary to meet a condition that:

$$Dg \geq 31 \text{ nm} \quad (4)$$

The condition for formula (4) is also a condition, which should be met in the present embodiment in which plastic deformation of the transparent substrate 2-2 does not occur. Although conditions for the lower limit values have been shown in formulas (3) and (4), the value $Dg \approx 60$ nm obtained by substituting $n_{32}=1.8$ for an equal sign portion in formula (2) has been utilized as the thickness Dg of the recording layer 3-2 used for thermal analysis.

Then, assuming polycarbonate used as a standard material of the transparent substrate 2-2, 150° C. which is a glass transition temperature of polycarbonate has been set as an estimate value of a thermal deformation temperature at the side of the transparent substrate 2-2. For discussion using thermal analysis, a value of $k_{32}=0.1$ to 0.2 has been assumed as a value of an absorption coefficient of the organic dye recording film 3-2 at 405 nm. Further, discussion has been made with respect to a case in which an NA value of a focusing objective lens and an incident light intensity distribution when an objective lens is passed is NA=60 and H format ((D1):NA=0.65 in FIG. 1) and B format ((D2): NA=0.85 in FIG. 1) which is assumed condition in a conventional DVD-R format.

(2) Condition for Lower Limit Value of Channel Bit Length

A check has been made for a lengthwise change in a direction along a track of an area reaching a thermal deformation temperature at the side of a transparent substrate 2-2 which comes into contact with a recording layer 3-2 when recording power has been changed. Discussion has been made with respect to a lower limit value of an allowable channel bit length considering a window margin at the time of reproduction. As a result, if the channel bit length is slightly lower than 105 nm, it is considered that a lengthwise change in a direction along a track in an area which reaches the thermal deformation temperature at the side of the transparent substrate 2-2 occurs according to the slight change of recording power, and a sufficient window margin cannot be obtained. On discussion of thermal analysis, an analogous tendency is shown in the case where the NA value is any one of 0.60, 0.65, and 0.85. Although a focusing spot size is changed by changing the NA value, a possibility cause is believed to be that a thermal spreading range is wide (a gradient of a temperature distribution at the side of the transparent substrate 2-2 which comes into contact with the recording layer 3-2) is comparatively gentle). In the above thermal analysis, the temperature distribution at the side of the transparent substrate 2-2 which comes into contact with the recording layer 3-2 is discussed, and thus, an effect of the thickness Dg of the recording layer 3-2 does not appear.

Further, in the case where a shape change of the transparent substrate 3-3 shown in FIGS. 6A and 6B occurs, a boundary position of a substrate deformation area blurs (is ambiguous), and thus, a window margin is lowered more significantly. When a sectional shape of an area in which the recording mark 9 is formed is observed by an electron microscope, it is believed that a blurring amount of the boundary position of the substrate deformation area increases as the value of the thickness Dg of the recording layer 3-2 increases. With respect to the effect of the thermal deformation area length due to the above recording power change, in consideration of the blurring of the boundary position of this substrate deformation area, it is considered necessary that the lower limit value of the channel bit length allowed for allocation of a sufficient window margin is in order of two times of the thickness Dg of the recording layer 3-2, and it is desirable that the lower limit value is greater than 120 nm.

In the foregoing, a description has been principally given with respect to discussion using thermal analysis in the case where thermal deformation of the transparent substrate 2-2 occurs. There also exists a case in which plastic deformation of the transparent substrate 2-2 is very small as another principle of recording (mechanism of forming the recording mark 9) in a conventional write-once type information storage medium (CD-R or DVD-R) and thermal deformation or gasification (evaporation) of the organic dye recording material in the recording layer 3-2 mainly occurs. Thus, an additional description will be given with respect to such a case. Although the gasification (evaporation) temperature of the organic dye recording material is different depending on the type of the organic dye material, in general, the temperature ranges 220° C. to 370° C., and a thermal decomposition temperature is lower than this range. Although a glass transition temperature 150° C. of a polycarbonate resin has been presumed as an arrival temperature at the time of substrate deformation in the above discussion, a temperature difference between 150° C. and 220° C. is small, and, when the transparent substrate 2-2 reaches 150° C., the inside of the recording layer 3-2 exceeds 220° C. Therefore, although there exists an exception depending on the type of the organic recording material, even in the case where plastic deformation of the transparent substrate 2-2 is very small and thermal decomposition or gasification (evaporation) of the organic dye recording material in the recording layer mainly occurs, there is obtained a result which is substantially identical to the above discussion result.

When the discussion result relating to the above channel bit length is summarized, in the conventional write-once type information storage medium (CD-R or DVD-R) including plastic deformation of the transparent substrate 2-2, it is considered that, when a channel bit length is narrower than 120 nm, the lowering of a window margin occurs, and further, if the length is smaller than 105 nm, stable reproduction becomes difficult. That is, when the channel bit is smaller than 120 nm (105 nm), advantageous effect is attained by using a novel principle of recording shown in the present embodiment.

(3) Condition for Lower Limit Value of Track Pitches

When a recording layer 3-2 is exposed at recording power, energy is absorbed in the recording layer 3-2, and a high temperature is obtained. In a conventional write-once type information storage medium (CD-R or DVD-R), it is necessary to absorb energy in the recording layer 3-2 until the transparent substrate 3-2 has reached a thermal deformation temperature. A temperature at which a structural change of the organic dye recording material occurs in the recording layer 3-2 and a value of a refractive index $n_{32}$ or an absorption coefficient $k_{32}$ starts its change is much lower than an arrival temperature for the transparent substrate 2-2 to start thermal deformation. Therefore, the value of the refractive index $n_{32}$ or absorption coefficient $k_{32}$ changes in a comparatively wide range in the recording layer 3-2 at the periphery of a recording mark 9, which is thermal deformed at the side of the transparent substrate 2-2, and this change seems to cause "cross-write" or "cross-erase" for the adjacent tracks. It is possible to set a lower limit value of track pitch in which "cross-write" or "cross-erase" does not occur with the width of an area which reaches a temperature which changes the refractive index $n_{32}$ or absorption coefficient $k_{32}$ in the recording layer 3-2 when the transparent substrate 2-2 exceeds a thermal deformation temperature. From the above point of view, it is considered that "cross-write" or "cross-erase" occurs in location in which the track pitch is equal to or smaller than 500 nm. Further, in consideration of an effect of warping or inclination of an information storage medium or a change of recording power (recording power margin), it can be concluded difficult to set the track pitch to 600 nm or less in the conventional write-once type information storage medium (CD-R or DVD-R) in which energy is absorbed in the recording layer 3-2 until the transparent substrate 2-2 has reached a thermal deformation temperature.

As described above, even if the NA value is changed from 0.60, 0.65, and then, to 0.85, substantially similar tendency is shown because the gradient of the temperature distribution in the peripheral recording layer 3-2 when the transparent substrate 2-2 has reached a thermal deformation temperature at a center part is comparatively gentle, and the thermal spread range is wide. In the case where plastic deformation of the transparent substrate 2-2 is very small and thermal decomposition or gasification (evaporation) of the organic dye recording material in the recording layer 3-2 mainly occurs as another principle of recording (mechanism of forming the recording mark 9) in the conventional write-once type information storage medium (CD-R or DVD-R), as has been described in the section "(2) Condition for lower limit value of channel bit", the value of track pitch at which "cross-write" or "cross-erase" starts is obtained as a substantially analogous result. For the above described reason, advantageous effect is attained by using a novel principle of recording shown in the present embodiment when the track pitch is set to 600 nm (500 nm) or lower.

3-2-B] Basic Characteristics Common to Organic Dye Recording Material in the Invention As described above, in the case where plastic deformation of the transparent substrate 2-2 is very small and thermal decomposition or gasification (evaporation) of the organic dye recording material in the recording layer 3-2 mainly occurs as another principle of recording (mechanism of forming the recording mark 9) in the conventional write-once type information storage medium (CD-R or DVD-R), there occurs a problem that a channel bit length or track pitches cannot be narrowed because the inside of the recording layer 3-2 or a surface of the transparent substrate 2-2 reaches a high temperature at the time of forming the recording mark 9. In order to solve the above described problem, the present embodiment is primarily featured in "inventive organic dye material" in which "a local optical characteristic change in the recording layer 3-2, which occurs at a comparatively low temperature, is a principle of recording" and "setting environment (recording film structure or shape) in which the above principle of recording easily occurs without causing a substrate deformation and gasification (evaporation) in the recording layer 3-2. Specific characteristics of the present embodiment can be listed below.

α] Optical Characteristic Changing Method Inside of recording layer 3-2

Chromogenic characteristic change
Change of light absorption sectional area due to qualitative change of light emitting area 8 (FIG. 3) or change of molar molecule light absorption coefficient
The light emitting area 8 is partially destroyed or the size of the light emitting area 8 changes, whereby a substantial light absorption sectional area changes. In this manner, an amplitude (absorbance) at a position of $\lambda_{max\ write}$ changes in the recording mark 9 while a profile (characteristics) of light absorption spectra (FIG. 4) itself is maintained.
Change of electronic structure (electron orbit) relevant to electrons which contribute to a chromogenic phenomenon
Change of light absorption spectra (FIG. 4) based on discoloring action due to cutting of local electron orbit (dissociation of local molecular bonding) or change of dimensions or structure of light emitting area 8 (FIG. 3)
Intra-molecular (inter-molecular) change of orientation or array
Optical characteristic change based on orientation change in azo metal complex shown in FIG. 3, for example
Molecular structure change in molecule
For example, discussion is made with respect to an organic dye material which causes either of dissociation between anion portion and cation portion, thermal decomposition of either of anion portion and cation portion, and a tar phenomenon that a molecular structure itself is destroyed, and carbon atoms are precipitated (denaturing to black coal tar). As a result, the refractive index $n_{32}$ or absorption coefficient $k_{32}$ in the recording mark 9 is changed with respect to an unrecorded area, enabling optical reproduction.

β] Setting Recording Film Structure or Shape, Making it Easy to Stably Cause an Optical Characteristic Change of [α] above:

The specific contents relating to this technique will be described in detail in the section "3-2-C] Ideal recording film structure which makes it easy to cause a principle of recording shown in the present embodiment" and subsequent.

γ] Recording Power is Reduced in Order to Form Recording Mark in a State in which Inside of Recording Layer or Transparent Substrate Surface is Comparatively Low at Temperature The optical characteristic change shown in [α] above occurs at a temperature lower than a deformation temperature of the transparent substrate 2-2 or a gasification (evaporation) temperature in the recording layer 3-2. Thus, the exposure amount (recording power) at the time of recording is reduced to prevent the deformation temperature from being exceeded on the surface of the transparent substrate 2-2 or the gasification (evaporation) temperature from being exceeded in the recording layer 3-2. The contents will be described later in detail in the section "3-3) Recording characteristics common to organic dye recording layer in the present embodiment". In addition, in contrast, it becomes possible to determine whether or not the optical characteristic change shown in [α] above occurs by checking a value of the optimal power at the time of recording.

δ] Electron Structure in a Light Emitting Area is Stabilized, and Structural Decomposition Relevant to Ultraviolet Ray or Reproduction Light Irradiation is Hardly Generated When ultraviolet ray is irradiated to the recording layer 3-2 or reproduction light is irradiated to the recording layer 3-2 at the time of reproduction, a temperature size in the recording layer 3-2 occurs. There is a request for a seemingly contradictory performance that characteristic degradation relevant to such a temperature rise is prevented and recording is carried out at a temperature lower than a substrate deformation temperature or a gasification (evaporation) temperature in the recording layer 3-2. In the present embodiment, the above described seemingly contradictory performance is ensured by "stabilizing an electron structure in a light emitting area". The specific technical contents will be described in "Chapter 4 Specific Description of Embodiments of Organic Dye Recording Film in the Present Embodiment".

ε] Reliability of Reproduction Information is Improved for a Case in which Reproduction Signal Degradation Due to Ultraviolet Ray or Reproduction Light Irradiation Occurs In the present embodiment, although a technical contrivance is made for "stabilizing an electron structure in a light emitting area", the reliability of the recording mark 9 formed in a principle of recording shown in the present embodiment may be principally lowered as compared with a local cavity in the recording layer 3-2 generated due to plastic deformation or gasification (evaporation) of the surface of the transparent substrate 2-2. As countermeasures against it, in the present embodiment, advantageous effect that the high density and the reliability of recording information are achieved at the same time in combination with strong error correction capability (novel ECC block structure), as described later in "Chapter 7: Description of H Format" and "Chapter 8: Description of B Format". Further, in the present embodiment, PRML (Partial Response Maximum Likelihood) technique is employed as a reproduction method, as described in the section "4-2 Description of reproducing circuit in the present embodiment", the high density and the reliability of recording information are achieved at the same time in combination with an error correction technique at the time of ML demodulation.

Among the specific characteristics of the above described present embodiment, a description has been given with respect to the fact that items [α] to [γ] are the contents of technical contrivance newly devised in the present embodiment in order to achieve "narrow track pitch" and "narrow channel bit length". In addition, "narrow channel bit length" causes the achievement of "reduction of minimum recording mark length". The meanings (objects) of the present embodiment relating to the remaining items [δ] and [ε] will be described in detail. At the time of reproduction in the H format in the present embodiment, a passage speed (line speed) of a focusing spot of light passing through the recording layer 3-2 is set to 6.61 m/s, and the line speed in the B format is set in the range of 5.0 m/s to 10.2 m/s.

Figure 31:
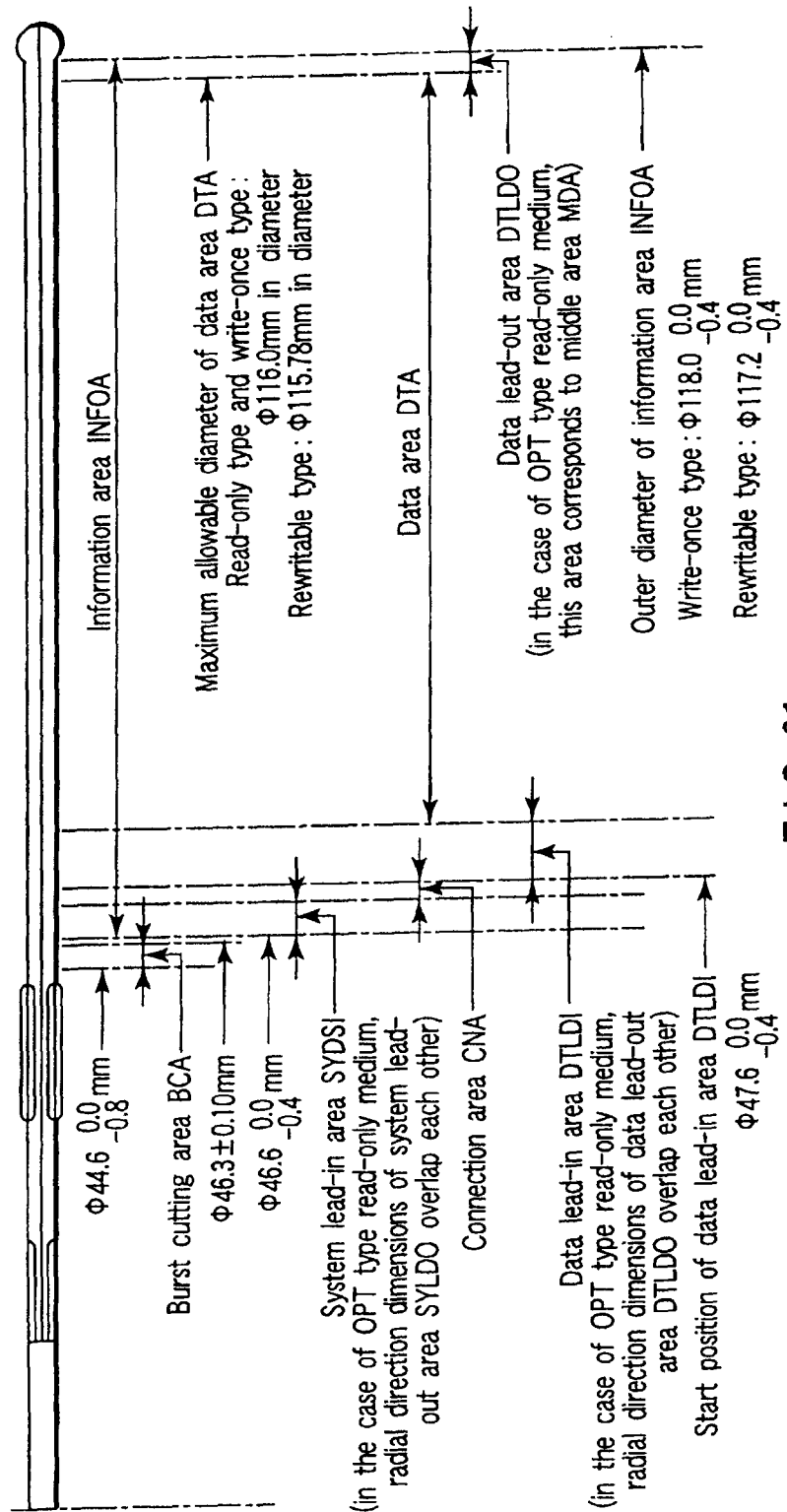
FIG. 31 is an exemplary view showing an example of a structure and dimensions in an information storage medium.

In any case, the line speed at the time of reproduction in the present embodiment is equal to or greater than 5 m/s. As shown in FIG. 31, a start position of a data lead-in area DTLDI in the H format is 47.6 m in diameter. In view of the B format as well, user data is recorded in location equal to or greater than 45 m in diameter. An inner periphery of 45 m in diameter is 0.141 m, and thus, the rotation frequency of an information storage medium when this position is reproduced at a line speed of 5 m/s is obtained as 35.4 rotations/s. Video image information such as TV program is provided as one of the methods utilizing a write-once type information storing medium according to the present embodiment. For example, when a user presses "pause (temporary stop) button" at the reproduction of the user's recorded video image, a reproduction focusing spot stays on a track of its paused position. When the spot stops on the track of the paused position, the user can start reproduction at the paused position immediately after a "reproduction start button" has been pressed. For example, after the user has pressed a "pause (temporary stop) button", in the case where a customer visits the user's home immediately after the user has gone to toilet, there is a case in which the pause button is left to have been pressed for one hour while the user meets the customer. The write-once type information storage medium makes 35.4×60×60≅130,000 rotations for one hour, and the focusing spot traces on the same track during this period (130,000 repetitive playbacks). If the recording layer 3-2 is degraded due to repetitive playback and video image information cannot be reproduced after this period, the user coming back one hour later cannot see any portion of video image, and thus, gets angry, and in the worst case, there is a danger that the problem may be taken to court. Therefore, a minimum condition that, if the recorded video image information is not destroyed even if such a pausing is left for one hour or longer (even if continuous playback in the same track occurs), no video image data is destroyed, requires to guarantee that at least 100,000 repetitive playback occurs, no reproduction degradation occurs. There is a rare case in which a user repeats one-hour pausing (repetitive playback) 10 times with respect to the same location in a general use condition. Therefore, when it is guaranteed that the write-once type information storage medium according to the present embodiment desirably makes 1,000,000 repetitive playbacks, no problem occurs with use by the general user, and it is considered sufficient to set to about 1,000,000 times the upper limit value of the repetitive playback count as long as the recording layer 3-2 is not degraded. If the upper limit value of the repetitive playback count is set to a value which significantly exceeds 1,000,000 times, there occurs inconvenience that "recording sensitivity is lowered" or "medium price increases".

In the case where the upper limit value of the above repetitive reproduction count is guaranteed, a reproduction power value becomes an important factor. In the present embodiment, recording power is defined in a range set in formulas (8) to (13). It is said that a semiconductor laser beam is featured in that continuous light irradiation is not stable in a value equal to or smaller than 1/80 of the maximum use power. Because the power, which is 1/80 of the maximum use power, is in location in which light irradiation is just started (mode initiation is started), mode hopping is likely to occur. Therefore, at this light irradiation power, the light reflected in the light reflection layer 4-2 of the information storage medium comes back to a semiconductor laser light source, there occurs a "return light noise" featured in that the light emission amount always changes. Accordingly, in the present embodiment, the values of the reproduction power is set below around the value which is 1/80 of the value described at the right side of formula (12) or formula (13):

$$[\text{Optical reproduction power}] > 0.19 \times (0.65/NA)^2 \times (V/6.6) \quad (B-1)$$

$$[\text{Optical reproduction power}] > 0.19 \times (0.65/NA)^2 \times (V/6.6)^{1.2} \quad (B-2)$$

In addition, the value of the optimal reproduction power is restricted by a dynamic range of a power monitoring optical detector. Although not shown in an information recording/reproducing unit 141 of FIG. 11, a recording/reproducing optical head exists. This optical head incorporates an optical detector which monitors a light emission amount of a semiconductor laser light source. In the present embodiment, in order to improve light irradiation precision of the reproduction power at the time of reproduction, this optical detector detects a light emission amount and applies a feedback to an amount of a current to be supplied to the semiconductor laser light source at the time of light irradiation. In order to lower a price of the optical head, it is necessary to use a very inexpensive optical detector. A commercially available, inexpensive optical detector is often molded with a resin (an optical detecting unit is surrounded).

Figures 8A, 8B, 8C:
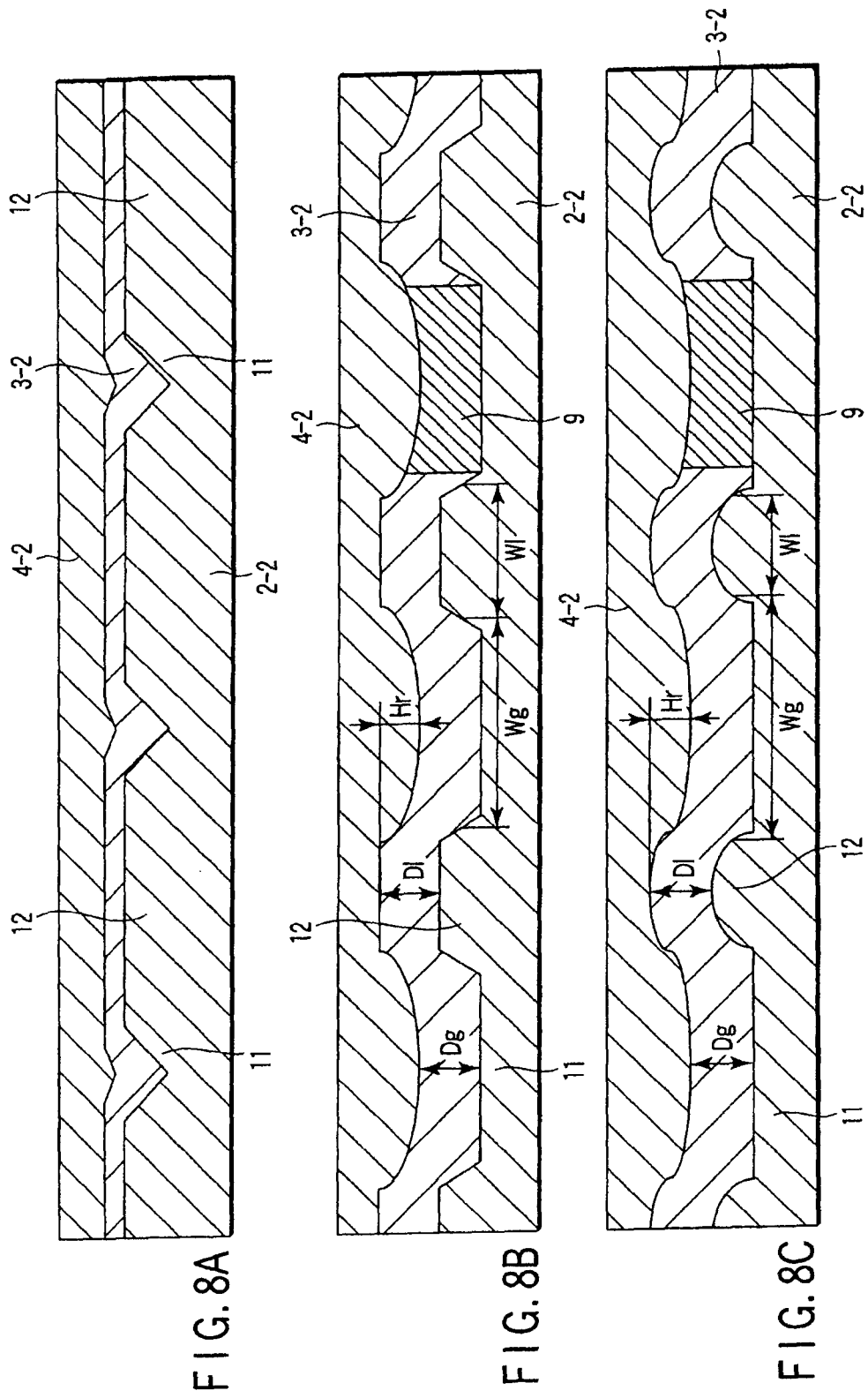
FIGS. 8A, 8B and 8C are exemplary views showing characteristics of the shape and dimensions of the recording film.

As disclosed in "Chapter 0: Description of Relationship between Use Wavelength and the Present Embodiment", 530 nm or less (in particular, 455 nm or less) is used as a light source wavelength in the present embodiment. In the case of this wavelength area, a resin with which the optical detecting unit is molded (mainly, epoxy resin) causes such a degradation that occurs when ultraviolet ray has been irradiated if the wavelength light is irradiated (such as dark yellow discoloring or occurrence of cracks (fine white stripes)) and the optical detection characteristics are impaired. In particular, in the case of the write-once type information storage medium shown in the present embodiment, a mold resin degradation is likely to occur because the storage medium has a pre-groove area 11 as shown in FIGS. 8A, 8B and 8C. As a focus blurring detection system of an optical head, in order to remove adverse effect due to the diffraction light from this pre-groove area 11, there is most often employed a "knife-edge technique" of allocating an optical detector at an image forming position relevant to the information storage medium (image forming magnification M is in order of 3 times to 10 times). When the optical detector is arranged at the image forming position, high optical density is irradiated onto a mold resin because light beams are focused on the optical detector, and resin degradation due to this light irradiation is likely to occur. This mold resin characteristic degradation mainly occurs due to a photon mode (optical action), and however, it is possible to predict an upper limit value of an allowable irradiation amount in comparison with a light emission amount in a thermal mode (thermal excitation). Assuming the worst case, let us assume an optical system in which an optical detector is arranged at an image forming position as an optical head.

From the contents described in "(1) Condition for thickness Dg of recording layer 3-2" in "3-2-A] Range requiring application of technique according to the present embodiment", when an optimal characteristic change (thermal mode) occurs in the recording layer 3-2 at the time of recording in the present embodiment, it is considered that a temperature temporarily rises in the range of 80° C. to 150° C. in the recording layer 3-2. In view of a room temperature of about 15° C., a temperature difference $\Delta T_{write}$ ranges from 65° C. to 135° C. Pulse light emissions occur at the time of recording, and continuous light emissions occur at the time of reproduction. At the time of reproduction, the temperature rises in the recording layer 3-2 and a temperature difference $\Delta T_{read}$ occurs. When an image forming magnification of a detecting system in the optical head is M, the optical density of the detected light focused on the optical detector is obtained as $1/M^2$ of the optical density of convergence light irradiated on the recording layer 3-2, and thus, a temperature rise amount on the optical detector at the time of reproduction is obtained as $\Delta T_{read}/M^2$ which is a rough estimate. In view of the fact that an upper limit value of optical density, which can be irradiated on the optical detector, is converted by the temperature rise amount, it is considered that the upper limit value is in order of $\Delta T_{read}/M^2 \leq 1°$ C. The image foaming magnification of the detecting system in the optical head M is in order of 3 times to 10 times in general, if the magnification $M^2 \cong 10$ is tentatively estimated, it is necessary to set reproduction power so as to obtain:

$$\Delta T_{read}/\Delta T_{write} \leq 20 \quad (B-3)$$

Assuming that a duty ratio of recording pulses at the time of recording is estimated as 50%, the following is required:

$$[\text{Optimal reproduction power}] \leq [\text{Optimal recording power}]/10 \quad (B-4)$$

Therefore, in view of formulas (8) to (13) described later and the above formula (B-4), optimal reproduction power is assigned as follows:

$$[\text{Optimal reproduction power}] < 3 \times (0.65/NA)^2 \times (V/6.6) \quad (B-5)$$

$$[\text{Optimal reproduction power}] < 3 \times (0.65/NA)^2 \times (V/6.6)^{1/2} \quad (B-6)$$

$$[\text{Optimal reproduction power}] < 2 \times (0.65/NA)^2 \times (V/6.6) \quad (B-7)$$

$$[\text{Optimal reproduction power}] < 2 \times (0.65/NA)^2 \times (V/6.6)^{1/2} \quad (B-8)$$

$$[\text{Optimal reproduction power}] < 1.5 \times (0.65/NA)^2 \times (V/6.6) \quad (B-9)$$

$$[\text{Optimal reproduction power}] < 1.5 \times (0.65/NA)^2 \times (V/6.6)^{1/2} \quad (B-10)$$

(Refer to "3-2-E] Basic characteristics relating to thickness distribution of recording layer in the present embodiment for definition of parameters".) For example, when NA=0.65 and V=6.6 m/s, the following is obtained:

[Optimal reproduction power]<3 mW,

[Optimal reproduction power]<2 mW, or

[Optimal reproduction power]<1.5 mW.

In reality, the optical detector is fixed as compared with the fact the information storage medium rotates and relatively moves, and thus, in consideration of this fact, it is necessary to further set the optimal reproduction power to be in order of 1/3 or less of the value obtained in the above formula. In the information recording/reproducing apparatus according to the present embodiment, a value of the reproduction power is set to 0.4 mW.

3-2-C] Ideal Recording Film Structure in which a Principle of Recording Shown in the Present Embodiment is Easily Generated A description will be given with respect to a method for "setting an environment" (recording film structure or shape) in which the above principle of recording is easily generated in the present embodiment.

As an environment in which an optical characteristic change inside of the above described recording layer 3-2 is likely to occur, the present embodiment is featured in that a technical contrivance is carried out in recording film structure or shape such as:

"in an area for forming the recording mark 9, a critical temperature at which an optical characteristic change is likely to occur is exceeded, and at a center part of the recording mark 9, a gasification (evaporation) temperature is not exceeded, and a surface of a transparent substrate 2-2 in the vicinity of the center part of the recording mark 9 does not exceed a thermal temperature"

The specific contents relating to the above description will be described with reference to FIGS. 7A, 7B and 7C. In FIGS. 7A, 7B and 7C, the open (blank) arrow indicates an optical path of an irradiation laser light beam 7, and the arrow of the dashed line indicates a thermal flow. A recording film structure shown in FIG. 7A indicates an environment in which an optical characteristic change inside of a recording layer 3-2 corresponding to the present embodiment is most likely to occur. That is, in FIG. 7A, the recording layer 3-2 consisting of an organic dye recording material has uniform thickness anywhere in the range shown in formula (3) or formula (4) (where the thickness is sufficiently large), and receives irradiation of the laser light beam 7 in a direction vertical to the recording layer 3-2. As described in detail in "6-1) light reflection layer (material and thickness)", a silver alloy is used as a material for a light reflection layer 4-2 in the present embodiment. A material including a metal with high light reflection factor, in general, has high thermal conductivity and heat radiation characteristics without being limited to the silver alloy. Therefore, although a temperature of the recording layer 3-2 is risen by absorbing the energy of the irradiated laser light beam 7, a heat is radiated toward the light reflection layer 4-2 having heat radiation characteristics. Although a recording film shown in FIG. 7A is formed anywhere in a uniform shape, a comparatively uniform temperature rise occurs inside of the recording layer 3-2, and a temperature difference at points α, β, and γ at the center part is comparatively small. Therefore, when the recording mark 9 is formed, when a critical temperature at which an optical characteristic change at the points α and β occurs is exceeded, a gasification (evaporation) temperature is not exceeded at the point α of the center part; and a surface of a transparent substrate (not shown) which exists at a position which is the closest to the point α of the center part does not exceed a thermal deformation temperature.

In comparison, as shown in FIG. 7B, a step is provided partly of the recording film 3-2. At the points δ and ε, the radiation of the laser light beam 7 is subjected in a direction oblique to a direction in which the recording layer 3-2 is arrayed, and thus, an irradiation amount of the laser light beam 7 per a unit area is relatively lowered as compared with the point α of the center part. As a result, a temperature rise amount in the recording layer 3-2 at the points δ and ε is lowered. At the points δ and ε as well, thermal radiation toward the light reflection layer 4-2 occurs, and thus, the arrival temperature at the points δ and ε is sufficiently lowered as compared with the point α of the center part. Therefore, a heat flows from the point β to the point α and a heat flows from the point α to the point β, and thus, a temperature difference at the points β and γ relevant to the point α of the center part becomes very small. At the time of recording, a temperature rise amount at the points β and γ is low, and a critical temperature at which an optical characteristic change occurs is hardly exceeded at the points β and α. As countermeasures against it, in order to produce an optical characteristic change occurs at the points β and γ (in order to produce a critical temperature or more), it is necessary to increase an exposure amount (recording power) of the laser light beam 7. In the recording film structure shown in FIG. 7B, a temperature difference at the point α of the center part relevant to the points β and γ is very large. Thus, when a current temperature has risen at a temperature at which an optical characteristic change occurs at the points β and γ, a gasification (evaporation) temperature is exceeded at the point α of the center part or the surface of a transparent substrate (not shown) in the vicinity of the point α of the center part easily exceeds a thermal deformation temperature.

In addition, even if the surface of the recording layer 3-2 at the side at which irradiation of the laser light beam 7 is subjected is vertical to the irradiation direction of the laser light beam 7 anywhere, in the case where the thickness of the recording layer 3-2 changes depending on a location, there is provided a structure in which an optical characteristic change inside of the recording layer 3-2 according to the present embodiment hardly occurs. For example, as shown in FIG. 7C, let us consider a case in which the thickness D1 of a peripheral part is significantly small with respect to the thickness Dg of the recording layer 3-2 at the point α of the center part (for example, formula (2) or formula (4) is not satisfied). Even at the point α of the center part, although heat radiation toward the light reflection layer 4-2 occurs, the thickness Dg of the recording layer 3-2 is sufficiently large, thus making it possible to achieve heat accumulation and to achieve a high temperature. In comparison, at the points ξ and η at which the thickness D1 is significantly small, a heat is radiated toward the light reflection layer 4-2 without carrying out heat accumulation, and thus, a temperature rise amount is small. As a result, heat radiation toward points β, δ, and ξ in order and heat radiation toward points γ, ε, and η in order occurs as well as heat radiation toward the light reflection layer 4-2, and thus, as in FIG. 7B, a temperature difference at the point α of the center part relevant to points β and γ becomes very large. When an exposure amount of the laser light beam 7 (recording power) is increased in order to produce an optical characteristic change at the points β and γ (in order to produce a critical temperature or more), the gasification (evaporation) temperature at the point α of the center part is exceeded or the surface of the transparent substrate (not shown) in the vicinity of the point α of the center part easily exceeds a thermal deformation temperature.

Based on the contents described above, referring to FIGS. 8A, 8B and 8C, a description will be given with respect to: the contents of a technical contrivance in the present embodiment relating to the pre-groove shape/dimensions for providing "setting of environment (structure or shape of a recording film)" in which a principle of recording according to the present embodiment is likely to occur; and the contents of a technical contrivance in the present embodiment relating to a thickness distribution of the recording layer. FIG. 8A shows a recording film structure in a conventional write-once type information storage medium such as CD-R or DVD-R; and FIGS. 8B and 8C each show a recording film structure in the present embodiment. In the invention, as shown in FIGS. 8A, 8B and 8C, a recording mark 9 is formed in a pre-groove area 11.

3-2-D] Basic Characteristics Relating to Pre-Groove Shape/Dimensions in the Present Embodiment As shown in FIG. 8A, there have been many cases in which a pre-groove area 11 is formed in a "V-groove" shape in a conventional write-once type information storage medium such as CD-R or DVD-R. In the case of this structure, as described in FIG. 7B, the energy absorption efficiency of the laser light beam 7 is low, and the temperature distribution non-uniformity in the recording layer 3-2 becomes very large. The present embodiment is featured in that, in order to make close to an ideal state of FIG. 7A, a planar shape orthogonal to a traveling direction of the incident laser light beam 7 is provided in the pre-groove area 11 at the side of at least the "transparent substrate 2-2". As described with reference to FIG. 7A, it is desirable that this planar area be as wide as possible. Therefore, the present embodiment is secondarily featured in that the planar area is provided in the pre-groove area 11 and the width Wg of the pre-groove area 11 is wider than the width Wl of a land area (Wg>Wl). In this description, the width Wg of the pre-groove area and the width Wl of the land area are defined as their respective widths at a position at which there crosses a plane having an intermediate height between a height at a planar position of the pre-groove area and a height at a position at which the land area becomes the highest and an oblique surface in the pre-groove.

A discussion has been made using thermal analysis, data has been recorded in a write-once type information storage medium actually produced as a prototype, substrate deformation observation due to a sectional SEM (scanning type electronic microscope) image at the position of the recording mark 9 has been made, and observation of the presence or absence of a cavity generated due to gasification (evaporation) in the recording layer 3-2 has been repeated. As a result, it is found that advantageous effect is attained by widening the width Wg of the pre-groove area more significantly than the width Wl of the land area. Further, a ratio of the pre-groove area width Wg and the land area width Wl is Wg:Wl=6:4, and desirably, is greater than Wg:Wl=7:3, whereby it is considered that a local optical characteristic change in the recording layer 3-2 is likely to occur while the change is more stable at the time of recording. As described above, when a difference between the pre-groove area width Wg and the land area width Wl is increased, a flat surface is eliminated from the top of the land area 12, as shown in FIG. 8C. In the conventional DVD-R disk, a pre-pit (land pre-pit: not shown) is formed in the land area 12, and a format for recording address information or the like in advance is realized here. Therefore, it is conditionally mandatory to form a flat area in the land area 12. As a result, there has been a case in which the pre-groove area 11 is formed in the "V-groove" shape. In addition, in the conventional CD-R disk, a wobble signal has been recorded in the pre-groove area 11 by means of frequency modulation. In a frequency modulation system in the conventional CD-R disk, slot gaps (a detailed description of each format is given in detail) are not constant, and phase adjustment at the time of wobble signal detection (PLL: synchronization of PLL (Phase Lock Loop)) has been comparatively difficult. Thus, a wall face of the pre-groove area 11 is concentrated (made close to the V-groove) in the vicinity of a center at which the intensity of a reproducing focusing spot is the highest and a wobble amplitude amount is increased, whereby the wobble signal detection precision has been guaranteed. As shown in FIGS. 8B and 8C, after the flat area in the pre-groove area 11 in the present embodiment has been widened, when the oblique surface of the pre-groove area 11 is shifted to the outside relatively than a center position of the reproducing focusing spot, a wobble detection signal is hardly obtained. The present embodiment is featured in that the width Wg of the pre-groove area described above is widened and the H format utilizing PSK (Phase Shift Keying) in which slot gaps at wobble detection is always fixedly maintained or the B format utilizing FSK (Frequency Shift Keying) or STW (Saw Tooth Wobble) are combined, whereby stable recording characteristics are guaranteed (suitable to high speed recording or layering) at low recording power and stable wobble signal detection characteristics are guaranteed. In particular, in the H format, in addition to the above combination, "a ratio of a wobble modulation is lowered more significantly than that of a non-modulation area", thereby facilitating synchronization at the time of wobble signal detection more significantly, and further, stabilizing wobble signal detection characteristics more significantly.

3-2-E] Basic Characteristics Relating to Thickness Distribution of Recording Layer 3-2 in the Present Embodiment In the present description, as shown in FIGS. 8B and 8C, the thickness in a portion at which the recording layer 3-2 in the land area 12 is the thickest is defined as recording layer thickness D1 in the land area 12; and a portion at which the recording layer 3-2 in the pre-groove area 11 is the thickest is defined as recording layer thickness Dg in the pre-groove area. As has been described with reference to FIG. 7C, the recording layer thickness D1 in the land area is relatively increased, whereby a local optical characteristic change in the recording layer is stably likely to occur at the time of recording.

In the same manner as that described above, a discussion has been made using thermal analysis, data has been recorded in a write-once type information storage medium actually produced as a prototype, substrate deformation observation and observation of the presence or absence of a cavity generated due to gasification (evaporation) in the recording layer 3-2 by a sectional SEM (scanning type electronic microscope) image at the position of the recording mark 9 have been made. As a result, it has been found necessary to set a ratio between the recording layer thickness Dg in the pre-groove area and the recording layer thickness D1 in the land area to be equal to or smaller than Dg:D1=4:1. Further, Dg:D1=3:1 is set, and desirably, Dg:D1=2:1 is set, thereby making it possible to guarantee stability of a principle of recording in the present embodiment.

3-3) Recording Characteristics Common to Organic Dye Recording Film in the Present Embodiment As one of "3-2-B] basic characteristics common to an organic dye recording material in the present embodiment", the present embodiment is featured by recording power control, as described in item [γ].

The formation of the recording mark 9 due to a local optical characteristic change in the recording layer 3-2 occurs at a temperature, which is much lower than a plastic deformation temperature of the conventional transparent substrate 2-2, at a thermal decomposition temperature in the recording layer 3-2, or a gasification (evaporation) temperature. Thus, an upper limit value of recording power is restricted so as not ensure that the transparent substrate 2-2 locally exceeds a plastic deformation temperature at the time of recording or a thermal decomposition temperature or a gasification (evaporation) temperature is locally exceeded in the recording layer 3-2.

In parallel to discussion using thermal analysis, by using an apparatus described later in "4-1) Description of structure and characteristics of reproducing apparatus or recording/reproducing apparatus in the present embodiment" and by using a recording condition described later in "4-3) Description of recording condition in the present embodiment", there has been made a demonstration of a value of optimal power in the case where recording has been carried out in a principle of recording shown in the present embodiment. A numerical aperture (NA) value of an objective lens in the recording/reproducing apparatus used in a demonstration test has been 0.65, and a line speed at the time of recording has been 6.61 m/s. As a value of recording power (Peak Power) defined later in "4-3) Description of recording condition in the present embodiment", it has been found that:

Gasification (evaporation) occurs with most of an organic dye recording material at 30 mW, and a cavity occurs in a recording mark;

A temperature of the transparent substrate 2-2 at a position in the vicinity of the recording layer 3-2 significantly exceeds a glass transition temperature;

A temperature of the transparent substrate 2-2 at a position in the vicinity of the recording layer 3-2 reaches a plastic deformation temperature (glass transition temperature) at 20 mW;

15 mW or less is desirable in consideration of a margin such as surface pre-warping or recording power change of an information storage medium.

The "recording power" described above denotes a sum of exposure amount irradiated to the recording layer 3-2. The optical energy density at a center part of a focusing spot and at a portion at which the optical intensity density is the highest is obtained as parameters targeted for discussion in the present embodiment. The focusing spot size is inversely proportional to the NA value, and thus, the optical energy density at the center part of the focusing spot increases in proportion to a square of the NA value. Therefore, the current value can be converted to a value of optimal recording power in the B format described later or another format (another NA value) shown in FIG. 1 (D3) by using a relational formula below:

$$[\text{Recording power applicable to different NA values}] = [\text{Recording power when NA} = 0.65] \times 0.65^2/NA^2 \quad (5)$$

Further, optimal recording power changes depending on a line speed V in phase change type recording material. In general, it is said that optimal recording power changes in proportion to a ½ square of a line speed V in phase change type recording material, and changes in proportion to a line speed V in organic dye recording material. Therefore, a conversion formula of optimal recording power considering a line speed V, obtained by extending formula (5), is obtained as follows:

$$[\text{General recording power}] = \quad (6)$$
$$[\text{Recording power when } NA = 0.65; 6.6 \text{ m/s}] \times$$
$$(0.65/NA)^2 \times (V/6.6)$$

or $$[\text{General recording power}] = \quad (7)$$
$$[\text{Recording power when } NA = 0.65; 6.6 \text{ m/s}] \times$$
$$(0.65/NA)^2 \times (V/6.6)^{1/2}$$

When the above discussion result is summarized, as recording power for guaranteeing a principle of recording shown in the present embodiment, it is desirable to set an upper limit value such as:

$$[\text{Optimal recording power}] < 30 \times (0.65/NA)^2 \times (V/6.6) \quad (8)$$

$$[\text{Optimal recording power}] < 30 \times (0.65/NA)^2 \times (V/6.6)^{1/2} \quad (9)$$

$$[\text{Optimal recording power}] < 20 \times (0.65/NA)^2 \times (V/6.6) \quad (10)$$

$$[\text{Optimal recording power}] < 20 \times (0.65/NA)^2 \times (V/6.6)^{1/2} \quad (11)$$

$$[\text{Optimal recording power}] < 15 \times (0.65/NA)^2 \times (V/6.6) \quad (12)$$

$$[\text{Optimal recording power}] < 15 \times (0.65/NA)^2 \times (V/6.6)^{1/2} \quad (13)$$

From among the above formulas, a condition for formula (8) or formula (9) is obtained as a mandatory condition; a target condition for formula (10) or formula (11) is obtained; and a condition for formula (12) or formula (13) is obtained as a desirable condition.

3-4) Description of Characteristics Relating to "H-L" Recording Film in the Present Embodiment A recording film having characteristics that a light reflection amount in a recording mark 9 is lower than that in an unrecorded area is referred to as an "H-L" recording film. In contrast, a recording film in which the above light reflection amount is high is referred to as an "L-H" recording film. Among them, with respect to the "H-L" recording film, the present embodiment is featured in that:

(1) an upper limit value is provided at a ratio of absorbance at a reproduction wavelength relevant to absorbance at a $\lambda_{max\ write}$ position of light absorption spectra; and (2) a light absorption spectra profile is changed to form a recording mark.

Figure 9:
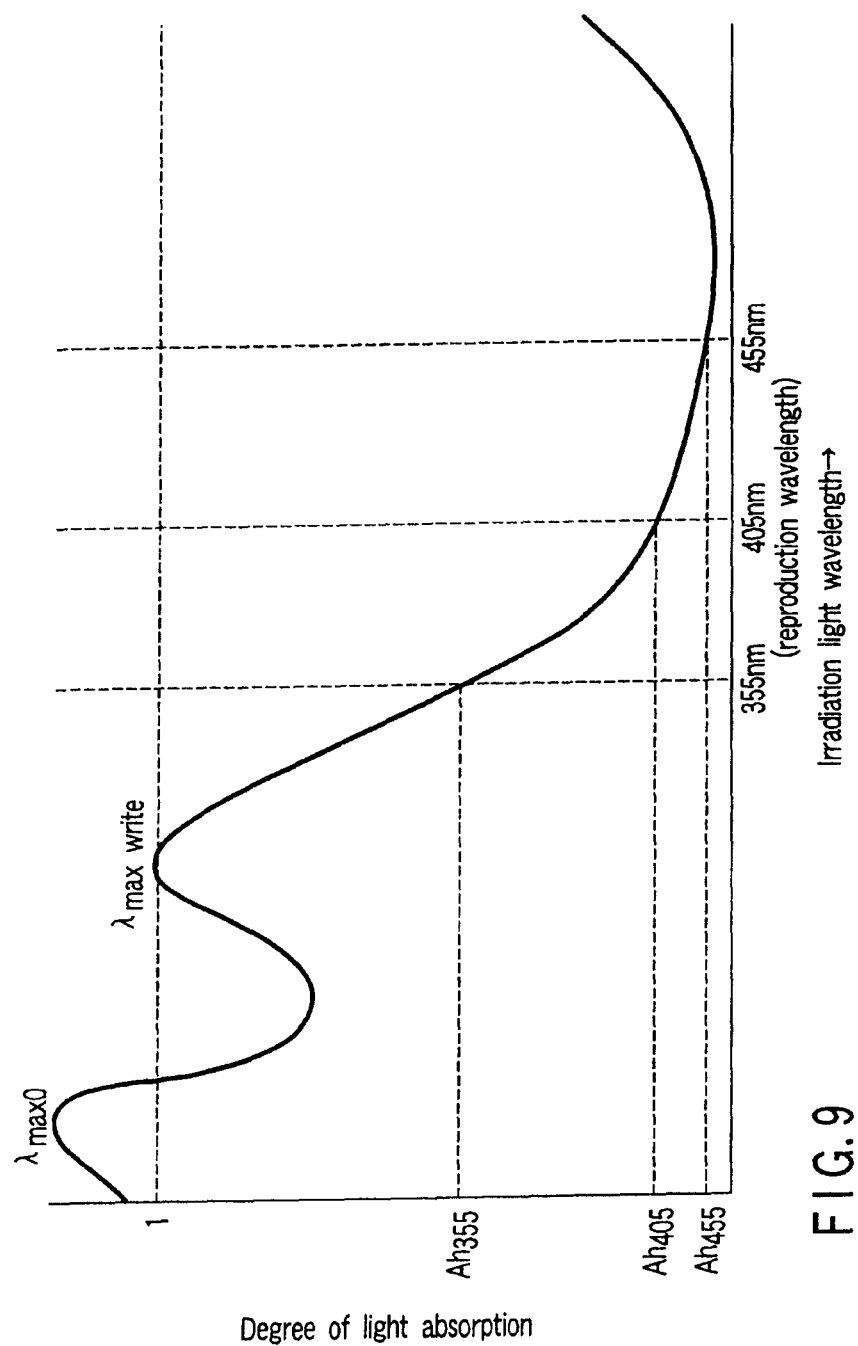
FIG. 9 is an exemplary view of light absorption spectrum characteristics in an unrecorded state in an "H-L" recording film.

A detailed description relating to the above contents will be given with reference to FIGS. 9 and 10. In the "H-L" recording film in the present embodiment, as shown in FIG. 9, a wavelength of $\lambda_{max\ write}$ is shorter than a use wavelength utilized for recording/reproduction (in the vicinity of 405 nm). As is evident from FIG. 10, in the vicinity of a wavelength of $\lambda_{max\ write}$, a change of absorbance is small between an unrecorded portion and a recorded portion. If a change of absorbance is small between the unrecorded portion and the recorded portion, a large reproduction signal amplitude cannot be obtained. Even if a wavelength change of a recording or reproducing laser light source occurs, in view of the fact that recording or reproduction can be stably carried out, in the present embodiment, as shown in FIG. 9, a design of the recording film 3-2 is made so that a wavelength of $\lambda_{max\ write}$ arrives at the outside ranging from 355 nm to 455 nm, i.e., arrives at the shorter wavelength side than 355 nm.

The relative absorbance at 355 nm, 455 nm, and 405 nm described in "Chapter 0: Description of Relationship between Use Wavelength and the Present Embodiment" when the absorbance at a position of $\lambda_{max\ write}$ defined in "2-1) Difference in principle of recording/recording film structure and difference in basic concept relating to reproduction signal generation", is defined as $Ah_{355}$, $Ah_{455}$, and $Ah_{405}$.

In the case where of $Ah_{405}=0.0$, the light reflection factor from a recording film in an unrecorded state coincides with that at 405 nm in the light reflection layer 4-2. A light reflection factor of the light reflection layer 4-2 will be described later in detail in the section "6-1) Light reflection layer". Hereinafter, a description will be given with respect to the fact that the light reflection factor of the light reflection layer 4-2 is defined as 100% for the sake of simplification.

In the write-once type information storage medium using an "H-L" recording film in the present embodiment, a reproduction circuit is used in common to a case of using a read-only type information storage medium (HD DVD-ROM disk) in the case of a one-sided single layer film. Therefore, in this case, an optical reflection factor is defined as 45% to 85% in accordance with a light reflection factor of the reflection only information storage medium (HD DVD-ROM disk) of a one-sided single layer film. Therefore, it is necessary to set the light reflection factor at an unrecorded position to 40% or more. Because 1−0.4=0.6, it is possible to intuitively understand whether or not the absorbance $Ah_{405}$ at 405 nm may be set:

$$Ah_{405} \leq 0.6 \quad (14)$$

In the case where formula (14) above is met, it is possible to easily understand that the light reflection factor can be set to 40% or more. Thus, in the present embodiment, an organic dye recording material, which meets formula (14) in an unrecorded location, is selected. The above formula (14) assumes that, in FIG. 9, the light reflection factor is obtained as 0% when the light reflection layer 4-2 is reflected over the recording layer 3-2 with a light beam having a wavelength of $\lambda_{max\ write}$. However, in reality, at this time, the light reflection factor is not obtained as 0%, and has a certain degree of light reflection factor. Thus, strictly, there is a need for correction relevant to formula (14). In FIG. 9, if the light reflection factor is defined as $R\lambda_{max\ write}$ when the light reflection layer 4-2 has been reflected over the recording layer 3-2 with a light beam having a wavelength of $\lambda_{max\ write}$, a strict conditional formula in which the light reflection factor at an unrecorded position is set to 40% or more is obtained as follows:

$$1 - Ah_{405} \times (1 - R\lambda_{max\ write}) \geq 0.4 \quad (15)$$

In the "H-L" recording layer, in many cases, $R\lambda_{max\ write} \geq 0.25$, and thus, formula (15) is established as follows:

$$Ah_{405} \leq 0.8 \quad (16)$$

In the "H-L" recording film according to the present embodiment, it is conditionally mandatory to meet formula (16). Characteristics of the above formula (14) has been provided, and further, a detailed optical film design has been made under a condition that the film thickness of the recording layer 3-2 meets the condition for formula (3) or formula (4), in consideration of a variety of margins such as a film thickness change or a wavelength change of reproduction light. As a result, it has been found desirable that:

$$Ah_{405} \leq 0.3 \quad (17)$$

Assuming that formula (14) is established, when:

$$Ah_{455} \leq 0.6 \quad (18)$$

or $$Ah_{355} \leq 0.6 \quad (19),$$

the recording/reproducing characteristics are more stable. This is because, in the case where formula (14) meets any of at least formulas (18) and (19) when formula (14) is established, the value of Ah becomes 0.6 or less in the range of 355 nm to 405 nm or in the range of 405 nm to 455 nm (occasionally in the range of 355 nm to 455 nm), and thus, even if a fluctuation occurs at a light emission wavelength of a recording laser light source (or a reproducing laser light source), a value of absorbance does not change drastically.

As a specific principle of recording of the "H-L" recording film in the present embodiment, there is utilized a phenomenon of "array change between molecules" or "molecular structure change in molecule" in a recording mechanism listed in item [α] in "3-2-B] Basic featured common to organic dye recording material in the present embodiment" which has been described as a specific principle of recording of the "H-L" recording film in the present embodiment. As a result, as described in the above item (2), a light absorption spectrum profile is changed. The light absorption spectrum profile in a recording mark in the present embodiment is indicated by the solid line shown in FIG. 10, and the light absorption spectrum profile in an unrecorded location is superimposed by the dashed line, thereby making it possible to compare these profiles with each other. In the present embodiment, the light absorption spectrum profile in the recording mark changes comparatively broadly, and there is a possibility that a molecular structure change in molecules occurs and partial precipitation (coal tar) of carbon atoms occurs. The present embodiment is featured in that a value of a wavelength $\lambda 1_{max}$ at which the absorbance in the recording mark becomes maximal is made closer to a reproduction wavelength of 405 nm than a value of a wavelength $\lambda_{max\ write}$ at an unrecorded position, thereby generating a reproduction signal in the "H-L" recording film. In this manner, the absorbance at the wavelength $\lambda 1_{max}$ at which the absorbance is the highest becomes smaller than "1", and a value of the absorbance $Al_{405}$ at a reproduction wavelength of 405 nm becomes greater than a value of $Ah_{405}$. As a result, a total light reflection factor in a recording mark is lowered.

In the H format in the present embodiment, as a modulation system, there is employed ETM (Eight to Twelve: 8-bit data code is converted to 12-channel bit) and RLL (1, 10) (Among a code train after modulated, a minimum inversion length relevant to a 12-channel bit length T is 2T, and a maximum inversion length is 11T). Where performance evaluation of a reproduction circuit described later in "4-2) Description of reproducing circuit in the present embodiment) is carried out, in order to stably carry out reproduction by the reproducing circuit, it has been found necessary to meet that a ratio of [differential value $I11 \equiv I_{11H} - I_{11L}$, where $I_{11H}$ is a reproduction signal amount from an unrecorded area having a sufficiently long length (11T and $I_{11L}$ is a reproduction signal amount from a recording mark having the sufficiently long length (11T) to $[I_{11H}]$ is:

$$I_{11}/I_{11H} \geq 0.4 \quad (20) \text{ or preferably,}$$

$$I_{11}/I_{11H} > 0.2 \quad (21)$$

Figure 15:
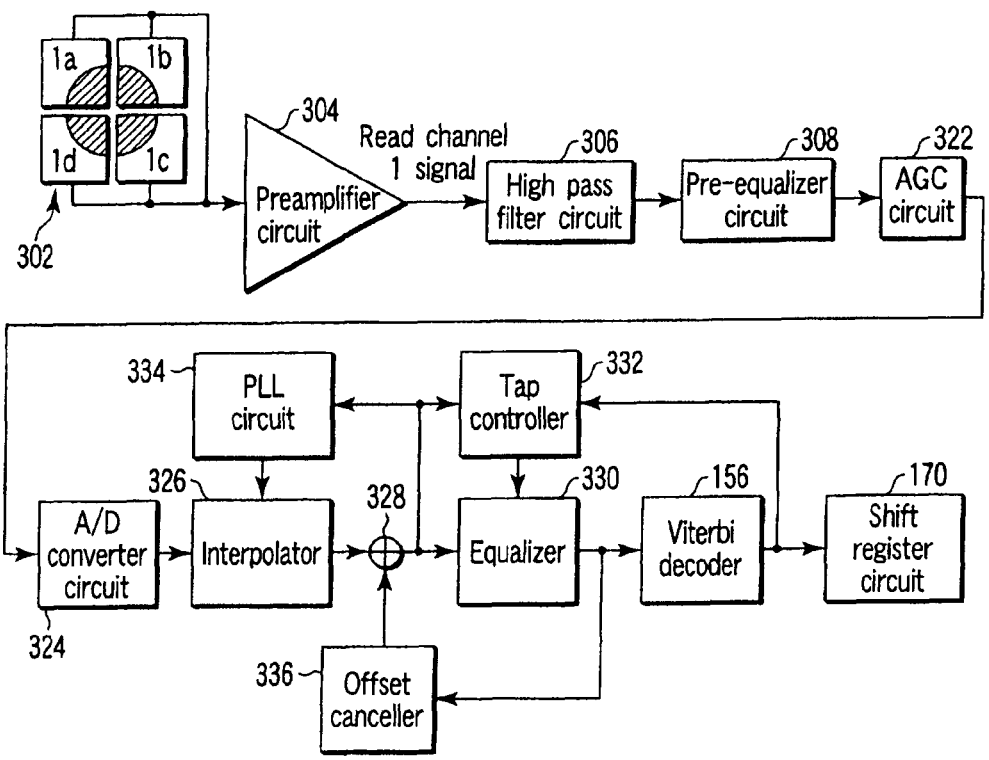
FIG. 15 is an exemplary view showing a signal processor circuit using a PRML detecting technique.
Figure 16:
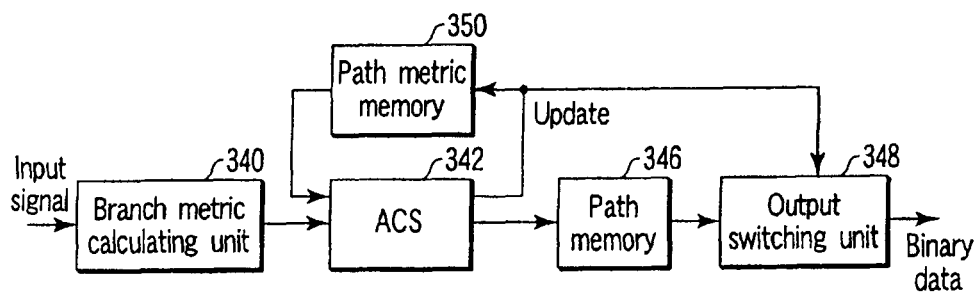
FIG. 16 is an exemplary view showing a structure in a Viterbi decoder 156 shown in FIG. 11 or FIG. 15.
Figure 17:
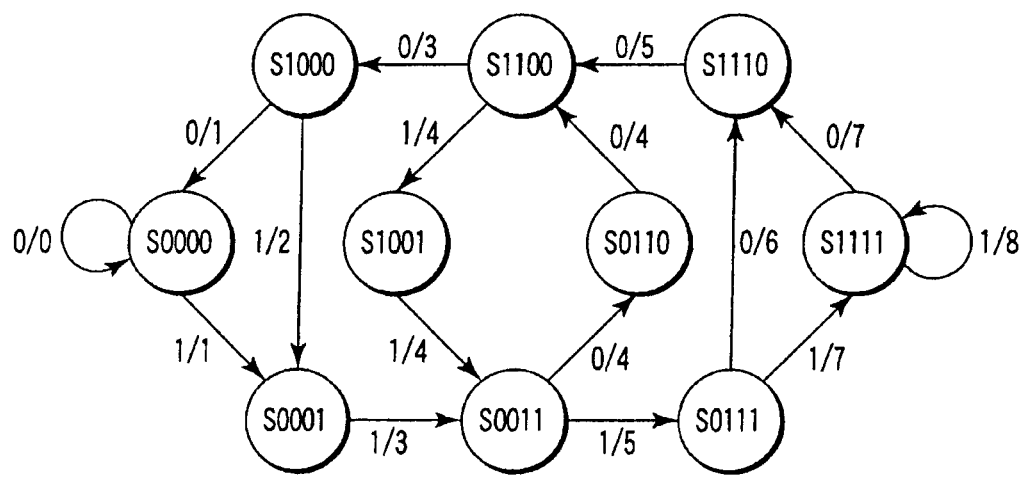
FIG. 17 is an exemplary view showing a state transition in a PR(1, 2, 2, 2, 1) class.

In the present embodiment, a PRML method is utilized at the time of signal reproduction recorded at high density, and a signal processor circuit and a state transition chart shown in FIGS. 15 to 17 is used (A detailed description is given later). In order to precisely carry out detection in accordance with a PRML technique, the linearity of a reproduction signal is requested. The characteristic of the signal processor circuit shown in FIGS. 15 and 16 has been analyzed based on the state transition chart shown in FIG. 17, in order to ensure the linearity of the above reproduction signal. As a result, it has been found necessary to meet that a ratio relevant to the above $I_{11}$ of a value when a recording mark having a length of 3T and a reproduction signal amplitude from a repetition signal of an unrecorded space is defined as $I_3$ meets:

$$I_3/I_{11} \geq 0.35 \quad (22); \text{ or desirably,}$$

$$I_3/I_{11} > 0.2 \quad (23)$$

In view of a condition for the above formula (16), the present embodiment is technically featured in that a value of $Al_{405}$ has been set so as to meet formulas (20) and (21). Referring to formula (16), the following is obtained:

$$1 - 0.3 = 0.7 \quad (24)$$

In view of formula (24), from a correlation with formula (20), the following condition is derived:

$(Al_{405} - 0.3)/0.7 \geq 0.4$, that is, $$Al_{405} \geq 0.58 \quad (25)$$

Formula (25) is a formula derived from a very coarse result of discussion, and is merely shown as a basic concept. Because the $Ah_{405}$ setting range is specified in accordance with formula (16), in the present embodiment, at least a condition for $Al_{405}$ is mandatory as:

$$Al_{405} > 0.3 \quad (26)$$

As a method for selecting an organic dye material suitable to a specific "H-L" recording layer, there is selected an organic dye material for which, in the present embodiment, based on an optical film design, a refractive factor range in an unrecorded state is $n_{32} = 1.3$ to 2.0; the absorption coefficient range is $k_{32} = 0.1$ to 0.2, desirably $n_{32} = 1.7$ to 1.9; the absorption coefficient range is $k_{32} = 0.15$ to 0.17, and a series of conditions described above are met.

In the "H-L" recording film shown in FIG. 9 or 10, in light absorption spectra in an unrecorded area, although a wavelength of $\lambda_{max\ write}$ is shorter than a wavelength of reproduction light or recording/reproducing light (for example, 405 nm), the wavelength of $\lambda_{max\ write}$ may be longer than a wavelength of reproduction light or recording/reproducing light (for example, 405 nm), without being limited thereto.

In odder to meet the above formula (22) or formula (23), the thickness Dg of the recording layer 3-2 is influenced. For example, if the thickness Dg of the recording layer 3-2 significantly exceeds an allowable value, optical characteristics of only a part coming into contact with the transparent substrate 2-2 in the recording layer 3-2 are changed as a state that follows forming of the recording mark 9, whereby the optical characteristics of a portion coming into contact with the light reflection layer 4-2 adjacent to its location are obtained as a value equal to that in the unrecorded area. As a result, a reproduction light amount change is lowered, and a value of $I_3$ in formula (22) or formula (23) is reduced, and a condition for formula (22) or formula (23) cannot be met. Therefore, in order to meet formula (22), as shown in FIGS. 8B and 8C, it is necessary to make a change to the optical characteristics of a portion which comes into contact with the light reflection layer 4-2 in the recording mark 9. Further, if the thickness Dg of the recording layer 3-2 significantly exceeds an allowable value, a temperature gradient occurs in the thickness direction in the recording layer 3-2 when the recording mark is formed. Then, before reaching the optical characteristic change temperature at a portion coming into contact with the light reflection layer 4-2 in the recording layer 3-2, a gasification (evaporation) temperature of a portion coming into contact with the transparent substrate 2-2 is exceeded or a thermal deformation temperature is exceeded in the transparent substrate 2-2. For the above reason, in the present embodiment, in order to meet formula (22), the thickness Dg of the recording layer 3-2 is set to "3T" or less based on the discussion of thermal analysis; and a condition meeting formula (23) is such that the thickness Dg of the recording layer 3-2 is set to "3×3T" or less. Basically, in the case where the thickness Dg of the recording layer 3-2 is equal to or smaller than "3T", although formula (22) can be met, the thickness may be set to "T" or less in consideration of effect of a tilt due to a facial motion or warping of the write-once type information storage medium or a margin relevant to a focal blurring. In consideration of a result obtained by formulas (1) and (2) described previously, the thickness Dg of the recording layer 3-2 in the present embodiment is set in the range assigned in a required minimum condition that:

$$9T \geq Dg \geq \lambda/8n_{32} \quad (27)$$

and in a desired condition that:

$$3T \geq Dg \geq \lambda/4n_{32} \quad (28)$$

Without being limited thereto, the severest condition can be defined as:

$$T \geq Dg \geq \lambda/4n_{32} \quad (29)$$

As described later, a value of the channel bit length T is 102 nm in the H format, and is 69 nm to 80 nm in the B format. Thus, a value of 3T is 306 nm in the H format and is 207 nm to 240 nm in the B format. A value of 9T is 918 nm in the H format and is 621 nm to 720 nm in the B format. Here, although an "H-L" recording film has been described, the conditions for formulas (27) to (29) can be applied to an "L-H" recording film without being limited thereto.

Figure 11:
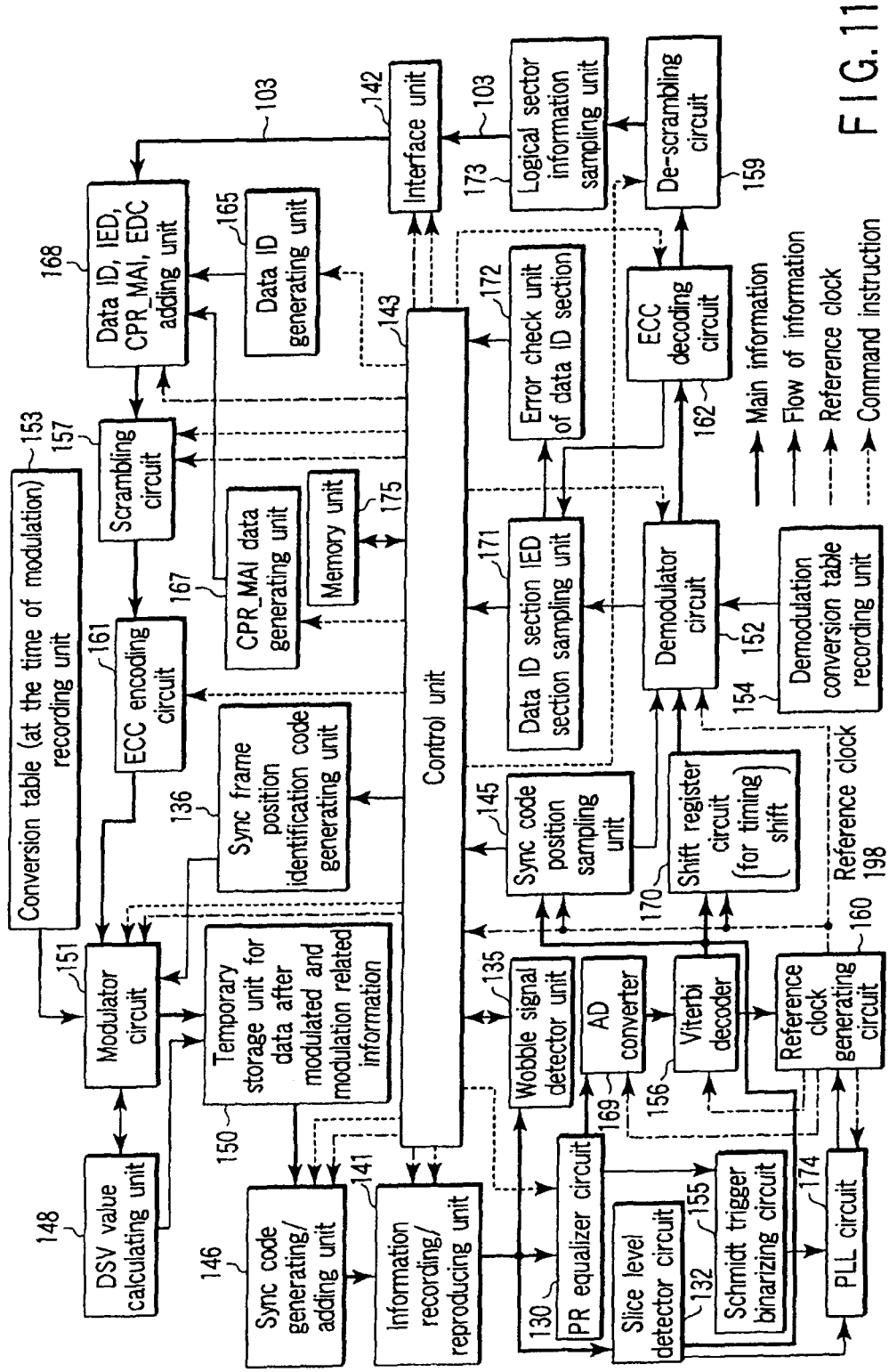
FIG. 11 is an exemplary view of a structure in an embodiment of an information recording/reproducing apparatus according to the invention.

Chapter 4 Description of Reproducing Apparatus or Recording/Reproducing Apparatus and Recording Condition/Reproducing Circuit 4-1) Description of Structure and Characteristics of Reproducing Apparatus or Recording/Reproducing Apparatus in the Present Embodiment FIG. 11 shows an illustration of a structure in an embodiment of an information recording/reproducing apparatus.

In FIG. 11, an upper side of a control unit 143 mainly indicates an information recording control system for an information storage medium. In the embodiment of the information reproducing apparatus, a structure excluding the information recording control system in FIG. 11 corresponds to the above structure. In FIG. 11, the arrow drawn by the thick solid line indicates a flow of main information which designates a reproduction signal or a recording signal; the arrow of the thin solid line denotes a flow of information; the arrow of the one-dotted chain line denotes a reference clock line; and the arrow of the thin dashed line denotes a command indicating direction.

An optical head (not shown) is arranged in an information recording/reproducing unit 141 shown in FIG. 11. In the present embodiment, although a wavelength of a light source (semiconductor laser) used in the optical head is 405 nm, the present embodiment is not limited thereto, and there can be used a light source having a use wavelength equal to or shorter than 620 nm or 530 nm or a light source ranging from 355 nm to 455 nm, as described previously. In addition, two objective lenses used to focus the light beam having the above wavelength onto the information storage medium may be incorporated in the optical head. In the case where a recording/reproducing operation is carried out with respect to an information storage medium in the H format, an objective lens having a NA value of 0.65 is used. A structure is provided such that, in the case where a recording/reproducing operation is carried out with respect to an information storage medium in the B format, an objective lens having NA=0.85 is used. As an intensity distribution of incident light immediately before the light is incident to an objective lens, the relative intensity at the periphery of the objective lens (at the boundary position of an aperture) when the center intensity is set to "1" is referred to as "RIM Intensity". A value of the RIM intensity in the H format is set in the range of 55% to 70%. At this time, a wave surface aberration amount in the optical head is optically designed so as to be 0.33λ (0.33λ or less) with respect to a use wavelength λ.

In the present embodiment, a partial response maximum likelihood (PRML) is used for information reproduction to achieve high density of an information storage medium (FIG. 1, point [A]). As a result of a variety of tests, when PR(1, 2, 2, 2, 1) is used as a PR class to be used, line density can be increased and the reliability of a reproduction signal can be improved (i.e., demodulation reliability can be improved) when a servo correction error such as a focal blurring or a track shift has occurred. Thus, in the present embodiment, PR(1, 2, 2, 2, 1) is employed (FIG. 1, point [A1]). In the present embodiment, a channel bit pattern after modulated is recorded in an information storage medium in accordance with a (d, k; m, n) modulation rule (In the above described method, this denotes RLL(d, k) of m/n modulation). Specifically, ETM (Eight to Twelve Modulation) for converting 8-bit data to a 12-channel bit (m=8, n=12) is employed as a modulation system, and a condition of RLL (1, 10) in which a minimum value having continuous "0"s is defined as d=1, and a maximum value is defined as k=10 as a run length limited RLL restriction for apply limitation to a length that follows "0" in the channel bit pattern after modulated must be met. In the present embodiment, in order to achieve high density of an information storage medium, a channel bit gap is reduced to the minimum. As a result, for example, after a pattern "101010101010101010101010" which is a repetition of a pattern of d=1 has been recorded in the information storage medium, in the case where the data is reproduced in an information recording/reproducing unit 141, the data is close to a shutdown frequency having MTF characteristics of a reproducing optical system, and thus, a signal amplitude of a reproduced raw signal is formed in a shape almost hidden by noise. Therefore, a partial response maximum likelihood (PRML) technique is used as a method for thus reproducing a recording mark or a pit, which has been dense up to the vicinity of a limit of the MTF characteristics (shutdown frequency). That is, a signal reproduced from the information recording/reproducing unit 141 receives reproducing waveform correction by a PR equalizer circuit 130. A signal having passed through the PR equalizer circuit 130 is sampled by converting a signal after passing through the PR equalizer circuit 130 to a digital amount in accordance with a timing of a reference clock 198 sent from a reference clock generating circuit 160; the sampled signal is converted to a digital data by an AD converter 169; and a Viterbi decoding process is carried out in a Viterbi decoder 156. The data after Viterbi-decoded is processed as data, which is completely similar to binary data at a conventional slice level. In the case where the PRML technique has been employed, if a sampling timing obtained by the AD converter 169 is shifted, an error rate of the data after Viterbi decoded increases. Therefore, in order to enhance precision of the sampling timing, the information reproducing apparatus or information recording/reproducing apparatus according to the present embodiment has another sampling timing sampling circuit in particular (combination of Schmidt trigger binarizing circuit 155 and PLL circuit 174). This Schmidt trigger circuit 155 has a specific value (forward direction voltage value of diode in actuality) at a slice reference level for binarizing, and is featured in that binarizing is provide only when the specific width has been exceeded. Therefore, for example, as described above, in the case where a pattern of "101010101010101010101010" has been input, a signal amplitude is very small, and thus, switching of binarizing does not occur. In the case where "100100100100100100100100100" or the like, for example, being a pattern of a rarer fraction than the above, has been input, an amplitude of a reproducing raw signal increases, and thus, the polarity switching of a binary signal occurs in accordance with a timing of "1" by a Schmidt trigger binarizing circuit 155. In the present embodiment, an NRZI (Non Return to Zero Invert) technique is employed, and a position of "1" of the above pattern coincides with an edge section (boundary section) of a recording mark or a pit.

A PLL circuit 174 detects a shift in frequency and phase between a binary signal which is an output of this Schmidt trigger binarizing circuit 155 and a signal of a reference clock 198 sent from a reference clock generating circuit 160 to change the frequency and phase of the output clock of the PLL circuit 174. A reference clock generating circuit 160 applies a feedback to (a frequency and a phase) of a reference clock 198 so as to lower an error rate after Viterbi decoded, by using an output signal of this PLL circuit 174 and decoding characteristic information on a Viterbi decoder 156 and a convergence length (information on (distance to convergence)) in a path metric memory in the Viterbi decoder 156, although is not specifically shown). The reference clock 198 generated by this reference clock generating circuit 160 is utilized as a reference timing at the time of reproduction signal processing.

A sync code position sampling unit 145 serves to detect the presence and position of a sync code, which coexists in an output data train of the Viterbi decoder 156 and to sample a start position of the above output data. While this start position is defined as a reference, a demodulator circuit 152 carries out a demodulating process with respect to data temporarily stored in a shift resistor circuit 170. In the present embodiment, the above temporarily stored data is returned to its original bit pattern with reference to a conversion table recorded in a demodulating conversion table recording unit 154 on 12-channel bit by bit basis. Then, an error correcting process is performed by an ECC decoding circuit 162, and descrambling is carried out by a descrambling circuit 159. Address information is recorded in advance by wobble modulation in a recording type (rewritable type or write-once type) information storage medium according to the present embodiment. A wobble signal detecting unit 135 reproduces this address information (i.e., judges the contents of a wobble signal), and supplies information required to provide an access to a desired location to the control unit 143.

A description will be given with respect to an information recording control system provided at the upper side than the control unit 143. After data ID information has been generated from a data ID generating unit 165 in accordance with a recording position on an information storage medium, when copy control information is generated by a CPR_MAI data generating unit 167, a variety of information on data ID, IED, CPR_MAI, and EDC is added to information to be recorded by a data ID, IED, CPR_MAI, and EDC adding unit 168. After the added information has been descrambled by the descrambling circuit 157, an ECC block is formed by an ECC encoding circuit 161, and the ECC block is converted to a channel bit pattern by a modulating circuit 151. A sync code is added by a sync code generating/adding unit 146, and data is recorded in an information storage medium in the information recording/reproducing unit 141. At the time of modulation, DSV values after modulated are sequentially calculated by a DSV (Digital Sum Value) calculating unit 148, and the serially calculated values are fed back to code conversion after modulated.

FIG. 12 shows a detailed structure of peripheral portions including the sync code position detector unit 145 shown in FIG. 11. A sync code is composed of a sync position detecting code section and a variable code section having a fixed pattern. From the channel bit pattern output from a Viterbi decoder, a sync position detecting code detector unit 182 detects a position of a sync position detecting code section having the above fixed pattern. Variable code transfer units 183 and 184 sample data on a variable code which exists before and after the detected position, and judge in which sync frame in a sector the sync code is positioned, the sync code being detected by an identifying unit 185 for detecting a sync position having the above fixed pattern. User information recorded on an information storage medium is sequentially transferred in order of a shift register circuit 170, a demodulation processing unit 188 in a demodulator circuit 152, and an ECC decoding circuit 162.

In the present embodiment, in the H format, the high density of the information storage medium is achieved (in particular, line density is improved) by using the PRML system for reproduction in a data area, a data lead-in area, and a data lead-out area. In addition, compatibility with a current DVD is ensured and reproduction stability is ensured by using a slice level detecting system for reproducing in a system lead-in area and a system lead-out area. (A detailed description will be given later in "Chapter 7: Description of H Format".)

4-2) Description of Reproducing Circuit in the Present Embodiment

Figure 13:
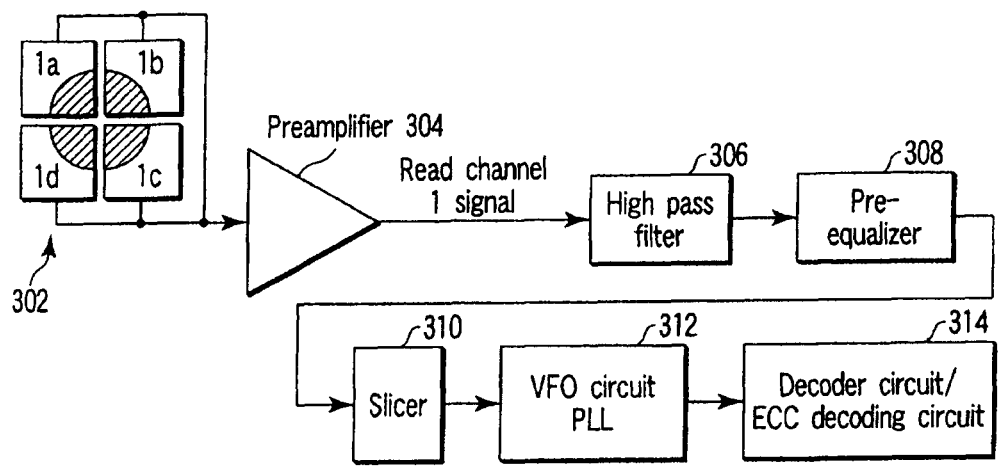
FIG. 13 is an exemplary view showing a signal processor circuit using a slice level detecting system.

FIG. 13 shows an embodiment of a signal reproducing circuit using a slice level detecting system used at the time of reproduction in a system lead-in area and a system lead-out area. A quadrature optical detector 302 in FIG. 13 is fixed into the optical head, which exists in the information recording/reproducing unit 141 in FIG. 11. Hereinafter, a signal having taken a sum of detection signals obtained from optical detecting cells 1a, 1b, 1c, and 1d of the quadrature optical detector 302 is referred to as a "lead channel 1 signal". From a preamplifier 304 to a slicer 310 in FIG. 13 corresponds to a detailed structure in the slice level detecting circuit 132 in FIG. 11. A reproduction signal obtained from an information storage medium is subjected to a waveform equalizing process by a pre-equalizer 308 after the signal has passed through a high path filter 306 which shuts out a frequency component lower than a reproduction signal frequency bandwidth. According to testing, it has found that this pre-equalizer 308 minimizes a circuit scale by using a 7-tap equalizer and can detect a reproduction signal precisely. Thus, in the present embodiment, the 7-tap equalizer is used. A VFO circuit/PLL 312 in FIG. 13 corresponds to the PLL circuit 174 in FIG. 11; and a demodulating/ECC decoding circuit 314 in FIG. 13 corresponding to the decoding circuit 152 and the ECC decoding circuit 162 in FIG. 11.

Figure 14:
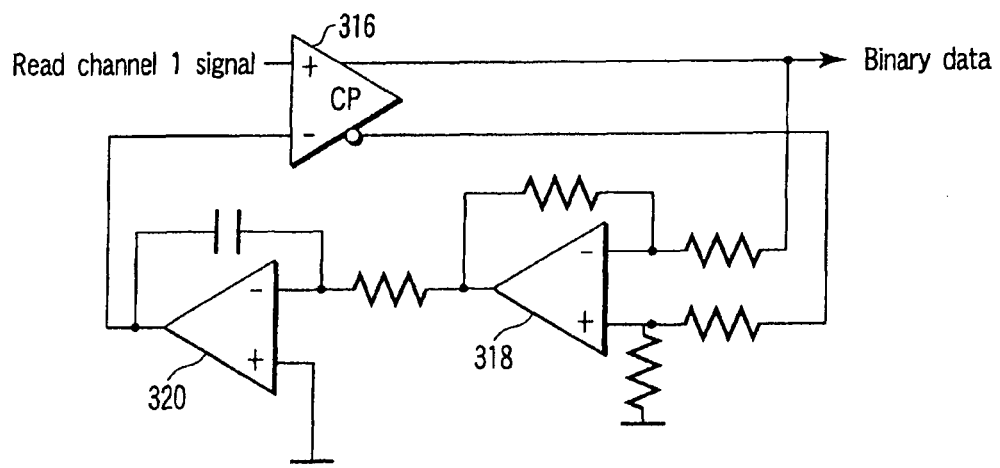
FIG. 14 is an exemplary view showing a detailed structure in a slicer 310 of FIG. 13.

FIG. 14 shows a detailed structure in a circuit of the slicer 310 in FIG. 13. A binary signal after sliced is generated by using a comparator 316. In response to an inverting signal of binary data after binarized is set at a slice level at the time of binarizing. In the present embodiment, a cutoff frequency of this low path filter is set to 5 KHz. When this cutoff frequency is high, a slice level change is fast, and the low path filter is affected by noise. In contrast, if a cutoff frequency is low, a slice level response is slow, and thus, the filter is affected by dust or scratch on the information storage medium. The cutoff frequency is set to 5 KHz in consideration of a relationship between RLL(1, 10) and a reference frequency of a channel bit described previously.

FIG. 15 shows a signal processor circuit using a PRML detecting technique used for signal reproduction in a data area, a data lead-in area, and a data lead-out area. A quadrature optical detector 302 in FIG. 15 is fixed into the optical head, which exists in the information recording/reproducing unit 141 in FIG. 11. Hereinafter, a signal having taken a sum of detection signals obtained from the optical detecting cells 1a, 1b, 1c, and 1d of the quadrature optical detector 302 is referred to as a "lead channel 1 signal". A derailed structure in the PR equalizer circuit 130 in FIG. 11 is composed of circuits from a preamplifier 304 to a tap controller 332, an equalizer 330, and an offset canceller 336 in FIG. 15. A PLL circuit 334 in FIG. 15 is a part in the PR equalizer circuit 130, and denotes an element other than the Schmidt trigger binarizing circuit 155. A primary cutoff frequency of a high path filter circuit 306 in FIG. 15 is set at 1 KHz. A pre-equalizer circuit 308 uses a 7-tap equalizer in the same manner as that in FIG. 13 (because the use of the 7-tap equalizer minimizes a circuit scale and can detect a reproduction signal precisely). A sample clock frequency of an A/D converter circuit 324 is set to 72 MHz, and a digital output is produced as an eight-bit output. In the PRML detecting technique, if a reproduction signal is affected by a level change (DC offset) of its entire signal, an error is likely to occur at the time of Viterbi demodulation. In order to eliminate such an effect, there is provided a structure of correcting an offset by the offset canceller 336 using a signal obtained from an equalizer output. In the embodiment shown in FIG. 15, an adaptive equalizing process is carried out in the PR equalizer circuit 130. Thus, a tap controller for automatically correcting tap coefficients in the equalizer 330 is utilized by utilizing an output signal of the Viterbi decoder 156.

FIG. 16 shows a structure in the Viterbi decoder 156 shown in FIG. 11 or 15. A branch metric relevant to all branches, which can be predicted in response to an input signal, is calculated by a branch metric calculating unit 340, and the calculated value is sent to an ACS 342. The ACS 342 is an acronym of Add Compare Select, which calculates a path metric obtained by adding branch metrics in response to each of the passes which can be predicted in the ACS 342 and transfers the calculation result to a path metric memory 350. At this time, in the ACS 342, a calculating process is carried out with reference to the information contained in the path metric memory 350. A path memory 346 temporarily stores a value of the path metric corresponding to each path (transition) state and such each path, which can be predicted in the memory 346, the value being calculated by the ACS 342. An output switch unit 348 compares a path metric corresponding to each path, and selects a path when a path metric value becomes minimal.

FIG. 17 shows a state change in PR(1, 2, 2, 2, 1) class in the present embodiment. A change of a state which can be obtained in the PR(1, 2, 2, 2, 1) class can be made as only a change shown in FIG. 17, and a path which can exist (which can be predicted) at the time of decoding is identified in the Viterbi decoder 156 based on a transition chart in FIG. 17.

4-3) Description of Recording Condition in the Present Embodiment

Figure 18:
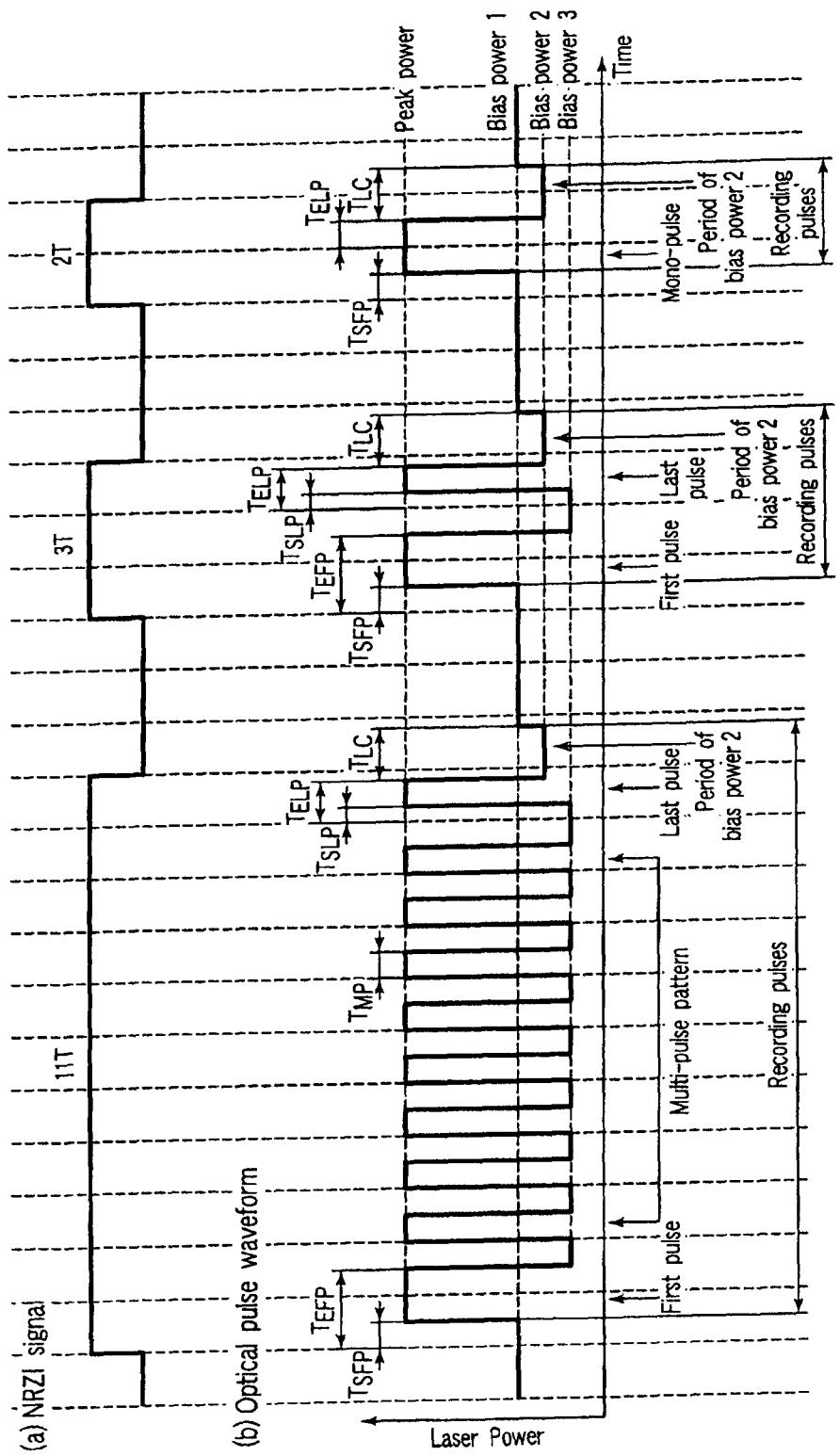
FIG. 18 is an exemplary view showing a wavelength (write strategy) of a recording pulse which carries out trial writing for a drive test zone.

"A description of optimal recording power (peak power) in the present embodiment has been given in "3-3) Recording characteristics common to organic dye recording film in the present embodiment". Referring to FIG. 18, a description will be given with respect to a recording waveform (exposure condition at the time of recording) used when the optimal recording power is checked.

The exposure levels at the time of recording have four levels of recording power (peak power), bias power 1, bias power 2, and bias power 3. When a long (4T or more) recording mark 9 is formed, modulation is carried out in the form of multi-pulses between recording power (peak power) and bias power 3. In the present embodiment, in any of the H format and B format systems, a minimum mark length relevant to a channel bit length T is obtained as 2T. In the case where this minimum mark of 2T is recorded, one write pulse of recording power (peak power) after bias power 1 is used as shown in FIG. 18, and bias power 2 is temporarily obtained immediately after the write pulse. In the case where a 3T recording mark 9 is recorded, bias power 2 is temporarily used after exposing two write pulses, a first pulse and a last pulse of recording power (peak power) level that follows bias power 1. In the case where a recording mark 9 having a length of 4T or more is recorded, bias power 2 is used after multi-pulse and write pulse exposure.

The vertical dashed line in FIG. 18 shows a channel clock cycle. In the case where a 2T minimum mark is recorded, the laser power is risen at a position delayed by $T_{SFP}$ from a clock edge, and fallen at a position, which is backward by $T_{ELP}$ from an edge of a succeeding clock. A cycle during which the laser power is set at bias power 2 is defined as $T_{LC}$. Values of $T_{SFP}$, $T_{ELP}$, and $T_{LC}$ are recorded in physical format information PFI contained in a control data zone CDZ as described later in the case of the H format. In the case where a 3T or more long recording mark is formed, the laser power is risen at a position delayed by $T_{SFP}$ from a clock edge, and lastly, ended with a last pulse. Immediately after the last pulse, the laser power is kept at the bias power 2 during a period of $T_{LC}$. Shift times from a clock edge to a rise/fall timing of the last pulse are defined as $T_{SLP}$, $T_{ELP}$. In addition, a shift time from a clock edge to a fall timing of the last pulse is defined as $T_{EFP}$, and further, an interval of a single pulse of a multi-pulse is defined as $T_{MP}$.

Figure 19:
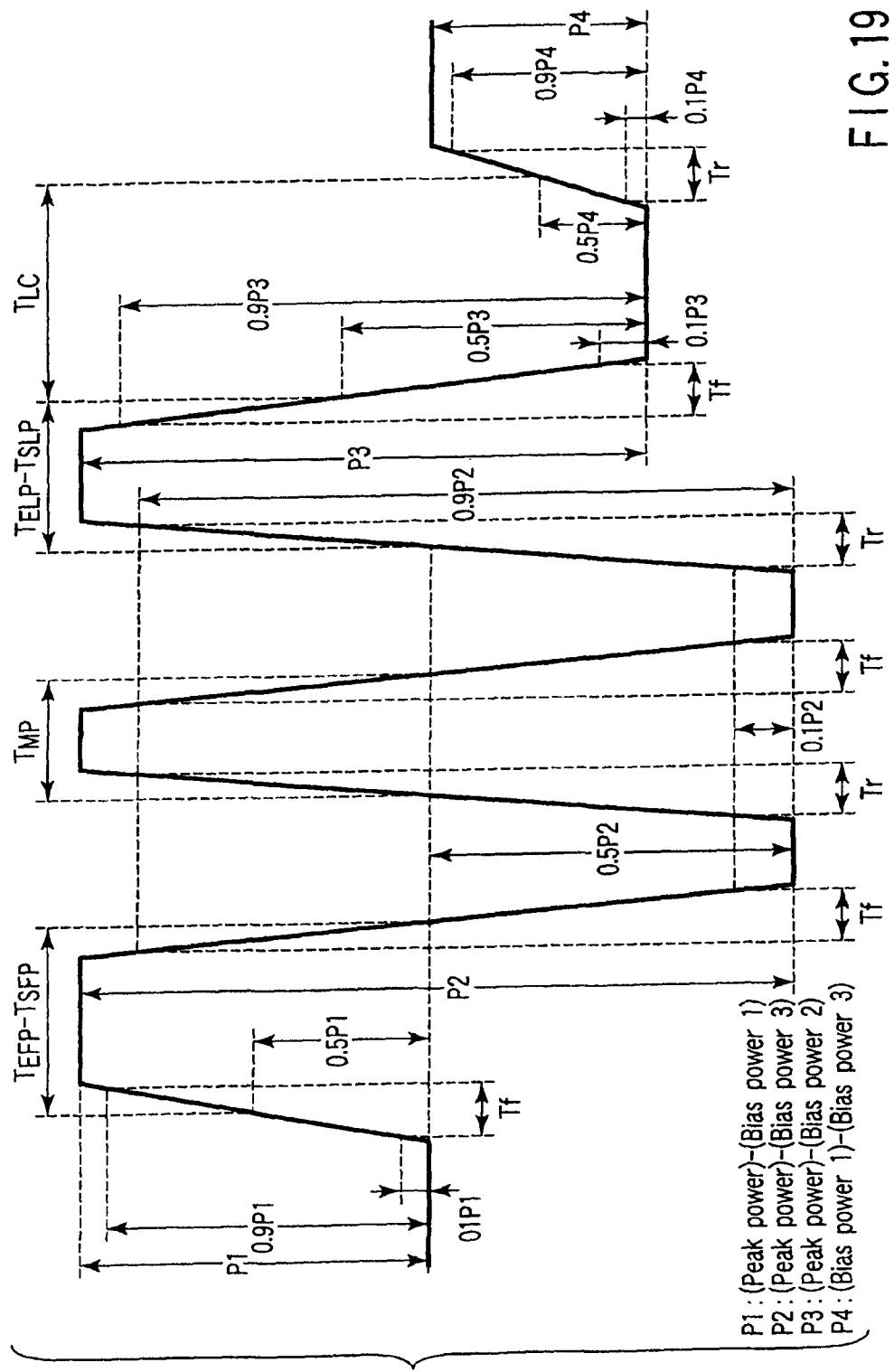
FIG. 19 is an exemplary view showing a definition of a recording pulse shape.

Each of intervals $T_{ELP}$-$T_{SFP}$, $T_{MP}$, $T_{ELP}$-$T_{SLP}$, and $T_{LC}$ is defined as a half-value wide relevant to a maximum value, as shown in FIG. 19. In addition, in the present embodiment, the above parameter setting range is defined as follows:

$$0.25T \leq T_{SFP} \leq 1.50T \tag{30}$$

$$0.00T \leq T_{ELP} \leq 1.00T \tag{31}$$

$$1.00T \leq T_{EFP} \leq 1.75T \tag{32}$$

$$-0.10T \leq T_{SLP} \leq 1.00T \tag{33}$$

$$0.00T \leq T_{LC} \leq 1.00T \tag{34}$$

$$0.15T \leq T_{MP} \leq 0.75T \tag{35}$$

Further, in the present embodiment, the values of the above described parameters can be changed as shown in FIGS. 20A, 20B and 20C according to a recording mark length (Mark Length) and the immediately preceding/immediately succeeding space length (Leading/Trailing space length).

FIGS. 21A, 21B and 21C each shows parameter values when optimal recording power of the write-once type information storage medium recorded in a principle of recording shown in the present embodiment has been checked, as described in the section "3-3) Recording characteristics common to organic dye recording film in the present embodiment". At this time, the values of bias power 1, bias power 2, and bias power 3 are 2.6 mW, 1.7 mW, and 1.7 mW, and reproduction power is 0.4 mW.

Figure 22:
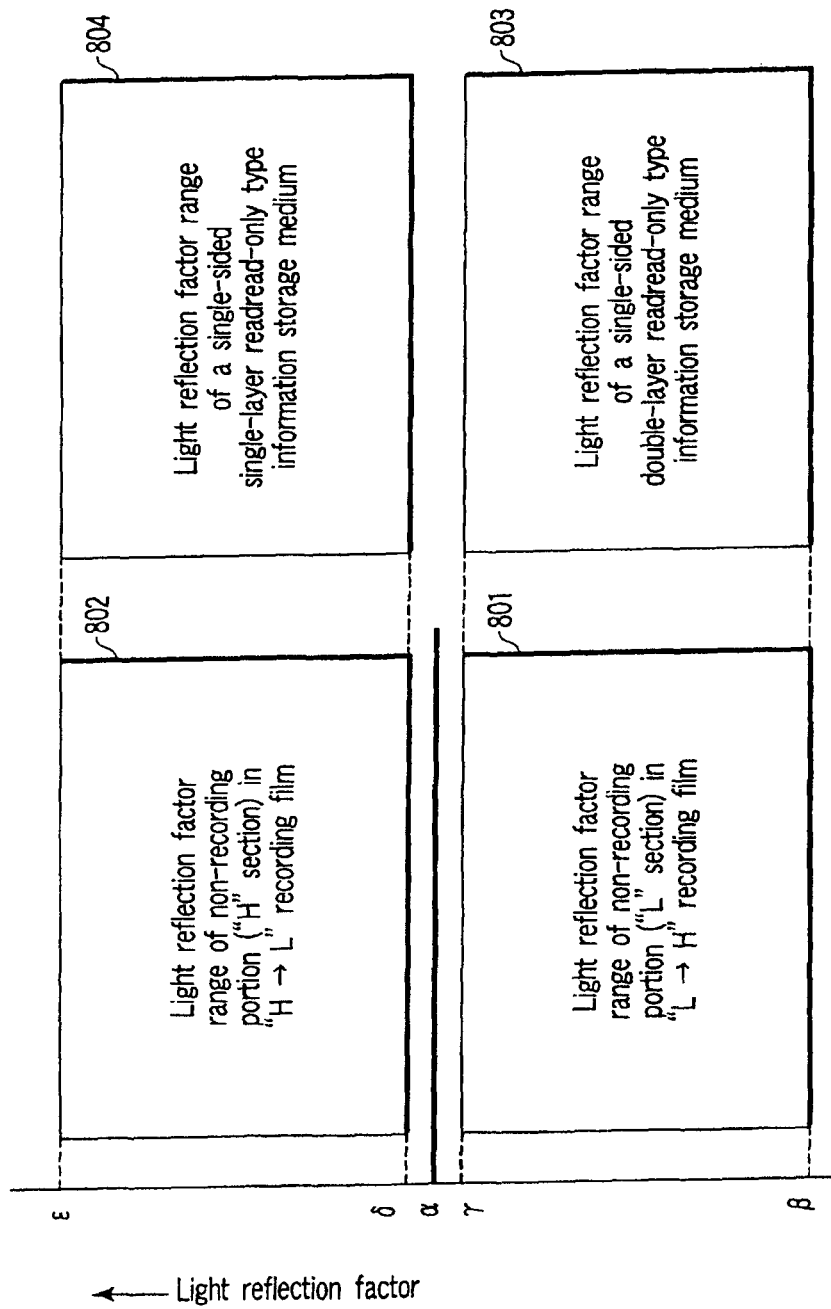
FIG. 22 is an exemplary view showing a light reflection factor range of non-recording unit in a "H-L" recording film and an "L-H" recording film.

Chapter 5: Specific Description of Organic Dye Recording Film in the Present Embodiment 5-1) Description of Characteristics Relating to "L-H" Recording Film in the Present Embodiment A description will be given with respect to an "L-H" recording film having characteristics in which a light reflection amount is lowered in a recording mark as compared with that in an unrecorded area. From among principles of recording described in "3-2-B] Basic characteristics common to organic dye recording material in the present embodiment", a principle of recording in the case of using this recording film mainly utilizes any of:

Chromogenic characteristic change;

Change of electron structure (electron orbit) relevant to elements which contribute to chromogenic phenomenon [discoloring action or the like]; and Array change between molecules, and changes characteristics of light absorption spectra. The "L-H" recording film is featured in that the reflection amount range in an unrecorded location and a recorded location has been specified in view of characteristics of a read-only type information storage medium having a one-sided two-layered structure. FIG. 22 shows a light reflection factor range in an unrecorded area (non-recording portion) of the "H-L" recording film and the "L-H" recording film according to the present embodiment. In the present embodiment, the lower limit value δ of the reflection factor at the non-recording portion of the "H-L" recording film is specified so as to be higher than an upper limit value γ at the non-recording portion of the "L-H" recording film. When the above information storage medium has been mounted on an information recording/reproducing apparatus or an information reproducing apparatus, a light reflection factor of the non-recording portion is measured by the slice level detector unit 132 or the PR equalizer circuit 130 shown in FIG. 11, thereby making it possible to judge whether the film is the "H-L" recording film or "L-H" recording film, and thus, making it very easy to judge type of recording film. Measurement has been carried out while producing the "H-L" recording film and the "L-H" recording film under a changed manufacturing condition, when a light reflection factor α between the lower limit value δ at the non-recording portion of the "H-L" recording film and the upper limit value γ at the non-recording portion of the "L-H" recording film is set in the range of 32% to 40%. As a result, it has been found that high manufacturing performance of the recording film is obtained and medium cost reduction is facilitated. After an optical reflection factor range 801 of a non-recording portion ("L" portion) of the "L-H" recording film is made coincident with a light reflection factor range 803 of a one-sided double recording layer in the read-only type information storage medium, when a light reflection factor range 802 of a non-recording portion ("H" portion") of the "H-L" recording film is made coincident with a light reflection factor range 804 of a one-sided single layer in the read-only type information storage medium, a reproducing circuit of the information reproducing apparatus can be used in common to be well compatible with the read-only type information storage medium, and thus, the information reproducing apparatus can be produced inexpensively. Measurement has been carried out while producing the "H-L" recording film and the "L-H" recording film under a variety of changed manufacturing conditions, in order to facilitate price reduction of a medium while improving the manufacturing performance of the recording film. As a result, the lower limit value β of the light reflection factor of the non-recording portion ("L" portion) of the "L-H" recording film is set to 18%, and the upper limit value γ is set to 32%; and the lower limit value δ of the light reflection factor of the non-recording portion ("H" portion) of the "H-L" recording film is set to 40%, and the upper limit value ε is set to 85%.

Figure 23:
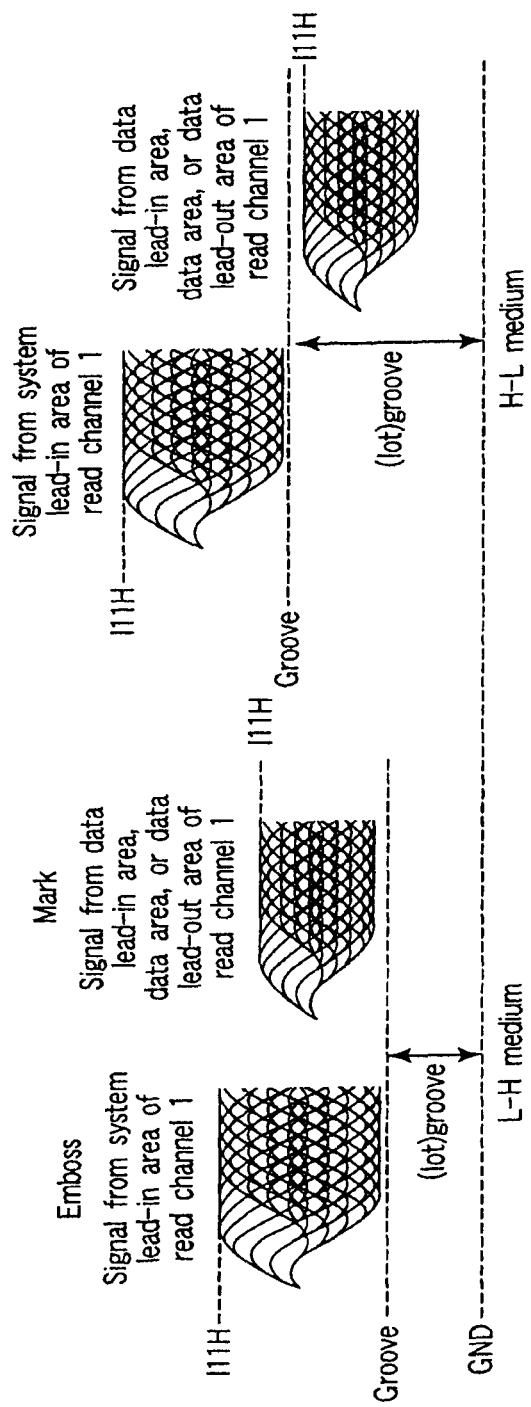
FIG. 23 is an exemplary view showing a polarity of a detection signal detected from the "H-L" recording film and the "L-H" recording film.

FIGS. 23 and 24 show reflection factors at a non-recording position and a recorded position in a variety of recording films in the present embodiment. In the case where an H format has been employed (refer to "Chapter 7: Description of H Format"), an optical reflection factor range at the non-recording portion is specified as shown in FIG. 22, whereby a signal appears in a same direction in an emboss area (such as system leas-in area SYLDI) and a recording mark area (data lead-in area DTLDI, data lead-out area DTLDO, or data area DTA) in the "L-H" recording film while a groove level is defined as a reference. Similarly, in the "H-L" recording film, while a groove level is defined as a reference, a signal appears in an opposite direction in an emboss area (such as system lead-in area SYSDI) and a recording mark area (data lead-in area DTLDI, data lead-out area DTLDO, or data area DTA). Utilizing this phenomenon, a detecting circuit design corresponding to the "L-H" recording film and "H-L" recording film is facilitated in addition to use for recording film identification between the "L-H" recording film and the "H-L" recording film. In addition, the reproduction signal characteristics obtained from a recording mark recorded on the "L-H" recording film shown in the present embodiment is adjusted to conform to signal characteristics obtained from the "H-L" recording film to meet formulas (20) to (23). In this manner, in the case of using either one of the "L-H" recording film and the "H-L" recording film, the same signal processor circuit can be used, and the signal processor circuit can be simplified and reduced in price.

5-2) Characteristics of Light Absorption Spectra Relating to "L-H" Recording Film in the Present Embodiment As has been described in "3-4) Description of characteristics relating to "H-L" recording film in the present embodiment, the relative absorbance in an unrecorded area is basically low in the "H-L" recording film, and thus, when reproduction light has been irradiated at the time of reproduction, it is difficult to occur an optical characteristic change generated by absorbing energy of the reproduction light. Even if an optical characteristic change (update of recording action) has occurred after the energy of the reproduction light has been absorbed in a recording mark having high absorbance, a light reflection factor from the recording mark is lowered. Thus, reproduction signal processing is less affected because such a change works in a direction in which an amplitude of a reproduction signal ($I_{11} \equiv I_{11H} - I_{11L}$) of the reproduction signal increases.

In contrast, the "L-H" recording film has optical characteristics that "a light reflection factor of an unrecorded portion is lower than that in a recording mark". This means that, as is evident from the contents described with respect to FIG. 2B, the absorbance of the unrecorded portion is higher than that in the recording mark. Thus, in the "L-H" recording film, signal degradation at the time of reproduction is likely to occur as compared with the "H-L" recording film. As described in "3-2-B] Basic characteristics common to organic dye recording material in the invention", there is a need for improving reliability of reproduction information in the case where reproduction signal degradation has occurred due to ultraviolet ray or reproduction light irradiation".

As a result of checking the characteristics of an organic dye recording material in detail, it has been found that a mechanism of absorbing the energy of reproduction light to cause an optical characteristic change is substantially analogous to that of an optical characteristic change due to ultraviolet ray irradiation. As a result, if there is provided a structure of improving durability relevant to ultraviolet ray irradiation in an unrecorded area, signal degradation at the time of reproduction hardly occurs. Thus, the present embodiment is featured in that, in the "L-H" recording film, a value of $\lambda_{max\ write}$ (maximum absorption wavelength which is the closest to wavelength of recording light) is longer than a wavelength of recording light or reproduction light (close to 405 nm). In this manner, the absorbance relevant to the ultraviolet ray can be reduced, and the durability relevant to ultraviolet ray irradiation can be significantly improved. As is evident from FIG. 26, a difference in absorbance between a recorded portion and an unrecorded portion in the vicinity of $\lambda_{max\ write}$ is small, and a degree of reproduction signal modulation (signal amplitude) in the case where the wavelength light in the vicinity of $\lambda_{max\ write}$ is reduced. In view of a wavelength change of a semiconductor laser light source, it is desirable that a sufficiently large degree of reproduction signal modulation (signal amplitude) be taken in the range of 355 nm to 455 nm. Therefore, in the present embodiment, a design of a recording film 3-2 is made so that a wavelength of $\lambda_{max\ write}$ exists out of the range of 355 nm to 455 nm (i.e., at a longer wavelength than 455 nm).

Figure 25:
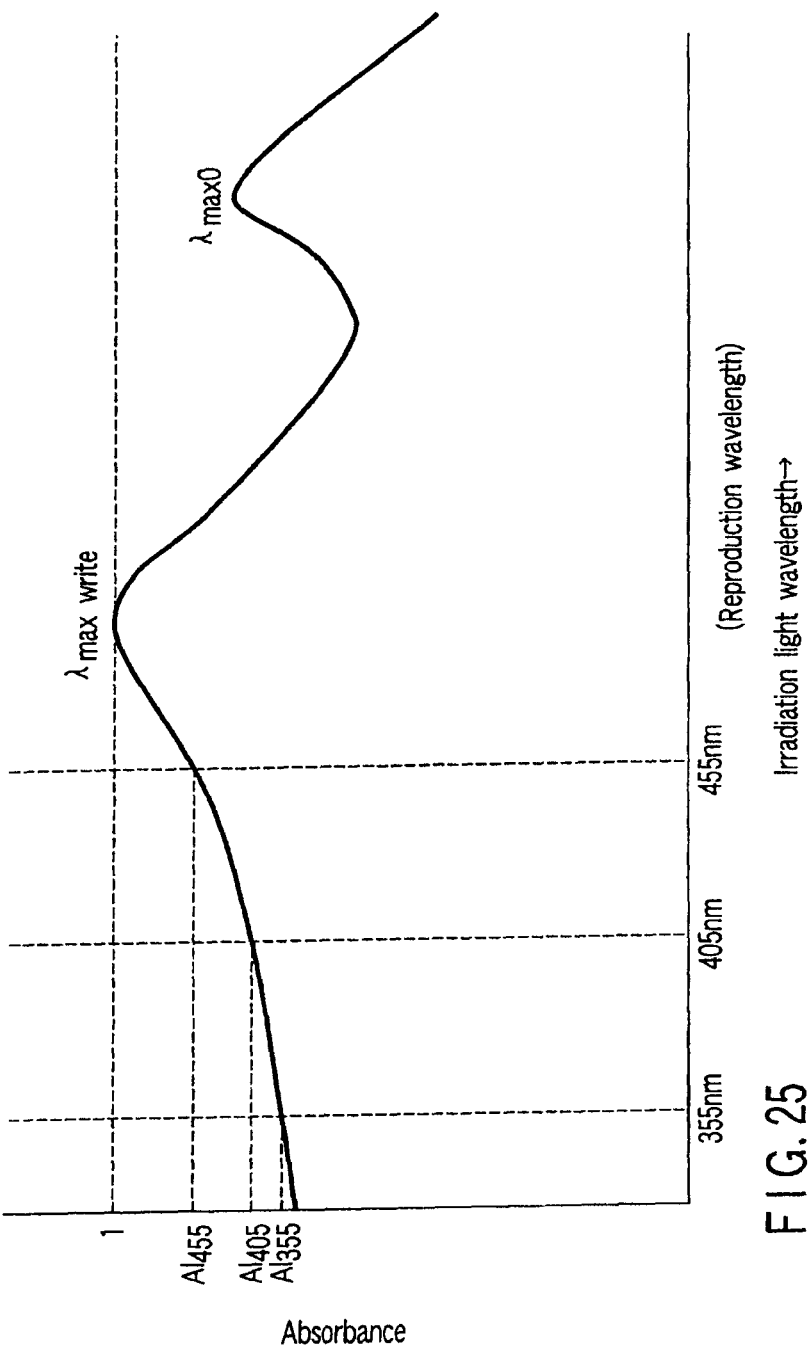
FIG. 25 is an exemplary view of light absorption spectrum characteristics in an unrecorded state in the "L-H" recording film.

FIG. 25 shows an example of light absorption spectra in the "L-H" recording film in the present embodiment. As described in "5-1) Description of features relating to "L-H" recording film, a lower limit value β of a light reflection factor at a non-recording portion ("L" section) of the "L-H" recording film is set to 18%, and an upper limit value γ is set to 32% in the present embodiment. From 1−0.32=0.68, in order to meet the above condition, it is possible to intuitively understand whether or not a value $Al_{405}$ of the absorbance in an unrecorded area at 405 nm should meet:

$$Al_{405} \geq 68\% \quad (36)$$

Although the light reflection factor at 405 nm of the light reflection layer 4-2 in FIGS. 2A and 2B is slightly lowered than 100%, it is assumed that the factor is almost close to 100% for the sake of simplification. Therefore, the light reflection factor when absorbance Al=0 is almost 100%. In FIG. 25, the light reflection factor of the whole recording film at a wavelength of $\lambda_{max\ write}$ is designated by $R\lambda_{max\ write}$. At this time, assuming that the light reflection factor is zero ($R\lambda_{max\ write} \approx 0$), formula (36) is derived. However, in actuality, the factor is not set to "0", and thus, it is necessary to drive a severer formula. A severe conditional formula for setting the upper light value γ of the light reflection factor of the non-recording portion "L" portion) of the "L-H" recording film to 32% is given by:

$$1-Al_{405} \times (1-R\lambda_{max\ write}) \leq 0.32 \quad (37)$$

In a conventional write-once type information storage medium, only the "H-L" recording film is used, and there is no accumulation of information relating to the "L-H" recording film. However, in the case of using the present embodiment described later in "5-3) Anion portion: azo metal complex+cation portion: dye" and "5-4) Using "copper" as azo metal complex+center metal", the most severest condition which meets formula (37) is obtained as:

$$Al_{405} \geq 80\% \quad (38)$$

In the case of using an organic dye recording material described later in the embodiment, when an optical design of a recording film is made including a margin such as a characteristic variation at the time of manufacture or a thickness change of the recording layer 3-2, it has been found that a minimum condition which meet the reflection factor described in the section "Description of featured relating to "L-H" recording film" in the present embodiment:

$$Al_{405} \geq 40\% \quad (39)$$

may be met. Further, by meeting either of:

$$Al_{355} \geq 40\% \quad (40)$$

$$Al_{455} \geq 40\% \quad (41)$$

it is possible to ensure stable recording characteristics or reproduction characteristics even if a wavelength of a light source is changed in the range of 355 nm to 405 nm or in the range of 405 nm to 455 nm (in the range of 355 nm to 455 nm in the case where both of the formulas are met at the same time).

Figure 26:
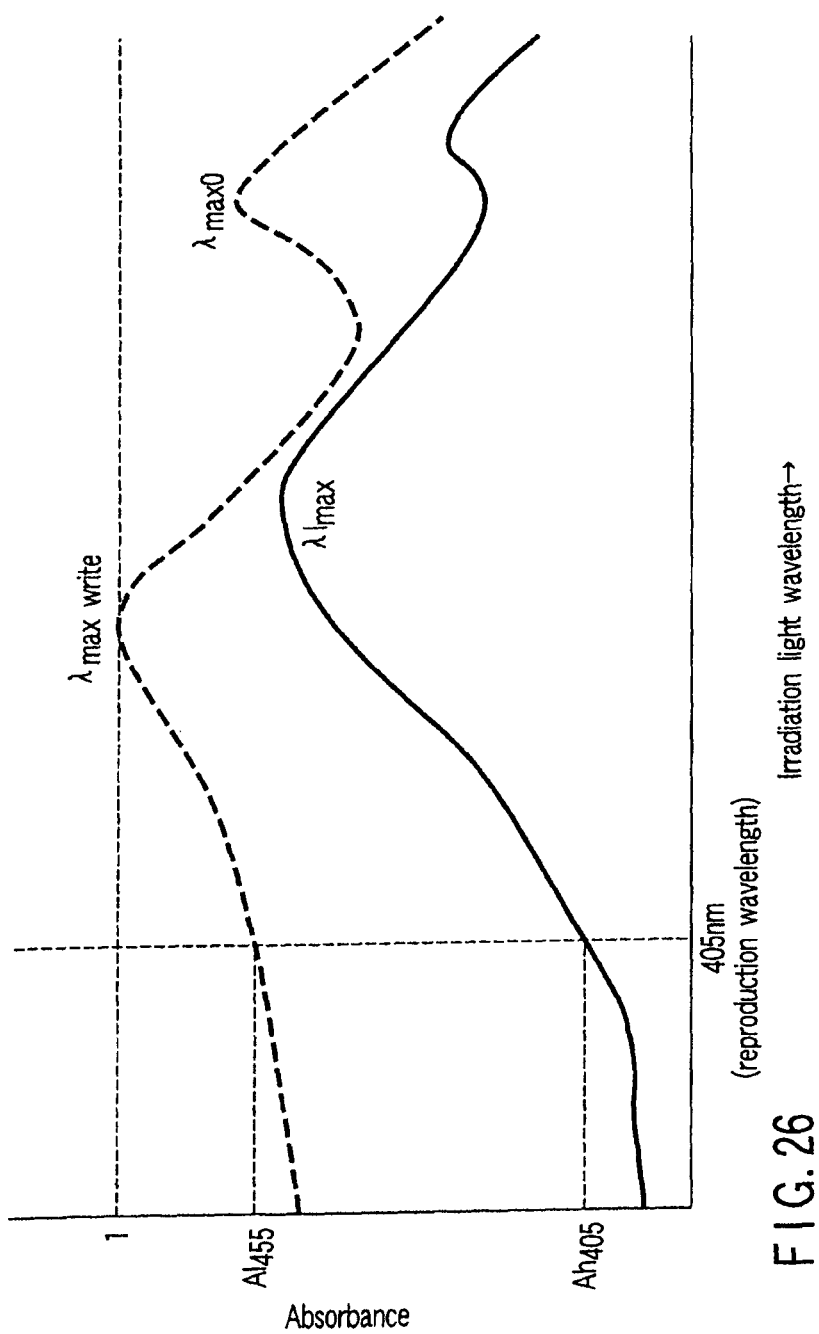
FIG. 26 is an exemplary view showing a light absorption spectrum characteristic change in a recorded state and an unrecorded state in the "L-H" recording film.

FIG. 26 shows a light absorption spectrum change after recorded in the "L-H" recording film according to the present embodiment. It is considered that a value of a maximum absorption wavelength $\lambda l_{max}$ in a recording mark deviates from a wavelength of $\lambda_{max\ write}$, and an inter-molecular array change (for example, an array change between azo metal complexes) occurs. Further, it is considered that a discoloring action (cutting of local electron orbit (local molecular link dissociation)) occurs in parallel to a location in which both of the absorbance in location of $\lambda l_{max}$ and the absorbance $Al_{405}$ at 405 nm are lowered and the light absorption spectra spreads itself.

In the "L-H" recording film according to the present embodiment as well, by meeting each of formulas (20), (21), (22), and (23), the same signal processor circuit is made available for both of the "L-H" recording film and the "H-L" recording film, thereby promoting simplification and price reduction of the signal processor circuit. In formula (20), when:

$$I_{11L}/I_{11H} = (I_{11H}-I_{11L})/I_{11H} \geq 0.4 \quad (42),$$

is modified, $$I_{11H} \geq I_{11L}/0.6 \quad (43)$$

is obtained. As described previously, in the present embodiment, a lower limit value β of a light reflection factor of an unrecorded portion ("L" portion) of an "L-H" recording film is set to 18%, and this value corresponds to $I_{11L}$. Further, conceptually, the above value corresponds to:

$$I_{11H} \approx 1-Ah_{405} \times (1-R\lambda_{max\ write}) \quad (44).$$

Thus, from formulas (43) and (44), the following formula is established:

$$1-Ah_{405} \times (1-R\lambda_{max\ write}) \geq 0.18/0.6 \quad (45)$$

In comparison between the above formulas (46) and (36), it is found that the values of $Al_{405}$ and $Ah_{405}$ may be seemingly set in the vicinity of 68% to 70% as values of absorbance. Further, in view of a case in which the value of $Al_{405}$ is obtained in the range of formula (39) and performance stability of a signal processor circuit, a sever condition is obtained as:

$$Ah_{405} \leq 0.4 \quad (47)$$

If possible, it is desirable to meet:

$$Ah_{405} \leq 0.3 \quad (48)$$

5-3) Anion Portion: Azo Metal Complex+Cation Portion: Dye

A description will be specifically given with respect to an organic dye material in the present embodiment having characteristics described in "5-1) Description of characteristics relating to "L-H" recording film in the present embodiment", the present embodiment meeting a condition shown in "5-2) Characteristics of optical absorption spectra relating to "L-H" recording film" in the present embodiment". The thickness of the recording layer 3-2 meets the conditions shown in formulas (3), (4), (27), and (28), and is formed by spinner coating (spin coating). For comparison, a description will be given by way of example. A crystal of a "salt" is assembled by "ion coupling" between positively charged "sodium ions" and negatively charged "chloride ions". Similarly, in polymers as well, there is a case in which a plurality of polymers are combined with each other in the form close to "ion coupling", forming configuring an organic dye material. The organic dye recording film 3-2 in the present embodiment is composed of a positively charged "cation portion" and a negatively charged "anion portion". In particular, the above recording film is technically featured in that: coupling stability is improved by utilizing a "dye" having chromogenic characteristics for the positively charged "cation portion" and utilizing an organic metal complex for the negatively charged "anion portion"; and there is met a condition that "δ] an electron structure in a chromogenic area is stabilized, and structural decomposition relevant to ultraviolet ray or reproduction light irradiation hardly occurs" shown in "3-2-B] Basic feature common to organic dye recording material in the present embodiment". Specifically, in the present embodiment, an "azo metal complex" whose general structural formula is shown in FIG. 3 is utilized as an organic metal complex. In the present embodiment which comprises a combination of an anion portion and a cation portion, cobalt or nickel is used as a center metal M of this azo metal complex, thereby enhancing optical stability. There may be used: scandium, yttrium, titanium, zirconium, hafnium, vanadium, niobium, tantalum, chrome, molybdenum, tungsten, manganese, technetium, rhenium, iron, ruthenium, osmium, rhodium, iridium, palladium, platinum, copper, silver, gold, zinc, cadmium, or mercury and the like without being limited thereto. In the present embodiment, as a dye used for the cation portion, there is used any of a cyanine dye whose general structural formula is shown in FIG. 27; a styril dye whose general structural formula is shown in FIG. 28; and a monomethine cyanine dye whose general structural formula is shown in FIG. 29.

Although an azo metal complex is used for the anion portion in the present embodiment, a formazane metal complex whose general structural formula is shown in FIG. 30 may be used without being limited thereto, for example. The organic dye recording material comprising the anion portion and cation portion is first powdered. In the case of forming the recording layer 3-2, the powdered organic dye recoding material is dissolved in organic solvent, and spin coating is carried out on the transparent substrate 2-2. At this time, the organic solvent to be used includes: a fluorine alcohol based TFP (tetrafluoro propanol) or pentane; hexane; cyclohexane; petroleum ether; ether or analogous, nitrile or analogous, and any of a nitro compound or sulfur-containing compound or a combination thereof.

5-4) Using "Copper" as Azo Metal Complex+Center Metal

FIGS. 65 and 66 each show an example of a light spectrum change before and after recording (forming a recording mark) in an "H-L" recording film and an "L-H" recording film using an optical characteristic change according to the present embodiment as a principle of recording. A wavelength of $\lambda_{max}$ write before recording (in an unrecorded area) is defined as $\lambda b_{max\ write}$; a half value width of a light absorption spectrum (b) around this $\lambda_{max\ write}$ (a width of a wavelength area meeting a range of "A≧0.5" when the absorbance A at $\lambda b_{max\ write}$ is "1") is defined as $W_{as}$; and a wavelength of $\lambda_{max\ write}$ of a light absorption spectrum (a) after recorded (in a recording mark) is defined as $\lambda a_{max\ write}$. The recording film 3-2 having the characteristics shown in FIGS. 65 and 66 utilizes a "change of an electron structure (electron orbit) relevant to elements which contribute to a chromogenic phenomenon and a "molecular structure change in molecules" from among the principles of recording shown in [α] of "3-2-B] Basic characteristics common to organic dye recording material in the invention". If there occurs a "change of an electron structure (electron orbit) relevant to electrons which contribute to a chromogenic phenomenon", for example, the dimensions or structure of the light emitting area 8 as shown in FIG. 3 changes. For example, if dimensions of the light emitting area 8 change, the resonant absorption wavelength of the local electrons also changes, and thus, the maximum absorption wavelength of light absorption spectra changes from $\lambda b_{max\ write}$ to $\lambda a_{max\ write}$. Similarly, if a "molecular structure change in molecules" occurs, a structure of the light emitting area 8 also changes, and thus, the maximum absorption wavelength of the light absorption spectra also changes. When a change amount of the maximum absorption wavelength is defined as $\Delta\lambda_{max}$, the following relationship is established:

$$\Delta\lambda_{max} \equiv |\lambda a_{max\ write} - \lambda b_{max\ write}| \qquad (49)$$

When the maximum absorption wavelength of the light absorption spectra thus changes, the half value width $W_{as}$ of the light absorption spectra also changes concurrently. A description will be given with respect to an effect on a reproduction signal obtained from a recording mark position when the maximum absorption wavelength of the light absorption spectra and the half value width $W_{as}$ of the light absorption spectra have thus changed at the same time. The light absorption spectra in a pre-recording/unrecorded area are represented as (b) in FIG. 65 (FIG. 66), and thus, the absorbance with a reproduction light beam having 405 nm is obtained as $Ah_{405}$ ($Al_{405}$). If only the maximum absorption wavelength changes to $\lambda a_{max\ write}$ as optical spectra after recorded (in recording mark) and a change of the half value width $W_{as}$ has not occurred, the light absorption spectra are theoretically obtained as shown in (c) of FIG. 65 (FIG. 66). Then, the absorbance with a reproduction light beam having 405 nm changes to $A^*_{405}$. However, in actuality, the half value width changes, and the absorbance after recorded (in recording mark) is obtained as $Al_{405}$ ($Ah_{405}$). A change amount $|Al_{405} - Ah_{405}|$ of the absorbance before and after recorded is proportional to a reproduction signal amplitude value. Thus, in the example shown in FIG. 65 (FIG. 66), the maximum absorption wavelength change and the half width value change work as an offset action relevant to an increase of the reproduction signal amplitude. Therefore, there occurs a problem that a C/N ratio of a reproduction signal is impaired. A first application example of the present embodiment for solving the above problem is featured in that the characteristics of the recording layer 3-2 is set (film-designed) so that a maximum absorption wavelength change and a half value width change work relevant to an increase of the reproduction signal amplitude in a synergetic manner. That is, as is easily predicted from the change shown in FIG. 65 (FIG. 66), the characteristics of the recording layer 3-2 is set (film-designed) so that a change occurs in a direction in which a half value width widens independent of a moving direction of $\lambda a_{max\ write}$ after recorded relevant to $\lambda b_{max\ write}$ before recorded in the "H-L" recording film or in a direction in which the half value width narrows independent of a moving direction of $\lambda a_{max\ write}$ after recorded relevant to $\lambda b_{max\ write}$ before recorded in the "L-H" recording film.

Figure 68:
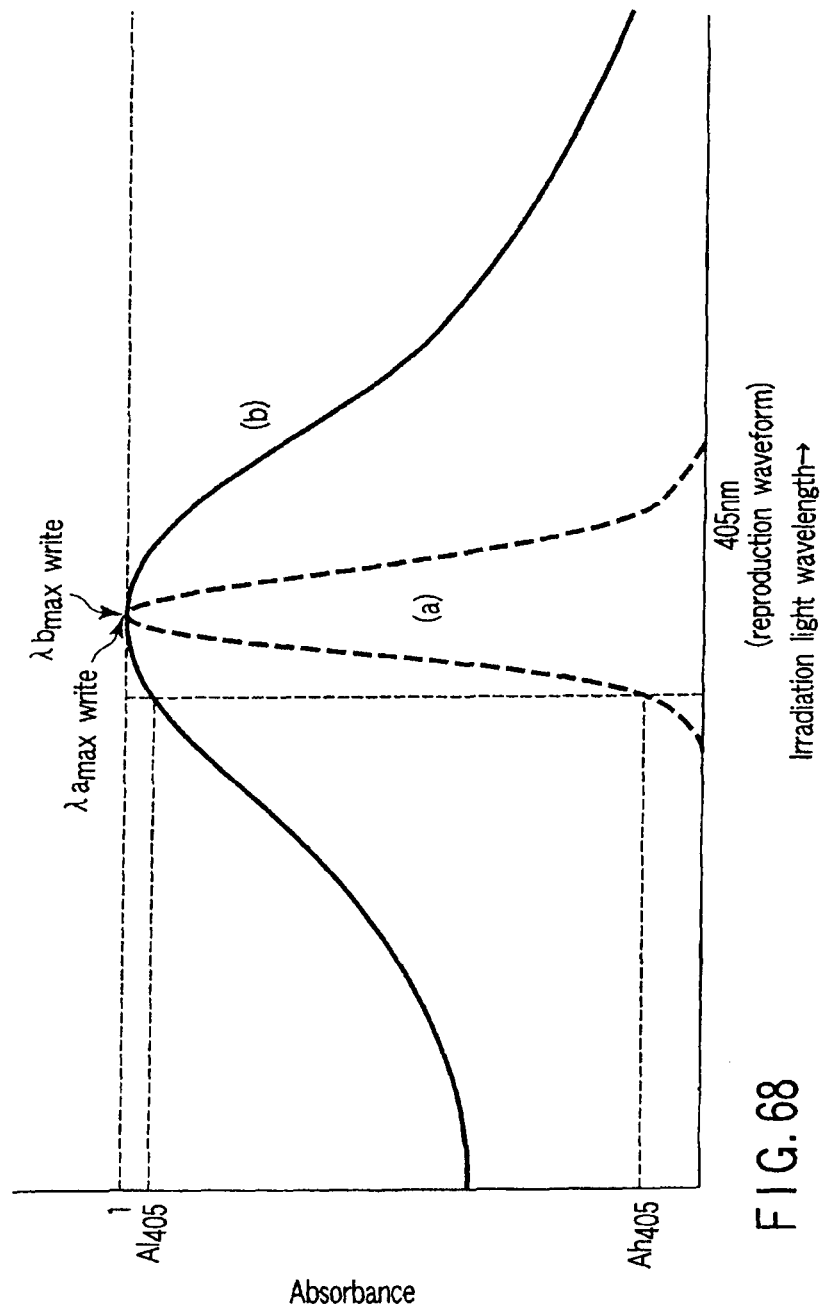
FIG. 68 is an exemplary view showing another example of a light absorption spectrum change before and after recorded, in an "L-H" recording film.

Now, a second application example in the present embodiment will be described here. As described previously, there is a case in which the C/N ratio of the reproduction signal is lowered by offsetting a difference between $Ah_{405}$ and $Al_{405}$ due to the maximum absorption wavelength change and the change of the half value width $W_{as}$. Further, in the above first application example or the embodiment shown in FIG. 65 or FIG. 66, the maximum absorption wavelength change and the half value width $W_{as}$ of the light absorption spectra change at the same time, a value of the absorbance "A" after recorded (in recording mark) is affected by both of the maximum absorption wavelength change amount $\Delta\lambda_{max}$ and the half value width change amount. When the write-once type information storage medium 12 has been mass-produced, it is difficult to precisely control values of both of the maximum absorption wavelength change amount $\Delta\lambda_{max}$ and the half value width change amount. Thus, when the information is recorded in the mass-produced write-once type information storage medium 12 has been recorded, a fluctuation of the reproduction signal amplitude increases. Then, the reliability of the reproduction signal is lowered when the signal has been reproduced by the information reproducing apparatus shown in FIG. 11. In contrast, the second application example in the present embodiment is featured in that a material of which the maximum absorption wavelength does not change between before and after recorded (between the recording mark and the unrecorded area). Therefore, a fluctuation of values of the absorbance "A" after recorded (in recording mark) is suppressed and a fluctuation between the individuals of the reproduction signal amplitude from the above value fluctuation is reduced, whereby the reliability of the reproduction signal has been improved. In this second application example, the maximum absorption wavelength does not change between before and after recording (in recording mark and in unrecorded area), and the value of the absorbance "A" is determined depending on only the spread of the light absorption spectra before and after recording (in recording mark and in unrecorded area). When a large number of write-once type information storage mediums 12 have been mass-produced, it is sufficient if only the spread of the light absorption spectra before and after recorded (in recording mark and in unrecorded area) is controlled, and thus, a fluctuation in characteristics between mediums can be reduced. Even if a contrivance is made so that a maximum absorption wavelength before and after recording (in recording mark and in unrecorded area) does not change, strictly, it is difficult to completely match the values of $\lambda b_{max\ write}$ and $\lambda a_{max\ write}$ each other, as shown in FIG. 68. The half value width $W_{as}$ of the light absorption spectra around $\lambda b_{max\ write}$ shown in FIG. 65 or 66 is often included in the range of 100 nm to 200 nm in a general organic dye recording material. Therefore, if the value of the maximum absorption wavelength change amount $\Delta\lambda_{max}$ exceeds 100 nm, it is possible to easily predict from FIG. 65 or 66 that there occurs a large difference between the absorbance $Ah_{405}$ ($Al_{405}$) obtained from the characteristics of item (b) and the absorption $A^*_{405}$ obtained from the characteristics of item (c). Accordingly, the fact that "the maximum absorption wavelength does not change" as the second application example mans that the following condition is met:

$$\Delta\lambda_{max} \leq 100\ nm \quad (50)$$

Further, when a condition that the maximum absorption wavelength change amount $\Delta\lambda_{max}$ is ⅓ of the value obtained by formula (50), i.e., $$\Delta\lambda_{max} \leq 30\ nm \quad (51)$$

a difference between the absorbance $Ah_{405}$ ($Al_{405}$) obtained from the characteristics of item (b) and the absorption $A^*_{405}$ obtained from the characteristics of item (c) is very small, and a fluctuation in reproduction signal characteristics between the mediums can be reduced.

FIG. 68 shows the "L-H" recording film characteristics, which meet formula (50) or formula (51). The light absorption spectra before recorded (in unrecorded area) are obtained as wide spectra as shown in the characteristic (b) of FIG. 68, and the absorbance $Ah_{405}$ at a reproduction wavelength of 405 nm is obtained as a sufficient small value. The absorbance $Ah_{405}$ after recorded (in recording mark) narrows in width as shown in the characteristic (a) of FIG. 68, and the absorbance $Al_{405}$ at a reproduction wavelength of 405 nm rises.

In order to meet formula (50) or formula (51), the present embodiment utilizes an "orientation change in molecules" in item [α] of "3-2-B] Basic characteristics common to organic dye recording material in the invention" as a principle of recording. In the azo metal complex shown in FIG. 3, a plurality of benzene nucleus rings are located on the same plane because the benzene nucleus rings are radically coupled with each other. That is, in FIG. 3, four benzene nuclear rings which exist more upwardly than the center metal M forms an U (up-side) plane which the benzene nucleus group produced; and four benzene nuclear rings which exist more downwardly than the center metal M forms a D (down-side) plane which the benzene nucleus group produced.

Figure 67A:
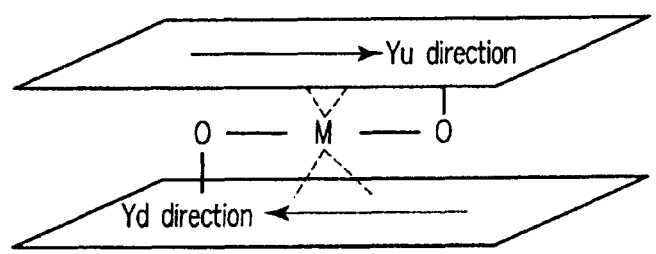
FIGS. 67A and 67B are exemplary views each showing a molecular structure changing situation in an azo metal complex.
Figure 67B:
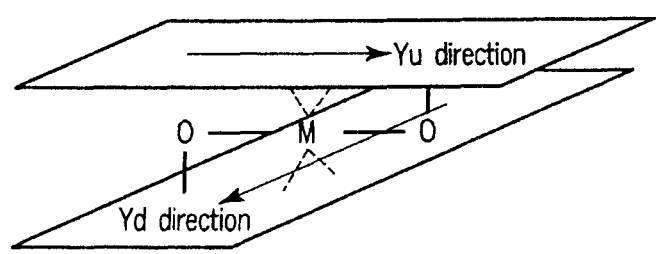

A mutually parallel relationship is always maintained between the above U plane and D plane in any case (irrespective of whether pre-recording or post-recording may be). Side chain groups of R1 and R3 are arranged in a form orthogonal to the above U plane and D plane. Ion coupling is carried out between the center metal atom M and the oxygen atom O, and a plane formed by a line segment for connecting O-M-O is located in parallel to the above U plane and D plane. The light emitting area 8 surrounded in a round area shown in FIG. 3 has such a three-dimensional structure. For further description, a direction oriented from a direction of R4 to a direction of R5 in the U plane is tentatively defined as a "Yu direction", and a direction oriented from a direction of R4 to a direction of R5 in the D plane is defined as a "Yd direction". Orientation coupling is carried out between a nitrogen atom N included in the U plane or D plane and the center metal atom M sandwiched between these two planes so that a position of the nitrogen atom N around the center metal atom M can be rotated. That is, a structure is provided such that the Yd direction can be rotated with respect to the Yu direction while a mutually parallel relationship is maintained between the above U plane and D plane. In the azo metal complex shown in FIG. 3, the Yu direction and Yd direction can be parallel to each other, as shown in FIG. 67A (the orientations can be made identical or opposite to each other as shown in FIG. 67A); and the Yu direction and Yd direction can be in a skew position relationship as shown in FIG. 67B. Of course, an arbitrary angle relationship between FIGS. 67A and 67B can be also established. As described previously, the side chain groups of R1 and R3 are arranged in a form orthogonal to the above U plane and D plane. Thus, in the structure of FIG. 67A, collision is likely to occur between the side chain group of R1 or R3 and another side chain group of R4 or the like. Therefore, as shown in FIG. 67B, a time point at which the Yu direction and Yd direction are in a skew position relationship (when the U plane is seen from far above, the Yu direction and Yd direction are seen as if it were orthogonal to each other) is the most stable in a structural point of view. The light absorption wavelength in the light emitting area 8 when the state shown in FIG. 67B is established coincides with a value of $\lambda a_{max\ write} = \lambda b_{max\ write}$ shown in FIG. 68. If the relationship between the Yu direction and Yd direction deviates from the state shown in FIG. 67B, the electron structure in the light emitting area 8 and the local distance of light absorption electrons (the size of local area) slightly change, and the light absorption wavelength deviates from the value of $\lambda a_{max\ write} = \lambda b_{max\ write}$. By means of spinner coating, a relationship between the above Yu direction and Yd direction is arbitrarily oriented in the recording layer 3-2 (in unrecorded state) immediately after formed on the transparent substrate 2-2. Therefore, the distribution width of light absorption spectra widens as shown in characteristic (b) of FIG. 68. In order to form a recording mark, when a temperature in the recording layer 3-2 is locally risen, a molecular orientation moves because of a high temperature, and finally, an almost stable state shown in FIG. 67B is established in a structural point of view. Then, the electron structures in the light emitting area 8 coincide with each other anywhere in the recording mark, and the current spectra changes to narrow light absorption spectra in width, as shown in characteristic (a) of FIG. 68. As a result, the absorbance at a reproduction wavelength (for example, 405 nm) changes from $Al_{405}$ to $Ah_{405}$.

A description will be made with respect another advantageous effect of using the light emitting area 8 in an azo metal complex. A dye is utilized for a cation portion in the case of utilizing a combination of the anion portion and the cation portion described previously. Although the chromogenic area in each of the dyes shown in FIGS. 27 to 29 occupies a portion in each of the dye structures, a relative occupying capacitance of the chromogenic area in the recording layer 3-2 is decreased by combining this area with an anion portion which does not contribute to the chromogenic area. Therefore, a light absorption sectional area is relatively lowered, and a molar molecule light absorption coefficient is lowered. As a result, a value of the absorbance at a position of $\lambda_{max\ write}$ shown in FIG. 25 is reduced, and recording sensitivity is lowered. In contrast, in the case of utilizing the chromogenic characteristics at the periphery of the center metal of an azo metal complex itself described here, the azo metal complex itself emits light, and thus, there does not exist a redundant portion which does not contribute to a chromogenic area such as the anion portion described previously. Therefore, there is no unnecessary factor that the relative occupying capacitance of the chromogenic area decreases. Further, as shown in FIG. 3, the occupying capacitance of the light emitting area 8 in the azo metal complex is wide, and thus, the light absorption sectional area increases, and a value of the molar molecule light absorption coefficient rises. As a result, there is provided advantageous effect that the value of the absorbance at a position of $\lambda_{max}$ write shown in FIG. 25 increases, and the recording sensitivity is improved.

The present embodiment is featured in that the structural stability of the chromogenic area has been achieved by optimizing the center metal of the azo metal complex as a specific method for "δ] stabilizing an electron structure in a chromogenic area so that structural decomposition relevant to ultraviolet ray or reproduction light irradiation hardly occurs" described in "3-2-B] Basic characteristics common to organic dye recording material in the invention".

It is known that metal ions have their unique ionization tendency. These metal atoms are arranged in stronger order of ionization tendency, i.e., Na>Mg>Al>Zn>Fe>Ni>Cu>Hg>Ag>Au. The ionization tendency of the metal atoms represents "nature of metal radiating electrons to form positive ions".

After a variety of metal atoms has been incorporated as the center metal of the azo metal complex having the structure shown in FIG. 3, where reproduction stability (stability of chromogenic characteristics when a light beam in the vicinity of 405 nm is repeatedly irradiated with reproduction power) is repeatedly checked, it has been found that the metal atoms with high ionization tendency radiates electrons more remarkably and are easily decoupled; and the light emitting area 8 is easily destroyed. As a result of a number of tests, in order to ensure structural stabilization of the chromogenic area, it has been found desirable to use a metal material (Ni, Cu, Hg, Ag, Au) after nickel (Ni) as the center metal. Further, from the viewpoint of "structural stability of high chromogenic area", "low price", and "use safety", it is the most desirable to use copper (Cu) as the center metal as the present embodiment. In the present embodiment, any of $CH_3$, CxHy, H, Cl, F, $NO_2$, $SO_2$, and $SO_2NHCH_3$ is used as R1, R2, R3, R4, or R5 which is a side chain shown in FIG. 3.

Now, a description will be given with respect to a method for forming an organic dye recording material having a molecular structure shown in FIG. 3 as the recording layer 3-2 on a transparent substrate 2-2. The powdered organic dye recording material of 1.49 g is dissolved in 100 nm of TFP (tetrafluoro propanol) which is a fluorine alcohol based solvent. The above numeric value denotes that 1.4 wt % is obtained as a mixture ratio, and an actual use amount changes depending on a manufacture amount of the write-once type information storage medium. It is desirable that the mixture ratio ranges from 1.2 wt % to 1.5 wt %. As a solvent, it is conditionally mandatory that a surface of the transparent substrate 2-2 made of a polycarbonate resin is not dissolved, and the above described alcohol based solvent is used. Because the above TFP (tetrafluoro propanol) has polarity, the solubility of the powdered organic dye recording material is improved. While the transparent substrate 2-2 on a spindle motor is rotated, the organic dye recording material dissolved in the solvent is applied to the center part of the transparent substrate 2-2 until the solvent has evaporated after the material has been spread by utilizing a centrifugal force, and then, the recording layer 3-2 is compressed in accordance with a baking process for increasing the entire temperature.

FIG. 69 shows a third application example in which a basic principle of the second application example in the present embodiment is applied to the "H-L" recording film. The maximum absorption wavelength $\lambda a_{max\ write}$ of absorption spectra (a) after recorded (in recording mark) is equalized with respect to the maximum absorption wavelength $\lambda b_{max\ write}$ of absorption spectra (b) before recorded (in unrecorded area). As an example of a specific organic dye material which achieves the third application example, an azo metal complex is used for an anion portion. For a cation portion, there is used an "anion/cation type organic dye recording material" utilizing dye molecules having an absorption wavelength $\lambda b_{max\ write}$ on a shorter wavelength side than a reproduction signal wavelength (for example, 405 nm), as shown in FIG. 69. In this case, in the azo metal complex shown in FIG. 3, at an α position or a γ position in the D plane, which a benzene nucleus group produces and a β position or a δ position in the U plane which a benzene nucleus group produces, color dye molecules (positively charged cation portion) are allocated by an inter-ion force. As in the second application example, a principle of changing (recording) the light absorption spectra before and after recorded while keeping unchanged the maximum absorption wavelength $\lambda b_{max\ write}$ of the light absorption spectra (b) before recorded (in unrecorded area) and the maximum absorption wavelength $\lambda a_{max}$ write of the light absorption spectra (a) after recorded (in recording mark) utilizes rotation between the U plane (Yu direction) which the benzene nucleus group produces and the D plane (Yd direction) which the benzene nucleus group produces. Further, in the third application example, the electron coupling force in the light emitting area 8 is improved, whereby "degradation of an electron structure (electron orbit) with respect to electrons which contribute to a chromogenic phenomenon" hardly occurs. As a result, an area in the absorption spectra (b) before recorded (in unrecorded area) (an integration result in spectra wavelength direction) can be adjusted to conform to an area in the absorption spectra (a) after recorded (in recoding mark). In this manner, the absorbance "A" at the maximum absorption wavelength $\lambda a_{max\ write}$ in the absorption spectra (a) after recorded (in recording mark) becomes greater than the absorbance "l" at the maximum absorption wavelength $\lambda b_{max\ write}$ before recorded (in unrecorded area), and a value of $Al_{405}$ rises more significantly than a value of $Ah_{405}$, as shown in FIG. 69.

In the case where degradation in the light emitting area 8 such as discoloring action does not occur, the area in the absorption spectra before and after recorded (the integration result in the spectra wavelength direction) is kept unchanged. Thus, the absorbance $Aa_{max}$ in the maximum absorption wavelength $\lambda a_{max\ write}$ increases with a decrease in the width of the absorption spectra before and after recorded. When a difference clearly occurs between the value of the absorbance $Al_{405}$ and the value of $Ah_{405}$ at the reproduction wavelength of 405 nm (when a reproduction signal can be detected at a good C/N ratio), from FIG. 69, it is found necessary to meet a condition that the value of the absorbance $Aa_{max}$ in the maximum absorption wavelength $\lambda a_{max\ write}$ is:

$$Aa_{max} \geq 1.2 \qquad (52)$$

Further, in order to stably ensure the reliability of reproduction of a detection signal, it is necessary to meet a condition:

$$Aa_{max} \geq 1.5 \qquad (53)$$

Although there has been shown an example of providing a structure in which an azo metal complex is utilized for an anion portion and dyes are utilized for a cation portion as a specific organic dye recording material which achieve the third application example, the invention (third application example) include an organic dye recording material having "H-L" recording characteristics; meeting formula (50) or formula (51) with respect to the maximum absorption wavelength change amount before and after recorded; and changing the absorbance at the maximum absorbance wavelength without being limited thereto, as the specific organic dye recording material which achieves the third application example.

Figure 70:
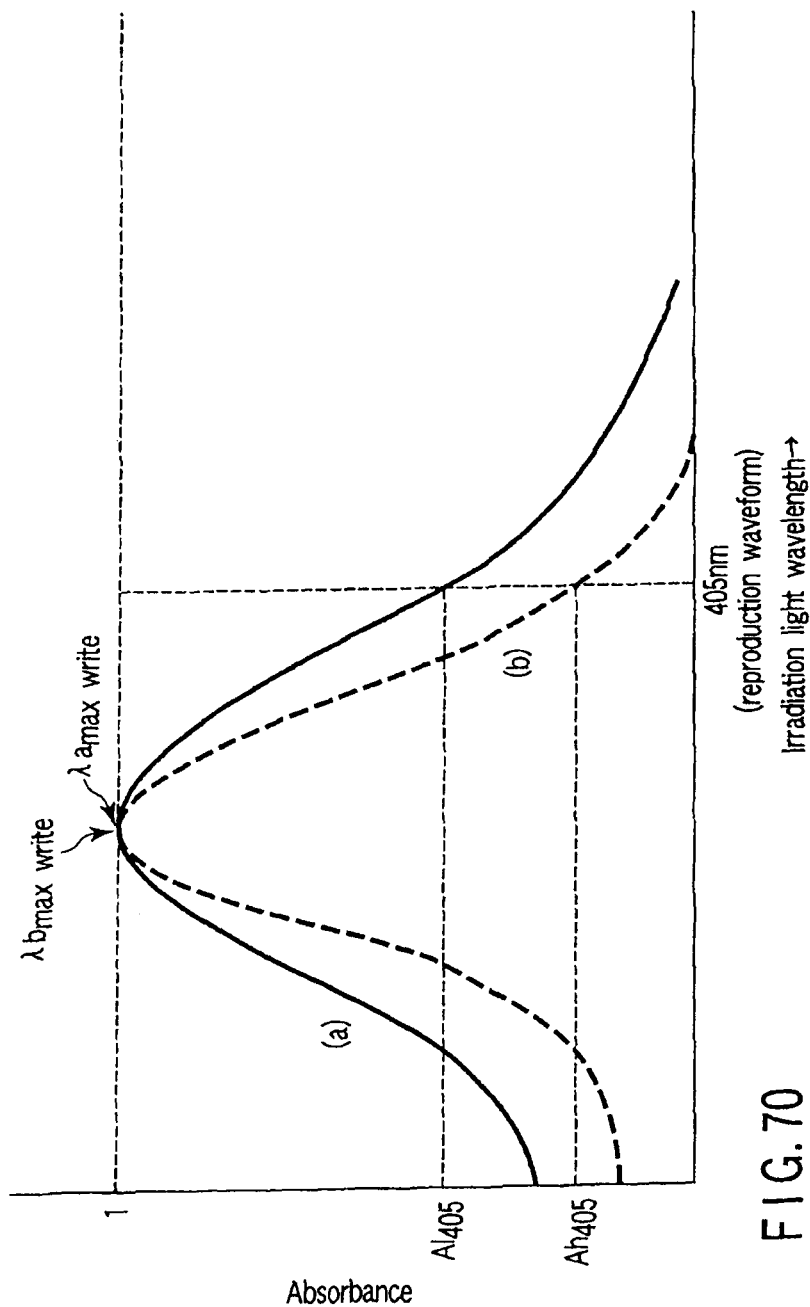
FIG. 70 is an exemplary view showing still another example of a light absorption spectrum change before and after recorded, in an "H-L" recording film.

Further, a fourth application example is shown in FIG. 70. In a phase change recording film, "atoms are allocated in order (in crystalline state) before recorded", and "atoms are arranged in random (in amorphous state) after recorded". In the fourth application example, a feature of this phase change recording film is combined with a feature that "the maximum absorption wavelength does not change before and after recorded" shown in the second application example. Although a specific organic dye recording material in the fourth application example has a structure of utilizing the azo metal complex shown in the third application example for an anion portion and dyes for a cation portion as a specific organic recording material in the fourth application example, the detailed contained atoms, these application examples are different from each other in terms of detailed contained atoms, detailed intra-molecular structure, or a method for manufacturing the recording layer 3-2. That is, a time required for solidification of the recording layer 3-2 is taken by using an organic solvent which hardly evaporates after applying an organic dye recording material dissolved in an organic solvent on the transparent substrate 2-2 by spinner coating, or alternatively, a temperature of the transparent substrate 2-2 is increased in advance at the time of the application, and then, the temperature of the transparent substrate 2-2 is slowly decreased at the time of evaporation of an organic solvent, whereby a contrivance is made so that the intra-molecular (or inter-molecular) orientation or array can be easily arranged in order at the stage of the solidification of the recording layer 3-2. As a result, as shown in characteristic (b) of FIG. 70, the width of the light absorption spectra before recorded (in unrecorded area) becomes narrow. Next, contrivance is made to apply a recording pulse at the time of recording (for example, after the inside of the recording layer 3-2 has locally exceeded an optical characteristic change temperature, the width of the recording pulse is narrowed instead of increasing the height of the recording pulse at the time of applying the same energy so as to provide rapid cooling), and the intra-molecular (or inter-molecular) orientation or array after recorded (in recording mark) is arranged in random. As a result, the width of the light absorption spectra after recorded (in recording mark) widens as shown in characteristic (a) of FIG. 70. A large difference in absorbance "A" before and after recorded is produced by adjusting a reproduction light wavelength to conform to a lower end position of the light absorption spectra. Although an example of providing a structure in which an azo metal complex is utilized for an anion portion and dyes are utilized for a cation portion as a specific organic dye recording material which achieve the fourth application example, the invention (fourth application example) include an organic dye recording material having "H-L" recording characteristics; meeting formula (50) or formula (51) with respect to the maximum absorption wavelength change amount before and after recorded; and changing the absorbance at the maximum absorbance wavelength without being limited thereto, as the specific organic dye recording material which achieves the fourth application example.

Chapter 6: Description Relating to Pre-Groove Shape/Pre-Pit Shape in Coating Type Organic Dye Recording Film and on Light Reflection Layer Interface 6-1) Light Reflection Layer As described in "Chapter 0: Description of Relationship between Use Wavelength and the Present Embodiment", the present embodiment assumes a range of 355 nm to 455 nm in particular around 405 nm. When the metal materials each having a high light reflection factor at this wavelength bandwidth are arranged in order from the highest light reflection factor, Ag is in the order of around 96%; Al is in the order of around 80%, and Rh is in the order of around 80%. In a write-one type information storage medium using an organic dye recording material, as shown in FIG. 2B, the reflection light from the light reflection layer 4-2 is a standard, and thus, the light reflection layer 4-2 requires a high light reflection factor in characteristics. In particular, in the case of the "H-L" recording film according to the present embodiment, the light reflection factor in an unrecorded area is low. Thus, if the light reflection factor in the light reflection layer 4-2 simplex is low, in particular, a reproduction signal C/N ratio from a pre-pit (emboss) area is low, lacking the stability at the time of reproduction. Thus, in particular, it is mandatory that the light reflection factor in the light reflection layer 4-2 simplex is high. Therefore, in the present embodiment, in the above wavelength bandwidth, a material mainly made of Ag (silver) having the highest reflection factor is used. As a material for the light reflection layer 4-2, there occurs a problem that "atoms easily move" or "corrosion easily occurs" if silver is used alone. To solve the first problem, when partial alloying is carried out by adding other atoms, silver atoms hardly move. In the first embodiment in which other atoms are added, the light reflection layer 4-2 is made of AgNdCu according to the first embodiment. AgNdCu is in a solid soluble state, and thus, the reflection factor is slightly lowered than a state in which silver is used alone. In the second embodiment in which other atoms are added, the light reflection layer 4-2 is made of AgPd, and an electric potential is changed, whereby corrosion hardly occurs in an electrochemical manner. If the light reflection layer 4-2 corrodes due to silver oxidization or the like, the light reflection factor is lowered. In an organic dye recording film having a recording film structure shown in FIG. 2B, in particular, in the case of an organic dye recording film shown in "Chapter 3: Description of Characteristics of Organic Dye Recording Film in the Present Embodiment", in particular, a light reflection factor on an interface between the recording layer 3-2 and the light reflection later 4-2 is very important. If correction occurs on this interface, the light reflection factor is lowered, and an optical interface shape blurs. In addition, the detection signal characteristics from a track shift detection signal (push-pull signal) or a wobble signal and a pre-pit (emboss) area are degraded. In addition, in the case where the width Wg of the pre-groove area 11 is wider than the width Wl of the land area, a track shift detection signal (push-pull signal) or a wobble signal is hardly generated, thus increasing effect of degradation of the light reflection factor on the interface between the recording layer 3-2 and the light reflection layer 4-2 due to corrosion. In order to prevent degradation of the light reflection factor on this interface, AgBi is used for the light reflection layer 4-2 as the third embodiment. AgBi forms a very stable phase and prevents degradation of the light reflection factor on the above interface because a passive coat film is formed on a surface (interface between the recording layer 3-2 and the light reflection layer 4-2). That is, if Bi (bismuth) is slightly added to Ag, Bi is isolated from the above interface, the isolated Bi is oxidized. Then, a very fine film (passive coat film) called oxidized bismuth is formed to function to preclude internal oxidization. This passive coat film is formed on the interface, and forms a very stable phase. Thus, the degradation of a light reflection factor does not occur, and the stability of detection signal characteristics from a track shift detection signal (push-pull signal) or a wobble signal and a pre-pit (emboss) area is guaranteed over a long period of time. At a wavelength band ranging from 355 nm to 455 nm, the silver simplex has the highest light reflection factor, and the light reflection factor is lowered as an additive amount of other atoms is increased. Thus, it is desirable that an additive amount of Bi atoms in AgBi in the present embodiment be equal to or smaller than 5 at %. The unit of at % used here denotes atomic percent, and indicates that five Bi atoms exist in a total atom number 100 of AgBi, for example. When characteristics have been evaluated by actually producing the passive coat film, it has found that a passive coat film can be produced as long as an additive amount of Bi atoms is equal to or greater than 0.5 at %. Based on a result of this evaluation, an additive amount of Bi atoms in the light reflection layer 4-2 in the present embodiment is defined as 1 at %. In this third embodiment, only one atom Bi is added, and an additive amount of atoms can be reduced as compared with AgNdCu according to the first embodiment (a case in which two types of atoms Nd and Cu is added in Ag), and AgBi can increase the light reflection factor more significantly than AgNdCu. As a result, even in the case of the "H-L" recording film according to the present embodiment or in the case where the width Wg of the pre-groove area 11 is wider than the with Wl of the land area, as shown in FIGS. 8B and 8C, a detection signal can be stably obtained from a track shift detection signal (push-pull signal) or a wobble signal and a pre-pit (emboss) area with high precision. The third embodiment is not limited to AgBi, and a ternary system including AgMg, AgNi, AgGa, AgNx, AgCo, AgAl or the atoms described previously may be used as a silver allow which produces a passive coat film. The thickness of this light reflection layer 4-2 is set in the range of 5 nm to 200 nm. If the thickness is smaller than 5 nm, the light reflection layer 4-2 is not uniform, and is formed in a land shape. Therefore, the thickness of the light reflection layer 4-2 is set to 5 nm. When an AgBi film is equal to or smaller than 80 nm in thickness, the film permeates to its back side. Thus, in the case of a one-sided single recording layer, the thickness is set in the range of 80 nm to 200 nm, and preferably, in the range of 100 nm to 150 nm. In the case of a one-sided double recording layer, the thickness is set in the range of 5 nm to 15 nm.

Figure 71A:
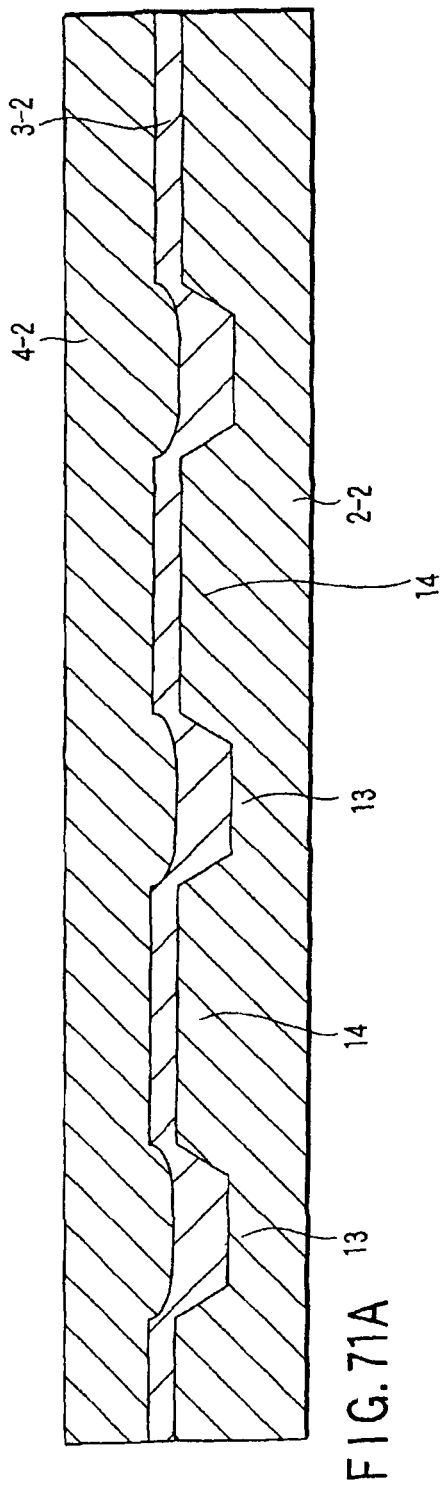
FIGS. 71A and 71B are exemplary illustrative cross section of a pre-pit in a system lead-in area SYLDI.
Figure 71B:
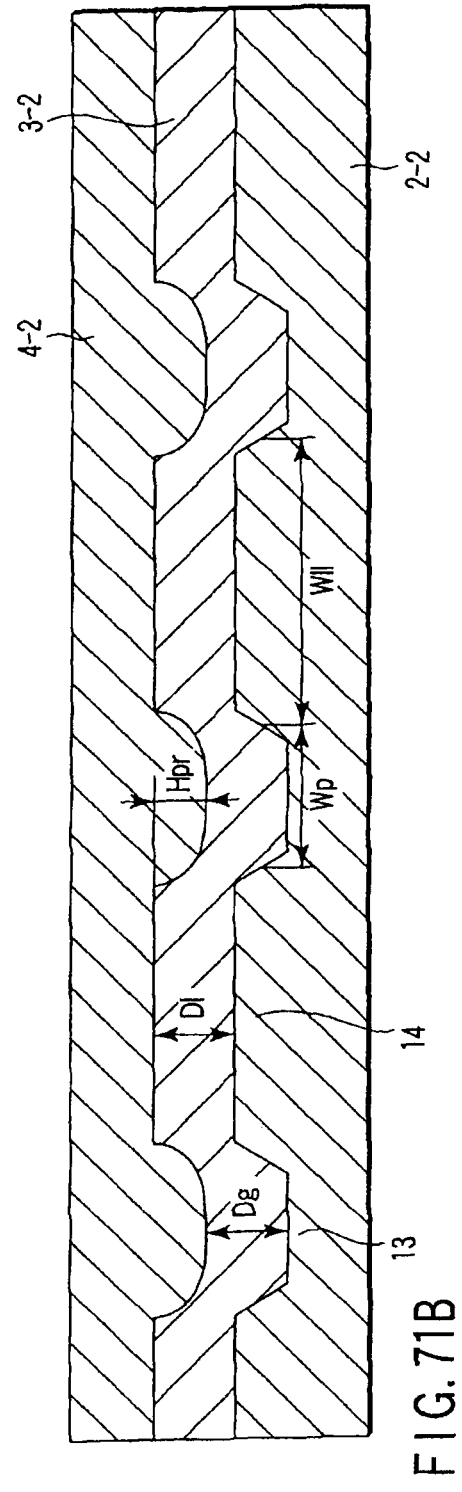

6-2) Description Relating to Pre-Pit Shape in Coating Type Organic Dye Recording Film and on Light Reflection Layer Interface In an H format according to the present embodiment, as shown in FIGS. 35A, 35B and 35C, the system lead-in area SYLDI is provided. In this area, an emboss pit area 211 is provided, and, as shown in FIGS. 71A and 71B, information is recorded in advance in the form of a pre-bit. A reproduction signal in this area is adjusted to conform to reproduction signal characteristics from a read-only type information storage medium, and a signal processor circuit in an information reproducing apparatus or an information recording/reproducing apparatus shown in FIG. 11 is compatible with a read-only type information storage medium and a write-once type information storage medium. A definition relevant to a signal detected from this area is adjusted to conform with a definition of "3-4): Description of characteristics relating to "H-L" recording film in the invention". That is, a reproduction signal amount from the space area 14 having a sufficiently large length (11T) is defined as $I_{11H}$, and a reproduction signal from the pre-pit (emboss) area 13 having a sufficiently large length (11T) is defined as In addition, a differential value between these amounts is defined as $I_{11}=I_{11H}-I_{11L}$. In the present embodiment, in accordance with the reproduction signal characteristics from the read-only type information storage medium, the reproduction signal in this area is set to be:

$$I_{11}/I_{11H} \geq 0.3 \quad (54)$$

and desirably, is set to be:

$$I_{11}/I_{11H} > 0.5 \quad (55)$$

When a repetitive signal amplitude of the space area 14 relevant to the pre-pit (emboss) area 13 having a 2t length is defined as $I_2$, the amplitude is set to be:

$$I_2/I_{11} \geq 0.5 \quad (56)$$

and desirably, is set to be:

$$I_2/I_{11} > 0.7 \quad (57)$$

A description will be given with respect to a physical condition for meeting the above formula (54) or formula (55).

As has been described in FIG. 2B, the signal characteristics from a pre-pit are mainly dependent on the reflection in the light reflection layer 4-2. Therefore, the reproduction signal amplitude value $I_{11}$ is determined depending on a step amount Hpr between the space area 14 and the pre-pit (emboss) area 13 in the light reflection layer 4-2. When optical approximation calculation is made, this step amount Hpr, with respect to a reproduction light wavelength $\lambda$ and a refractive index $n_{32}$ in the recording layer 3-2, has the following relationship:

$$I_{11} \propto \sin^2\{(2\pi \times Hpr \times n_{32})/\lambda\} \quad (58)$$

From formula (58), it is found that $I_{11}$ becomes maximal when $Hpr \approx \lambda/(4 \times n_{32})$. In order to meet formula (54) or formula (55), from formula (58), it is necessary to meet:

$$Hpr \geq \lambda/(12 \times n_{32}) \quad (59)$$

and desirably, $$Hpr > \lambda/(6 \times n_{32}) \quad (60)$$

As described in "Chapter 0: Description of Relationship between Use Wavelength and the Present Embodiment", $\lambda=355$ nm to 455 nm is used in the embodiment, and as described in "2-1) Difference in Principle of Recording/Recording Film and Difference in Basic Concept Relating to Generation of Reproduction Signal", $n_{32}=1.4$ to 1.9 is established. Thus, when this value is substituted into formula (59) or formula (60), a step is produced so as to meet a condition:

$$Hpr \geq 15.6 \text{ nm} \quad (62)$$

and desirably, $$Hpr > 31.1 \text{ nm} \quad (63)$$

In the conventional write-once type information storage medium, as shown in FIG. 71B, the thickness of the recording layer 3-2 is small in the space area 14, and thus, a step on an interface between the light reflection layer 4-2 and the recording layer 3-2 is small, and formula (62) has not successfully met. In contrast, in the present embodiment, a contrivance has been made to ensure that a relationship between the thickness Dg of the recording layer 3-2 in the pre-pit (emboss) area 13 and the thickness D1 of the recording layer 3-2 in the space area 14 conform with a condition described in "3-2-E] Basic characteristics relating to thickness distribution of recording layer in the present embodiment for definition of parameters". As a result, as shown in FIG. 71B, a sufficiently large step Hpr which meets formula (62) or formula (63) has been successfully provided.

By carrying out optical approximation discussion as described above, in the present embodiment, in order to have sufficient resolution of a reproduction signal so as to meet formula (56) or formula (57), a contrivance is made so that the width Wp of the pre-pit (emboss) area 13 is equal to or smaller than half of track pitches as shown in FIG. 71B, and a reproduction signal from the pre-pit (emboss) area 13 can be largely taken.

6-3) Description Relating to Pre-Groove Shape in Coating Type Organic Dye Recording Film and on Light Reflection Layer Interface:

Chapter 7: Description of H Format

Now, an H format in the present embodiment will be described here.

FIG. 31 shows a structure and dimensions of an information storage medium in the present embodiment. As embodiments, there are explicitly shown three types of embodiments of information storage mediums such as:

"read-only type information storage medium" used exclusively for reproduction in which recording cannot be carried out;

"write-once type information storage medium" capable of additional recording; and "rewritable type information storage medium" capable of rewriting or recording any times As shown in FIG. 31, the above three types of information storage mediums are common to each other in a majority of structure and dimensions. In all of the three types of information storage mediums, from their inner periphery side, a burst cutting area BCA, a system lead-in area SYLDI, a connection area CNA, a data lead-in area DTLSI, and a data area DTA have been arranged. All the mediums other than an OTP (Opposite Track Path) type read-only medium is featured in that a data lead-out area DTLDO is arranged at the outer periphery. As described later, in the OTP type read-only medium, a middle area MDA is arranged at the outer periphery. In either of the write-once type and rewritable type mediums, the inside of this area is for read-only (additional writing disabled). In the read-only type information storage medium, information is recorded in the data lead-in area DTLDI in the form of emboss (pre-pit). In contrast, in the write-once type and the rewritable type information storage medium, new information can be additionally written (rewritten in the rewritable type) by forming a recording mark in the data lead-in area DTLDI. As described later, in the write-once type and rewritable type information storage medium, in the data lead-out area DTLDO, there coexist an area in which additional writing can be carried out (rewriting can be carried out in the rewritable type) and a read-only area in which information is recorded in the form of emboss (pre-pit). As described previously, in the data area DTA, data lead-in area DTLVI, data lead-out area DTSDO, and middle area MDA shown in FIG. 31, high density of the information storage medium is achieved (in particular, line density is improved) by using a PRML (Partial Response Maximum Likelihood) method for reproduction of signals recorded therein. In addition, in the system lead-in area SYLDI and the system lead-out area SYLDO, compatibility with a current DVD is realized and the stability of reproduction is improved by using a slice level detecting system for reproduction of signals recorded therein.

Unlike the current DVD specification, in the embodiment shown in FIG. 31, the burst cutting area BCA and system lead-in area SYLDI are separated from each other in location without being superimposed on each other. These areas are physically separated from each other, thereby making it possible to prevent interference between the information recorded in the system lead-in area SYLDI at the time of information reproduction and the information recorded in the burst cutting area BCA and to allocate information reproduction with high precision.

In the case where an "L-H" type recording film has been used as another embodiment, there is a method for forming fine irregularities in advance in location for allocating the burst cutting area BCA. A description will be given later with respect to information on polarity (identification of "H-L" or "L-H") of a recording mark which exists at a 192 nd byte in FIG. 42. In this section, a description will be given with respect to the present embodiment in which an "L-H" recording film as well as the "H-L" recording film is also incorporated in a specification and a scope of selecting the recording film is widened to enable high speed recording or supply of an inexpensive medium. As described later, the present embodiment also considers a case of using the "L-H" recording film. Data recorded in the burst cutting area BCA (barcode data) is formed by locally carrying out laser exposure to a recording film. As shown in FIGS. 35A, 35B and 35C, the system lead-in area SYLDI is formed of the emboss bit area 211, and thus, the reproduction signal from the system lead-in area SYLDI appears in a direction in which a light reflection amount decreases as compared with a light reflection level from the mirror surface 210. If while the burst cutting area BCA is formed as the mirror surface 210, in the case where the "L-H" recording film has been used, a reproduction signal from the data recorded in the burst cutting area BCA appears in a direction in which a light reflection amount increases more significantly than a light reflection level from the mirror surface 210 (in an unrecorded state). As a result, a significant step occurs between a position (amplitude level) of a maximum level and a minimum level of the reproduction signal from the data recorded in the burst cutting area BCA and a position (amplitude level) of a maximum level and a minimum level of the reproduction signal from the system lead-in area SYLDI. As described later with respect to FIGS. 35A, 35B and 35C, an information reproducing apparatus or an information recording/reproducing apparatus carry out processing in accordance with the steps of:

(1) reproducing information in the burst cutting area BCA;

(2) reproducing information contained in a information data zone CDZ in the system lead-in area SYLDI;

(3) reproducing information contained in the data lead-in area DTLDI (in the case of write-once type or rewriting type);

(4) readjusting (optimizing) a reproduction circuit constant in a reference code recording zone RCZ; and (5) reproducing information recorded in the data area DTA or recording new information.

Thus, if there exists a large step between a reproduction signal amplitude level from the data formed in the burst cutting area BCA and a reproduction signal amplitude level from the system lead-in area SYLDI, there occurs a problem that the reliability of information reproduction is lowered. In order to solve this problem, in the case where the "L-H" recording film is used as a recording film, the present embodiment is featured in that fine irregularities are formed in advance in thus burst cutting area BCA. When such fine irregularities are formed, the light reflection level becomes lower than that from the mirror surface 210 due to a light interference effect at the stage prior to recording data (barcode data) by local laser exposure. Then, there is attained an advantageous effect that a step is remarkably decreased between a reproduction signal amplitude level (detection level) from the data formed in the burst cutting area BCA and a reproduction signal amplitude level (detection level) from the system lead-in area SYLDI; the reliability of information reproduction is improved; and processing going from the above item (1) to item (2) is facilitated. In the case of using the "L-H" recording film, the specific contents of fine irregularities formed in advance in the burst cutting area BCA include the emboss pit area 211 like the system lead-in area SYLDI. Another embodiment includes a method for forming the groove area 214 or the land area and the groove area 213 like the data lead-in area DTLDI or data area DTA. As has been described in the description of embodiments in which the system lead-in area SYSDI and burst cutting area BCA are separately arranged, if the burst cutting area BCA and the emboss bit area 211 overlaps each other, there increases a noise component from the data provided in the burst cutting area BCA due to unnecessary interference to a reproduction signal. When the groove area 214 or the land area and groove area 213 is formed without forming the emboss pit area 211 as an embodiment of the fine irregularities in the burst cutting area BCA, there is attained an advantageous effect that there decreases a noise component from the data formed in the burst cutting area BCA due to unnecessary interference to a reproduction signal and the quality of a reproduction signal is improved. When track pitches of the groove area 214 or the land area and groove area 213 formed in the burst cutting area BCA are adjusted to conform with the those of the system lead-in area SYLDI, there is attained an advantageous effect that the manufacturing performance of the information storage medium is improved. That is, at the time of original master manufacturing of the information storage medium, emboss pits in the system lead-in area are'produced while a feed motor speed is made constant. At this time, the track pitches of the groove area 214 or the land area and groove area 213 formed in the burst cutting area BCA are adjusted to conform with those of the emboss pits in the system lead-in area SYLDI, thereby making it possible to continuously maintain a constant motor speed in the burst cutting area BCA and the system lead-in area SYLDI. Thus, there is no need for changing the speed of the feed motor midway, and thus, the pitch non-uniformity hardly occurs, and the manufacturing performance of the information storage medium is improved.

FIG. 32 shows parameter values according to the present embodiment in a read-only type information storage medium; FIG. 33 shows parameter values according to the present embodiment in a write-once type information storage medium; and FIG. 34 shows parameter values according to the present embodiment in a rewritable type information storage medium. As is evident in comparison between FIG. 32 or 33 and FIG. 34 (in particular, in comparison of section (B)), the rewritable type information storage medium has higher recording capacity than the read-only type or write-once type information storage medium by narrowing track pitches and line density (data bit length). As described later, in the rewritable type information storage medium, the track pitches are narrowed by reducing effect of a cross-talk of the adjacent tracks by employing land-groove recording. Alternatively, any of the read-only type information storage medium, write-once information storage medium, and rewritable-type information storage medium is featured in that the data bit length and track pitches (corresponding to recording density) of the system lead-in/system lead-out areas SYLDI/SYLDO are greater than those of the data lead-in/data lead-out area DTLDI/DTLDO (in that the recording density is low). The data bit length and track pitches of the system lead-in/system lead-out areas SYLDI/SYLDO are close to the values of the current DVD lead-in area, thereby realizing compatibility with the current DVD. In the present embodiment as well, like the current DVD-R, an emboss step in the system lead-in/system lead-out areas SYLDI/SYLDO of the write-once type information storage medium is shallowly defined. In this manner, there is attained advantageous effect that a depth of a pre-groove of the write-once information storage medium is shallowly defined and a degree of modulation of a reproduction signal from a recording mark formed on a pre-groove by additional writing is increased. In contrast, as a counteraction against it, there occurs a problem that the degree of modulation of the reproduction signal from the system lead-in/system lead-out areas SYLDI/SYLDO decreases. In order to solve this problem, the data bit length (and track pitches) of system lead-in/system lead-out areas SYLDI/SYLDO are roughened and a repetition frequency of pits and spaces at the narrowest position is isolated (significantly reduced) from an optical shutdown frequency of an MTF (Modulation Transfer Function) of a reproduction objective lens, thereby making it possible to increase the reproduction signal amplitude from the system lead-in/system lead-out areas SYLDI/SYLDO and to stabilize reproduction.

FIGS. 35A, 35B and 35C show a comparison of detailed data structure in a system lead-in area SYLDI and a data lead-in area DTLDI in a variety of information storage mediums. FIG. 35A shows a data structure of a read-only type information storage medium; FIG. 35B shows a data structure of a rewritable-type information storage medium; and FIG. 35C shows a data structure of a write-once type information storage medium.

As shown in FIG. 35A, except that only a connection zone CNZ is formed as a mirror surface 210, the read-only type information storage medium is featured in that the emboss pit area 211 having emboss pits formed therein is provided in all of the system lead-in area SYLDI and data lead-in area DTLDI and data area DTA. The emboss pit area 211 is provided in the system lead-in area SYLDI, and the connection zone CNZ is provided in the mirror surface 210. As shown in FIG. 35B, the rewritable-type information storage medium is featured in that the land area and the groove area 213 are formed in the data lead-in area DTLSI and the data area DTA. The write-once type information storage medium is featured in that the groove area 214 is formed in the data lead-in area DTLDI and the data area DTA. Information is recorded by forming a recording mark in the land area and the groove area 213 or groove area 214.

The initial zone INZ indicates a start position of the system lead-in area SYLDI. As significant information recorded in the initial zone INZ, there is discretely arranged data ID (Identification Data) information including information on physical sector numbers or logical sector numbers described previously. As described later, one physical sector records information on a data frame structure composed of data ID, IED (ID Error Detection code), main data for recording user information, and EDC (Error detection code); and the initial zone records information on the above described data frame structure. However, in the initial zone INZ, all the information on the main data for recording the user information is all set to "00h", and thus, the significant information contained in the initial zone INZ is only data ID information. A current location can be recognized from the information on physical sector numbers or logical sector numbers recorded therein. That is, when an information recording/reproducing unit 141 shown in FIG. 11 starts information reproduction from an information storage medium, in the case where reproduction has been started from the information contained in the initial zone INZ, first, the information on physical sector numbers or logical sector numbers recorded in the data ID information is sampled, and the sampled information is moved to the control data zone CDZ while the current location in the information storage medium is checked.

A buffer zone 1 BFZ1 and a buffer zone 2 BFZ2 each are composed of 32 ECC blocks. As shown in FIGS. 32, 33 and 34, one ECC block corresponds to 1024 physical sectors. In the buffer zone 1 BFZ1 and the buffer zone 2 BFZ2 as well, like the initial zone INZ, main data information is set to all "00h".

The connection zone CNZ which exists in a CNA (Connection Area) is an area for physically separating the system lead-in area SYLDI and the data lead-in area DTLDI from each other. This area is provided as a mirror surface on which no emboss pit or pre-groove exists.

An RCZ (Reference code zone) of the read-only type information storage medium and the write-once type information storage medium each is an area used for reproduction circuit tuning of a reproducing apparatus (for automatic adjustment of tap coefficient values at the time of adaptive equalization carried out in the tap controller 332 shown in FIG. 15), wherein information on the data frame structure described previously is recorded. A length of the reference code is one ECC block (=32 sectors). The present embodiment is featured in that the RCZ (Reference code zone) of the read-only type information storage medium and the write-once information storage medium each is arranged adjacent to a DTA (data area). In any of the structures of the current DVD-ROM disk and the current DVD-R disk as well, a control data zone is arranged between the reference code zone and data area, and the reference code zone and the data area are separated from each other. If the reference code zone and data area are separated from each other, a tilt amount or a light reflection factor of the information storage medium or the recording sensitivity of a recording film (in the case of the write-once information storage medium) slightly changes. Therefore, there occurs a problem that an optimal circuit constant in the data area is distorted even if a circuit constant of the reproducing apparatus is adjusted. In order to solve the above described problem, when the RCZ (reference code zone) is arranged adjacent to the DTA (data area), in the case where the circuit constant of the information reproducing apparatus has been optimized in the RCZ (reference code zone), an optimized state is maintained by the same circuit constant in the DTA (data area). In the case where an attempt is made to precisely reproduce a signal in arbitrary location in the DTA (data area), it becomes possible to reproduce a signal at a target position very precisely in accordance with the steps of:

(1) optimizing a circuit constant of the information reproducing apparatus in the RCZ (reference code zone);

(2) optimizing a circuit constant of the information reproducing apparatus again while reproducing a portion which is the closest to the reference code zone RCZ in the data area DTA;

(3) optimizing a circuit constant once again while reproducing information at an intermediate position between a target position in the data area DTA and the position optimized in step (2); and (4) reproducing signal after moving to the target position.

GTZ1 and GTZ2 (guard track zones 1 and 2) existing in the write-once information storage medium and the rewritable-type information storage medium are areas for specifying the start boundary position of the data lead-in area DTLDI, and a boundary position of a drive test zone DRTZ and a disc test zone DKTZ. These areas are prohibited from being recorded a recording mark. The guard track zone 1 GTZ1 and guard track zone 2 GTZ2 exist in the data lead-in area DTLDI, and thus, in this area, the write-once type information storage medium is featured in that the pre-groove area is formed in advance. Alternatively, the rewritable-type information storage medium is featured in that the groove area and the land area are formed in advance. In the pre-groove area or groove area and the land area, as shown in FIGS. 32, 33 and 34, wobble addresses are recorded in advance, and thus, the current location in the information storage medium is determined by using these wobble addresses.

The disk test zone DKTZ is an area provided for manufactures of information storage mediums to carry out quality test (evaluation).

The drive test zone DRTZ is provided as an area for carrying out test writing before the information recording/reproducing apparatus records information in the information storage medium. The information recording/reproducing apparatus carries out test writing in advance in this area, and identifies an optimal recording condition (write strategy). Then, the information contained in the data area DTA can be recorded under the optimal recording condition.

The information recorded in the disk identification zone DIZ which exists in the rewritable-type information storage medium (FIG. 35B) is an optional information recording area, the area being adopted to additionally write a set of drive descriptions composed of: information on manufacturer name of recording/reproducing apparatuses; additional information relating thereto; and an area in which recording can be uniquely carried out by the manufacturers.

A defect management area 1 DMA1 and a defect management area 2 DMA2 which exist in a rewritable-type information storage medium (FIG. 35B) record defect management information contained in the data area DTA, and, for example, substitute site information when a defect occurs or the like is recorded.

In the write-once type information storage medium (FIG. 35C), there exist uniquely: an RMD duplication zone RDZ; a recording management zone RMZ; and an R physical information zone R-PFIZ. The recording management zone RMZ records RMD (recording management data) which is an item of management information relating to a recording position of data updated by additional writing of data. A detailed description will be given later. As described later in FIGS. 36 (*a*), (*b*), (*c*) and (*d*), in the present embodiment, a recording management zone RMZ is set for each bordered area BRDA, enabling area expansion of the recording management zone RMZ. As a result, even if the required recording management data RMD increases due to an increase of additional writing frequency, such an increase can be handled by expanding the recording management zone RMZ in series, and thus, there is attained advantageous effect that the additional writing count can be significantly increased. In this case, in the present embodiment, the recording management zone RMZ is arranged in a border-in BRDI which corresponds to each bordered area BRDA (arranged immediately before each bordered area BRDA). In the present embodiment, the border-in BRDI corresponding to the first bordered area BRDA#1 and a data lead-in area DTLDI are made compatible with each other, and efficient use of the data area DTA is promoted while the forming of the first border-in BRDI in the data area DTA is eliminated. That is, the recording management zone RMZ in the data lead-in area DTA shown in FIG. 35C is utilized as a recording location of the recording management data RDM which corresponds to the first bordered area BRDA#1.

The RMD duplication zone RDZ is a location for recording information on the recording management data RMD which meets the following condition in the recording management zone RMZ, and the reliability of the recording management data RMD is improved by providing the recording management data RMD in a duplicate manner, as in the present embodiment. That is, in the case where the recording management data RMD contained in the recording management zone RMZ is valid due to dust or scratch adhering to a write-once information storage medium surface, the recording management data RMD is reproduced, the data being recorded in this RMD duplication zone RDZ. Further, the remaining required information is acquired by tracing, whereby information on the latest recording management data RMD can be restored.

This RMD duplication zone records recording management data RDM at a time point at which (a plurality of) borders are closed. As described later, a new recording management zone RMZ is defined every time one border is closed and a next new bordered area is set. Thus, every time a new recording management zone RMZ is created, the last recording management data RMD relating to the preceding bordered area may be recorded in this RMD duplication zone RDZ. When the same information is recorded in this RMD duplication zone RDZ every time the recording management data RDM is additionally recorded on a write-once information storage medium, the RMD duplication zone RDZ becomes full with a comparatively small additional recording count, and thus, an upper limit value of the additional writing count becomes small. In contrast, as in the present embodiment, in the case where a recording management zone is newly produced when a border is closed, the recording management zone in the border-in BRDI becomes full, and a new recording management zone RMZ is formed by using an R zone, there is attained advantageous effect that only the last recording management data RMD contained in the past recording management zone RMZ is recorded in the RMD duplication zone RDZ, thereby making it possible to improve an allowable additional writing count by efficiently using the RMD duplication zone RDZ.

For example, in the case where the recording management data RMD contained in the recording management zone RMZ which corresponds to the bordered area BRDA on the way of additional writing (before closed) cannot be reproduced due to the dust or scratch adhering to the surface of the write-once type information storage medium, a location of the bordered area BRDA, which has been already closed, can be identified by reading the recording management data RMD lastly recorded in this RMD duplication zone RDZ. Therefore, the location of the bordered area BRDA on the way of additional writing (before closed) and the contents of information recorded therein can be acquired by tracing another location in the data area DTA of the information storage medium, and the information on the latest recording management data RMD can be restored.

An R physical information zone R-PFIZ records the information analogous to the physical format PFI contained in the control data zone CDZ which exists common to FIGS. 35A to 35C (described later in detail).

Figure 36:
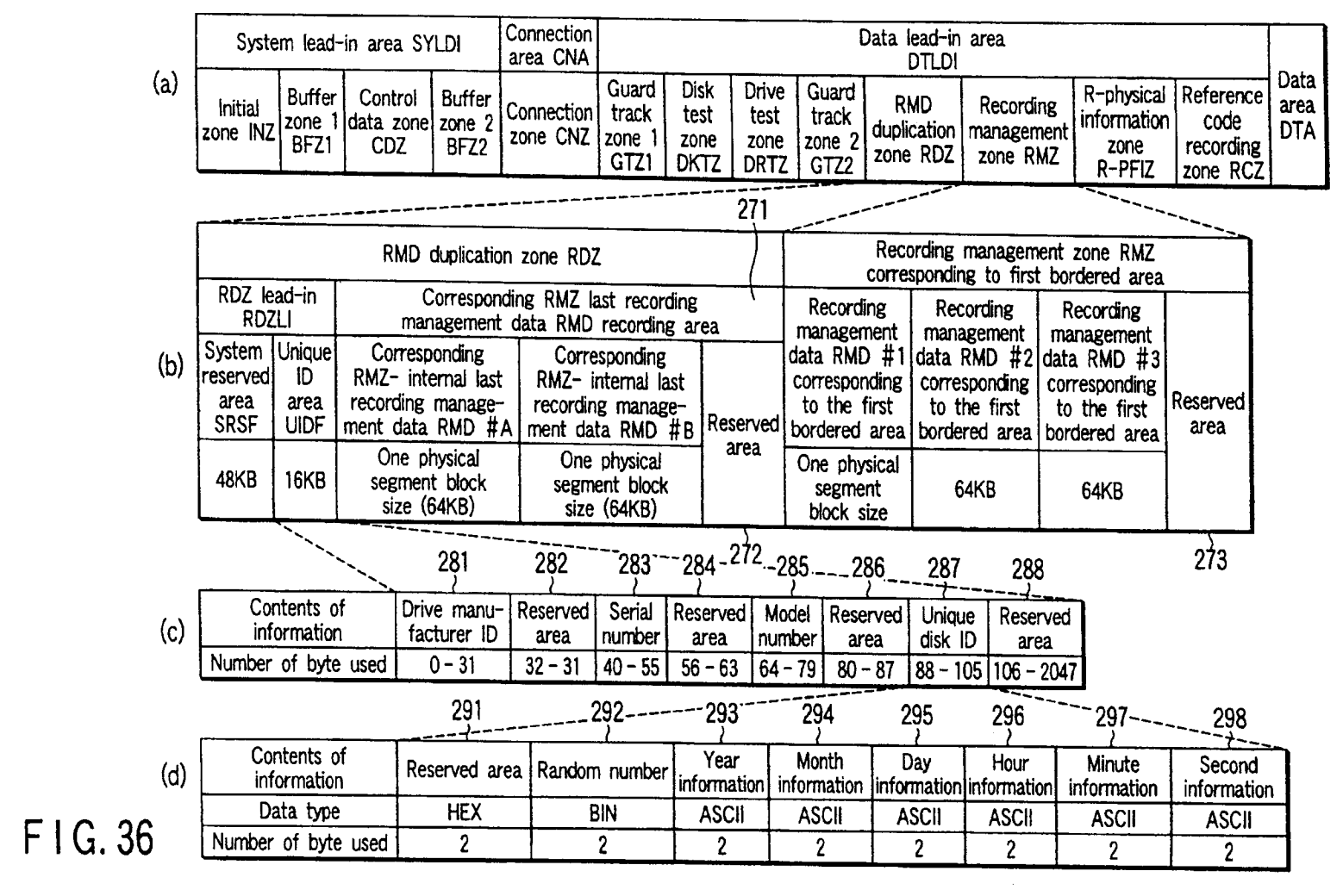

FIG. 36 shows a data structure in the RMD duplication zone RDZ and the recording management zone RMZ which exists in the write-once type information storage medium (FIG. 35C). FIG. 36 (*a*) shows the same structure as that shown in FIG. 35C, and FIG. 36 (*b*) shows an enlarged view of the RMD duplication zone RDZ and the recording management zone RDZ shown in FIG. 35C. As described above, in the recording management zone RMZ contained in the data lead-in area DTLDI, data relating to recording management which corresponds to the first bordered area BRDA is collectively recorded, respectively, in one items of recording management data (RMD); and new recording management data RMD is sequentially additionally written at the back side every time the contents of the recording management data RMD generated when additional writing process has been carried out in the write-once information storage medium are updated. That is, the RMD (Recording Management Data) is recorded in size units of single physical segment block (a physical segment block will be described later), and new recording management data RMD is sequentially additionally written every time the contents of data are updated. In the example shown in FIG. 36 (*b*), a change has occurred with management data in location recording management data RMD#1 and RMD#2 has been recorded. Thus, this figure shows an example in which the data after changed (after updated) has been recorded as recording management data RMD#3 immediately after the recording management data RMD#2. Therefore, in the recording management zone RMD, a reserved area 273 exists so that additional writing can be further carried out.

Although FIG. 36 (*b*) shows a structure in the recording management zone RMZ which exists in the data lead-in area DTLDI, a structure in the recording management zone RMZ (or expanded recording management zone: referred to as expanded RMZ) which exists in the border-in BRDI or bordered area BRDA described later is also identical to the structure shown in FIG. 36 (*b*) without being limited thereto.

In the present embodiment, in the case where a first bordered area BRDA#1 is closed or in the case where the terminating process (finalizing) of the data area DTA is carried out, a processing operation for padding all the reserved area 273 shown in FIG. 36 (*b*) with the latest recording management data RMD duplication zone is carried out. In this manner, the following advantageous effects are attained:

(1) An "unrecorded" reserved area 273 is eliminated, and the stabilization of tracking correction due to a DPD (Differential Phase Detection) technique is guaranteed;

(2) the latest recording management data RMD is overwritten in the past reserved area 273, thereby remarkably improving the reliability at the time of reproduction relating to the last recording management data RMD; and (3) an event that different items of recording management data RMD are mistakenly recorded in an unrecorded reserved area 273 can be prevented.

The above processing method is not limited to the recording management zone RMZ contained in the data lead-in area DTLDI. In the present embodiment, with respect to the recording management zone RMZ (or expanded recording management zone: referred to as expanded RMZ) which exists in the border-in BRDI or bordered area BRDA described later, in the case where the corresponding bordered area BRDA is closed or in the case where the terminating process (finalizing) of the data area DTA is carried out, a processing operation for padding all the reserved area 273 shown in FIG. 36 (*b*) with the latest recording management data RMD is carried out.

The RMD duplication zone RDZ is divided into the RDZ lead-in area RDZLI and a recording area 271 of the last recording management data RMD duplication zone RDZ of the corresponding RMZ. The RDZ lead-in area RDZLI is composed of a system reserved field SRSF whose data size is 48 KB and a unique ID field UIDF whose data size is 16 KB, as shown in FIG. 36 (*b*). All "00h" are set in the system reserved field SRSF.

The present embodiment is featured in that DRZ lead-in area RDZLI is recorded in the data lead-in area DTLDI which can be additionally written. In the write-once type information storage medium according to the present embodiment, the medium is shipped with the RDZ lead-in area RDZLI being in an unrecorded state immediately after manufacturing. In the user's information recording/reproducing apparatus, at a stage of using this write-once type information storage medium, RDZ lead-in area RDZLI information is recorded. Therefore, it is determined whether or not information is recorded in this RDZ lead-in area RDZLI immediately after the write-once type information storage medium has been mounted on the information recording/reproducing apparatus, thereby making it possible to easily know whether or not the target write-once type information storage medium is in a state immediately after manufacturing/shipment or has been used at least once. Further, as shown in FIG. 36, the present embodiment is secondarily featured in that the RMD duplication zone RDZ is provided at the inner periphery side than the recording management zone RMZ which corresponds to a first bordered area BRDA, and the RDZ lead-in RDZLI is arranged in the RMD duplication zone RDZ.

The use efficiency of information acquisition is improved by arranging information (RDZ lead-in area RDZLI) representing whether or not the write-once type information storage medium is in a state immediately after manufacturing/shipment or has been used at least once in the RMD duplication zone RDZ used for the purpose of a common use (improvement of reliability of RMD). In addition, the RDZ lead-in area RDZLI is arranged at the inner periphery side than the recording management zone RMZ, thereby making it possible to reduce a time required for acquisition of required information. When the information storage medium is mounted on the information recording/reproducing apparatus, the information recording/reproducing apparatus starts reproduction from the burst cutting area BCA arranged at the innermost periphery side, as described in FIG. 31, and sequentially changes a reproducing location from the system lead-in SYLSI to the data lead-in area DTLDI while the reproduction position is sequentially moved to the innermost periphery side. It is determined whether or not information has been recorded in the RDZ lead-in area RDZLI contained in the RMD duplication zone RDZ. In a write-once type information storage medium in which no recording is carried out immediately after shipment, no recording management data RMD is recorded in the recording management zone RMZ. Thus, in the case where no information is recorded in the RDZ lead-in area RDZLI, it is determined that the medium is "unused immediately after shipment", and the reproduction of the recording management zone RMD can be eliminated, and a time required for acquisition of required information can be reduced.

As shown in FIG. 36 (*c*), a unique ID area UIDF records information relating to an information recording/reproducing apparatus for which the write-once type information storage medium immediately after shipment has been first used (i.e., for which recording has been first started). That is, this area records a drive manufacturer ID 281 of the information recording/reproducing apparatus or serial number 283 and model number 284 of the information recording/reproducing apparatus. The unique ID area UIDF repeatedly records the same information for 2 KB (strictly, 2048 bytes) shown in FIG. 36 (*c*). Information contained in the unique disk ID 287 records year information 293, month information 294, date information 295, time information 296, minutes information 297, and seconds information 298 when the storage medium has been first used (recording has been first started). A data type of respective items of information is described in HEX, BIN, ASCII as described in FIG. 36 (*d*), and two types or four bytes are used.

The present embodiment is featured in that the size of an area of this RDZ lead-in area RDZLI and the size of the one recording management data RMD are 64 KB, i.e., the user data size in one ECC block becomes an integer multiple. In the case of the write-once type information storage medium, it is impossible to carry out a processing operation for rewriting ECC block data after changed in the information storage medium after changing part of the data contained in one ECC block. Therefore, in particular, in the case of the write-once type information storage medium, as described later, data is recorded in recording cluster units composed of an integer multiple of a data segment including one ECC block. Therefore, the size of the area of the RDZ lead-in area RDZLI and the size of such one item of recording management data RMD are different from a user data size in an ECC block, there is a need for a padding area or a stuffing area for making adjustment to the recording cluster unit, and a substantial recording efficiency is lowered. As in the present embodiment, the size of the area of the RDZ lead-in area RDZLI and the size of such one item of recording management data RMD are set to an integer multiple of 64 KB, thereby making it possible to lower the recording efficiency.

A description will be given with respect to a last recording management data RMD recording area 271 of the corresponding RMZ shown in FIG. 36 (*b*). As described in Japanese Patent No. 2621459, there is a method for recording intermediate information at the time of interruption of recording inwardly of the lead-in area. In this case, every time recording is interrupted or every time an additional writing process is carried out, it is necessary to serially additionally write intermediate information in this area (recording management data RMD in the present embodiment). Thus, if such recording interruption or additional writing process is frequently repeated, there is a problem that this area becomes full immediately and a further adding process cannot be carried out. In order to solve this problem, the present embodiment is featured in that an RMD duplication zone RDZ is set as an area capable of recording the recording management data RMD updated only when a specific condition is met and the recording management data RMD sampled under such a specific condition is recorded. Thus, there is attained advantageous effect that the RMD duplication zone RDZ can be prevented from being full and the numbers of additional writings enable with respect to the write-once type information storage medium can be remarkably improved by lowering the frequency of the recording management data RMD additionally written in the RMD duplication zone RDZ. In parallel to this effect, the recording management data updated every time an additional writing process is carried out is serially additionally written in the recording management zone RMZ in the border-in area BRDI shown in FIG. 36 (a) (in the data lead-in area DTLDI as shown in FIG. 36 (a) with respect to the first bordered area BRDA#1) or the recording management zone RMZ utilizing an R zone described later. When a new recording management zone RMZ is created, for example, when the next bordered area BRDA is created (new border-in area BRDI is set) or when a new recording management zone RMZ is set in an R zone, the last recording management data RMD (the newest RMD in a state immediately before creating a new recording management zone RMZ) is recorded in (the corresponding last recording management data RMD recording area 271) contained in the RMD duplication zone RDZ. In this manner, there is attained advantageous effect that a newest RMD position search is facilitated by utilizing this area in addition to a significantly increase of additional writing enable count for the write-once type information storage medium.

FIG. 38 shows a data structure in the recording management data RMD shown in FIG. 36. FIG. 38 shows the same contents of FIG. 36. As described previously, in the present embodiment, the border-in area BRDI for the first bordered area BRDA#1 is partially compatible with the data lead-in area DTLDI, and thus, the recording management data RMD#1 to #3 corresponding to the first bordered area are recorded in the recording management zone RMZ in the data lead-in area DTLDI. In the case where no data is recorded in the data area DTA, the inside recording management zone RMZ is provided as a reserved area 273 in which all data is in an unrecorded state. The recording management data RMD updated every time data is additionally written in the data area DTA is recorded in first location contained in this reserved area 273, and the corresponding recording management data RMD is sequentially additionally written in the first bordered area contained in the recording management zone RMZ. The size of the recording management data RMD additionally written each time in the recording management zone RMZ is defined as 64 KB. In the present embodiment, one ECC block is composed of 64 KB data, and thus, an additional writing process is simplified by adjusting the data size of this recording management data RMD to conform with one ECC block size. As described later, in the present embodiment, one data segment 490 is configured by adding part of a guard area before and after one ECC block data 412, and recording clusters 540 and 542 in units of additional writing or rewriting are configured by adding expanded guard fields 258 and 259 to one or more (n) data segments. In the case of recording the recording management data RMD, the recording clusters 540 and 542 including only one data segment (one ECC block) are sequentially additionally written in this recording management zone RMZ. As described later, a length of a location for recording one data segment 531 corresponds to that of one physical segment block composed of seven physical segments 550 to 556.

FIG. 38 (c) shows a data structure in one recording management data RMF#1. FIG. 38 (c) shows a data structure in recording management data RMD#1 contained in the data lead-in area DTLDI. The illustrated data structure is identical to a data structure in the recording management data RMD#A and #B (FIG. 36 (b)) recorded in the RMD duplication zone RDZ; (expanded) recording management data RMD recorded in a border-in area BRDI described later; (expanded) recording management data RMD recorded in an R zone; and copy CRMD of RMD recorded in the border-out area BRDO (FIG. 39 (d)) as well. As shown in FIG. 38 (c), one item of recording management data RMD is composed of a reserved area and RMD fields ranging from "0" to "21". In the present embodiment, 32 physical sectors are included in one ECC block composed of 64 KB user data, and user data of 2 KB (strictly, 2048 bytes) is recorded in one physical sector. Each RMD field are assigned by 2048 bytes in conformance to a user data size recorded in this physical sector, and relative physical sector numbers are set. RMD fields are recorded on a write-once type information storage medium in order of these relative physical sector numbers. The contents of data recorded in each RMD field are as follows:

RMD field 0 ... Information relating to disk state and data area allocation (information relating to location for allocating a variety of data in data area)

RMD field 1 ... Information relating to used test zone and information relating to recommended recording waveform RMD field 2 ... User available area RMD field 3 ... Start position information on border area and information relating to expanded RMZ position EMD fields 4 to 21 ... Information relating to position of R zone As shown in FIG. 35 in any of the read-only type, write-once type, and rewritable-type information storage medium, the present embodiment is featured in that a system lead-in area is arranged at an opposite side of a data area while a data lead-in area is sandwiched between the two areas, and further, as shown in FIG. 31, the burst cutting area BCA and the data lead-in area DTLDI are arranged at an opposite side to each other while the system lead-in area SYSDI is sandwiched between the two areas. When an information storage medium is inserted into the information reproducing apparatus or information recording/reproducing apparatus shown in FIG. 11, the information reproducing apparatus or information recording/reproducing apparatus carries out processing in accordance with the steps of:

(1) reproducing information contained in the burst cutting area BCA;

(2) reproducing information contained in the information data zone CDZ contained in the system lead-in area SYLDI;

(3) reproducing information contained in the data lead-in area DTLDI (in the case of a write-once type or a rewritable-type medium);

(4) readjusting (optimizing) a reproduction circuit constant in the reference code zone RCZ; and (5) reproducing information recorded in the data area DTA or recording new information.

As shown in FIG. 35, information is sequentially arranged from the inner periphery side along the above processing steps, and thus, a process for providing an access to an unnecessary inner periphery is eliminated, the number of accesses is reduced, and the data area DTA can be accessed. Thus, there is attained advantageous effect that a start time for reproducing the information recording in the data area or recording new information is accelerated. In addition, RPML is used for signal reproduction in the data lead-in area DTDLI and data area DTA by utilizing a slice level detecting system for signal reproduction in the system lead-in area SYLDI. Thus, if the data lead-in area DTLDI and the data area DTA are made adjacent to each other, in the case where reproduction is carried out sequentially from the inner periphery side, a signal can be stably reproduced continuously merely by switching a slice level detecting circuit to a PRML detector circuit only once between the system lead-in area SYLDI and the data lead-in area DTLDI. Thus, the number of reproduction circuit switchings along the reproduction procedures is small, thus simplifying processing control and accelerating a data intra-area reproduction start time.

FIG. 37 shows a comparison of the data structures in the data areas DTA and the data lead-out areas DTLDO in a variety of information storage mediums. FIG. 37(*a*) shows a data structure of a read-only type information storage medium; FIGS. 37(*b*) and 37(*c*) each show a data structure of a writing-type information storage medium; and FIGS. 37(*d*) to 37(*f*) each show a data structure of a write-once type information storage medium. In particular, FIGS. 37(*b*) and 37(*d*) each show a data structure at the time of an initial state (before recording); and FIGS. 37(*c*), 37(*e*) and 37(*f*) each show a data structure in a state in which recording (additional writing or rewriting) has advanced to a certain extent.

As shown in FIG. 37(*a*), in the read-only type information storage medium, the data recorded in the data lead-out area DTLDO and the system lead-out area SYLDO each have a data frame structure (described later in detail) in the same manner as in the buffer zone 1 BFZ1 and buffer zone 2 BFZ2 shown in FIGS. 35(*a*) to 35(*c*), and all values of the main data contained therein are set to "00h". In the read-only type information storage medium, a user data prerecording area 201 can be fully used in the data area DTA. However, as described later, in any of the embodiments of the write-once information storage medium and rewritable-type information storage medium as well, user rewriting/additional writing enable ranges 202 to 205 are narrower than the data area DTA.

In the write-once information storage medium or rewritable-type information storage medium, an SPA (Spare Area) is provided at the innermost periphery of the data area DTA. In the case where a defect has occurred in the data area DTA, a substituting process is carried out by using the spare area SPA. In the case of the rewritable-type information storage medium, the substitution history information (defect management information) is recorded in a defect management area 1 (DMA1) and a defect management area 2 (DMA2) shown in FIG. 35(*b*); and a detect management area 3 (DMA3) and a defect management area (DMA4) shown in FIGS. 37(*b*) and 37(*c*). The defect management information recorded in the defect management area 3 (DMA3) and defect management area 4 (DMA4) shown in FIGS. 37(*b*) and 37(*c*) are recorded as the same contents of the defect management information recorded in the defect management information 1 (DMA1) and defect management information 2 (DMA2) shown in FIG. 35B. In the case of the write-once type information storage medium, substitution history information (defect management information) in the case where the substituting process has been carried out is recorded in the data lead-in area DTLDI shown in FIG. 35C and copy information CRMZ on the contents of recoding in a recording management zone which exists in a border zone. Although defect management has not been carried out in a current DVD-R disk, DVD-R disks partially having a defect location are commercially available as the manufacture number of DVD-R disks increases, and there is a growing need for improving the reliability of information recorded in a write-once type information storage medium. In the embodiment shown in FIGS. 37A to 37F, a spare area SPA is set with respect to the write-once information storage medium, enabling defect management by a substituting process. In this manner, a defect management process is carried out with respect to the write-once type information storage medium partially having a defect location, thereby making it possible to improve the reliability of information. In the rewritable-type information storage medium or write-once type information storage medium, in the case where a defect frequently has occurred, a user judges an information recording/reproducing apparatus, and an ESPA, ESPA1, and ESPA2 (Expanded Spare Areas) are automatically set with respect to a state immediately after selling to the user shown in FIGS. 37A and 37D so as to widen a substitute location. In this manner, the expanded spare areas ESPA, ESPA1, and ESPA2 can be set, thereby making it possible to sell mediums with which a plenty of defects occur for a manufacturing reason. As a result, the manufacture yield of mediums is improved, making it possible to reduce a medial price. As shown in FIGS. 37A, 37E and 37F, when the expanded spare areas ESPA, ESPA1, and ESPA2 are expanded in the data area DTA, user data rewriting or additional writing enable ranges 203 and 205 decrease(s), thus making it necessary to management its associated positional information. In the rewritable-type information storage medium, the information is recorded in the defect management area 1 (DMA1) to the defect management area 4 (DMA4) and in the control data zone CDZ, as described later. In the case of the write-once type information storage medium, as described later, the information is recorded in recording management zones RMZ which exist in the data lead-in area DTLDI and in the border-out BRDO. As described later, the information is recorded in the RMD (Recording Management Data) contained in the recording management zone RMZ. The recording management data RMD is updated or additionally written in the recoding management zone RMZ every time the contents of management data are updated. Thus, even if an expanded spare area is reset many times, timely updating and management can be carried out. (The embodiment shown in FIG. 37E indicates a state in which an expanded spare area 2 (ESPA2) has been set because further area substituting setting is required due to a number of defects even after the expanded spare area 1 (ESPA1) has been fully used).

A guard track zone 3 (GTZ3) shown in FIGS. 37B and 37C each is arranged to separate a defect management area 4 (DMA4) and a drive test zone (DRTS) from each other, and a guard track zone 4 (GTZ4) is arranged to separate a disk test zone DKTZ and a servo calibration zone SCZ from each other. The guard track zone 3 (GTZ3) and guard track zone 4 (GTZ4) are specified as area which inhibits recording by forming a recording mark, as in the guard track zone 1 (GTZ1) and guard track zone 2 (GTZ2) shown in FIGS. 35A to 35C. The guard track zone 3 (GTZ3) and the guard track zone 4 (GTZ4) exist in the data lead-out area DTLDO. Thus, in these areas, in the write-once type information storage medium, a pre-groove area is formed in advance, or alternatively, in the rewritable-type information storage medium, a groove area and a land area are formed in advance. As shown in FIGS. 32 to 34, wobble addresses are recorded in advance in the pre-groove area or the groove area and land area, thus judging a current position in the information storage medium by using this wobble addresses.

As in FIGS. 35A to 35C, a drive test zone DRTZ is arranged as an area for test writing before an information recording/reproducing apparatus records information in an information storage medium. The information recording/reproducing apparatus carries out test writing in advance in this area, and identifies an optimal recording condition (write strategy). Then, this apparatus can record information in the data area DTA under the optimal recording condition.

As shown in FIGS. 35A to 35C, the disk test zone DKTZ is an area provided for manufacturers of information storage mediums to carry out quality test (evaluation).

In all of the areas contained in the data lead-out area DTLDO other than the SCZ (Servo Calibration Zone), a pre-groove area is formed in advance in the write-once type information storage medium, or alternatively, a groove area and a land area are formed in advance in the rewritable-type information storage medium, enabling recording (additional writing or rewriting) of a recording mark. As shown in FIGS. 37C and 37E, the SCZ (Servo Calibration Zone) serves as an emboss pit area 211 in the same manner as in the system lead-in area SYLDI instead of the pre-groove area 214 or the land area and groove area 213. This area forms continuous tracks with emboss pits, which follows another area of the data lead-out area DTLDO. These tracks continuously communicate with each other in a spiral manner, and form emboss pits over 360 degrees along the circumference of the information storage medium. This area is provided to detect a tilt amount of the information storage medium by using a DPD (Deferential Phase Detect) technique. If the information storage medium tilts, an offset occurs with a track shift detection signal amplitude using the DPD technique, making it possible to precisely the tilt amount from the offset amount and a tilting direction in an offset direction. By utilizing this principle, emboss pits capable of DPD detection are formed in advance at the outermost periphery (at the outer periphery in the data lead-out area DTLDO), thereby making it possible to carry out detection with inexpensiveness and high precision without adding special parts (for tilt detection) to an optical head which exists in the information recording/reproducing unit 141 shown in FIG. 11. Further, by detecting the tilt amount of the outer periphery, servo stabilization (due to tilt amount correction) can be achieved even in the data area. In the present embodiment, the track pitches in this servo calibration zone SCZ are adjusted to conform with another area contained in the data lead-out area DTLD, and the manufacturing performance of the information storage medium is improved, making it possible to reduce a media price due to the improvement of yields. That is, although a pre-groove is formed in another area contained in the data lead-out area DTLDO in the write-once type information storage medium, a pre-groove is created while a feed motor speed of an exposure section of an original master recording device is made constant at the time of original master manufacturing of the write-once type information storage medium. At this time, the track pitches in the servo calibration zone SCZ are adjusted to conform with another area contained in the data lead-out area DTLDO, thereby making it possible to continuously maintain a motor speed constantly in the servo calibration zone SCZ as well. Thus, the pitch non-uniformity hardly occurs, and the manufacturing performance of the information storage medium is improved.

Another embodiment includes a method for adjusting at least either of the track pitches and data bit length in the servo calibration zone SCZ to conform with the track pitches or data bit length of the system lead-in area SYLDI. As described previously, the tilt amount in the servo calibration zone SCZ and its tilt direction are measured by using the DPD technique, and the measurement result is utilized in the data area DTA as well, thereby promoting servo stabilization in the data area DTA. A method for predicting a tilt amount in the data area DTA is featured in that the tilt amount in the system lead-in area SYLDI and its direction are measured in advance by using the DPD technique similarly, and a relationship with the measurement result in the servo calibration zone SCZ is utilized, thereby making it possible to predict the tilt amount.

In the case of using the DPD technique, the present embodiment is featured in that the offset amount of the detection signal amplitude relevant to a tilt of the information storage medium and a direction in which an offset occurs, change depending on the track pitches and data bit length of emboss pits. Therefore, there is attained advantageous effect that at least either of the track pitches and data bit length in the servo calibration zone SCZ is adjusted to conform with the track pitches or data bit length of the system lead-in area SYLDI, whereby the detection characteristics relating to the offset amount of the detection signal amplitude and the direction in which an offset occurs are made coincident with each other depending on the servo calibration zone SCZ and the system lead-in area SYLDI; a correlation between these characteristics is easily obtained, and the tilt amount and direction in the data area DTA is easily predicted.

As shown in FIGS. 35C and 37D, in the write-once type information storage medium, two drive test zones DRTZ are provided at the inner periphery side and the outer periphery side of the medium. As more test writing operations are carried out for the drive text zones DRTZ, parameters are finely assigned, thereby making it possible to search an optimal recording condition in detail and to improve the precision of recording in the data area DTA. The rewritable-type information storage medium enables reuse in the drive test zone DRTZ due to overwriting. However, if an attempt is made to enhance the recording precision by increasing the number of test writings in the write-once type information storage medium, there occurs a problem that the drive test zone is used up immediately. In order to solve this problem, the present embodiment is featured in that an EDRTZ (Expanded Drive Test Zone) can be set from the outer periphery to the inner periphery direction, making it possible to extend a drive test zone. In the present embodiment, features relating to a method for setting an expanded drive test zone and a method for carrying out test writing in the set expanded drive test zone are described below.

1. The setting (framing) of expanded drive test zones EDRTZ are sequentially provided collectively from the outer periphery direction (close to the data lead-out area DTLDO) to the inner periphery side.

As shown in FIG. 37E, the expanded drive test zone 1 (EDRTZ1) is set as an area collected from a location which is the closest to the outer periphery in the data area (which is the closest to the data lead-out area DTLDO); and the expanded drive test zone 1 (EDRTZ1) is used up, thereby making it possible to secondarily set the expanded drive test zone 2 (EDRTZ2) as a corrected area which exists in the inner periphery side than the current position.

2. Test writing is sequentially carried out from the inner periphery side in the expanded dive test zone DDRTZ.

In the case where test writing is carried out in the expanded drive test zone EDRTZ, such test writing is carried out along a groove area 214 arranged in a spiral shape from the inner periphery side to the outer periphery side, and current test writing is carried out for an unrecorded location that immediately follows the previously test-written (recorded) location.

The data area is structured to be additionally written along the groove area 214 arranged in a spiral manner from the inner periphery side to the outer periphery side. A processing operation from "checking immediately test-written location" to "carrying out current test writing" can be serially carried out by using a method for sequentially carrying out additional writing a location that follows a test writing location in which test writing in the expanded drive test zone has been carried out immediately before, thus facilitating a test writing process and simplifying management of the test-written location in the expanded drive test zone EDRTZ.

3. The data lead-out area DTLDO can be reset in the form including the expanded drive test zone.

FIG. 37E shows an example of setting two areas, i.e., an expanded spare area 1 (ESPA1) and an expanded spare area 2 (ESPA2) in the data area DTA and setting two areas, i.e., the expanded drive test zone 1 (EDRTZ1) and expanded drive test zone 2 (EDRTZ2). In this case, as shown in FIG. 37F, the present embodiment is featured in that the data lead-out area DTLO can be reset with respect to an area including up to the expanded drive test zone 2 (EDRTZ2). Concurrently, the range of data area DTA is reset in a range-narrowed manner, making it easy to manage an additional writing enable range 205 of the user data which exists in the data area DTA. In the case where the resetting has been provided as shown in FIG. 37F, a setting location of the expanded spare area 1 (ESPA1) shown in FIG. 37E is regarded as an "expanded spare area which has already been used up", and an unrecorded area (area enabling additional test writing) is managed only in the expanded spare area 2 (ESPA2) contained in the expanded drive test zone EDRTZ if any. In this case, non-defect information which is recorded in the expanded spare area 1 (ESPA1) and which has been used up for substitution is transferred to a location of an area which is not substituted in the expanded spare area 2 (ESPTA2), and defect management information is rewritten. The start position information on the reset data lead-out area DTLDO is recorded in allocation position information on the latest (updated) data area DTA of RMD field 0 contained in the recording management data RMD, as shown in FIG. 44.

A structure of a border area in a write-once type information storage medium will be described here with reference to FIG. 40. When one border area has been first set in the write-once information storage medium, an bordered area (Bordered Area) BRDA#1 is set at the inner periphery size (which is the closest to the data lead-in area DTLDI), as shown in FIG. 40 (a), and then, a border out (Border out) BRDO that follows the above area is formed.

Further, in the case where an attempt is made to set a next bordered area (Bordered Area) BRDA#2, as shown in FIG. 40 (b), a next (#1) border in area BRDI that follows the preceding #1 border out area BRDO is formed, and then, a next bordered area BRDA#2 is set. In the case where an attempt is made to close the next bordered area BRDA#2, a (#2) border out area BRDO that immediately follows the area BRDA#2 is formed. In the present embodiment, a state in which the next ((#1) border in area BRDI) that follows the preceding (#1) border out area BRDO is formed and combined is referred to as a border zone BRDZ. The border zone BRDZ is set to prevent an optical head from overrun between the bordered areas BRDAs when reproduction has been carried out by using the information reproducing apparatus (on the presumption that the DPD detecting technique is used). Therefore, in the case where a write-once type information storage medium having information recorded therein is reproduced by using a read-only apparatus, it is presumed that a border close process is made such that the border out area BRDO and border-in area BRDI are already recorded and the border out area BRDO that follows the last bordered area BRDA is recorded. The first bordered area BRDA#1 is composed of 4080 or more physical segment blocks, and there is a need for the first bordered area BRDA#1 to have a width of 1.0 m or more in a radial direction on the write-once type information storage medium. FIG. 40 (b) shows an example of setting an expanded drive test zone EDRTZ in the data area DTA.

FIG. 40 (c) shows a state obtained after finalizing a write-once information storage medium. FIG. 40 (c) shows an example in which an expanded drive test zone EDRTZ is incorporated in the data lead-out area DTLDO, and further, an expanded spare area ESPA has been set. In this case, a user data adding enable range 205 is fully padded with the last border out area BRDO.

FIG. 40 (d) shows a detailed data structure in the border zone area BRDZ described above. Each item of information is recorded in size units of one physical segment blocks (physical segment block). Copy information C_RMZ on the contents recorded in a recording management zone is recorded at the beginning of the border out area BRDO, and a border end mark (Stop Block) STB indicating the border out area BRDOP is recorded. Further, in the case the next border in area BDI is reached, a first mark (Next Border Marker) NBM indicating that a next border area reaches an "N1-th" physical segment block counted from a physical segment block in which the border end mark (Stop Block) STC has been recorded; a second mark NBM indicating that a next border region reaches an "N2-th" physical segment block; and a third mark NBM indicating that a next border region reaches an "N3-th" mark NBM are discretely recorded in a total of three locations on a size by size basis of one physical segment block, respectively. Updated physical format information U_PFI is recorded in the next border-in area BRDI. In a current DVD-R or a DVD-RW disk, in the case where a next border is not reached (in the last border out area BRDO), a location in which "a mark NBM indicating a next border" should be recorded (a location of one physical segment block size) shown in FIG. 40 (d) is maintained as a "location in which no data is recorded". If border closing is carried out in this state, this write-once type information storage medium (current DVD-R or DVD-RW disk) enters a state in which reproduction can be carried out by using a conventional DVD-ROM drive or a conventional DVD player. The conventional DVD-ROM drive or the conventional DVD player utilizes a recording mark recorded on this write-once type information storage medium (current DVD-R or DVD-RW disk) to carry out track shift detection using the DPD (Differential Phase Detect) technique. However, in the above described "location in which no data is recorded", a recording mark does not exist over one physical segment block size, thus making it impossible to carry out track shift detection using the DPD (Differential Phase Detect) technique. Thus, there is a problem that a track servo cannot be stably applied. In order to solve the above described problem with the current DVD-R or DVD-RW disk, the present embodiment newly employed methods for:

(1) in the case where a next border area is reached, recording data on a specific pattern in advance in a "location in which the mark NBM indicating a next border should be recorded"; and (2) carrying out an "overwriting process" in a specific recording pattern partially and discretely with respect to a location indicating "the mark NBM indicating a next border" in which, in the case where a next border area is reached, the data on the specific pattern is recorded in advance, thereby utilizing identification information indicating that "a next border area is reached".

By setting a mark indicating a next border due to overwriting, there is attained advantageous effect that, even in the case where a next border area is reached as shown in item (1), a recording mark of a specific pattern can be formed in advance in a "location in which the mark NBM indicating a next border should be recorded", and, after border closing, even if a read-only type information reproducing apparatus carries out track shift detection in accordance with the DPD technique, a track servo can be stably applied. If a new recording mark is overwritten partially on a portion at which a recording mark has already been formed in a write-once type information storage medium, there is a danger that the stability of a PLL circuit shown in FIG. 11 is degraded in an information recording/reproducing apparatus or an information reproducing apparatus. In order to overcome this danger, the present embodiment further newly employs methods for:

(3) when overwriting is carried out at a position of "the mark NBM indicating a next border" of one physical segment block size, changing an overwrite state depending on a location contained in the same data segment;

(4) partially carrying out overwriting in a sync data 432 and disabling overwriting on a sync code 431; and (5) carrying out overwriting in a location excluding data ID and IED.

As described later in detail, data fields 411 to 418 for recording user data and guard areas 441 to 448 are alternately recorded on an information storage medium. A group obtained by combining the data fields 411 to 418 and the guard areas 441 to 448 is called a data segment 490, and one data segment length coincides with one physical segment block length. The PLL circuit 174 shown in FIG. 11 facilitates PLL lead-in in VFO areas 471 and 472 in particular. Therefore, even if PLL goes out immediately before the VFO areas 471 and 472, PLL re-lead-in is easily carried out by using the VFO areas 471 and 472, thus reducing an effect on a whole system in the information recording/reproducing apparatus or information reproducing apparatus. There is attained advantageous effect that (3) an overwrite state is changed depending on a location in a data segment internal location, as described above, by utilizing this state, and an overwrite amount of a specific pattern is increased at a back portion close to the VFO areas 471 and 472 contained in the same data segment, thereby making it possible to facilitate judgment of "a mark indicating a next border" and to prevent degradation of the precision of a signal PLL at the time of reproduction. As described in detail with respect to FIGS. 83 (a) to 83 (f) and FIGS. 62 (a) and 62 (b), one physical sector is composed of a combination of a location in which sync codes (SY0 to SY3) are arranged and the sync data 434 arranged between these sync codes 433. The information recording/reproducing apparatus or the information recording apparatus samples sync codes 43 (SY0 to SY3) from a channel bit pattern recorded on the information storage medium, and detects a boundary of the channel bit pattern. As described later, position information (physical sector numbers or logical sector numbers) on the data recorded on the information storage medium is sampled from data ID information. A data ID error is sensed by using an IED arranged immediately after the sampled information. Therefore, the present embodiment enables (5) disabling overwriting on data ID and IED and (4) partially carrying out overwriting in the sync data 432 excluding the sync code 431, thereby enabling detection of a data ID position and reproduction (content-reading) of the information recorded in data ID by using the sync code 431 in the "mark NMB indicating a next border".

Figure 39:
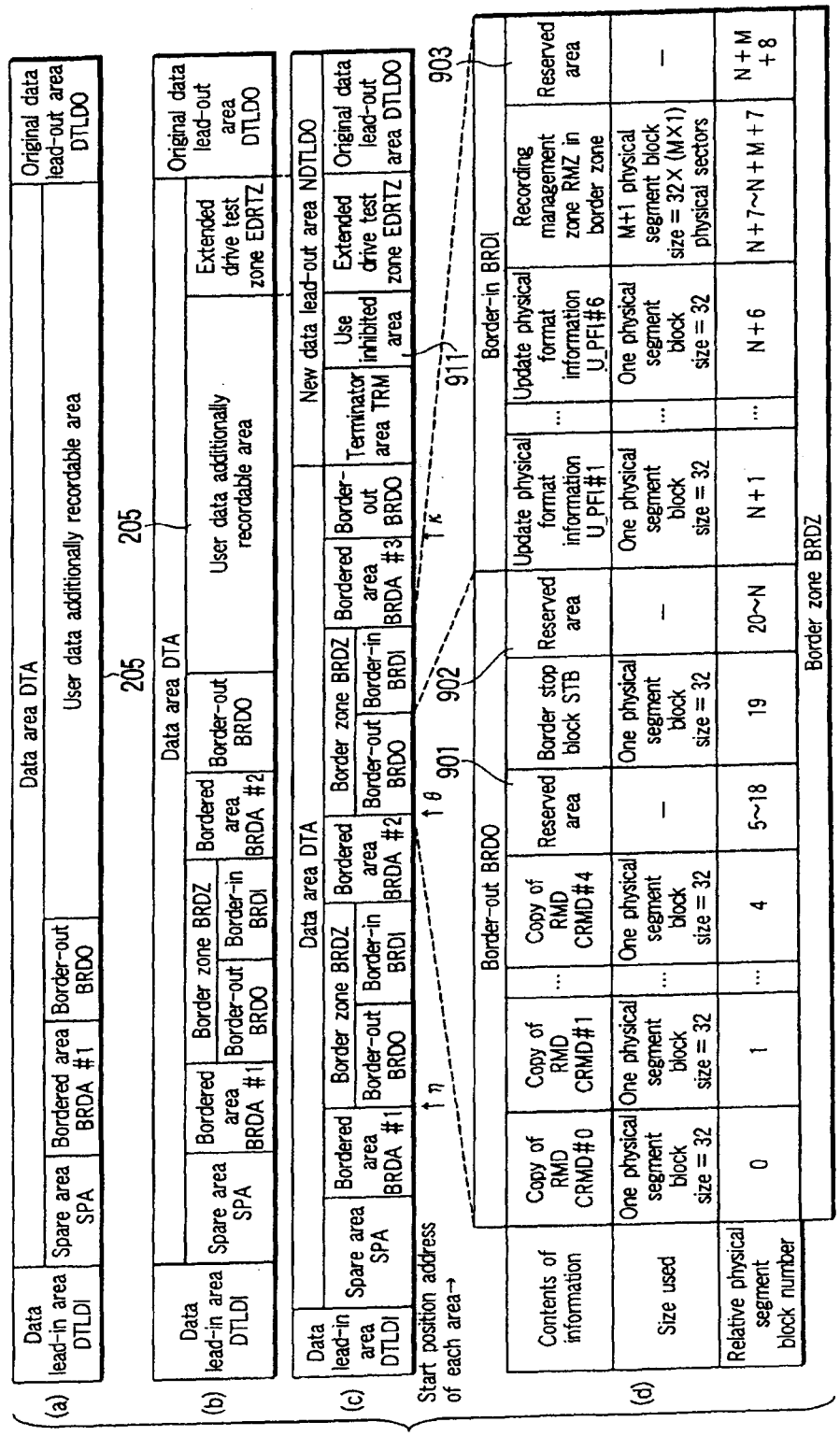
FIG. 39 is an exemplary view showing a structure of a border area in a write-once type information storage medium different from that in FIG. 38.

FIG. 39 shows another embodiment which is different from that shown in FIG. 40 relating to a structure of a border area in a write-once type information storage medium. FIGS. 39 (a) and 39 (b) show the same contents of FIGS. 40 (a) and 40 (b). FIGS. 39 (a) to 39 (d) are different from FIG. 40 (c) in terms of a state that follows finalization of a write-once type information storage medium. For example, as shown in FIG. 39 (c), after information contained in the bordered area BRDA#3 has been recorded, in the case where an attempt is made to achieve finalization, a border out area BRDO is formed immediately after the bordered area BDA#3 as a border closing process. Then, a terminator area TRM is formed after the border out area DRDO which immediately follows the bordered area BRDA#3, thereby reducing a time required for finalization. In the embodiment shown in FIG. 40, there is a need for padding a region that immediately precedes the expanded spare area ESPA with border out area BRDO. There occurs a problem that a large amount of time is required to form this border out area BRDO, thereby extending the finalization time. In contrast, in the embodiment shown in FIG. 39 (c), a comparatively short terminator area TRM is set in length; all of the outer areas than the terminator TRM are redefined as a data lead-out area NDTLDO; and an unrecorded portion which is outer than the terminator TRM is set as a user disable area 911. That is, when the data area DTA is finalized, the terminator area TRM is formed at the end of recording data (immediately after the border out area BRDO). All the information on the main data contained in this area is set to "00h". Type information on this area is set in an attribute of the data lead-out area NDTLDO, whereby this terminator area TRM is redefined as a new data lead-out area NDTLDO, as shown in FIG. 39 (c). Type information on this area is recorded in area type information 935 contained in data ID, as described later. That is, the area type information 935 contained in the data ID in this terminator area TRM is set to "10b", as shown in FIGS. 50 (a) to 50 (d), thereby indicating that data exists in the data lead-out area DTLDO. The present embodiment is featured in that identification information on a data lead-out position is set by the data ID internal area type information 935. In an information recording/reproducing apparatus or an information reproducing apparatus shown in FIG. 11, let us consider a case in which an information recording/reproducing unit 141 has provided a random access to a specific target position on a write-once type information storage medium. Immediately after random access, the information recording/reproducing unit 141 must reproduce a data ID and decode a data frame number 922 in order to know where on the write-once type information storage medium has been reached. In the data ID, area type information 935 exists near the data frame number 922. At the same time, it is possible to immediately identify whether or not the information recording/recording unit 141 exists in the data lead-out area DTLDO merely by decoding this area type information 935. Thus, a simplification and high speed access control can be made. As described above, identification information on the data lead-out area DTLDO is provided by data ID internal setting of the terminator area TRM, thereby making it easy to detect the terminator area TRM.

As a specific example, in the case where the border out area BRDO is set as an attribute of the data lead-out area NDTLDO (that is, in the case where the area type information 935 contained in the data ID of a data frame in the border out BRDO is set to "10b"), the setting of this terminator area TRM is not provided. Therefore, when the terminator area TRM is recorded, the area having an attribute of the data lead-out area NDTLDO, this terminator area TRM is regarded as part of the data lead-out area NDTLDO, thus disabling recording into the data area DTA. As a result, as in FIG. 39 (c), a user disable area 911 may remain.

In the present embodiment, the size of the terminator area TRM is changed depending on a location on a write-once type information storage medium, thereby reducing a finalization time and achieving efficient processing. This terminator area TRM indicates an end position of recording data. In addition, even in the case where this area is used in a read-only apparatus, which carries out track shift detection in accordance with a DPD technique, the terminator area, is utilized to prevent overrun due to a track shift. Therefore, a width in a radial direction on the write-once type information storage medium having this terminator area TRM (width of a portion padded with the terminator area TRM) must be a minimum of 0.05 nm or more because of the detection characteristics of the read-only apparatus. A length of one cycle on the write-once type information storage medium is different depending on a radial position, and thus, the number of physical segment blocks included in one cycle is also different depending on the radial position. Thus, the size of the terminator area TRM is different depending on the physical sector number of a physical sector which is positioned at the beginning of the terminator area TRM, and the size of the terminator area TRM increases as the physical sector go to the outer periphery side. A minimum value of a physical sector number of an allowable terminator area TRM must be greater than "04FE00h". This derived from a restrictive condition in which the first bordered area DRDA#1 is composed of 4080 or more physical segment blocks, making it necessary for the first bordered area BRDA#1 to have a width equal to or greater than 1.0 m in a radial direction on the write-once type information storage medium. The terminator area TRM must start from a boundary position of physical segment blocks.

In FIG. 39 (*d*), a location in which each item of information is to be recorded is set for each physical segment block size for the reason described previously, and a total of 64 KB user data recorded to be distributed in 32 physical sectors is recorded in each physical segment block. A relative physical segment block number is set with respect to a respective one item of information, as shown in FIG. 39 (*d*), and the items of information are sequentially recorded in the write-once type information storage medium in ascending order from the lowest relative physical segment number. In the embodiment shown in FIGS. 39 (*a*) to 39 (*d*), copies CRMD#0 to CRMD#4 of RMD, which are the same contents, are overwritten five times in a copy information recording zone C_TRZ of the contents recorded in the recording management zone shown in FIG. 40 (*d*). The reliability at the time of reproduction is improved by carrying out such overwriting, and, even if dust or scratch adheres onto a write-once information storage medium, the copy information CRMD on the contents recorded in the recording management zone can be stably reproduced. Although the border end mark STB shown in FIG. 39 (*d*) coincides with a border end mark STB shown in FIG. 40 (*d*), the embodiment shown in FIG. 39 (*d*) does not have the mark NBM indicating a next border, unlike the embodiment shown in FIG. 40 (*d*). All the information on the main data contained in reserved areas 901 and 902 is set to "00h".

At the beginning of the border-in area BRDI, information which is completely identical to updated physical format information U_PFI is multiply written six times from N+1 to N+6, configuring the updated physical format information U_PFI shown in FIG. 40. The thus updated physical format information U_PFI is multiply written, thereby improving the reliability of information.

In FIG. 39 (*d*), the present embodiment is featured in that the recording management zone RMZ in the border zone is provided in the border-in area BRDI. As shown in FIG. 36 (*a*), the size of the recording management zone RMZ contained in the data lead-in area DTLDI is comparatively small. If the setting of a new bordered area BRDA is frequently repeated, the recording management data RMD recorded in the recording management zone RMZ is saturated, making it impossible to set a new bordered area BRDA midway. As in the embodiment shown in FIG. 39 (*d*), there is attained advantageous effect that a recording management zone for recording the recording management data RMD relating to the bordered area BRDA#3 that follows is provided in the border-in area DRDI, whereby the setting of a new bordered area BRDA can be provided a number of times and the additional writing count in the bordered area BRDA can be significantly increased. In the case where the bordered area BRDA#3 that follows the border-in area BRDI including the recording management zone RMZ in this border zone is closed or in the case where the data area DTA is finalized, it is necessary to repeatedly record all the last recording management data RMD into a spare area 273 (FIG. 38 (*b*)) established in an unrecorded state in the recording management zone RMZ, and pad all the spare area with the data. In thins manner, the spare area 273 in an unrecorded state can be eliminated, a track shift (due to DPD) at the time of reproduction in a read-only apparatus can be prevented, and the reproduction reliability of the recording management data RMD can be improved by multiple recording of the recording management data. All the data contained in a reserve area 903 are set to "00h". Although the border out area BRDO serves to prevent overrun due to a track shift in the read-only apparatus while the use of DPD is presumed, there is no need for the border-in area BRDI to have a particularly large size other than having the updated physical format information U_PFI and the information contained in recording management zone RMZ in the border zone. Therefore, an attempt is made to reduce the size to the minimum in order to reduce a time (required for border zone BRDZ recording) at the time of setting a new bordered area BRDA. With respect to FIG. 39 (*a*), before forming the border out area BRDO due to border closing, there is a high possibility that the user data additional writing enable range 205 is sufficiently large, and a large number of additional writing is carried out. Thus, it is necessary to largely take a value of "M" shown in FIG. 39 (*d*) so that recording management data can be recorded a number of times in the recording management zone RMZ in a border zone. In contrast, with respect to FIG. 39 (*b*), in a state that precedes border closing of the bordered area BRDA#2 and that precedes recording the border out area BRDO, the user data additional writing enable range 205 narrows, and thus, it is considered that not the number of additional writings of the recording management data to be additionally written in the recording management zone RMZ in the border zone does not increase so much. Therefore, the setting size "M" of the recording management zone RMZ in the border-in area BRDI that immediately precedes the bordered area BRDA#2 can be taken to be relatively small. That is, as a location in which the border-in area BRDI is arranged goes to the inner periphery side, the number of predicted additional writings of the recording management data increases. As the location goes to the outer periphery, the number of predicted additional writings of the recording management data decreases. Thus, the present embodiment is featured in that the size of the border-in area BRDI is reduced. As a result, the reduction of a time for setting a new bordered area BRDA and processing efficiency can be achieved.

A logical recording unit of the information recorded in the bordered area BRDA shown in FIG. 40 (*c*) is referred to as an R zone. Therefore, one bordered area BRDA is composed of at least one or more R zones. In a current DVD-ROM, as a file system, there are employed a file system called a "UDF bridge" in which both of file management information which conforms with a UDF (Universal Disc Format) and file management information which conforms with ISO 9660 are recorded in one information storage medium at the same time. In a file management method which conforms with ISO 9660, there is a rule that one file must be continuously recorded in an information storage medium. That is, information contained in one file is disabled to be divisionally arranged at a discrete position on an information storage medium. Therefore, for example, in the case where information has been recorded in conformance with the above UDF bridge, all the information configuring one file is continuously recorded. Thus, it is possible to adapt this area in which one file is continuously recorded so as to configure one R zone.

FIG. 41 shows a data structure in the control data zone CDZ and the R-physical information zone RIZ. As shown in FIG. 41 (*b*), physical format information (PFI) and disc manufacturing information (DMI) exist in the control data zone CDZ, and similarly, an DMI (Disc Manufacturing Information) and R_PFI (R-Physical Format Information) are contained in an R-physical information zone RIZ.

Information 251 relating to a medium manufacture country and medium manufacturer's nationality information 252 are recorded in medium manufacture related information DMI. When a commercially available information storage medium infringes a patent, there is a case in which an infringement warning is supplied to such a country in which a manufacturing location exists or an information storage medium is consumed (or used). A manufacturing location (country name) is identified by being obliged to record the information contained in an information storage medium, and a patent infringement warning is easily supplied, whereby an intellectual property is guaranteed, and technical advancement is accelerated. Further, other medium manufacture related information 253 is also recorded in the medium manufacture related information DMI.

The present embodiment is featured in that type of information to be recorded is specified depending on a recording location (relative byte position from the beginning) in physical format information PFI or R-physical format information R_PFI. That is, as a recording location in the physical format information PFI or R-physical format information R_PFI, common information 261 in a DVD family is recorded in an 32-byte area from byte 0 to byte 31; common information 262 in an HD_DVD family which is the subject of the present embodiment is recorded in 96 bytes from byte 32 to byte 127; unique information (specific information) 263 relating to various specification types or part versions are recording in 384 bytes from byte 128 to byte 511; and information corresponding to each revision is recorded in 1536 bytes from byte 512 to byte 2047. In this way, the information allocation positions in the physical format information are used in common depending on the contents of information, whereby the locations of the recorded information are used in common depending on medium type, thus making it possible to carry out in common and simplify a reproducing process of an information reproducing apparatus or an information recording/reproducing apparatus. The common information 261 in a DVD family recorded in byte 0 to byte 31, as shown in FIG. 41D, is divided into: information 267 recorded in common in all of a read-only type information storage medium and a rewritable-type information storage medium, and a write-once type information storage medium recorded from byte 0 to byte 16; and information 268 which is recorded in common in the rewritable-type information storage medium and the write-once type information storage medium from byte 17 to byte 31 and which is not recorded in the read-only type medium.

FIG. 55 shows another embodiment relating to a data structure in the control data zone shown in FIG. 41. As shown in FIG. 35C, the control data zone CDZ is configured as part of an emboss bit area 211. This control data zone CDZ is composed of 192 data segments start from physical sector number 151296 (024F00h). In the embodiment shown in FIG. 55, a control data section CTDS composed of 16 data segments and a copyright data section CPDS composed of 16 data segments are arranged on two by two basis in the control data zone CDZ, and a reserve area RSV is set between these two sections. By allocating these sections on a two by two basis, a physical distance between the two sections is widened, and an effect relevant to a burst error which occurs due to a scratch of an information storage medium surface or the like is reduced.

In one control data section CTDS, as shown in FIG. 55 (*c*), physical sector information on first three relative sector numbers "0" to "2" is recorded to be repeated 16 times. Multiple writing is carried out 16 times, thereby improving the reliability of recording information. Physical format information PFI described in FIG. 42 or 54 is recorded in a first physical sector in a data segment whose relative physical sector number is "0". Disk manufacture related information DMI is recorded in a second physical sector in a data segment whose relative physical sector number is "1". Furthermore, copyright protection information CPI is recorded in the third physical sector in the data segment in which relative number of the physical sector is "2". A reserved area RSV whose relative physical sector number is "3" to "31" is reserved so as to be available in a system.

As the contents of the above described disk manufacture related information DMI, a disk manufacturer's name (Disc Manufacturer's name) is recorded in 128 bytes from byte 0 to byte 127; and information on a location in which a manufacturer exists (information indicating where this disk has been manufactured" is recorded in 128 bytes from byte 128 to byte 255.

The above disk manufacturer's name is described in ASCII codes. However, the ASCII codes available in use as a disk manufacturer's name are limited to a starting byte to "0Dh" and "20h" to "7Eh". A disk manufacture's name is described from the first byte 1 in this area, and the remaining portions in this area are padded (terminated) with data "0Dh".

With respect to information on a location in which the above disk manufacturer exists, the information indicating where this disk has been manufactured, a country or a region is described in the ASCII codes. This area is limited to a starting byte to "0Dh" and "20h" to "7Eh" which are available ASCII codes as in the disk manufacturer's name. The information on a location in which a disk manufacturer exists is described from the first byte 1 in this area, and the remaining portions in this area are padded (terminated) with data "0Dh". Alternatively, another describing method includes setting an allowable size in the range of the first byte to "0Dh" as the information on a location in which a disk manufacturer exists. In the case where the information on a location in which a disk manufacturer exists is long, the information is terminated at "0Dh", and a region subsequent to "0Dh" may be padded with data "20h".

The reserved area RSV shown in FIG. 55 (*c*) is fully padded with data "00h".

FIG. 42 shows a comparison depending on a medium type (read-only type, rewritable-type, or write-once type) of information contained in the physical format information PFI with the contents of specific information contained in the physical format information PFI or R-physical format information R_PFI shown in FIG. 41 or FIG. 55. As information 267 recorded in common to all of the read-only type, rewritable-type, and write-once type medium in the common information 261 in the DVD family, there are sequentially recorded from byte positions 0 to 16: specification type (read-only, rewriting, or write-once) information and version number information; medium size (diameter) and maximum allowable data transfer rate information; a medium structure (single layer or double layer or whether or not emboss pit, additional writing area, or rewriting area exists); a recording density (line density and track density) information; allocation location information on data region DTA; and information on whether or not burst cutting area BCA exists (both of them exist in the present embodiment).

As information 268 in common information 261 of a DVD family and recorded in common to a rewriting type and a write-once type, there are recorded: revision number information for sequentially defining a maximum recording speed from byte 17 to byte 31; revision number information for defining a minimum recording speed; a revision number table (application revision number); class state information and expanded (part) version information. The embodiment is featured in that the information contained from byte 17 to byte 31 include revision information according to a recording speed in a recording area of physical format information PFI or R_PFI. Conventionally, upon development of a medium featured in that a medium recording speed such as ×2 or ×4 increases, there has been a very complicated inconvenience that a specification is newly drafted concurrently. In contrast, according to the present embodiment, there are divisionally provided: a specification (version book) in which a version is changed when the contents have been significantly changed; and a revision book in which the corresponding revision is changed and issued, and only a revision book is issued, the book having updated only revision every time a recording speed is improved. In this manner, an extending function for a medium which supports high speed recording and a specification can be handled by a simple method called revision change. Thus, in the case where a high speed recording compatible medium has been newly developed, there is attained advantageous effect that high speed recording can be carried out. In particular, the present embodiment is featured in that revision numbers can be separately set by a maximum value and a minimum value by separately providing a field of revision number information defining a maximum recording speed of byte 17 and a field of revision number information defining a minimum recording speed of byte 18. For example, in the case where a recording film capable of carrying out recording at a very high speed has been developed, that recording film is often very expensive. In contrast, as in the present embodiment, revision numbers are separately set depending on a maximum value and a minimum value of a recording speed, thereby increasing options of recording mediums which can be developed. As a result, there is attained advantageous effect that a medium capable of carrying out high speed recording or a more inexpensive medium can be supplied. An information recording/reproducing apparatus according to the present embodiment has in advance information on an allowable maximum recording speed and an allowable minimum recording speed for each revision. When an information storage medium is mounted on this information recording/reproducing apparatus, first, the information recording/reproducing unit 141 shown in FIG. 11 reads the information contained in this physical format information PFI and R-physical format information R_PFI. Based on the obtained revision number information, there are detected by the control unit 143: an allowable maximum speed and an allowable minimum recording speed of an information storage medium mounted with reference to information on an allowable maximum recording speed and an allowable minimum recording speed for each revision recorded in advance in the memory unit 175; and recording is carried out at an optimal recording speed based on the result of the identification.

Now, a description will be given with respect to the significance of specific information 263 of the type and version of each of the specifications from byte 128 to byte 511 shown in FIG. 41 (*c*) and the significance of information content 264 which can be set specific to each of the revisions from byte 512 to byte 2047. That is, in the specific information 263 of type and version of each of the specifications from byte 128 to byte 511, the significance of the contents of recording information at each byte position coincides with a rewritable-type information storage medium of a different type regardless of a write-once type information storage medium. The information content 264 which can be set specific to each of the revisions from byte 512 to byte 2047 permits the fact that if a revision is different from another in the same type of medium as well as a difference between a rewritable-type information storage medium and a write-once type information storage medium whose types are different from each other, the significances of the contents of recording information at byte positions are different from each other.

As shown in FIG. 42, as information contents in the specific information 263 on the type and version of each of the specifications which coincide with each other in significance of the contents of recording information at byte positions between the rewritable-type information storage medium and the write-once type information storage medium whose types are different from each other, there are sequentially recorded: disk manufacturer's name information; additional information from the disk manufacturer; recording mark polarity information (identification of "H-L" or "L-H"); line speed information at the time of recording or reproduction; a rim intensity value of an optical system along a radial direction; and recommended laser power at the time of reproduction (light amount value on recording surface).

In particular, the present embodiment is featured in that recording mark polarity information (Mark Polarity Descriptor (identification of "H-L" or "L-H") is provided in byte 192. In the conventional rewritable-type or write-once DVD disk, only a "H-L" (High to Low) recording film whose light reflection amount in a recording mark is low with respect to an unrecorded state (a state in which reflection level is relatively high: High) has been accepted. In contrast, if a medium requires "high speed recording compatibility", "price reduction" or "decrease in cross-erase" and "increase in upper limit value of rewriting count" which are physical properties, there is a problem that the conventional "H-L" recording film is insufficient. In contrast, the present embodiment allows use of an "L-H" recording film whose light reflection amount increases in a recording mark as well as only an "H-L" recording film. Thus, there is attained advantageous effect that the "L-H" recording film as well as the conventional "H-L" film is incorporated in the specification, and selecting options of the recording films are increased, thereby making it possible to achieve high speed recording or to supply an inexpensive medium.

A specific method for mounting an information recording/reproducing apparatus will be described below. The specification (version book) or revision book describe both of the reproduction signal characteristics derived from the "H-L" recording film and the reproduction signal characteristics derived from the "L-H" recording film. Concurrently, the corresponding circuits are provided on a two by two basis in the PR equalizing circuit 130 and Viterbi decoder 156 shown in FIG. 11. When an information storage medium is mounted in the information reproduction unit 141, first, the slice level detector circuit 132 for reading the information contained in the system lea-in area SYLDI is started up. This slice level detector circuit 132 reads information on polarity of a recording mark recorded in this 192 byte (identification of "H-L" or "L-H"); and then make judgment of "H-L" or "L-H". In response to the judgment, after the PR equalizing circuit 130 and a circuitry contained in the Viterbi decoder 156 has been switched, the information recorded in the data lead-in area DTLDI or data area DTA is reproduced. The above described method can read the information contained in the data lead-in area DTLDI or data area DTA comparatively quickly, and moreover, precisely. Although revision number information defining a maximum recording speed is described in byte 17 and revision number information defining a minimum recording speed is described in byte 18, these items of information are merely provided as range information defining a maximum and a minimum. In the case where the most stable recording is carried out, there is a need for optimal line speed information at the time of recording, and thus, the associated information is recorded in byte 193.

The present embodiment is featured in that information on a rim intensity value of an optical system along a circumferential direction of byte 194 and information on a rim intensity value of an optical system along in a radial direction of byte 195 is recorded as optical system condition information at a position which precedes information on a variety of recording conditions (write strategies) included in the information content 264 set specific to each revision. These items of information denote conditional information on an optical system of an optical head used when identifying a recording condition arranged at the back side. The rim intensity used here denotes a distribution state of incident light incident to an objective lens before focusing on a recording surface of an information storage medium. This intensity is defined by a strength value at a peripheral position of an objective lens (iris face outer periphery position) when a center intensity of an incident light intensity distribution is defined as "1". The incident light intensity distribution relevant to an objective lens is not symmetrical on a point to point basis; an elliptical distribution is formed; and the rim intensity values are different from each other depending on the radial direction and the circumferential direction of the information storage medium. Thus, two values are recorded. As the rim intensity value increases, a focal spot size on a recording surface of the information storage medium is reduced, and thus, an optimal recording power condition changes depending on this rim intensity value. The information recording/reproducing apparatus recognizes in advance the rim intensity value information contained in its own optical head. Thus, this apparatus reads the rim intensity values of the optical system along the circumferential direction and the radial direction, the value being recorded in the information storage medium, and compares values of its own optical head. If there is no large difference as a result of the comparison, a recording condition recorded at the back side can be applied. If there is a large difference, there is a need for ignoring the recording condition recorded at the back side and starting identifying an optimal recording condition while the recording/reproducing apparatus carries out test writing by utilizing the drive test zone DRTZ shown in FIGS. 35B, 35C, 37A to 37F.

Therefore, there is a need for quickly making a decision as to whether to utilize the recording condition recorded at the back side or whether to start identifying the optimal recording condition while ignoring the information and carrying out test writing by oneself. As shown in FIG. 42, there is attained advantageous effect that the rim intensity information can be read, and then judgment can be made at a high speed as to whether or not the recoding condition arranged later is met by arranging conditional information on an optical system identified at a preceding position with respect to a position at which the recommended recording condition has been recorded.

As described above, according to the present embodiment, there are divisionally provided: a specification (version book) in which a version is changed when the contents have been significantly changed; and a revision book in which the corresponding revision is changed and issued, and only a revision book is issued, the book having updated only revision every time a recording speed is improved. Therefore, if a revision number is different from another, a recording condition in a revision book changes. Thus, information relating to a recording condition (write strategy) is mainly recorded in the information content 264 which can be set specific to each of the revisions from byte 512 to byte 2047. As is evident from FIG. 42, the information content 264 which can be set specific to each of the revisions from byte 512 to byte 2047 permits the fact that if a revision is different from another in the same type of medium as well as a difference between a rewritable-type information storage medium and a write-once type information storage medium whose types are different from each other, the significances of the contents of recording information at byte positions are different from each other.

Definitions of peak power, bias power 1, bias power 2, and bias power 3 shown in FIG. 42 coincide with power values defined in FIG. 18. An end time of a first pulse shown in FIG. 42 denotes $T_{EFP}$ defined in FIG. 18; a multi-pulse interval denotes $T_{MP}$ defined in FIG. 18; a start time of a last pulse denotes $T_{SLP}$ defined in FIG. 38, and a period of bias power 2 of 2T mark denotes $T_{LC}$ defined in FIG. 18.

FIG. 54 shows another embodiment relating to a data structure in each of physical format information and R-physical format information. Further, FIG. 54 comparatively describes "updated physical format information". In FIG. 54, byte 0 to byte 31 are utilized as a recording area of common information 269 contained in a DVD family, and byte 32 and subsequent are set for each specification.

In a write-once type information storage medium, as shown in FIG. 35C, with respect to R-physical format information recorded in an R-physical information zone RIZ contained in the data lead-in area DTLDI, border zone start position information (first border outermost periphery address) is added to the physical format information PFI (copy of HD_DVD family common information), and the added information is described. In the updated physical format information U_PFI, updated in the border-in area BRDI shown in FIG. 40 or 39, start position information (self-border outermost periphery address) is added to the physical format information (copy of HD_DVD family common information), and the added information is recorded. In FIG. 42, this border zone start position information is recorded from byte 197 to byte 204. In contrast, the embodiment shown in FIG. 54 is featured in that information is recorded at byte 133 to byte 140 which are positions preceding information relating to a recording condition such as peak power or bias power 1 (information content 264 which can be set specific to each revision), the position following the common information 269 contained in the DVD family. The updated start position information is also arranged in byte 133 to byte 140 which are positions preceding information relating to a recording condition such as peak power or bias power 1 (information content 264 which can be set specific to each revision), the position following the common information 269 contained in the DVD family. If revision number is upgraded and a recording condition for high precision is required, there is a possibility that the recording condition information contained in the rewritable-type information storage medium uses byte 197 to byte 207. In this case, as in the embodiment shown in FIG. 42, if the border zone start position information for R-physical format information recorded in the write-once type information storage medium is arranged in byte 197 to byte 204, there is a danger that a correlation (compatibility) between the rewritable-type information storage medium and the write-once type information storage medium relating to the arranged position of the recording condition is distorted. As shown in FIG. 54, there is attained advantageous effect that the border zone start position information and the updated start position information are arranged in byte 133 to byte 140, thereby making it possible to record a correlation (compatibility) in recording position of a variety of information between the rewritable-type information storage medium and the write-once type information storage medium even if an amount of information relating to a recording condition will be increased in the future. With respect to the specific contents of information relating to the borer zone start position information, the start position information on the border out area BRDO situated at the outside of the (current) bordered area BRDA currently used in byte 133 to byte 136 is described in PSN (Physical Sector Number); and border-in area BRDI start position information relating to the bordered area BRDA to be used next is described in the physical sector number (PSN) in byte 137 to byte 140.

The specific contents of information relating to the updated start position information indicate the latest border zone position information in the case where a bordered area BRDA has been newly set. The start position information on the border out area BRDO situated at the outside of the (current) bordered area BRDA currently used in byte 133 to byte 136 is described in PSN (Physical Sector Number); and the start position information on the border-in area BRDI relating to the bordered area BRDA to be used next is described in the sector number (PSN) in byte 137 to byte 140. In the case where recording cannot be carried out in the next bordered area BRDA, this area (ranging from byte 137 to byte 140) is padded with all "00h".

As compared with the embodiment shown in FIG. 42, in the embodiment shown in FIG. 54, "medium manufacturer's name information" and "additional information from medium manufacturer" are erased, and recording mark polarity information (identification of "H-L" or "L-H") is arranged in 128 byte and subsequent.

FIG. 43 shows a comparison of the contents of detailed information recorded in the allocation location information on the data area DTA recorded in byte 4 to byte 15 shown in FIG. 42 or 54. The start position information on the data area DTA is recorded in common regardless of identification of medium type, physical format information PFI, and R-physical format information R_PFI. As information indicating an end position, end position information on the data area DTA is recorded in a read-only type information storage medium.

End position information on an additional writing enable range of the user data is recorded in the physical format information PFI contained in the write-once type storage medium. This positional information denotes a position that immediately precedes point 8 in an example shown in FIG. 37E, for example.

In contrast, the R-physical format information R_PFI contained in the write-once type information storage medium records the end position information on the recorded data contained in the corresponding bordered area BRDA.

Further, the read-only type information storage medium records the end address information contained in "layer 0" which is a front layer when seen from the reproduction optical system; and the rewritable-type information storage medium records information on a differential value of each item of start position information between a land area and a groove area.

As shown in FIG. 35C, a recording management zone RMZ exists in the data lead-in area DTLDI. In addition, as shown in FIG. 40 (*d*), the associated copy information exists in the border-out zone BRDO as copy information C_RMZ indicating the contents recorded in the recording management zone. This recording management zone RMZ records RMD (Recording Management Data) having the same data size as one physical segment block size, as shown in FIG. 36 (*b*), so that new recording management data RMD updated every time the contents of the recording management data RMD is updated can be sequentially added backwardly. A detailed data structure in such one item of recording management data RMD is shown in each of FIGS. 44, 45, 46, 47, 48 and 49. The recording management data RMD is further divided into fine RMD field information RMDF of 2048 byte size.

The first 2048 bytes in the recording management data are provided as a reserved area. The next RMD field 0 of 2048 byte size sequentially allocates: format code information of recording management data RMD; medium state information indicating a state of the target medium, i.e., (1) in an unrecorded state, (2) on the way of recording before finalizing, or (3) after finalizing; unique disk ID (disk identification information); allocation position information on the data region DTA; allocation position information on the latest (updated) data area DTA; and allocation position information on recording management data RMD. The allocation position information on the data area records information indicating a user data additional writing enable range 204 (FIG. 37D), i.e., start position information on the data area DTA and the end position information on the user data recording enable range 204 at the time of an initial state. In the embodiment shown in FIG. 37D, this information indicates a position that immediately precedes point β.

The present embodiment, as shown in FIGS. 37E and 37F, is featured in that an expanded drive test zone EDRTZ and an expanded spare area ESPA can be additionally set in the user data additional writing enable range 204. However, such extension narrows a user data additional writing enable range 205. The present embodiment is featured in that associated information is recorded in "allocation position information on the latest (updated) data area DTA" so as not to additionally write the user data in these expanded areas EDRTZ and ESPA. That is, it is possible to identify whether or not the expanded drive test zone EDRTZ has been expanded based on the identification information on the presence or absence of the expanded drive test zone EDRTZ, and it is possible to identify whether or not the expanded spare area ESPA has been expanded based on identification information on the presence or absence of the expanded spare area ESPA. Further, the recording enable range information relating to the user data additional writing enable range 205 managed in the recording management data RMD includes an end position of the latest user data recording enable range 205 recorded in the allocation position information on the data area DTA. Therefore, the user data recording enable range 205 shown in FIG. 37F can be identified immediately, enabling high speed detection of a size of an unrecorded area in which recording can be carried out in the future (the residual amount of unrecorded area). In this manner, for example, there is attained advantageous effect that a transfer rate at the time of optimal recording is set in conformance with the user specified image recording reserved time, thereby making it possible to fully record an image in a medium during the user specified image recording reserved time. By way of example of the embodiment shown in FIG. 37D, "the end position of the latest user data recording enable range 205" denotes a position that precedes point δ. These items of positional information can be described in ECC block address numbers according to another embodiment instead of being described in physical sector numbers. As described later, in the present embodiment, one ECC block is composed of 32 sectors. Therefore, the least significant five bits of the physical sector number of a sector arranged at the beginning in a specific ECC block coincides with that of a sector arranged at the start position in the adjacent ECC block. In the case where a physical sector number has been assigned so that the least significant five bits of the physical sector of the sector arranged at the beginning in the ECC block is "00000", the values of the least significant six bits or more of the physical sector numbers of all the sectors existing in the same ECC block coincide with each other. Therefore, address information obtained by eliminating the least significant five bit data of the physical sector numbers of the sectors existing in the same ECC block as above and sampling only data of the least significant six bit and subsequent is defined as ECC block address information (or ECC block address number). As described later, the data segment address information (or physical segment block number information recorded in advance by wobble modulation coincides with the above ECC block address. Thus, when the positional information contained in the recording management data RMD is described in the ECC block address numbers, there is attained advantageous effects described below:

(1) An access to an unrecorded area is accelerated in particular:

A differential calculation process is facilitated because a positional information unit of the recording management data RMD coincides with an information unit of data segment addresses recorded in advance by wobble modulation; and (2) A management data size in the recording management data RMD can be reduced:

The number of bits required for describing address information can be reduced by 5 bits per address.

As described later, a single physical segment block length coincides with a one data segment length, and the user data for one ECC block is recorded in one data segment. Therefore, an address is expressed as an "ECC block address number"; an "ECC block address"; a "data segment address", a "data segment number", or a "physical segment block number" and the like. These expressions have the same meaning.

As shown in FIG. 44, in the allocation position information on the recording management data RMD existing in RMD field 0, size information in that the recording management zone RMZ capable of sequentially additionally writing the recording management data RMD is recorded in ECC block units or in physical segment block units. As shown in FIG. 36 (*b*), one recording management zone RMZ is recorded on one by one physical segment block basis, and thus, based on this information, it is possible to identify how many times the updated recording management data RMD can be additionally written in the recording management zone RMZ. Next, a current recording management data number is recorded in the recording management zone RMZ. This denotes number information on the recording management data RMD which has been already recorded in the recoding management zone RMZ. For example, assuming that this information corresponds to the information contained in the recording management data RMD#2 as an example shown in FIG. 36 (*b*), this information corresponds to the second recorded recording management data RMD in the recoding management zone RMZ, and thus, a value "2" is recorded in this field. Next, the residual amount information contained in the recording management zone RMZ is recorded. This information denotes information on the item number of the recording management data RMD which can be further added in the recording management zone RMZ, and is described in physical segment block units (=ECC block units=data segment units). Among the above three items of information, the following relationship is established.

[Size information having set RMZ therein]=[Current recording management data number]+[residual amount in RMZ]

The present embodiment is featured in that the use amount or the residual amount information on the recording management data RMD contained in the recording management zone RMZ is recorded in a recording area of the recording management data RMD.

For example, in the case where all information is recorded in one write-once type information storage medium once, the recording management data RMD may be recorded only once. However, in the case where an attempt is made to repeatedly record additional writing of the user data (additional writing of the user data in the user data additional writing enable range 205 in FIG. 37F) very finely in one write-once type information storage medium, it is necessary to additionally write recording management data RMD updated every time additional writing is carried out. In this case, if the recording management data RMD is frequently additionally written, the reserved area 273 shown in FIG. 36 (*b*) is eliminated, and the information recording/reproducing apparatus requires countermeasures against this elimination. Therefore, the use amount or residual amount information on the recording management data RMD contained in the recording management zone RMZ is recorded in a recording area of the recording management data RMD, thereby making it possible to identify in advance a state in which additional writing in the recording management zone RMZ cannot be carried out and to take action by the information recording/reproducing apparatus earlier.

As shown in FIGS. 37E to 37F, the present embodiment is featured in that the data lead-out area DTLDO can be set in the form such that the expanded drive test zone EDRTZ is included (FIG. 1 (E4)). At this time, the start position of the data lead-out area DTLDO changes from point β to point ε. In order to manage this situation, there is provided a field for recording the start position information on the data lead-out area DTLDO in the allocation position information of the latest (updated) data area DTA of the RMD field shown in FIGS. 44 to 49. As described previously, a drive test (test writing) is basically recorded in cluster units which can be expanded in data segment (ECC block) units. Therefore, although the start position information on the data lead-out area DTLDO is described in the ECC block address numbers, this information can be described in the physical sector number or physical segment block number, data segment address, or ECC block address of a physical sector first arranged in this first ECC block according to another embodiment.

In an RMD field 1, there are recorded: update history information on an information recording/reproducing apparatus in which recording of the corresponding medium has been carried out. This information is described in accordance with a format of all recording condition information contained in information 264 (FIG. 42) in which manufacturer identification information for each information recording/ reproducing apparatus; serial numbers and model numbers described in ASCII codes; date and time information when recording power adjustment using a drive test zone has been made; and recording condition information provided at the time of additional writing can be set specific to each revision.

An RMD field 2 is a user available area so that a user can record information recorded contents (or contents to be recorded), for example.

The start position information of each border zone BRDZ is recorded in an RMD field 3. That is, as shown in FIG. 45, the start position information from the start to the fiftieth border out areas BTDOs is described in the physical sector numbers.

For example, in the embodiment shown in FIG. 40 (*c*), the start position of the first border out area BRDO indicates a position of point η, and the start position of the second BRDO indicates a position of point θ.

The positional information on an expanded drive test zone is recorded in an RMD field 4. First, there are recorded: the end position information on a location which has already been used for test writing in the drive test zone DRTZ which exists in the data lead-in area DTLDI described in FIG. 36 (*c*); and the end position information on a location which has already been used for test writing in the drive test zone DRTZ which exists in the data lead-out area DTLDO described in FIGS. 37D to 37F. In the drive test zone DRTZ, the above position information is sequentially used for test writing from the inner periphery side (from the lowest physical sector number) to the outer periphery direction (in a direction in which the physical sector number is higher). Test writing is carried out in cluster units which are units of additional writing, as described later, and thus, ECC block units are used as location units. Therefore, in the case where the end position information on the location which has been already used for test writing is described in the ECC address numbers or is described in the physical sector numbers, there are described a physical sector number of a physical sector arranged at the end of the ECC block which has been used for test writing. Because a location used for test writing once has already been described, in the case where next test writing is carried out, such test writing is carried out from a next of the end position which has already been used for test writing. Therefore, the information recording/reproducing apparatus can identify momentarily from where test writing should be started by using the end position information (=a use amount in the drive test zone DRTZ) on a location which has already been used in the above drive test zone DRTZ. In addition, based on that information, this apparatus can judge whether or not a free space in which next test writing can be carried out exists in the drive test zone DRTZ. The drive test zone DRTZ which exists in the data lead-in area DTLDI records: flag information indicating whether or not area size information indicating that additional writing can be carried out; flag information indicating that this drive test zone DRTZ has been used up or area size information indicating that additional test writing can be further carried out in the drive test zone DRTZ which exists in the data lead-out area DLTDI; and area size information indicating that additional test writing can further be carried out in the drive test zone DRTZ which exists in the data lead-out area DTLDO or flag information indicating whether or not this drive test zone DRTZ has been used up. The size of the drive test zone DRTZ which exists in the data lead-in area DTLDI and the size of the drive test zone DRTZ which exists in the data lead-out area DTLDO are identified in advance, thus making it possible to identify the size (residual amount) of an area in which additional test writing can be carried out in the drive test zone DRTZ only based on the end position information on a location which has already been used for test writing in the drive test zone DRTZ which exists in the data lead-in area DTLDI or in the drive test zone DRTZ which exists in the data lead-out area DTLDO. However, this information is provided in the recording management data RMD, thereby making it possible to identify the residual amount in the drive test zone DRTZ immediately and to reduce a time required for judging whether or not to newly set the expanded drive test zone EDRTZ. According to another embodiment, in this field, it is possible to record: flag information indicating whether or not this drive test zone DRTZ has been used up instead of area size (residual amount) information indicating that additional writing can further be carried out in the drive test zone DRTZ. If a flag has already been set to identify momentarily that the above test zone has already been used up, it is possible to preclude a danger that test writing is carried out in this area.

Additional setting count information on the next expanded drive test zone EDRTZ is recorded in the RMD field 4. In the embodiment shown in FIG. 37E, the expanded drive test zones EDRTZs are set in two zones, i.e., an expanded drive test zone 1 EDRTZ1 and an expanded drive test zone 2 EDRTZ2, and thus, "additional setting count of the expanded drive test zone EDRTZ=2" is established. Further, range information for each expanded drive test zone EDRTZ and range information which has already been used for test writing are recorded in the RMD field 4. In this way, the positional information on the expanded drive test zone can be managed in the recording management data RMD, thereby enabling extension setting of the expanded drive test zone EDRTZ a plurality of times. In addition, in a write-once type information storage medium, the positional information on the expanded drive test zone EDRTZ which has been sequentially expanded can be precisely managed in the form of updating and additional writing of the recording management data RMD, and it is possible to preclude a danger that the user data is overwritten on the expanded drive test zone EDRTZ while user data additional writing enable range 204 (FIG. 37D) is mistakenly determined. As described above, test writing units are also recorded in cluster units (ECC block units), and thus, the range of each expanded drive test zone EDRTZ is specified in ECC block address units. In the embodiment shown in FIG. 37E, the start position information on the first set expanded drive test zone EDRTZ indicates point γ because the expanded drive test zone 1 EDRTZ1 has been first set; and the end position information on the first set expanded drive test zone EDRTZ corresponds to a position that immediately precedes point β. Positional information units are described in the address numbers or physical sector numbers similarly. While the embodiment of FIGS. 44 and 45 shows the end position information on the expanded drive test zone EDRTZ, size information on the expanded drive test zone EDRTZ may be described without being limited thereto. In this case, the size of the first set expanded drive test zone 1 EDRTZ1 is set to "β-γ". The end position information on a location which has already been used for test writing in the first set expanded drive test zone EDRTZ is also described with the ECC block address number or physical sector number. Then, the area size information (residual amount) in which additional test writing can be carried out in the first set expanded drive test zone EDRTZ. The size of the expanded drive test zone 1 EDRTZ1 and the size of the area, which has already been used therein, is already been identified based on the above described information. Thus, the area size (residual amount) in which additional test writing can be carried out is already obtained. By providing this field, it is possible to identify immediately whether or not a current drive test zone will suffice when a new drive test (test writing) is carried out. In addition, it is possible to reduce a judgment time required for determining additional setting of a further expanded drive test zone EDRTZ. In this field, there can be recorded area size (residual amount) information indicating that additional writing can be carried out. According to another embodiment, in this field it is possible to set flag information indicating whether or not this expanded drive test zone EDRTZ has been used up. It is possible to preclude a danger that test writing is mistakenly carried out in this area, as long as a flag is set to momentarily identify that the test zone has already been used up.

A description will be given with respect to an example of a processing method for newly setting an expanded drive test zone EDRTZ by the information recording/reproducing apparatus shown in FIG. 11 and carried out test writing in the zone.

(1) A write-once type information storage medium is mounted on an information recording/reproducing apparatus.

(2) Data formed in the burst cutting area BCA is reproduced by the information recording/reproducing unit 141; the recorded data is supplied to the control unit 143; and the information is decoded in the control unit 143, and it is determined whether or not processing can proceeds to a next step.

(3) Information recorded in the control data zone CDZ in the system lead-in area SYLDI is recorded by the information recording/reproducing unit 141, and the reproduced information is transferred to the control unit 143.

(4) Values of rim intensities (in bytes 194 and 195 shown in FIG. 42) when a recommended recording condition has been identified in the control unit 143 are compared with a value of rim intensity of an optical head used at the information recording/reproducing unit 141; and an area size required for test writing is identified.

(5) The information contained in recording management data is reproduced by the information recording/reproducing unit 141, and the reproduced information is transferred to the control unit 143. The control section decodes the information contained in the RMD field 4 and determines whether or not there is a margin of an area size required for test writing, the size being identified in step (4). In the case where the judgment result is affirmative, processing proceeds to step (6). Otherwise, processing proceeds to step (9).

(6) A location for starting test writing is identified based on end position information on a location which has already been used for test writing in the drive test zone DRTZ or expanded drive test zone EDRTZ used for test writing from the RMD field 4.

(7) Test writing is executed by the size identified in step (4) from the location identified in step (6).

(8) The number of locations used for test writing has been increased in accordance with the processing in step (7), and thus, recording management data RMD obtained by rewriting the end position information on the locations which has already been used for test writing is temporarily stored in the memory unit 175, and processing proceeds to step (12).

(9) The information recording/reproducing unit 141 reads information on "end position of the latest user data recording enable range 205" recorded in the RMD field 0 or "end position information on the user data additional writing enable range" recorded in the allocation location information on the data area DTA contained in the physical formed shown in FIG. 43; and the control unit 143 further internally sets the range of a newly set expanded drive test zone EDRTZ.

(10) Information on "end position of the latest used data recording enable range 205" recorded in the RMD field 0 based on the result described in step (9) is updated and additional setting count information on the expanded drive test zone EDRTZ contained in the RMD field 4 is incremented by one (that is, the count is added by 1); and further, the memory unit 175 temporarily stores the recording management data RMD obtained by adding the start/end position information on the newly set expanded drive test zone EDRTZ.

(11) Processing moves from step (7) to (12).

(12) Required user information additionally written into the user data additional writing enable range 205 under an optimal recording condition obtained as a result of test writing carried out in step (7).

(13) The memory unit 175 temporarily stores the recording management data RMD updated by additionally writing the start/end position information (FIG. 47) contained in an R zone which has been newly generated in response to step (12).

(14) The control unit 143 controls the information recording/reproducing unit 141 to additionally record the latest recording management data RMD temporarily stored in the memory unit 175, in the reserved area 273 (for example, FIG. 36 (b)) contained in the recording management zone RMZ.

As shown in FIG. 47, positional information on the expanded spare area ESPA is recorded in an RMD field 5. In the write-once type information storage medium, a spare area can be expanded, and the positional information on that spare area is managed in the position management data RMD. In the embodiment shown in FIG. 37E, the expanded spare area ESPA is set in two areas, i.e., an expanded spare area 1 ESPA1 and an expanded spare area 2 ESPA2, and thus, "the number of additional settings of the expanded space area ESPA" is set to "2". The start position information on the first set expanded spare area ESPA corresponds to at a position of point δ; the end position information on the second set expanded spare area ESPA corresponds to at a position that precedes point γ; the end position information on the first set expanded spare area ESPA corresponds to at a position that precedes point ξ; and the end position information on the second set expanded spare area ESPA corresponds to at a position of point ε.

The information relating to defect management is recorded in the RMD field 5 shown in FIG. 47. A first field in the RMD field 5 shown in FIG. 47 records ECC block number information or physical segment block number information which has already been used for substitution in the adjacent area to the data lead-in area DTLDI. In the present embodiment, a substituting process is carried out in ECC block units with respect to a defect area found in the user data additional writing range 204. As described later, one data segment configuring one ECC block is recorded in one physical segment block area, and thus, the substitution count which has already been done is equal to the number of ECC blocks which has already been used (or number of physical segment blocks and number of data segments). Therefore, the units of information described in this field are obtained as ECC block units or physical segment block units and data segment units. In the write-once type information storage medium, in the spare area SPA or expanded pare area ESPA, a location used as a replacing process may be often used sequentially from the inner periphery side having the lowest ECC block address number. Therefore, with respect to the information contained in this field, in another embodiment, it is possible to describe an ECC block address number as the end position information on a location which has already been used for substitution. As shown in FIG. 47, with respect to the first set expanded spare area 1 ESPA1 and the second set expanded spare area 2 ESPA2 as well, there exist fields for recording similar information ("ECC block number information or physical segment block number information which have already been used for substitution in the first set expanded spare area ESPA or end position information (ECC block address number) on a location which has been used for substitution"; and "ECC block number information or physical segment block number information which have already been used for substitution in the second set expanded spare area ESPA or end position information (ECC block address number) on a location which has been used for substitution".

Using these items of information, the following advantageous effects are attained:

(1) A spare location to be newly set with respect to a defect area found in the user data additional writing enable range 205 is identified immediately when next substituting process is carried out.

New substitution is carried out immediately after the end position of a location which has already been used for substitution.

(2) The residual amount in the spare area SPA or expanded spare area ESPA is obtained by calculation and (in the case where the residual amount is insufficient), it is possible to identify necessity of setting a new expanded spare area ESPA. The size of the spare area SPA adjacent to the data lead-in area DTLDI is identified in advance, and thus, the residual amount in the spare area SPA can be calculated if there exists information relating to the number of ECC blocks which have already been used in the spare area SPA. However, the residual amount can be identified immediately by providing a recording frame of the ECC block number information or physical segment block number information in an unused location available for future substitution, which is residual amount information contained in the spare area SPA. Thus, it is possible to reduce a time required for judgment of the necessity of providing settings relating to a further expanded spare area ESPA. For a similar reason, there is provided a frame capable of recording "residual amount information contained in the first set expanded spare area ESPA and "residual amount information contained in the second set expanded spare area ESPA. In the present embodiment, a spare area SPA is extensible in the write-once type information storage medium, and the associated position information is managed in the recording management data RMD. As shown in FIGS. 37A to 37F, it is possible to extensively set an expanded spare area 1 ESPA1 and an expanded spare area 2 ESPA2 or the like at an arbitrary start position and at an arbitrary size as required in the user data additional writing enable range 204. Therefore, the additional setting count information on the expanded spare area ESPA is recorded in the RMD field 5, making it possible to set the start position information on the first set expanded spare area ESPA or the start position information on the secondly set expanded spare area ESPA. These items of start position information are described in physical sector numbers or ECC block address numbers (or physical segment block numbers or data segment addresses). In the embodiment shown in FIGS. 44 and 45, "the end position information on the first set expanded spare area ESPA" or "the end position information on the second set expanded spare area ESPA" are recorded as information for specifying the range of the expanded spare area ESPA. However, in another embodiment, in stead of these items of end position information, size information on the expanded spare area ESPA can be recorded by the ECC block number or physical segment block number, data segment number, and ECC block number or physical sector number.

Defect management information is recorded in an RMD field 6. The present embodiment uses a method for improving reliability of information to be recorded in an information storage medium, the information relating to defect processing, in the following two modes:

(1) A conventional "replacing mode" for recording in a spare location information to be recorded in a defect location; and (2) A "multiplying mode" for recording the same contents of information twice in a location which is different from another one on an information storage medium, thereby improving reliability.

Information as to which mode processing is carried out is recorded in "type information on defect management processing" contained in secondary defect list entry information contained in the recording management data RMD as shown in FIG. 48. The contents of secondary defect list entry information are as follows:

(1) In the Case of the Conventional Replacing Mode
Type information on defect management processing is set to "01" (in the same manner as in conventional DVD-RAM);
The "positional information on a replacement source ECC block" used here denotes positional information on an ECC block found as a defect location in the user data additional writing enable range 205, and information to be essentially recorded in the range is recorded in a spare area or the like without being recorded in the above range; and
The "positional information on a replacement destination ECC block" used here indicates positional information on a location of a replacement source to be set in the spare area SPA or expanded spare area 1 ESPA1, and an expanded spare area 2 ESPA2 shown in FIG. 37E, and the information to be recorded in a defect location, the information being found in the additional writing enable range 205, is recorded in the above area.

(2) In the Case of the Multiplying Mode
Type information on defect management processing is set to "10";
The "positional information on replacement source ECC block" denotes a non-defect location, and indicates position information in which target information is recorded and the information recorded therein can be precisely reproduced; and
The "positional information on replacement destination ECC block" indicates positional information on a location in which the completely same contents as the information recorded in the above described "positional information on replacement source ECC block" are recorded for the purpose of multiplication set in the spare area SPA or expanded spare area 1 ESPA1 and expanded spare area 2 ESPA 2 shown in FIG. 37E.

In the case where recording has been carried out in the above described "(1) conventional replacing mode", it is confirmed that the information recorded in an information storage medium is precisely read out at the stage immediately after recording. However, there is a danger that the above described information cannot be reproduced due to scratch or dust adhering to an information storage medium, caused by the user's abuse. In contrast, in the case where recording has been carried out in the "(2) multiplying mode", even if information cannot be partially read in an information storage medium due to a scratch or dust caused by user's abuse or the like, because the same information is backed up at another portion, the reliability of information reproduction is remarkably improved. The above backed up information is utilized for the information which cannot be read at this time, and the replacing process in "(1) conventional replacing mode" is carried out, thereby further improving reliability. Therefore, there is attained advantageous effect that high reliability of information reproduction after recorded, considering countermeasures against scratch or dust can be arranged by a processing operation in "(1) conventional replacing mode" alone and by using a combination of the processing operation in "(1) conventional replacing mode" and a processing mode in "(2) multiplying mode". Methods for describing the positional information on the above ECC block include: a method for describing a physical sector number of a physical sector which exists at a start position which configures the above ECC block and a method for describing an ECC block address, a physical segment block address, or a data segment address. As described later, in the present embodiment, a data area including data of one ECC block size is referred to as a data segment. A physical segment block is defined as a physical unit on an information storage medium serving as a location for recording data, and one physical segment size coincides with a size of an area for recording one data segment.

The present embodiment provides a mechanism capable of recording the defect position information detected in advance before the replacing process. In this manner, the manufacturers of information storage mediums check a defect state in the user data additional writing range 204 immediately before shipment. When the detected defect location is recorded in advance (before the replacing process) or the information recording/reproducing apparatus has carried out an initializing process at the user's site, the defect state in the user data additional writing enable range 294 is checked so that the detected defect location can be recorded in advance (before the replacing process). In this way, the information indicating a defect position detected in advance before the replacing process corresponds to "information on the presence or absence of the process for replacing a defect block with a spare block" (SLR: State of Linear Replacement) contained in the secondary defect list entry information.

When the information SLR on the presence or absence of the process for replacing a defect block with a spare block is set to "0":

The replacing process is carried out with respect to a defect ECC block specified by "positional information on replacement source ECC block"; and Information, which can be reproduced, is recorded in a location specified by "positional information on replacement destination ECC block".

When the information SLR on the presence or absence of the process for replacing a defect block with a spare block is set to "1":

A defect ECC block specified by "positional information on replacement source ECC block" denotes a defect block detected in advance at the state that precedes the replacing process; and A field of "positional information on replacement destination ECC block" is blanked (no information is recorded).

When a defect location is thus identified in advance, there is attained advantageous effect that an optimal replacing process can be carried out at a high speed (and in a real time) at the stage at which an information recording/reproducing apparatus carries out additional writing in a write-once type information storage medium. In addition, in the case where video image information or the like is recorded in the information storage medium, it is necessary to guarantee continuity at the time of recording, and a high speed replacing process based on the above described information becomes important.

If a defect occurs in the user data additional writing enable range 205, the replacing process is carried out in predetermined location placed in the spare area SPA or expanded spare area ESPA. Every time the replacing process is carried out, one item of Secondary Defect List Entry information is added; and set information on the positional information on an ECC block utilized as a substitute of the positional information on a defect ECC block is recorded in this RMD field 6. When additional writing of the user data is newly repeated in the user data additional writing enable range 205, if a new defect location is detected, the replacing process is carried out, and the number of items of the secondary defect list entry information increases. A management information area (RMD field 6) for defect management can be expanded by additionally writing the recording management data RMD with an increased number of items of this Secondary Defect List Entry information into the reserved area 273 contained in the recording management zone RMZ, as shown in FIG. 36 (*b*). By using this method, the reliability of defect management information itself can be improved for the reasons described below.

(1) The recording management data RMD can be recorded while avoiding a defect location in the recording management zone RMZ.

A defect location may be produced in the recording management zone RMZ shown in FIG. 36 (*b*). The contents of the recording management data RMD newly additionally written in the recording management zone RMZ are verified immediately after additional writing, thereby making it possible to sense a state in which recording cannot be carried out due to a defect. In that case, the recording management data RMD is rewritten adjacent to the defect location, thereby making it possible to record the recording management data RMD in the form such that high reliability is guaranteed.

(2) Even if the past recording management data RMD cannot be reproduced due to the scratch adhering to an information storage medium surface, a certain degree of backup can be carried out.

For example, in the case where the example shown in FIG. 36 (*b*) is taken, a state in which, after recording management data RMD#2 has been recorded, the information storage medium surface is scratched due to the user's mistake or the like, and then, the recording management data RMD#2 cannot be reproduced, is presumed as an example. In this case, a certain degree of the past defect management information (information contained in the RMD field 6) can be recovered by reproducing information on the recording management data RMD#1 instead.

Size information on the RMD field 6 is recorded at the beginning of the RMD field 6, and this field size is made variable, thereby making it possible to extend the management information area (RMD field 6) for defect management. Each RMD field is set to 2048 size (for one physical sector size), as described previously. However, if a plenty of defects occur with the information storage medium, and then, the replacing process count increases, the size of the Secondary Detect List information increases, and the 2048 byte size (for one physical sector size) becomes insufficient. In consideration of this situation, the RMD field 6 can be set to a plurality of multiples of 2048 size (recording across a plurality of sectors can be carried out). Namely, if "the size of the RMD field 6" has exceeded 2048 bytes, an area for a plurality of physical sectors is arranged to the RMD field 6.

The secondary defect list information SDL records: the secondary defect list entry information described above; "secondary defect list identification information" indicating a start position of the secondary defect list information SDL; and "secondary defect list update counter (update count information)" indicating count information as to how many times the secondary defect list information SDL has been rewritten. The data size of the whole secondary defect list information SDL can be identified based on "number information on the secondary defect list entry".

As described previously, user data recording is locally carried out in units of R zone in the user data additional writing enable range 205. That is, part of the user data additional writing enable range 205 reserved for recoding the user data is referred to as an R zone. This R zone is divided into two types according to a recording condition. Among them, a type of zone in which additional user data can be further recorded is referred to as an Open R Zone, and a type of zone in which no further user data can be added is referred to as a Complete R Zone. The user data additionally writing enable range 205 cannot have three or more Open R zones. That is, up to two Open R zones can be set in the user data additional writing enable range 205. A location in which either of the above two types of R zones are not set in the user data additional writing enable range 205, i.e., a location in which the user data is reserved to record the user data (as either of the above two types of R zones), is referred to as an unspecified R zone (Invisible R Zone). In the case where the user data is fully recorded in the user data additional writing enable range 205, and then, no data can be added, this Invisible R zone does not exist. Up to 254-th R zone position information is recorded in an RMD field 7. The "whole R zone number information" first recorded in the RMD field 7 denotes a total number totalizing the number of Invisible R Zone logically established in the user data additional writing enable range 205, Open R Zones and the number of Complete R Zones. Next, the number information on the first Open R zone and the number information on the second Open R zones are recorded. As described previously, the user data additional writing enable range 205 cannot have three or more Open R zones, and thus, "1" or "0" is recorded (in the case where the first or second Open R zone does not exist). Next, the start position information and the end position information on the first Complete R zone are described in physical sector numbers. Then, the second to 254th start position information and end position information are sequentially described in the physical sector numbers.

In an RMD field 8 and subsequent, the 255-th and subsequent start position information and end position information are sequentially described in the physical sector numbers, and a maximum of RMD fields 15 (a maximum of 2047 Complete R zones) can be described according to the number of Complete R Zones.

FIGS. 51 and 52 each show another embodiment with respect to a data structure in the recording management data RMD shown in FIGS. 44 to 49.

In the embodiment shown in FIGS. 51 and 52, up to 128 bordered areas BRDAs can be set on one write-once type information storage medium. Therefore, the start position information on the first to 128 border out areas BRDOs is recorded in the RMD field 3. In the case where (128 or less) bordered areas BRDAs are set midway, "00h" is set as the start position information on the subsequent border out areas BRDOs. In this manner, it is possible to identify how many bordered areas BRDAs are set on the write-once information storage medium merely by checking to where the start position information on the border out areas BRDOs are recorded in the RMD field 3.

In the embodiment shown in FIGS. 51 and 52, up to 128 expanded recording management zones RMZs can be set on one write-once information storage medium. As described above, there are two types of expanded recording management zones RMZs such as:

1) an expanded recording management zone RMZ set in the border-in area BRDI; and
2) an expanded recording management zone RMZ set by utilizing an R zone.

In the embodiment shown in FIGS. 51 and 52, without discriminating these two types of RMZ zones, they are managed by recoding a pair of the start position information on the expanded recording management zone RMZ (indicated by the physical sector number) and size information (number information on occupying physical sectors) in the RMD field 3. In the embodiment shown in FIGS. 51 and 52, although there has been recorded: information on a pair of the start position information (indicated by the physical sector number) and size information (number information on occupying physical sectors) on the expanded recording management zone RMZ, a set of the start position (indicated by the physical sector number) and the end position information (indicated by the physical sector number) on the expanded recording management zone RMZ may be recorded without being limited thereto. In the embodiment shown in FIGS. 51 and 52, although the expanded recording management zones RMZ numbers have been assigned in order set on the write-once type information storage medium, the expanded recording management data zone RMZ numbers can be assigned in order from the lowest physical sector number as a start position without being limited thereto. Then, the latest recording management data RMD is recorded, a currently used recording management zone (which is open to enable additional writing of RMD) is specified by the number of this expanded recording management zone RMZ. Therefore, the information recording/reproducing apparatus or the information reproducing apparatus identifies the start position information on the currently used (opened so that the RMZ can be additionally recorded) recording management zone based on these items of information, and carries out identification of which one is the latest recording management data RMD from the identified information. Even if the expanded recording management zone is arranged to be distributed onto the write-once type information storage medium, the information recording/reproducing apparatus or information reproducing apparatus can easily carry out identification of which one is the latest recording management data RMD by taking a data structure shown in FIGS. 51 and 52 each. Based on these items of information; the start position information on the currently used (opened) recording management zone is identified; and the location is accessed to identify to where the recording management data RMD has already been recorded. In this manner, the information recording/reproducing apparatus or the information reproducing apparatus can easily identify to where the updated latest recording management data may be recorded.

In the case where 2) an expanded recording management zone RMZ set by utilizing an R zone has been set, one whole R zone corresponds to one expanded recording management zone RMZ. Thus, the physical sector number indicating the corresponding start position of the expanded recording management zone RMZ described in the RMD field 3 coincides with the corresponding physical sector number indicating the start position of the R zone described in the RMD fields 4 to 21.

In the embodiment shown in FIGS. 51 and 52, up to 4606 (4351+255) R zones can be set in one write-once type information storage medium. This set R zone position information is recorded in the RMD field 4 to 21. The start position information on each R zone is displayed by the information on the physical sector number, and the physical sector numbers LRAs (Last Recorded Addresses) indicating the end recording position in each R zone are recorded in pair. Although the R zones described in the recording management data RMD are set in order of setting R zones in the embodiment shown in FIGS. 51 and 52, these zones can be set in order from the lowest physical sector number indicating the start position information without being limited thereto. In the case where R zone setting of the corresponding number is not provided, "00h" is recorded in this field. Number information on invisible R zone is described in the RMD field 4. This number information on invisible R zone is indicated by a total number of the number of invisible R zones (zones in which area reserved for data recording is not made in data area DTA); the number of open type R zones (zones each having an unrecorded area in which additional writing can be carried out); and the number of complete type R zones (R zones which are already complete and which does not have an unrecorded area in which additional writing can be carried out). In the embodiment shown in FIGS. 51 and 52, it is possible to set up to two Open R zones in which additional writing can be carried out. In this way, by setting up to two Open R zones, it is possible to record video image information or audio information for which continuous recording or continuous reproduction must be guaranteed in one Open R zone, and then, separately record management information relevant to the video image information or audio information; general information used by a personal computer or the like; or file system management information in the remaining one Open R zone. Namely, it is possible to separately record plural items of information in another Open R zone according to type of user data to be recorded. This results in improved convenience in recording or reproducing AV information (video image information or audio information). In the embodiment shown in FIGS. 51 and 52, which R zone is an Open R zone is specified by the R zone allocation numbers arranged in the RMD fields 4 to 21. That is, the R zones are specified by the corresponding R zone number to the first and second Open R zones. A search can be easily made for the Open R zone by taking such a data structure. In the case where no Open R zone exists, "00h" is recorded in that field. In the present embodiment, the end position of an R zone coincides with the end recording position in the Complete R zone, the end position of the R zone and the last recording position LRA in the R zone are different from each other in the Open T zone. On the way of additionally writing user information in the Open R zone (at a state that precedes completion of additional writing of the recording management data RMD to be updated), the end recording position and a recording position at which additional writing can be further carried out are shifted. However, after an additional writing process of user information has completed, after completing the additional writing process of the latest recording management data RMD to be recorded, the end recording position and an end recording position at which additional writing can be further carried out coincide with each other. Therefore, after completing the additional writing process of the latest recording management data RMD to be updated, in the case where additional writing of new user data is carried out, the control unit 143 in the information recording/reproducing apparatus shown in FIG. 11 carries out processing in accordance with procedures for:

(1) checking a number of an R zone which corresponds to the Open R zone described in the RMD field 4;

(2) checking a physical sector number indicating an end recording position in the Open R zone described in each of the RMD fields 4 to 21 to identify an end recording position at which additional writing can be carried out; and (3) starting additional writing from the above identified end recording position NWA at which additional writing can be carried out.

In this manner, a new additional writing start position is identified by utilizing Open R zone information in the RMD field 4, thereby making it possible to sample a new additional writing start position simply and speedily.

FIG. 53 shows a data structure in an RMD field in the embodiment shown in FIGS. 51 and 52. As compared with the embodiment shown in FIGS. 44 to 49, there are added: address information on a location in which recording condition adjustment has been made in the inner drive test zone DRTZ (which belongs to the data lead-in area DTLDI); and address information on a location in which recording condition adjustment has been made in the outer drive test zone DRTZ (which belongs to the data lead-out area DTLDO). These items of information are described in the physical segment block address numbers. Further, in the embodiment shown in FIG. 53, there are added: information relating to a method for automatically adjusting a recording condition (running OPC); and the end DSV (Digital Sum Value) value at the end of recording.

Figure 56:
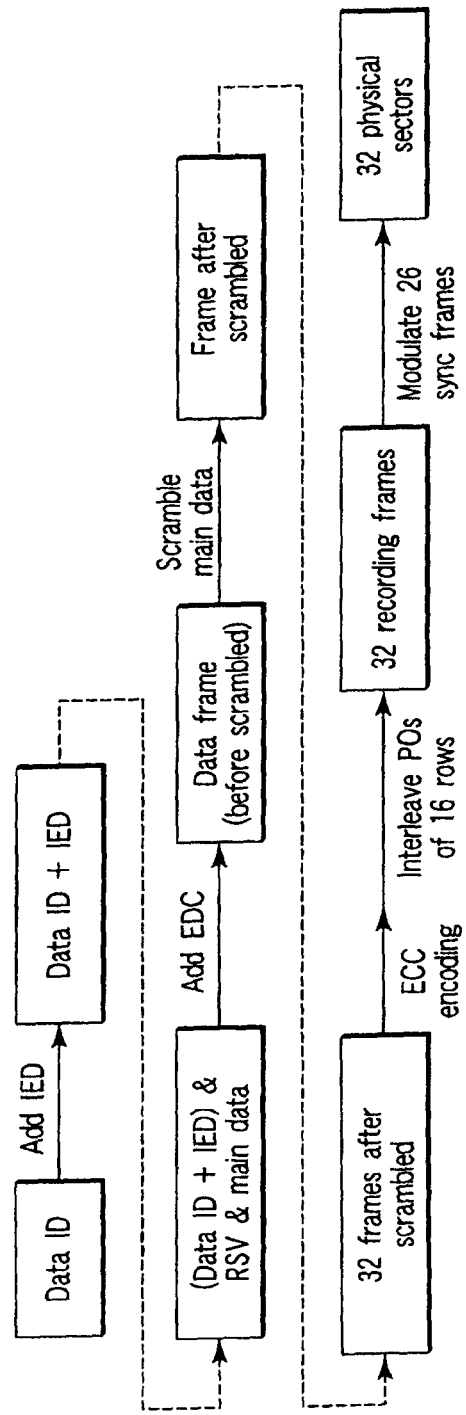
FIG. 56 is an exemplary view schematically showing converting procedures for configuring a physical sector structure.

FIG. 56 shows an outline of converting procedures for, after an ECC block is configured of a data frame structure in which user data in units of 2048 bytes has been recorded, and then, sync codes have been added, forming a physical sector structure to be recorded in an information storage medium. These converting procedures are employed in common for a read-only type information storage medium, a write-once type information storage medium, and a rewritable-type information storage medium. According to each converting stage, a data frame, a scrambled frame, a recording flame, or recorded data field are defined. The data frame is a location in which user data is recorded. This frame is composed of: main data consisting of 2048 types; a four-type data ID; a two-byte ID error detecting code (IED); a six-byte reserved bytes (RSV); and a four-byte error detecting code (EDC). First, after an IED (ID error detecting code) has been added to a data ID described later, the 6-byte reserved byte and main data consisting of 2048 bytes and in which the user data is recorded are added. Then, an error detecting code (EDC) is added. Then, scrambling relevant to the main data is executed. Here, a Cross Reed-Solomon Error Correction Code is applied to these scrambled 32 data frames (scrambled frames), and an ECC encode processing operation is executed. In this manner, a recording frame is configured. This recording frame includes a parity of outer-code (PO) and a parity of inner-code (PI). The PO and PI each are error correcting codes produced with respect ECC blocks, each of which consists of 32 scrambled frames. The recording frame, as described previously, is subjected to ETM (Eight to Twelve Modulation) for converting eight data bits to 12-channel bits. Then, a sync code SYNC is added to the beginning on a 91 by 91 bytes basis, and 32 physical sectors are formed. As described in the lower right frame shown in FIG. 56, the present embodiment is featured in that one error correcting unit (ECC block) is composed of 32 sectors. As described later, the numbers "0" to "31" in each frame shown in FIG. 60 or 61 indicate the numbers of physical sectors, respectively, and a structure is provided to ensure that one large ECC block is composed of a total of 32 physical sectors. In a next-generation DVD, even in the case where a scratch whose extent is identical to that of a current-generation DVD adheres to an information storage medium surface, it is required to enable reproduction of precise information by an error correction processing operation. In the present embodiment, recording density has been improved for the achievement of high capacity. As a result, in the case where a conventional one ECC block=16 sectors, a length of a physical scratch which can be corrected by error correction is reduced as compared with a conventional DVD. As in the present embodiment, there is attained advantageous effect that one ECC block is composed of 32 sectors, thereby making it possible to increase an allowable length of a scratch on the information storage medium surface for which error correction can be carried out and to ensure compatibility/format continuity of a current DVD ECC block structure.

FIG. 57 shows a structure in a data frame. One data frame is 2064 bytes consisting of 172 bytes×2×6 rows, and includes main data of 2048 bytes. IED is an acronym for IE Error Detection Code, and denotes a reserved area for enabling setting of information in the future. EDC is an acronym for Error Detection Code, and denotes an additional code for error detection of a whole data frame.

FIG. 50 shows a data structure in a data ID shown in FIG. 57. The data ID is composed of items of information on data frames 921 and 922. The data frame number indicates a physical sector number 922 of the corresponding data frame.

The data frame information 921 is composed of the following items of information.

Format type 931 . . . 0b: This indicates CLV.
1b: This indicates zone configuration
Tracking method 932 . . . 0b: This is pit-compatible and uses a DPD (Differential Phase Detect) technique in the present embodiment.
1b: This is pre-groove compatible and uses a push-pull technique or a DPP (Differential Push-Pull) technique.
Recording film reflection factor 933 . . . 0b: 40% or more
1b: 40% or less
Recording type information 934 . . . 0b: General data
1b: Real time data (Audio Video data)
Area type information 935 . . . 00b: Data area DTA
01b: System lead-in area SYLDI or data lead-in area DTLDI
10b: Data lead-out area DTLDO or system lead-out area SYLDO
Data type information 936 . . . 0b: Read-only data
1b: Rewritable data
Layer number 937 . . . 0b: Layer 0
1b: Layer 1

Figures 58A, 58B:
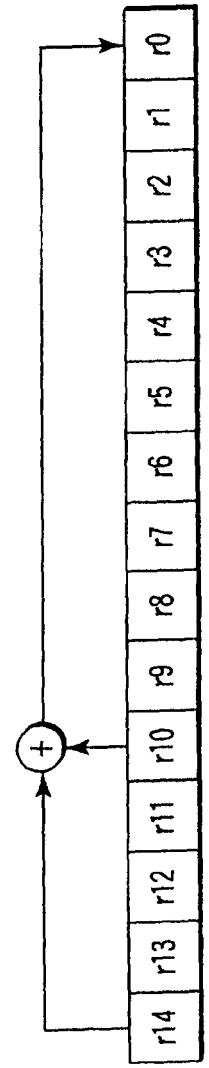
FIGS. 58A and 58B are exemplary views each showing an initial value assigned to a shift register when creating a frame after scrambled and a circuit configuration of a feedback resistor.

FIG. 58A shows an example of default values assigned to a feedback shift register when a frame after scrambled is produced. FIG. 58B shows a circuit configuration of the feedback shift register for producing scrambled bytes. The values of r7 (MSB) to r0 (LSB) are used as scramble bytes while they are shifted by 8 by 8 bit basis. As shown in FIG. 58A, 16 types of preset values are provided in the present embodiment. The default preset numbers shown in FIG. 58A are equal to 4 bits of data ID (b7 (MSB) to b4 (LSB)). When data frame scrambling is started, the default values of r14 to r0 must be set to the default preset values in a table shown in FIG. 58A. The same default preset value is used for 16 continuous data frames. Next, the default preset values are changed, and the changed same preset value is used for the 16 continuous data frames.

The least significant eight bits of the default values of r7 to r0 are sampled as a scramble byte S0. Then, eight-bit shifting is carried out, and the scrambled byte is then sampled. Such an operation is repeated 2047 times.

Figures 59, 60:
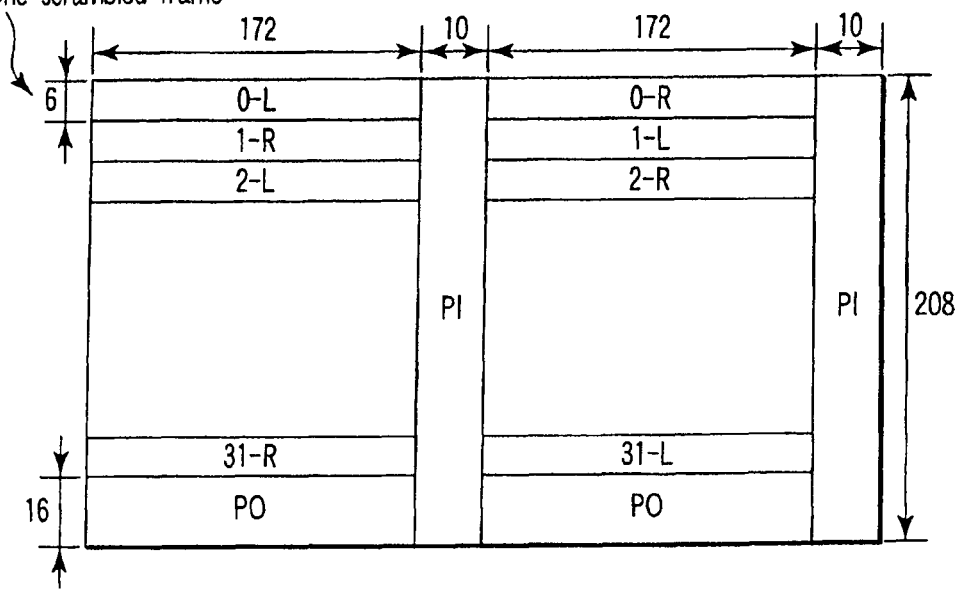
FIG. 59 is an exemplary view of an ECC block structure.
FIG. 60 is an exemplary view of a frame arrangement after scrambled.

FIG. 59 shows an ECC block structure in the present embodiment. The ECC block is formed of 32 scrambled frames. 192 rows+16 rows are arranged in a vertical direction, and (172+10)×2 columns are arranged in a horizontal direction. $B_{0,0}$, $B_{1,0}$, . . . are one byte, respectively. PO and PI are error correction codes, and an outer parity and an inner parity. In the present embodiment, an ECC block structure using a multiple code is configured. That is, as error correction additional bits, a structure is provided such that, PI (Parity in) is added in a "row" direction, and PO (Parity out) is added in a "column" direction. A high error correction capability using an erasure correction and a vertical and horizontal repetitive correction process can be guaranteed by configuring such an ECC block structure using a multiple code. Unlike a conventional DVD ECC block structure, the ECC block structure shown in FIG. 59 is featured in that two PIs are set in the same "row". That is, PI of 10-byte size described at the center in FIG. 59 is added to 172 bytes arranged at the left side. That is, for example, 10-byte PI from $B_{0,0}$ to $B_{0,172}$ is added to 172-byte data from $B_{0,0}$ to $B_{0,171}$; and 10-byte PI from $B_{1,172}$ to $B_{1,181}$ is added to 172-byte data from $B_{1,0}$ to $B_{1,171}$. The PI of 10-byte size described at the right end of FIG. 59 is added to 172 bytes arranged at the center on the left side of the FIG. 59. That is, for example, 10-byte PI from $B_{0,354}$ to $B_{0,363}$ are added to 172-byte data from $B_{0,182}$ to $B_{0,353}$.

FIG. 60 shows an illustration of a frame arrangement after scrambled. Units of (6 rows×172 bytes) are handled as one frame after scrambled. That is, one ECC block consists of 32 frames after scrambled. Further, this system handles a pair of (block 182 bytes×207 bytes). When L is assigned to the number of each frame after scrambled, in the left side ECC block, and R is assigned to the number of each frame after scrambled in the right side ECC block, the frames after scrambled are arranged as shown in FIG. 60. That is, the left and right frames after scrambled exist alternately at the left side block, and the frames after scrambled exist alternately at the right side block.

That is, the ECC block is formed of 32 frames after continuously scrambled. Lines of the left half of odd numbered sectors each are exchanged with those of the right half. 172×2 bytes×192 rows are equal to 172 bytes×12 rows×32 scrambled frames, and are obtained as a data area. 16-byte PO is added to form an outer code of RS (208, 192, 17) in each 172×2 columns. 10-byte PI (RS (182, 172, 11)) is added to each 208×2 rows in the left and right blocks. PI is added to a row of PO as well. The numerals in frames indicate scrambled frame numbers, and suffixes R and L denote the right half and the left half of the scrambled frame. The present embodiment is featured in that the same data frame is arranged to be distributed in a plurality of small ECC blocks. Specifically, in the present embodiment, a large one ECC block is composed of two small ECC blocks, and the same data frame are arranged to be alternately distributed into two small ECC blocks. As has already been described in FIG. 59, PI of 10-byte size described at the center is added to 172 bytes arranged at the left side, and PI of 10 byte size described on the right end is added to 172 bytes arranged at the center on the left side. Namely, the left side small ECC block is composed of continuous PI of 10 bytes from the left end of FIG. 59, and the right side small ECC block is composed of 10 bytes at the right end from the central 172 bytes. The signs in each frame are set in response to these blocks in FIG. 60. For example, "2-R" denotes which of a data frame number and the left and right small ECC blocks one belongs to (for example, one belongs to right side small ECC block in second data frame). As described later, with respect to each of the finally configured physical sectors, the data contained in the same physical sector is also alternately arranged to be distributed into the left and right small ECC blocks (the columns of the left half in FIG. 61 are included in the left side small ECC block (small ECC block "A" on the left side shown in FIG.

Figure 64:
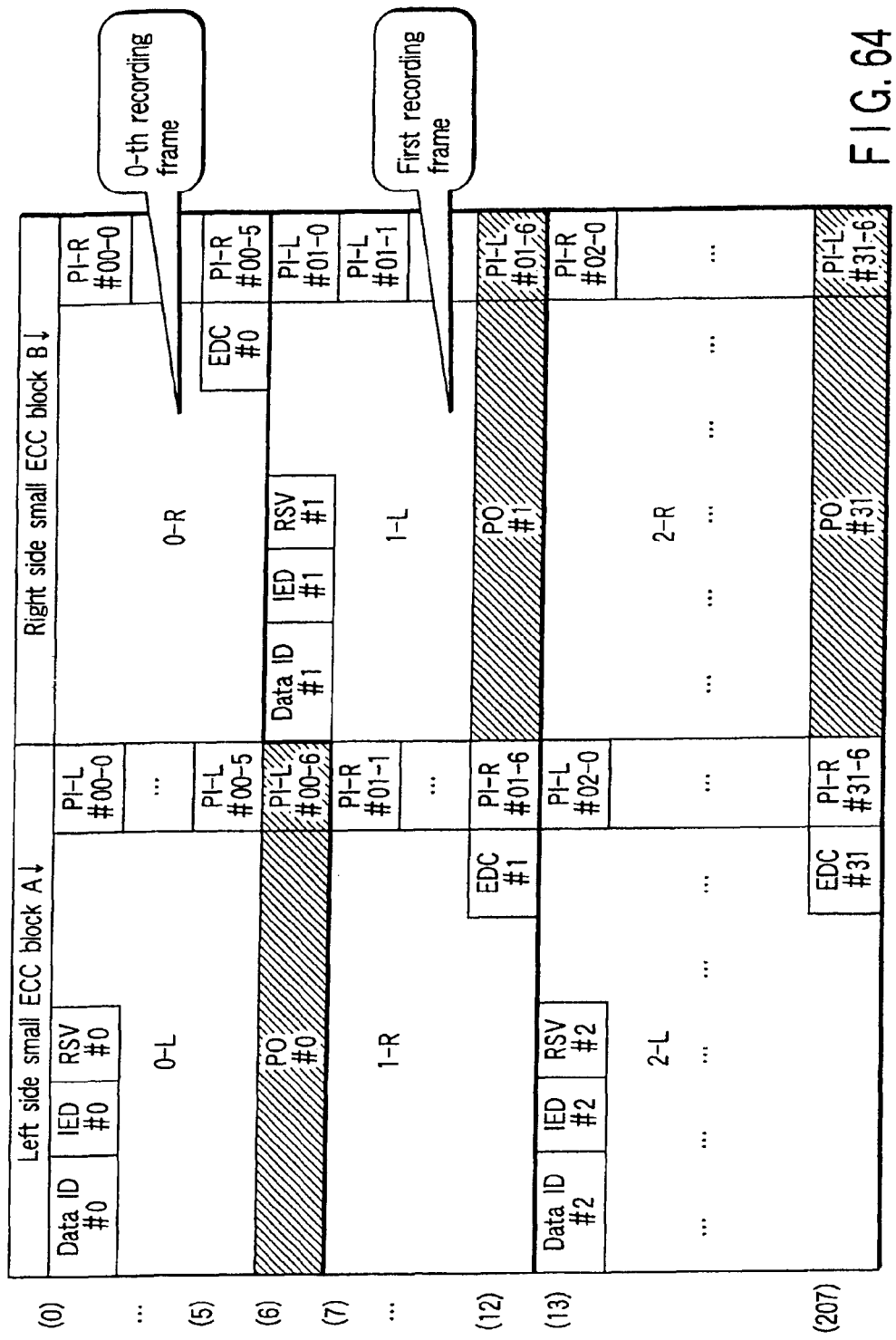
FIG. 64 is an exemplary view showing a detailed structure of an ECC block after PO interleaved, shown in FIG. 61.

64), and the column of the right half are included in small ECC blocks (small ECC block B on the right side shown in FIG. 64).

Figure 61:
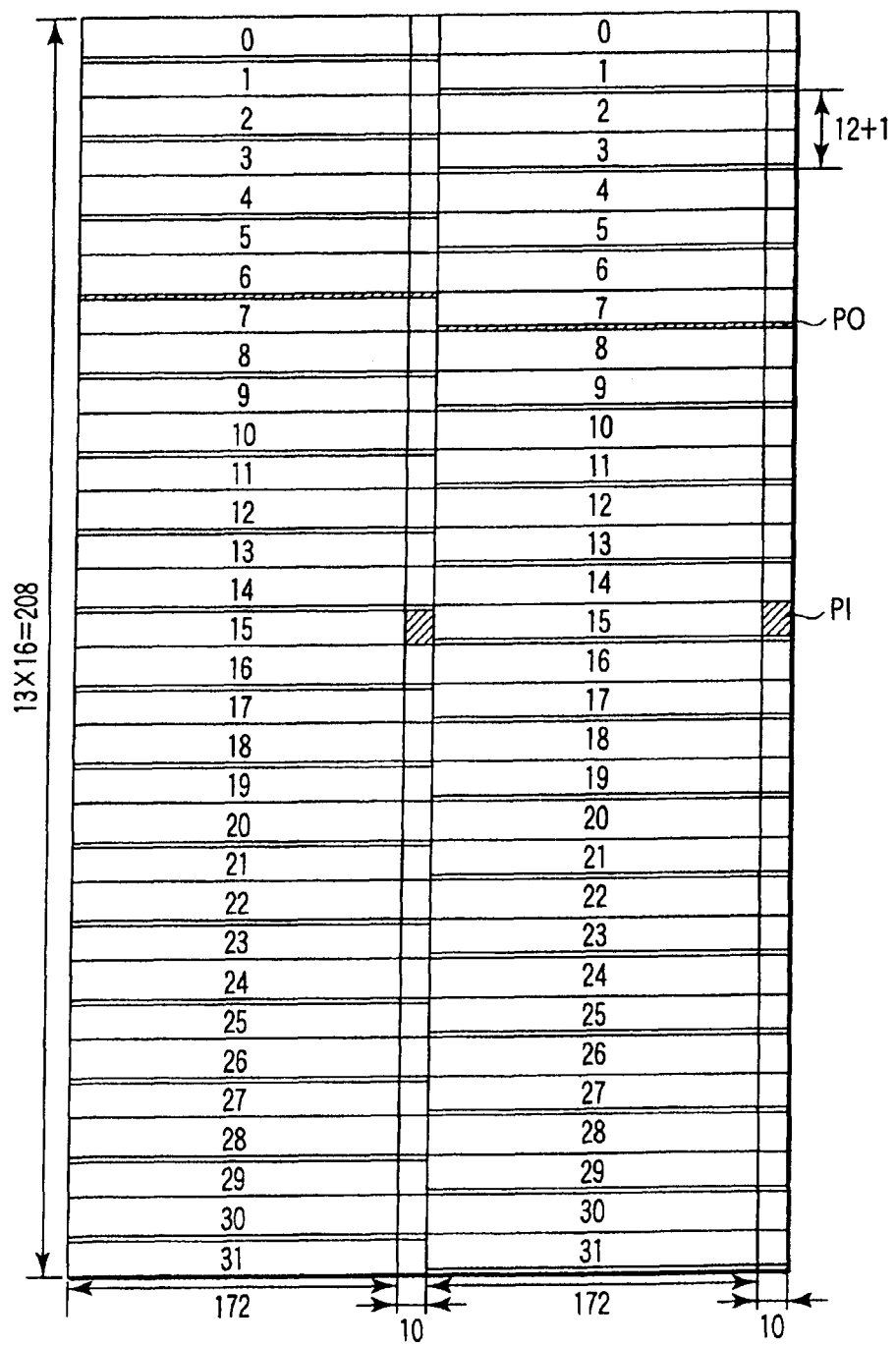
FIG. 61 is an exemplary view of a PO interleaving method.

Thus, when the same data frame is arranged to be distributed in a plurality of small ECC blocks, the reliability of recording data is improved by improving an error correction capability of the data contained in a physical sector (FIG. 61). For example, let us consider a case in which a track fails at the time of recording; the recorded data is overwritten; and data for one physical sector is damaged. In the present embodiment, the damaged data contained in one sector is subjected to error correction by using two small ECC blocks; a burden on error correction in one ECC block is reduced; and error correction with better performance is guaranteed. In the present embodiment, even after forming an ECC block, a structure is provided such that a data ID is arranged at the start position of each sector, thus making it possible to check a data position at the time of access at a high speed.

FIG. 61 shows an illustration of a PO interleaving method. As shown in FIG. 61, 16 parities are distributed on one by one row basis. That is, 16 parity rows are arranged on a one by one row basis with respect to two recording frames placed. Therefore, a recording frame consisting of 12 rows is obtained as 12 rows+1 row. After this row interleaving has been carried out, 13 rows×182 bytes are referred to as a recording frame. Therefore, an ECC block after row interleaved consists of 32 recording frames. In one recording, as described in FIG. 60, 6 rows exist in each of the right side and left side blocks. POs are arranged so as to be positioned in different rows between a left block (182×208 bytes) and a right block (182×208 bytes). FIG. 61 shows one complete type ECC block. However, at the time of actual data reproduction, such ECC blocks continuously arrive at an error correction processing section. In order to improve such an error correction processing capability, there is employed an interleaving system as shown in FIG. 61.

Referring to FIG. 61, a detailed description will be given with respect to a relationship from a structure in one data frame shown in FIG. 57 to a PO interleaving method shown in FIG. 61. FIG. 64 is an enlarged view showing, an upper side portion of an EC block structure after PO-interleaved shown in FIG. 61, wherein allocation locations of data ID, IED, RSV, and EDC shown in FIG. 57 are explicitly indicated, thereby visually identifying a series of conversion from FIGS. 57 to 61. "0-L" "0-R", "1-R", and "1-L" shown in FIG. 64 correspond to "0-L", "0-R", "1-R", and "1-L" shown in FIG. 60, respectively. The "0-L" and "1-L" denote data obtained after only the main data has been scrambled with respect to the left half shown in FIG. 57, that is, a set composed of 172 bytes and six rows from the center line to the left side. Similarly, the "0-R" and "1-R" denote data obtained after only the main data has been scrambled with respect to the right half shown in FIG. 57, that is, a set composed of 172 bytes and six rows from the center line to the right side. Therefore, as is evident from FIG. 57, data ID, IED, and RSV are arranged in order from the beginning of the first row (row 0) to byte 12 of "0-L" and "1-L". In FIG. 64, the centerline to the left side configures the left side small ECC block "A", and the centerline to the right side configures the right side small ECC block "B". Therefore, as is evident from FIG. 64, data ID#1, data ID#2, IED#0, IED#2, RSV#0, and RSV#2 included in "0-L" and "2-L" are included in the left side small ECC block "A". In FIG. 60, "0-L" and "2-L" are arranged at the left side, and "0-R" and "2-E" are arranged at the right side. In contrast, "1-R" and "1-L" are arranged at the left and right sides, respectively. Data ID#1, IED#1, and RSV#1 are arranged from the beginning to byte 12 of the first row in "1-L". Thus, as a result of reversing the left and right allocations, as is evident from FIG. 64, data ID#1, IED#1, and RSV#1 included in "1-L" is configured in the right side small ECC block "B". In the present embodiment, a combination of "0-L" and "0-R" in FIG. 64 is referred to as a "0-th recording frame" and a combination of "1-L" and "1-R" is referred to as a "first recording frame". The boundary between the recording frames are indicated by the bold characters shown in FIG. 64. As is evident from FIG. 64, data ID is arranged at the beginning of each recording frame and PO and PI-L are arranged at the end of each recording frame. As shown in FIG. 64, the present embodiment is featured in that small ECC blocks in which data ID is included are different from each other depending on the odd-numbered and even-numbered recording frames, and data ID, IED, and RSV are alternately arranged in the left side and right side small ECC blocks "A" and "B" in accordance with continuous recording frames. The error correction capability in one small ECC lock is limited, and error correction is disabled with respect to a random error exceeding a specific number or a burst error exceeding a specific length. As described above, data ID, IED, and RSV are alternately arranged in the left side and right side small ECC blocks "A" and "B", thereby making it possible to improve the reliability of reproduction of data ID. That is, even if a defect on an information storage medium frequently occurs, disabling error correction of any of the small ECC blocks and disabling decoding of data ID to which the faulty block belongs, data ID, IED, and RSV are alternately arranged in the left side and right side small ECC blocks "A" and "B", thus enabling error correction in the other small ECC block and enabling decoding the remaining data ID. Because the address information contained in data ID continuously lasts, the information on data ID is used, enabling interpolation with respect to the information on data ID which has not been successfully decoded. As a result, the access reliability can be improved according to the embodiment shown in FIG. 64. The numbers parenthesized at the left side of FIG. 64 denote row numbers in an ECC block after PO-interleaved. In the case where numbers are recorded in an information storage medium, row numbers are sequentially recorded from the left to the right. In FIG. 64, data ID intervals included in each recording frame are always constantly arranged, and thus, there is attained advantageous effect that data ID position searching capability is improved.

A physical sector structure is shown in FIGS. 62A and 62B. FIG. 62A shows an even numbered physical sector structure, and FIG. 62B show an odd numbered data structure. In FIGS. 62A and 62B, with respect to both of an even recorded data field and an odd recorded data field, outer parity PO information shown in FIG. 61 is inserted into a sync data area contained in the last 2 sync frames (i.e., in a portion at which the last sync code is SY3 and a portion at which the immediately succeeding sync data and sync code is SY1; and a portion at which sync code is SY1 and a portion at which the immediately succeeding sync data is arranged in the sync data area shown in FIG. 61 wherein information of outer parity PO is inserted).

Part of the left side PO shown in FIG. 60 is inserted at the last two sync frames in the even recorded data field, and part of the right side PO shown in FIG. 60 is inserted at the last two sync frames in the odd recorded data field. As shown in FIG. 60, one ECC block is composed of the left and right small ECC blocks, respectively, and the data on PO groups alternately different depending on sectors (the data on PO belonging to left small ECC block or the data on PO belonging to right small ECC block) is inserted. The even numbered physical sector structure shown in FIG. 62A and the odd numbered data structure shown in FIG. 62B are divided into two sections at a center line. The left side "24+1092+24+1092 channel bits are included in the left side small ECC block shown in FIG. 59 or 60, and the right side "24+1092+24+1092 channel bits are included in the right side small ECC block shown in FIG. 59 or 60. In the case where the physical sector structure shown in FIGS. 62A and 62B is recorded in an information storage medium, this structure is serially recorded on one by one column base. Therefore, for example, in the case where channel bit data on an even numbered physical sector structure shown in FIG. 62A is recorded in an information storage medium, the data on 2232 channel bits first recorded is included in the left side small ECC block, and the data on the 2232 channel bits recorded next is included in the right side small EC block. Further, the data on 2232 channel bits recorded next is included in the left side small ECC block. In contrast, in the case where the channel bit data on an odd numbered data structure shown in FIG. 62B is recorded in an information storage medium, the data on 2232 channel bits first recorded is included in the right side small ECC block, and the data on the 2232 channel bits recorded next is included in the left side small EC block. Further, the data on 2232 channel bits recorded next is included in the right side small ECC block. Thus, the present embodiment is featured in that the same physical sector is alternately included in two small ECC blocks on a 2232 by 2322 channel bit basis. In other words, a physical sector is formed in the shape such that the data included in the right side small ECC block and included in the left side small ECC block are alternately arranged to be distributed on a 2232 by 2332 channel bit basis, and the formed physical sector is recorded in an information storage medium. As a result, there is attained advantageous effect that a structure strong to a burst error can be provided. For example, let us consider a state in which a lengthwise scratch occurs in a circumferential direction of an information storage medium, and there occurs a burst error which disables decoding of data exceeding 172 bytes. In this case, a burst error exceeding 172 bytes is arranged to be distributed in two small ECC blocks. Thus, a burden on error correction in one ECC block is reduced, and error correction with better performance is guaranteed.

The present embodiment is featured by, as shown in FIGS. 62A and 62B, a data structure in a physical sector is different from another depending on whether or not the physical sector number of a physical sector configuring one ECC block is an even number or an odd number. Namely, (1) Small ECC blocks (right side or left side) to which the first 2232 channel bit data of a physical sector belongs are different from each other; and (2) There is provided a structure in which data on a PO group alternately different from each other depending on sectors is inserted.

As a result, in order to guarantee a structure in which data ID is arranged at the start position of all the physical sectors even after an ECC block has been configured, a data position check at the time of access can be made at a high speed. In addition, POs which belong to different small ECC blocks are mixed and inserted into the same physical sector, structurally simplifying a method employing a PO inserting method as shown in FIG. 61, facilitating information sampling on a sector by sector manner after error correction processing in an information reproducing apparatus; and simplifying an ECC block data assembling process in an information recording/reproducing apparatus.

In a method for specifically achieving the above contents, PO interleaving and inserting positions have different structures depending on the left and right. Portions indicated by the narrow double lines shown in FIG. 61 or portions indicated by the narrow double line and shading indicate the PO interleaving and inserting positions. PO is inserted at the left end in an even numbered physical sector number or at the right end in an odd numbered physical sector number. By employing this structure, even after an ECC block has configured, data ID is arranged at the start position of a physical sector, thus making it possible to check a data position at the time of access at high speed.

FIG. 63 shows an embodiment of specific pattern contents from sync codes "SY0" to "SY3" shown in FIGS. 62A and 62B. Three states from State 0 to State 2 are provided in accordance with a modulation rule according to the present embodiment (a detailed description will be given later). Four sync codes from SY0 to SY3 are set, and each code is selected from the left and right groups shown in FIG. 63 according to each state. In a current DVD specification, as a modulation system, there employed RLL(2, 10) of 8/16 modulation (8 bits are converted to 16 channel bits (a minimum value is 2 and a maximum value is 10 when Run Length Limit: d=2, k=10: "0" continuously lasts), four states from State 1 to State 4, i.e., eight types of sync codes from SY0 to SY7 are set. In comparison, in the present embodiment, types of sync codes are decreased. In an information recording/reproducing apparatus or an information reproducing apparatus, at the time of information reproduction from an information storage medium, types of sync code is identified in accordance with a pattern matching technique. As in the present embodiment, by significantly decreasing types of sync codes, target patterns required for matching are decreased in number; a processing operation required for pattern matching is simplified; and the processing efficiency is improved, making it possible to improve a recognition speed.

In FIG. 63, a bit (channel bit) indicated by "#" denotes a DSV (Digital Sum Value) control bit. As described later, the above DSV control bit is determined so as to suppress a DC component by means of a DSV controller (so as to make a value of DSM close to 0). The present embodiment is also featured in that a polarity inversion channel bit "#" is included in a sync code. There is attained advantageous effect that a value of "#" can be selected as "1" or "0" so that the DSV value is close to "0" in a macroscopic point of view, including both frame data fields (1092 channel bit fields shown in FIGS. 62A and 62B) sandwiching the above sync code, enabling DSV control from the macroscopic point of view.

As shown in FIG. 63, the sync codes in the present embodiment is composed of the sections below.

(1) Sync Position Detecting Code Section

This section has a common pattern in all sync codes, and forms a fixed code area. A sync code allocation position can be detected by detecting this code. Specifically, this section denotes the last 18 channel bits "010000 000000 001001" in each sync code in FIG. 63.

(2) Modulation Conversion Table Selector Code Section

This section forms part of a variable code area, and changes in response to state number at the time of modulation. The first channel bit shown in FIG. 63 corresponds to this section. That is, in the case where one of State 1 and State 2 is selected, the first channel bit is set to "1" in any of the codes from SY0 to SYY3. When State 0 is selected, the first channel bit of a sync code is set to "1". However, as an exception, the first channel bit of SY3 in State 0 is set to 0".

(3) Sync Frame Position Identification Code Section

Part of a variable code area is composed of codes identifying types from SY0 to SY3 in sync codes. The first to sixth channel bit section in each sync code shown in FIG. 63 corresponds to this section. As described later, a relative position in the same sector can be detected from a connection pattern of three by three sync codes continuously detected.

(4) DC Suppressing Polarity Inversion Code Section

A channel bit at a position "#" shown in FIG. 63 corresponds to this section. As described above, this bit is inverted or non-inverted, thereby making close to "0" the DSV value of a channel bit pattern including the preceding and succeeding frame data.

In the present embodiment, 8/12 modulation (ETM: Eight to Twelve Modulation), RLL (1, 10) is employed as a modulation method. That is, eight bits are converted to 12-channel bits at the time of modulation, and a minimum value (d value) is set to 1, and a maximum value (k value) is set to 10 in a range such that the settings "0" after converted are continuous. In the present embodiment, although high density can be achieved more significantly than conventionally by setting d=1, it is difficult to obtain a sufficiently large reproduction signal amplitude at a site indicated by the mark indicating the highest density.

Therefore, as shown in FIG. 11, an information recording/reproducing apparatus according to the present embodiment has the PR equalizing circuit 130 and the Viterbi decoder 156, and enables very stable signal reproduction by using a PRML (Partial Response Maximum Likelihood) technique. In addition, k=10 is set, and thus, there is no case in which eleven or more "0" settings are continuous in the modulated general channel bit data. By utilizing this modulation rule, the above sync position detecting code section has a pattern which hardly appears in the modulated general channel bit data. That is, as shown in FIG. 63, in the sync position detecting code section, 12 (=k+2) "0"s are continuously arranged. The information recording/reproducing apparatus or the information reproducing apparatus finds this section and detects a position of the sync position detecting code section. In addition, if "0" continuously lasts too much, a bit shift error is likely to occur. Thus, in order to reduce this problem, in the sync position detecting code section, a pattern having less continuous "0"s is arranged immediately after that portion. In the present embodiment, d=1, and thus, it is possible to set "101" as the corresponding pattern. However, as described above, a sufficiently large reproduction signal amplitude is hardly obtained at a site of "101" (at a site indicating the highest density), and thus, "1001" is arranged instead, obtaining a pattern of the sync position detecting code section as shown in FIG. 63.

The present embodiment is featured in that, as shown in FIG. 63, 18 channel bits at the back side in a sync code are independently used as (1) sync position detecting code section, and the front side 6 channel bits are used as (2) modulation conversion table selector code section; (3) sync frame position identification code section; or (4) DC suppression polarity inversion code section. There is attained advantageous effect that in the sync codes, the sync position detecting code section in item (1) is provided independently, thereby facilitating single detection and enhancing sync position detecting precision; the code sections in items (2) to (4) are used in common in the 6-channel bits, thereby reducing the data size of the whole sync codes (channel bit size); and a sync data occupying rate is increased, thereby improving substantial data efficiency.

The present embodiment is featured in that, from among four types of sync codes shown in FIG. 63, only SY0 is arranged at the first sync frame position in a sector, as shown in FIGS. 62A and 62B. Advantageous effect thereof includes that the start position in a sector can be identified immediately merely by detecting SY0, and the start position sampling process in the sector is extremely simplified.

The present embodiment is also featured in that all of the combination patterns of three continuous sync codes are different from each other in the same sector.

A detailed description will be given with respect to the pattern contents of a reference code recorded in the reference code recording zone RCZ shown in FIGS. 35A to 35C. In a current DVD, an "8/16 modulation" system for converting 8-bit data to 16-channel bits is employed as a modulation system. As a pattern of a reference code serving as a channel bit pattern recorded in an information storage medium after modulated, there is employed a repetition pattern "001000001000000100010000010000001". In comparison with this pattern, in the present embodiment, ETM modulation for modulating 8-bit data into 12-channel bits is used as shown in FIGS. 32 to 34, providing an RLL (1, 10) run length restriction. In addition, the PRML technique is employed for signal reproduction from the data lead-in area DTLDI, data area DTA, data lead-out area DTLDO, and middle area MDA. Therefore, there is a need for setting the above described modulation rule and a pattern of a reference code optimal for PRML detection. In accordance with the RLL(1, 10) run length restriction, a minimum value of continuous "0" settings is "d=1", and is a repetition pattern of "10101010". Assuming that a distance from a code "0" to the next adjacent code is "T", a distance relevant to the adjacent "1" in the above pattern is obtained as "2T". In the present embodiment, in order to achieve high density of an information storage medium, as described previously, a reproduction signal from the repetition pattern ("10101010") of "2T" recorded on the information storage medium is close to a shutdown frequency of MTF (Modulation Transfer Function) characteristics of an objective lens in an optical head (exists in the information recording/reproducing unit 141 shown in FIG. 11); and thus, a degree of modulation (signal amplitude) is hardly obtained. Therefore, in the case where a reproduction signal from a repetition pattern ("10101010") of "2T" has been used as a reproduction signal used for circuit tuning of the information reproducing apparatus or the information recording/reproducing apparatus (for example, initialing and optimizing tap coefficients in the tap controller 332 shown in FIG. 15), noise effect is significant, and stabilization is poor. Therefore, with respect to a signal after modulated in accordance with RLL(1, 10) run length restriction, then, it is desirable to carry out circuit tuning by using a pattern of "3T" having high density. In the case where a digital sum value (DSV) of the reproduction signal is considered, an absolute value of a DC (direct current) value increases in proportion to the number of continuous "0"s between "1" and next "1" that immediately follows it, and the increased value is added to the immediately preceding DSV value. The polarity of this added DC value is inverted every time "1" is reached. Therefore, as a method for setting the DSV value to "0" where a channel bit pattern having continuous reference code is followed, the DSV value is set to be "0" in 12 channel bit patterns after ETM-modulated, whereby the degree of freedom in reference code pattern design is increased more significantly by setting to an odd number the number of generated "1" appearing in 12 channel bit patterns after ETM-modulated; offsetting a DC component generated in one set of reference code cells consisting of a next set. Therefore, in the present embodiment, the number of "1" appearing in the reference code cells consisting of 12 channel bit patterns after ETM-modulated is set to an odd number. In the present embodiment, in order to achieve high density, there is employed a mark edge recording technique in which a location of "1" coincides with a boundary position of a recording mark or an emboss pit. For example, in the case where a repetition pattern of "3T"

Figure 72:
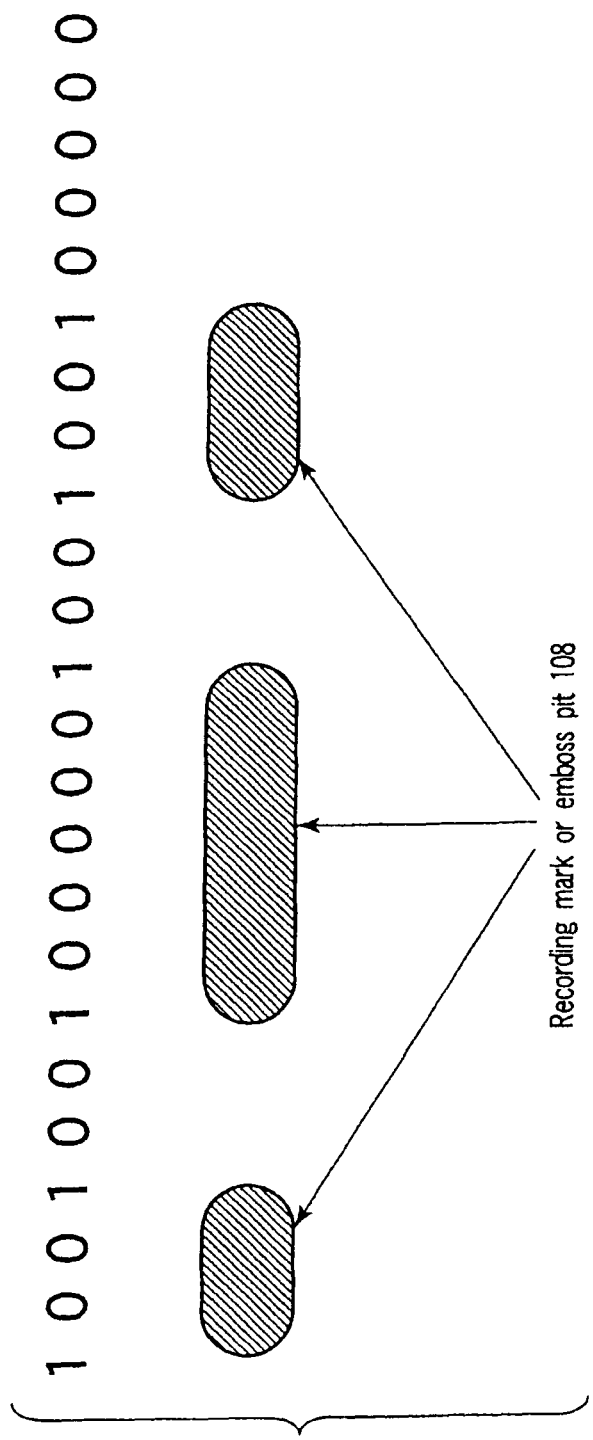
FIG. 72 is an exemplary view of a reference code pattern.

("1001001001001001001000") is followed, there occurs a case in which a length of a recording mark or an emboss pit and a length of a space between the mark and pit are slightly different from each other depending on a recording condition or an original master producing condition. In the case where the PRML detecting technique has been employed, a level value of a reproduction signal becomes very important. As described previously, even in the case where the length of the recording mark or emboss pit and the length of the space between the mark and pit are different from each other, there occurs a necessity of correcting such slightly different component in a circuit manner so as to enable signal detection stably and precisely. Therefore, a reference code for tuning a circuit constant has a space with a length of "3T", like a recording mark or an emboss pit with a length of "3T", thereby improving the precision of tuning a circuit constant. Thus, if a pattern of "1001001" is included as a reference code pattern according to the present embodiment, the recording mark or emboss pit having the length "3T"; and a space are always arranged. In addition, circuit tuning also requires a pattern in a non-dense state as well as a pattern ("1001001") having a high density. Therefore, in consideration of that fact that a non-dense state (pattern in which "0" is continuously and frequently generated) is generated at a portion at which a pattern of "1001001" has been excluded from among 12 channel bit patterns after ETM-modulated and the number of generated "1"s is set in an odd number, with respect to a reference code pattern, a repetition of "100100100000" is obtained as an optical condition, as shown in FIG. 72. In order to ensure that the channel bit pattern after modulated is produced as the pattern, although not shown, there is a need for setting to "A4h" a data word before modulated, when utilizing a modulation table specified in an H format. This data on "A4h" (hexadecimal notation) corresponds to a data symbol "164" (decimal notation).

A description will be given below with respect to how to produce specific data in accordance with the above data conversion rule. First, data symbol "164" (="0A4h") is set to main data "D0 to D2047" in the data frame structure described previously. Next, a data frame 1 to a data frame 15 are pre-scrambled in advance by an initial preset number "0Eh", and a data frame 16 to a data frame 31 are pre-scrambled in advance by an initial preset number "0Fh". If pre-scrambling is applied in advance, when scrambling is applied in the data conversion rule described previously, scrambling is applied in duplicate, and a data symbol "164" (="0A4h") appears as it is (when scrambling is applied in duplicate, an original pattern is returned). When pre-scrambling is applied to all of the reference codes, each of which consists of 32 physical sectors, DSV control cannot be made, and thus, pre-scrambling cannot be applied to only data frame 0 in advance. After the foregoing scrambling has been applied, if modulation is carried out, a pattern shown in FIG. 72 is recorded on the information storage medium.

Figure 73:
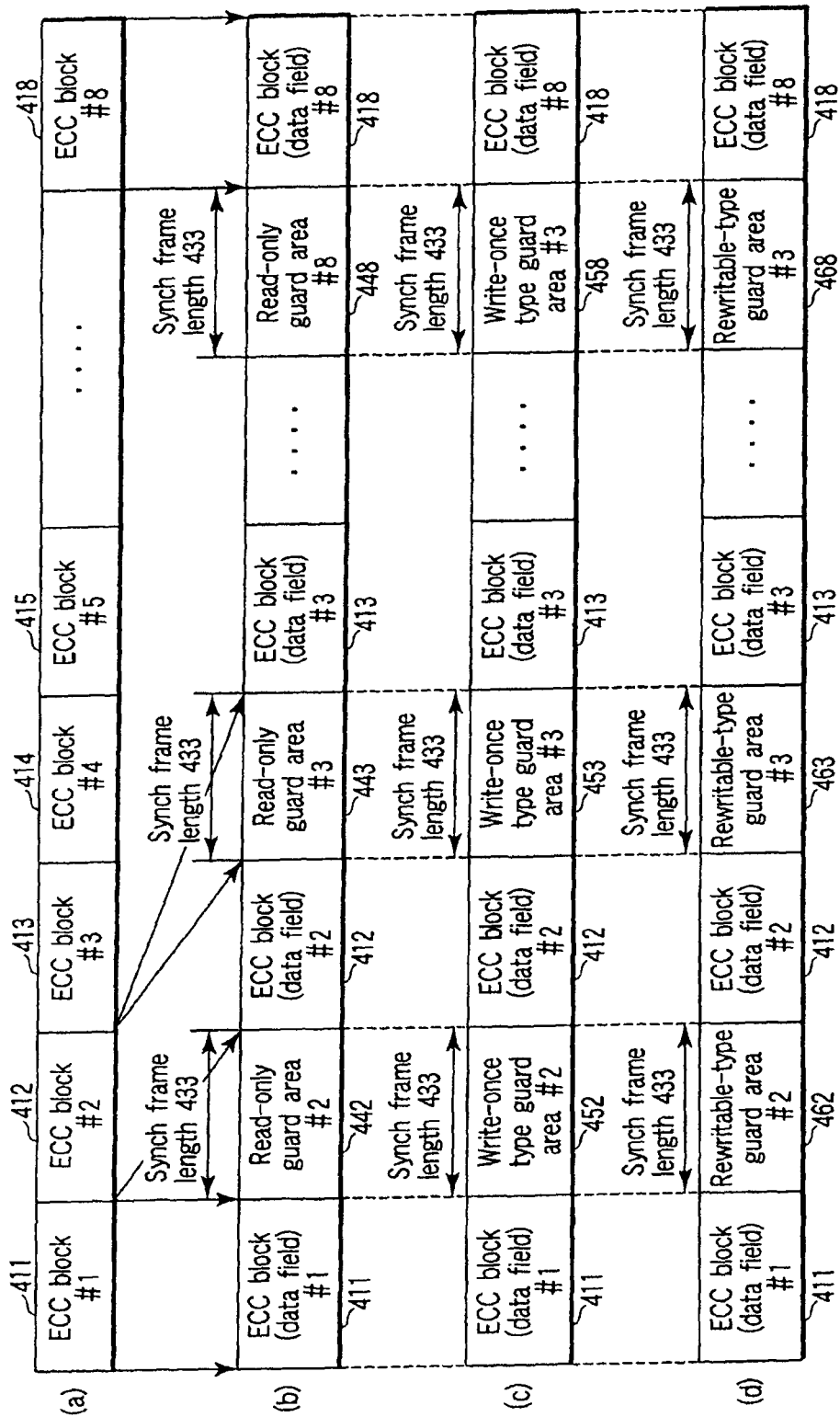
FIG. 73 is an exemplary view showing a comparison in data recording format of each of a variety of information storage mediums.

Referring to FIG. 73, a description will be given with respect to a comparison in data recording format between a variety of information storage mediums in the present embodiment. FIG. 73 (a) shows a data recording format in a conventional read-only type information storage medium DVD-ROM; a conventional write-once type information storage medium DVD-R; and a conventional DVD-RW; FIG. 73 (b) shows a data recording format in a read-only type information storage medium in the present embodiment; FIG. 73 (c) shows a data recording format of a write-once type information storage medium in the present embodiment; and FIG. 73 (d) shows a data recording format of a rewritable-type information storage medium. For the sake of comparison, ECC blocks 411 to 418 are shown as the same size. However, one ECC block is composed of 16 physical sectors in the conventional read-only type information storage medium DVD-ROM shown in FIG. 73 (a); the conventional write-once type information storage medium DVD-R; and the conventional rewritable type information storage medium DVD-RW, whereas, in the present embodiment shown in FIGS. 73 (b) to 73 (d), one ECC block is composed of 32 physical sectors. The present embodiment is featured in that guard areas 442 to 448 having the same length as a sync frame length 433 is provided between ECC blocks #1 411 to #8 418, as shown in FIGS. 73 (b) to 73 (d). In the conventional read-only type information storage medium DVD-ROM, ECC blocks #1 411 to #8 418 are continuously recorded as shown in FIG. 73 (a). If an attempt is made to allocate compatibility in data recording format with the conventional read-only type information storage medium DVD-ROM by means of the conventional write-once type information storage medium DVD-R or the conventional rewritable type information storage medium DVD-RW, if an additional writing or rewriting process called restricted overwrite is carried out, there has been a problem that part of the ECC block is damaged due to overwriting and the data reliability at the time of reproduction is significantly degraded. In contrast, as in the present embodiment, if guard areas 442 to 448 are arranged between data fields (ECC blocks), there is attained advantageous effect that an overwrite location is restricted to the guard areas 442 to 448, and the data damage in a data field (ECC block) can be prevented. The present embodiment is secondarily featured in that the lengths of the above guard areas 442 to 448 are adjusted to conform with a sync frame length 433 which is one sync frame size, as shown in FIGS. 73 (a) to 73 (d). As shown in FIGS. 62A and 62B, sync codes are arranged in space in determined sync frame lengths 433 having 1116 channel bits, and a sync code position is sampled by utilizing this predetermined cyclic space in the sync code position detector unit 145 shown in FIG. 11. In the present embodiment, there is attained advantageous effect that, even if the guard areas 442 to 448 are encompassed at the time of reproduction by making adjustment to conform with the length sync frame length 433 of the guard areas 442 to 448, the sync frame space is kept unchanged, thus facilitating sync code position detection at the time of reproduction.

Further, in the present embodiment, sync data is arranged in the guard area for the purpose of:

(1) improving detection precision of the sync code position detection while matching a generation frequency of the sync codes even in a location encompassing the guard areas 442 to 448; and (2) facilitating judgment of a position in a physical sector including the guard areas 442 to 448.

Figure 75:
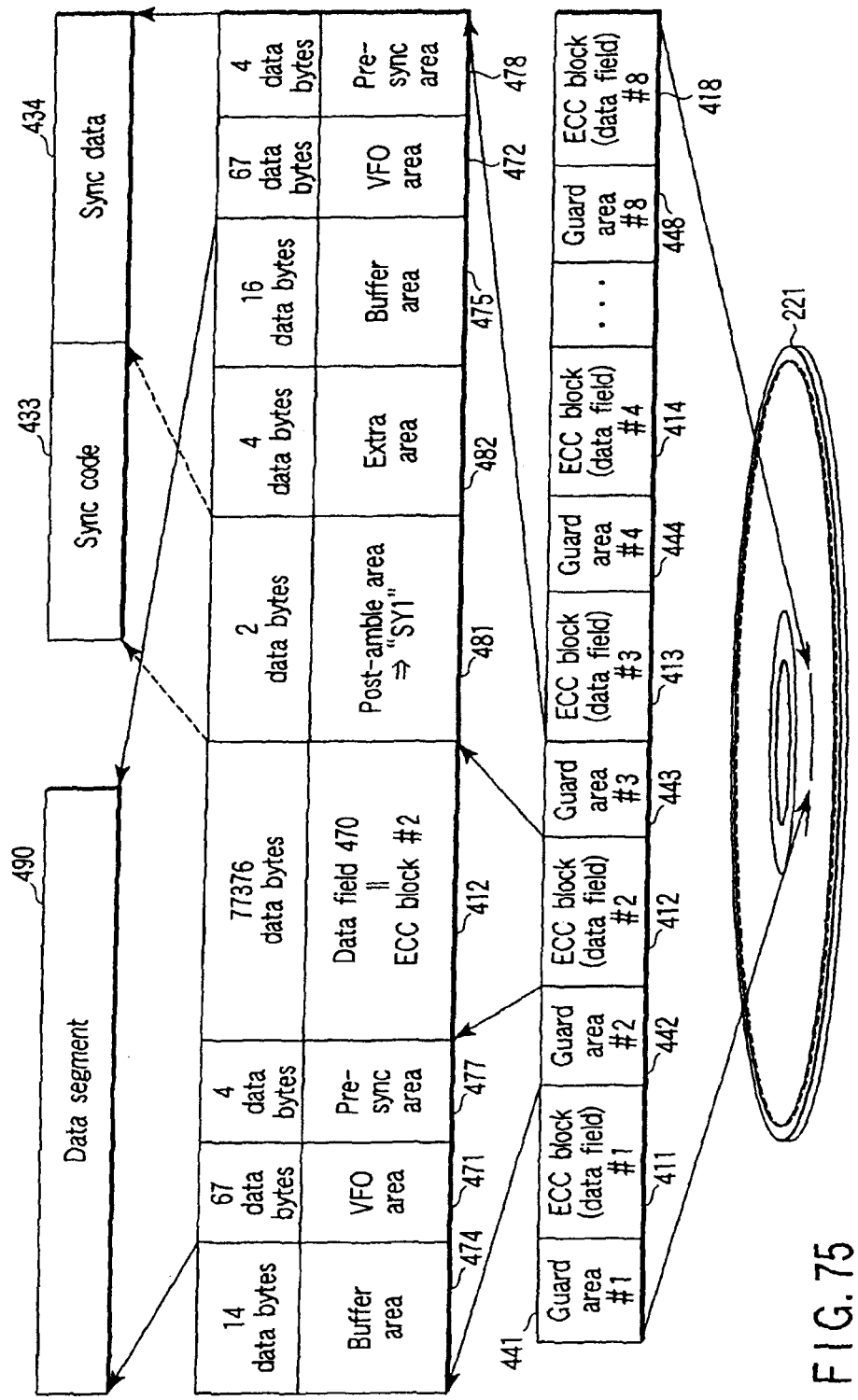
FIG. 75 is an exemplary view of a comparison with a conventional example of a data structure in a variety of information storage mediums.

Specifically, as shown in FIG. 75, a postamble field 481 is formed at the start position of each of the guard areas 442 to 468, and a sync code "SY1" of sync code number "1" shown in FIG. 63 is arranged in that postamble area 481. As is evident from FIGS. 62A and 62B, combinations of sync code numbers of three continuous sync codes in a physical sector are different from each other in all locations. Further, combinations of sync code numbers of three continuous sync codes considering up to sync code numbers "1" in the guard areas 442 to 448 are also different from each other in all locations. Therefore, the judgment of a position in physical sectors including a location of the guard area as well as positional information in the physical sectors can be made in accordance with sync code number combinations of three continuous sync codes in an arbitrary area.

FIG. 75 shows a detailed structure in the guard areas 441 to 448 shown in FIG. 73. The present embodiment is featured in that, although a structure in physical sectors is composed of a combination of the sync code 431 and sync data 432, the guard areas 441 to 448 is composed of a combination of a sync code 433 and sync data 434 similarly; and, in an area of the sync data 434 contained in the guard area #3 443, data is arranged, the data being modulated in accordance with the same modulation rule as the sync data 432 in sectors. An area in one ECC block #2 412 composed of 32 physical sectors shown in FIG. 59 is referred to as a data field 470 in the invention.

VFO (Variable Frequency Oscillator) areas 471 and 472 in FIG. 75 are utilized for synchronization of a reference clock of an information reproducing apparatus or an information recording/reproducing apparatus when the data field 470 is reproduced. As the contents of data recorded in the areas 471 and 472, the data before modulated, in a common modulation rule described later, is obtained as a continuous repetition of "7Eh", and a channel bit pattern actually described after modulated is obtained as a repetition of "010001 000100" (pattern in which three "0" settings are repeated). In order to obtain this pattern, it is necessary to set the start bytes of the VFO areas 471 and 472 to State 2.

The pre-sync areas 477 and 478 indicates a boundary position between the VFO areas 471 and 472 and the data area 470, and a recording channel bit pattern after modulated is a repetition of "100000 100000" (pattern in which continuous five "0" settings are repeated). The information reproducing apparatus or the information recording reproducing apparatus detects a pattern change position of a repetition pattern of "100000 100000" in pre-sync areas 477 and 478 and recognizes that the data area 470 approaches, from a repetition pattern of "010001 000100" contained in the VFO areas 471 and 472.

A postamble area 481 indicates an end position of the data area 470 and designates a start position of the guard area 443. A pattern in the postamble area 481 coincides with a pattern of "SY1" in a SYNC code shown in FIG. 63, as described above.

An extra area 482 is an area used for copy control or illegal copy protection. In particular, in the case where this area is not used for copy control or illegal copy protection, all "0s" are set by channel bits.

In a buffer area, data before modulated, which is identical to that in the VFO areas 471 and 472, is obtained as a continuous repetition of "7Eh", and the actually recorded channel bit pattern after modulated is obtained as a repetition pattern of "010001 000100" (pattern in which continuous three 0 settings are repeated). In order to obtain this pattern, it is necessary to set the start bytes of the VFO areas 471 and 472 to State 2.

As shown in FIG. 75, a postamble area 481 in which a pattern of "SY1" is recorded corresponds to the sync code area 433; and an area from the immediately succeeding extra area 482 to a pre-sync area 478 corresponds to the sync data area 434. An area from the VFO area 471 to the buffer area 475 (namely, area including the data area 470 and part of the preceding and succeeding guard areas) is referred to as a data segment 490 in the invention. This area indicates the conditions different from those of a "physical segment" described later. The data size of each item of data shown in FIG. 75 is expressed by byte number of data before modulated.

In the present embodiment, without being limited to a structure shown in FIG. 75, the following method can be employed as another embodiment. That is, the pre-sync area 477 is arranged midway of the VOF areas 471 and 472 shown in FIG. 75 instead of allocating the pre-sync area 477 at the boundary section between the VOF area 471 and the data area 470. In such another embodiment, a distance correlation is taken by spacing a distance between a sync code "SY0" and the pre-sync area 477 arranged at the start position of the data block 470; the pre-sync area 477 is set as pseudo-Syc; and the pre-sync area 477 is set as distance correlation information on a real Sync position (although it is different from a distance relevant to another Sync position). If a real Sync position cannot be detected, Sync is inserted into a position at which the real position generated from a pseudo Sync position would be detected. Another embodiment is featured in that the pre-sync area 477 is thus spaced slightly from real Sync ("SY0"). When the pre-sync area 477 is arranged at the beginning of the VFO areas 471 and 472, the role of the pre-sync becomes weaken because PLL of a read clock is not locked. Therefore, it is desirable that the pre-sync area 477 be arranged at the intermediate position of the VFO areas 471 and 472.

In the invention, address information in a recording type (rewritable-type or write-once) information storage medium is recorded in advance by using wobble modulation. The present embodiment is featured in that phase modulation of ±90 degrees (180 degrees) is used as a wobble modulation system, and NRZ (Non Return to Zero) method is employed, recording address information in advance with respect to an information storage medium. A specific description will be given with reference to FIG. 76. In the present embodiment, with respect to address information, the 1-address bit (referred to as an address symbol) area 511 is expressed by a four-wobble cycle, and a frequency and an amplitude/a phase are matched everywhere in the 1-address bit area 511. In the case where the same values of address bits are continued, the same phase continuously lasts at the boundary section of the 1-address bit areas 511 (at a portion indicated by "triangular mark" shown in FIG. 76). In the case where an address bit is inverted, wobble pattern inversion (180-degree shift of phase) occurs. In the wobble signal detector unit 135 of the information recording/reproducing apparatus shown in FIG. 11, a boundary position of the above address bit area 511 (location indicated by "triangular mark" shown in FIG. 76) and a slot position 412 which is a boundary position of a 1-wobble cycle are detected at the same time. Although not shown in the wobble signal detector unit 135, a PLL (Phase Lock Loop) circuit is incorporated, and PLL is applied in synchronism with both of the boundary position of the above address bit area 511 and the slot position 412. If the boundary position of this address bit area 511 or the slot position 412 is shifted, the wobble signal detector unit 135 is out of synchronization, disabling precise wobble signal reproduction (reading). A gap between the adjacent slot positions 412 is referred to as a slot gap 513. As this slot gap 513 is physically closer, synchronization with a PLL circuit can be easily obtained, enabling stable wobble signal reproduction (reading of contained information). As is evident from FIG. 76, this slot gap 513 coincides with a 1-wobble cycle. As a wobble modulating method, although an AM (Amplitude Modulation) system for changing a wobble amplitude is easily affected by dust or scratch adhering to the information storage medium surface, the above phase modulation is hardly comparatively affected by dust or scratch adhering to the information storage medium surface because a change of a phase is detected instead of a signal amplitude in the above phase modulation. As another modulation system, in an FSK (Frequency Shift Keying) system for changing a frequency, a slot gap 513 is long with respect to a wobble cycle, and synchronization of a PLL circuit is relatively hardly obtained. Therefore, as in the present embodiment, when address information is recorded by wobble phase modulation, there is attained advantageous effect that a slot gap is narrow, and wobble signal synchronization is easily obtained.

As shown in FIG. 76, although binary data "1" or "0" is assigned to the 1-address bit area 511, a method for allocating bits in the present embodiment is shown in FIG. 77. As shown on the left side of FIG. 77, a wobble pattern, which first wobbles from the start position of one wobble to the outer periphery side, is referred to as an NPW (Normal Phase Wobble), and data "0" is arranged. As shown at the right side, a wobble pattern which first wobbles from the start position of one wobble to the inner periphery side is referred to as an IPW (Invert Phase Wobble), and data "1" is arranged.

A description will be given with respect to an address information recording format using wobble modulation in an H format of a write-once type information storage medium according to the invention. An address information setting method using wobble modulation in the present embodiment is featured in that "allocation is carried out in units of the sync frame length 433" shown in FIG. 73. As shown in FIGS. 62A and 62B, one sector is composed of 26 sync frames, and, as is evident from FIG. 56, one ECC block consists of 32 physical sectors. Thus, one ECC block is composed of 32 physical sectors and is composed of 832 (=26×327) sync frames. As shown in FIG. 73, a length of the guard areas 442 to 468 which exist between the ECC blocks 411 to 418 coincides with one sync frame length 433, and thus, a length obtained by adding one guard area 462 and one ECC block 411 to each other is composed of 832+1=833 sync frames. Prime factorization can be carried out into 833=7×17×7, and thus, a structural allocation utilizing this feature is provided. That is, a basic unit of data capable of writing an area equal to a length of an area obtained by adding one guard area and one ECC block to each other is defined as a data segment 531 (A structure in the data segment 490 shown in FIG. 75 coincides with one another regardless of the read-only type information storage medium, the rewritable-type information storage medium, or the write-once type information storage medium); an area having the same length as a physical length of one data segment 490 is divided into "seven" physical segments, and address information is recorded in advance in the form of wobble modulation on a physical segment by segment basis. A boundary position relevant to the data segment 490 and a boundary position relevant to a physical segment do not coincide with each other, and are shifted by an amount described later. Further, wobble data is divided into 17 WDU (Wobble Data Units), respectively, on a physical segment by segment basis. From the above formula, it is evident that seven sync frames are arranged to a length of one wobble data unit, respectively. Thus, a physical segment is composed of 17 wobble data units, and seven physical segment lengths are adjusted to conform with a data segment length, thereby making it easy to allocate a sync frame boundary and detect a sync code in a range encompassing guard areas 442 to 468.

Each of the wobble data units #0 560 to #11 571 is composed of: a modulation area 598 for 16 wobbles; and non-modulation areas 592 and 593 for 68 wobbles, as shown in FIGS. 78A to 78D. The present embodiment is featured in that an occupying ratio of the non-modulation areas 592 and 593 with respect to a modulation area is significantly large. In the non-modulation areas 592 and 593, a group area or a land area always wobbles at a predetermined frequency, and thus, a PLL (Phase Locked Loop) is applied by utilizing the non-modulation areas 592 and 593, making it possible to stably sample (generate) a reference clock when reproducing a recording mark recorded in the information storage medium or a recording reference clock used at the time of new recording. Thus, in the present embodiment, an occupying ratio of the non-modulation areas 592 and 593 with respect to a modulation area 598 is significantly increased, thereby making it possible to remarkably improve the precision of sampling (generating) a recording reference clock and remarkably improving the stability of the sampling (generation). That is, in the case where phase modulation in wobbles has been carried out, if a reproduction signal is passed through a band path filter for the purpose of waveform shaping, there appears a phenomenon that a detection signal waveform amplitude after shaped is reduced before and after a phase change position. Therefore, there is a problem that, when the frequency of a phase change point due to phase modulation increases, a waveform amplitude change increases, and the above clock sampling precision drops; and, conversely, if the frequency of a phase change point in a modulation area is low, a bit shift at the time of wobble address information detection is likely to occur. Thus, in the present embodiment, there is attained advantageous effect that a modulation area and a non-modulation area due to phase modulation configured, and an occupying ratio of the non-modulation area is increased, thereby improving the above clock sampling precision. In the present embodiment, a position of switching the modulation area and the non-modulation area can be predicted in advance. Thus, a reproduction signal is gated to obtain a signal from the non-modulation area, making it possible to carry out the above clock sampling from that detection signal. In addition, in the case where the recording layer 3-2 is composed an organic dye recording material using a principle of recording according to the present embodiment, a wobble signal is comparatively hardly taken in the case of using the pre-groove shape/dimensions described in "3-2-D] Basic characteristics relevant to pre-groove shape/dimensions in the present embodiment" in "3-2) Description of basic characteristics common to organic dye film in the present embodiment". In consideration of this situation, the reliability of wobble signal detection is improved by significantly increasing an occupying ratio of the non-modulation areas 590 and 591 with respect to a modulation area, as described above. At the boundary between the non-modulation areas 592 and 593 and the modulation area 598, an IPW area is set as a modulation start mark of the modulation area 598 by using four wobbles or six wobbles. At a wobble data section shown in FIGS. 78C and 78D, allocation is carried out so that wobble address areas (address bits #2 to #0) wobble-modulated immediately after detecting the IPW area which is this modulation start mark. FIGS. 78A and 78B each show the contents in a wobble data unit #0 560 which corresponds to a wobble sync area 580 shown in FIG. 79 (c) described later; and FIGS. 78C and 78D each show the contents in a wobble data unit which corresponds to a wobble data section from segment information 727 to a CRC code 726 shown in FIG. 79 (c). FIGS. 78A and 78C each show a wobble data unit which corresponds to a primary position 701 in a modulation area described later; and FIGS. 78B and 78D each show a wobble data unit which corresponds to a secondary position 702 in a modulation area. As shown in FIGS. 78A and 78B, in a wobble sync area 580, six wobbles are allocated to the IPW area, and four wobbles are allocated to an NPW area surrounded by the IPW area. As shown in FIGS. 78C and 78D, four wobbles are allocated to a respective one of the IPW area and all of the address bit areas #2 to #0 in the wobble data section.

Figure 79:
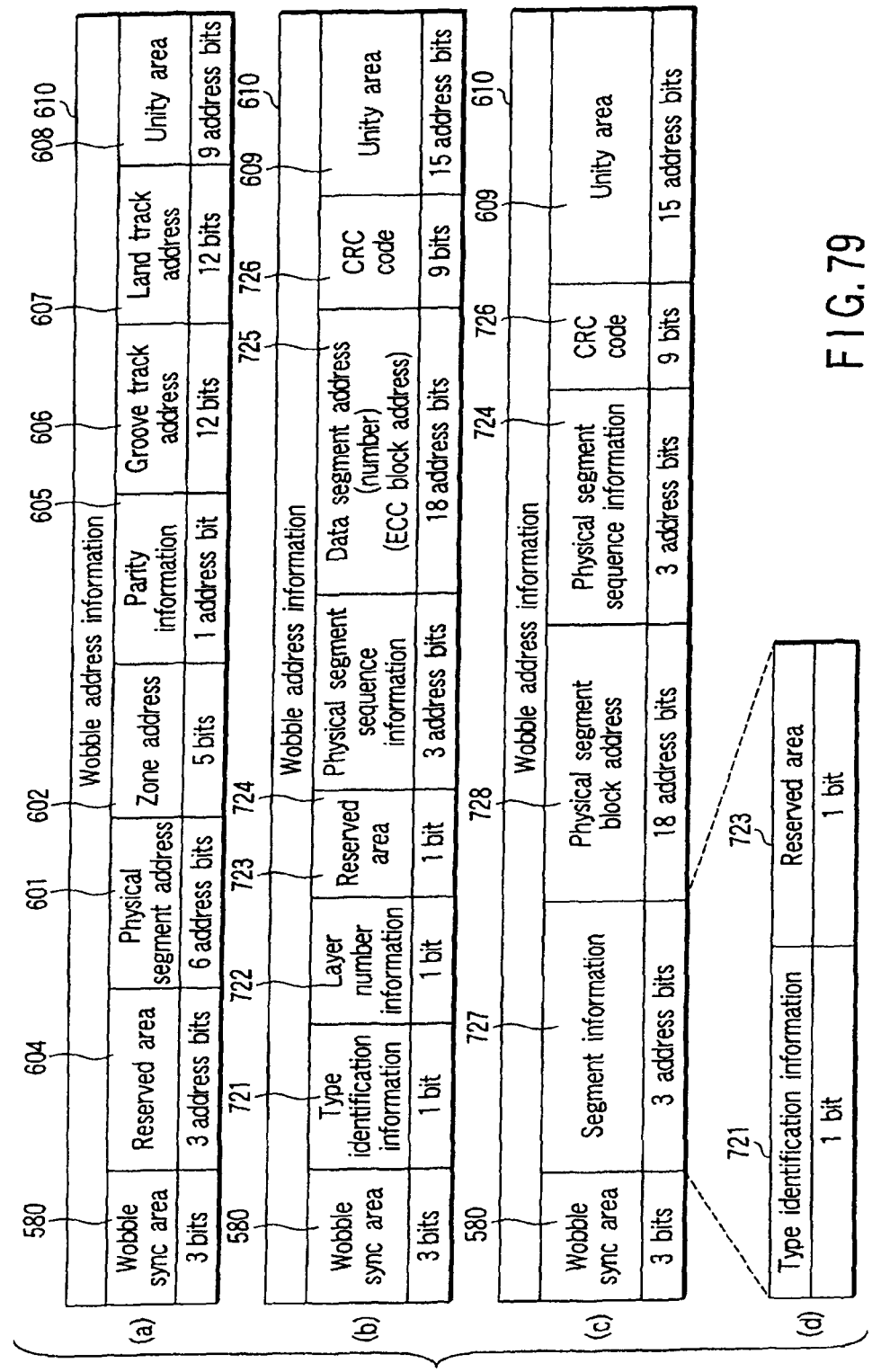
FIG. 79 is an exemplary view relating to a data structure in wobble address information contained in a write-once type information storage medium.

FIG. 79 shows an embodiment relating to a data structure in wobble address information in a write-once type information storage medium. For the sake of comparison, FIG. 79 (a)

shows a data structure in wobble address information of a rewritable-type information storage medium. FIGS. 79 (a) and 79 (c) show two embodiments relating to a data structure in wobble address information in the write-once type information storage medium.

In a wobble address area 610, three address bits are set by 12 wobbles (referring to FIG. 76). Namely, one address bit is composed of four continuous wobbles. Thus, the present embodiment employs a structure in which address information is arranged to be distributed on three by three address bit basis. When the wobble address information 610 is intensively recorded at one site in an information storage medium, it becomes difficult to detect all information when dust or scratch adheres to the medium surface. As in the present embodiment, there is attained advantageous effect that: wobble address information 610 is arranged to be distributed on a three by three address bit (12 wobbles) basis included in one of the wobble data units 560 to 576; and a set of information is recorded on an integer multiple by multiple address bit basis of three address bits, enabling information detection of another item of information even in the case where it is difficult to detect information in one site due to dust or scratch.

As described above, the wobble address information 610 is arranged to be distributed, and the wobble address information 610 is completely arranged on a one by one physical segment basis, thereby making it possible to identify address information on a physical segment by segment basis, and thus, identify a current position in physical segment units every time an information recording/reproducing apparatus provides an access.

In the present embodiment, an NRZ technique is employed as shown in FIG. 76, and thus, a phase does not change in four continuous wobbles in the wobble address area 610. A wobble sync area 580 is set by utilizing this characteristic. That is, a wobble pattern which is hardly generated in the wobble address information 610 is set with respect to the wobble sync area 580, thereby facilitating allocation position identification of the wobble sync area 580. The present embodiment is featured in that, with respect to wobble address areas 586 and 587 in which one address bit is composed of four continuous wobbles, one address bit length is set at a length other than four wobbles at a position of the wobble sync area 580. That is, in the wobble sync area 580, as shown in FIGS. 78A and 78B, an area (IPW area) in which a wobble bit is set to "1" is set as a wobble pattern change which does not occur in the wobble data section as shown in FIGS. 78C and 78D such as "six wobble→four wobbles→six wobbles". When a method for changing a wobble cycle as described above is utilized as a specific method for setting a wobble pattern which can be hardly generated in the wobble data section with respect to the wobble sync area 580, the following advantageous effects can be attained:

(1) Wobble detection (wobble signal judgment) can be stably continued without distorting PLL relating to the slot position 512 (FIG. 76) of a wobble which is carried out in the wobble signal detector unit 135 shown in FIGS. 11; and (2) A wobble sync area 580 and modulation start marks 561 and 562 can be easily detected due to a shift of an address bit boundary position generated in the wobble signal detector unit 135 shown in FIG. 11.

As shown in FIGS. 78A to 78D, the present embodiment is featured in that the wobble sync area 580 is formed in 12 wobble cycles, and a length of the wobble sync area 580 is made coincident with three address bit lengths. In this manner, all the modulation areas (for 16 wobbles) in one wobble data unit #0 560 are arranged to the wobble sync area 580, thereby improving detection easiness of the start position of wobble address information 610 (allocation position of wobble sync area 580). This wobble sync area 580 is arranged in the first wobble data unit in a physical segment. Thus, there is attained advantageous effect that the wobble sync area 580 is arranged to the start position in a physical segment, whereby a boundary position of the physical segment can be easily sampled merely by detecting a position of the wobble sync area 580.

As shown in FIGS. 78C and 78D, in wobble data units #1 561 to #11 571, the IPW area (refer to FIG. 77) is arranged as a modulation start mark at the start position, the area preceding address bits #2 to #0. The waveform of NPW is continuously formed in the non-modulation areas 592 and 593 arranged at the preceding position. Thus, the wobble signal detector unit 135 shown in FIG. 11 detects a turning point from NPW to IPW is detected, and samples the position of the modulation start mark.

As a reference, the contents of wobble address information 610 contained in a rewritable-type information storage medium shown in FIG. 79 (a) are as follows:

(1) Physical segment address 601
Information indicating a physical segment number in a track (within one cycle in an information storage medium 221);

(2) Zone address 602
This address indicates a zone number in the information storage medium 221; and (3) Parity information 605
This information is set for error detection at the time of reproduction from the wobble address information 610; 14 address bits from reserved information 604 to the zone address 602 are individually added in units of address bits; and a display as to whether or not a result of the addition is an even number or an odd number is made. A value of the parity information 605 is set so that a result obtained by taking exclusive OR in units of address bits becomes "1" with respect to a total of 15 address bits including one address bit of this address parity information 605.

(4) Unity area 608
As described previously, each wobble data unit is set so as to be composed of a modulation area 598 for 16 wobbles and non-modulation areas 592 and 593 for 68 wobbles, and an occupying ratio of the non-modulation areas 592 and 593 with respect to the modulation area 598 is significantly increased. Further, the precision and stability of sampling (generation) of a reproducing reference clock or a recording reference clock is improved more remarkably by increasing the occupying ratio of the non-modulation areas 592 and 593. The NPW area is fully continuous in a unity area 608, and is obtained as a non-modulation area having its uniform phase.

FIG. 79 (a) shows the number of address bits arranged to each item of the above described information. As described above, the wobble address information 610 is divided on a three by three address bits, and the divided items of the information are arranged to be distributed in each wobble data unit. Even if a burst error occurs due to the dust or scratch adhering to a surface of an information storage medium, there is a very low probability that such an error propagates across the wobble data units which are different from each other. Therefore, a contrivance is made so as to reduce to the minimum the count encompassing the different wobble data units as locations in which the same information is recorded and to match the turning point of each items of information with a boundary position of a wobble data unit. In this manner, even if a burst error occurs due to the dust or scratch adhering to a surface of an information storage medium, and then, specific information cannot be read, the reliability of reproducing of wobble address information is improved by enabling reading of another item of information recorded in another one of the wobble data units.

As shown in FIGS. 79 (a) to 79 (d), the present embodiment is featured in that the unity areas 608 and 609 are arranged at the end in the wobble address information 610. As described above, in the unity areas 608 and 609, a wobble waveform is formed in the shape of NPW, and thus, the NPW continuously lasts in substantially three continuous wobble data units. There is attained advantageous effect that the wobble signal detector unit 135 shown in FIG. 11 makes a search for a location in which NPW continuously lasts in a length for three wobble data units 576 by utilizing this feature, thereby making it possible to easily sample a position of the unity area 608 arranged at the end of the wobble address information 610, and to detect the start position of the wobble address information 610 by utilizing the positional information.

From among a variety of address information shown in FIG. 79 (a), a physical segment address 601 and a zone address 602 indicate the same values between the adjacent tracks, whereas a value changes between the adjacent tracks in a groove track address 606 and a land track address 607. Therefore, an indefinite bit area 504 appears in an area in which the groove track address 606 and the land track address 607 are recorded. In order to reduce a frequency of this indefinite bit, in the present embodiment, an address (number) is displayed by using a gray code with respect to the groove track address 606 and the land track address 607. The gray code denotes a code in the case where a code after converted when an original value changes by "1" only changes by "one bit" anywhere. In this manner, the indefinite bit frequency is reduced, making it possible to detect and stabilize a reproduction signal from a recording mark as well as a wobble detecting signal.

As shown in FIGS. 79 (b) and 79 (c), in a write-once type information storage medium as well, as in the rewritable-type information storage medium, a wobble sync area 680 is arranged at the start position of a physical segment, thereby making it easy to detect the start position of the physical segment or a boundary position between the adjacent segments. Type identification information 721 on the physical segment shown in FIG. 79B indicates an allocation position in the physical segment as in the wobble sync pattern contained in the above described wobble sync area 580, thereby making it possible to predict in advance an allocation location of another modulation area 598 in the same physical segment and to prepare for next modulation area detection. Thus, there is attained advantageous effect that the precision of signal detection (judgment) in a modulation area can be improved. Specifically, When type identification information 721 on a physical segment is set to "0", it denotes that all the items of information in the physical segment shown in FIG. 81 (b) are arranged at a primary position or that a primary position and a secondary position shown in FIG. 81 (d) are mixed; and When type identification information 721 of a physical segment is set to "1", all items of information in a physical segment are arranged at a secondary position, as shown in FIG. 81 (c).

According to another embodiment relevant to the above described embodiment, it is possible to indicate an allocation location of a modulation area in a physical segment by using a combination between a wobble sync pattern and type identification information 721 on a physical segment. By using the combination of the two types of information described previously, three or more types of allocation patterns of modulation areas shown in FIGS. 81 (b) to 81 (d) can be expressed, making it possible to provide a plurality of allocation patterns of the modulation areas. While the above described embodiment shows an allocation location of a modulation area in a physical segment which includes a wobble sync area 580 and type identification information 721 on a physical segment, the invention is not limited thereto. For example, as another embodiment, the wobble sync area 580 and the type identification information 721 on the physical segment may indicate an allocation location of a modulation area in a next physical segment. By doing this, in the case where tracking is carried out continuously along a groove area, there is attained advantageous effect that the allocation location of the modulation area in the next physical segment can be identified in advance, and a long preparation time for detecting a modulation area can be taken.

Layer number information 722 in a write-once type information storage medium shown in FIG. 79 (b) indicates either of the recording layers from among a single-sided single-layer or a single-sided double-layer. This information denotes:

"L0 later" in the case of a single-sided single-layer medium or a single-sided double-layer medium when "0" is set (a front layer at the laser light beam incident side); and "L1 layer" of a single-sided double-layer when "1" is set (a rear layer in viewed from the laser light beam incident side).

Physical segment sequence information 724 indicates an allocation sequence of relative physical segments in the same physical segment block. As is evident as compared with FIG. 79 (a), the start position of the physical segment sequence information 724 contained in wobble address information 610 coincides with that of a physical segment address 601 contained in a rewritable-type information storage medium. The physical segment sequence information position is adjusted to conform with the rewritable-type medium, thereby making it possible to improve compatibility between medium types and to share or simplify an address detection control program using a wobble signal in an information recording/reproducing apparatus in which both of a rewritable-type information storage medium and a write-once type information storage medium can be used.

A data segment address 725 shown in FIG. 79 (b) describes address information on a data segment in numbers. As has already been described, in the present embodiment, one ECC block is composed of 32 sectors. Therefore, the least significant five bits of a physical sector number of a sector arranged at the beginning in a specific ECC block coincides with that of a sector arranged at the start position in the adjacent ECC block. In the case where a physical sector number has beet set so that the least significant five bits of the physical sector number of a sector arranged in an ECC block are "00000", the values of the least significant six bits or more of the physical sector numbers of all the sectors which exist in the same ECC block coincide with each other. Therefore, the least significant five bit data of the physical sector number of the sectors which exist in the same ECC block is eliminated, and address information obtained by sampling only the least significant six bits or more is defined as an ECC block address (or ECC block address number). A data segment address 725 (or physical segment block number information) recorded in advance by wobble modulation coincides with the above ECC block address. Thus, when positional information on a physical segment block due to wobble modulation is indicated by a data segment address, there is advantageous effect that a data amount decreases on five by five bit basis as compared with when the address is displayed by a physical sector number, simplifying current position detection at the time of an access.

A CRC code 726 shown in FIGS. 79 (b) and 79 (c) is a CRC code (error correction code) arranged to 24 address bits from physical segment type identification information 721 to the data segment address 725 or a CRC code arranged to 24 address bits from segment information 727 to the physical segment sequence information 724. Even if a wobble modulation signal is partially mistakenly read, this signal can be partially corrected by this CRC code 726.

In a write-once type information storage medium, an area corresponding to 15 address bits is arranged to the unity area 609, and an NPW area is fully arranged in five wobble data units 12 to 16 (the modulation area 598 does not exist).

A physical segment block address 728 shown in FIG. 79 (c) is an address set for each physical segment block which configure one unit from seven physical segments, and a physical segment block address relevant to the first segment block in the data lead-in area DTRDI is set to "1358h". The values of the physical segment block addresses are sequentially added one by one from the first physical segment block contained in the data lead-in area DTLDI to the last physical segment block contained in the data lead-out area DTLDO, including the data area DTA.

The physical segment sequence information 724 denotes the sequence of each of the physical segments in one physical segment block, and "0" is set to the first physical segment, and "6" is set to the last physical segment.

The embodiment shown in FIG. 79 (c) is featured in that the physical segment block address 728 is arranged at a position which precedes the physical segment sequence information 724. For example, as in the RMD field 728 shown in FIG. 53, address information is often managed by this physical segment block address. In the case where an access is provided to a predetermined segment block address in accordance with these items of management information, first, the wobble signal detector unit 135 shown in FIG. 11 detects a location of the wobble sync area 580 shown in FIG. 79 (c), and then, sequentially decodes items of information recorded immediately after the wobble sync area 580. In the case where a physical segment block address exists at a position which precedes the physical segment sequence information 724, first, the physical segment block address is decoded, and it is possible to judge whether or not a predetermined physical segment block address exists without decoding the physical segment sequence information 724. Thus, there is advantageous effect that access capability using a wobble address is improved.

The segment information 727 is composed of type identification information 721 and a reserved area 723. The type identification information 721 denotes an allocation location of a modulation area in a physical segment. In the case where the value of this type identification information 721 is set to "0b", it denotes a state shown in FIG. 81 (b) described layer. In the case where the information is set to "1b", it denotes a state shown in FIG. 81 (c) or FIG. 81 (d) described later.

The present embodiment is featured in that type information identification 721 is arranged immediately after the wobble sync area 580 in FIG. 79 (c). As described above, first, the wobble signal detector unit 135 shown in FIG. 11 detects a location of the wobble sync area 580 shown in FIG. 79 (c), and then, sequentially decodes the items of information recorded immediately after the wobble sync area 580. Therefore, the type identification information 721 is arranged immediately after the wobble sync area 580, thereby enabling an allocation location check of a modulation area in a physical segment immediately. Thus, high speed access processing using a wobble address can be achieved.

In the write-once type information storage medium according to the present embodiment, a recording mark is formed on a groove area, and a CLV recording system is employed. In this case, as described previously, a wobble slot position is shifted between the adjacent tracks, and thus, interference between the adjacent wobbles is likely to occur with a wobble reproduction signal. In order to eliminate this effect, in the present embodiment, a contrivance is made to shift a modulation area so that modulation areas do not overlap each other between the adjacent tracks.

Figure 80:
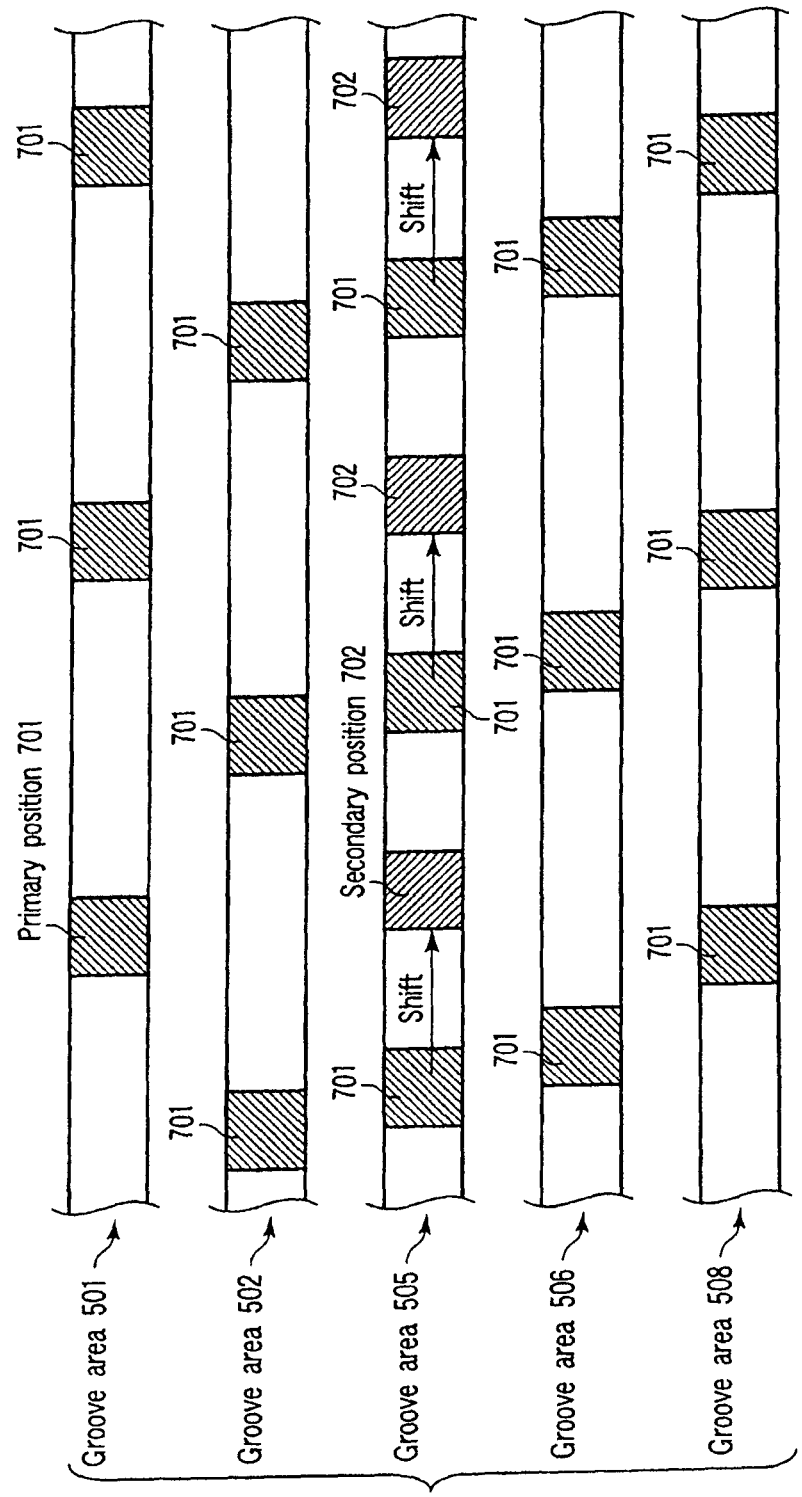
FIG. 80 is an exemplary view of an allocation place in a modulation area on a write-once type information storage medium.

Specifically, as shown in FIG. 80, a primary position 701 and a secondary position 702 can be set in an allocation location of a modulation area. Basically, assuming that after allocation has been fully carried out in the primary position, there occurs a location in which modulation areas partially overlap between the adjacent tracks, there is employed a method for partially shift the modulation area to the secondary position. For example, in FIG. 80, when a modulation area of a groove area 505 is set at the primary position, a modulation area of the adjacent groove area 502 and a modulation area of a groove area 506 partially overlap on each other. Thus, the modulation area of the groove area 505 is shifted to the secondary position. In this manner, there is attained advantageous effect that a wobble address can be stably reproduced by preventing the interference between the modulation areas of the adjacent tracks in a reproduction signal from a wobble address.

The specific primary position and secondary position relating to a modulation area is set by switching an allocation location in the same wobble data unit. In the present embodiment, an occupying ratio of a non-modulation area is set to be higher than a modulation area so that, the primary position and the secondary position can be switched merely by making a mere allocation change in the same wobble data unit. Specifically, in the primary position 701, as shown in FIGS. 78 (a) and 78 (c), the modulation area 598 is arranged at the start position in one wobble data unit. In the secondary position 702, as shown in FIGS. 78 (b) and 78 (d), the modulation area 598 is arranged at the latter half position in one of the wobble data unit 560 to 571.

A coverage of the primary position 701 and the secondary position 702 shown in FIGS. 78 (a) to 78 (d), i.e., a range in which the primary position or the secondary position continuously lasts is defined in the rage of physical segments in the present embodiment. That is, as shown in FIGS. 81 (b) to 81 (d), after three types (plural types) of allocation patterns of modulation areas in the same physical segment have been provided, when the wobble signal detector unit 135 shown in FIG. 11 identifies an allocation pattern of a modulation area in a physical segment from the information contained in the type identification information 721 on a physical segment, the allocation location of another modulation area 598 in the same physical segment can be predicted in advance. As a result, there is attained advantageous effect that preparation for detecting a next modulation area can be made, thus making it possible to improve the precision of signal detection (judgment).

FIG. 81 (b) shows allocation of wobble data units in a physical segment, wherein the number described in each frame indicate wobble data unit numbers in the same physical segment. A 0-th wobble data unit are referred to as a sync field 711 as indicated at a first stage. A wobble sync area exists in a modulation area in this sync field. First to eleventh wobble data units are referred to as an address field 712. Address information is recorded in a modulation area contained in this address field 712. Further, in twelfth to sixteenth wobble data units, all of the wobble patterns are formed in an NPW unity field 713.

A mark "P" described in FIGS. 81 (*b*), 81 (*c*) and 81 (*d*) indicates that a modulation area is set at a primary position in a wobble data unit; and a mark "S" indicates that a modulation area is set at a secondary position in a wobble data unit. A mark "U" indicates that a wobble data unit is included in a unity field 713, and a modulation area does not exist. An allocation pattern of a modulation area shown in FIG. 81 (*b*) indicates that all the areas in a physical segment are set at the primary position; and an allocation pattern of a modulation area shown in FIG. 81 (*c*) indicates all areas in a physical segment are set at the secondary position. In FIG. 81 (*d*), the primary position and the secondary position are mixed in the same physical segment; a modulation area is set at the primary position in each of 0-th to fifth wobble data units, and a modulation area is set at the secondary position in each of sixth to eleventh wobble data units. As shown in FIG. 81 (*d*), the primary positions and the secondary positions are half divided with respect to an area obtained by adding a sync field 711 and an address field 712, thereby making it possible to finely prevent an overlap of modulation areas between the adjacent tracks.

Now, a description will be given with respect to a method for recording the data segment data described previously with respect to the physical segment or the physical segment block in which address information is recorded in advance by wobble modulation described above. Data is recorded in recording cluster units serving as units of continuously recording data in both of a rewritable-type information storage medium and a write-once type information storage medium. FIGS. 82A and 82B show a layout in this recording cluster. In recording clusters 540 and 542, one or more (integer numbers) of data segments continuously lasts, and an expanded guard field 528 or 529 is set at the beginning or at the end of the segment. The expanded guard fields 528 and 529 are set in the recording clusters 540 and 542 so as to be physically overlapped and partially overwritten between the adjacent recording clusters so as not to produce a gap between the adjacent recording clusters when data is newly additionally written or rewritten in units of the recording clusters 540 and 542. As the position of each of the expanded guard fields 528 and 529 set in the recording clusters 540 and 542, in the embodiment shown in FIG. 82A, the expanded guard field 528 is arranged at the end of the recording cluster 540. In the case where this method is used, the expanded guard field 528 follows a post amble area 526 shown in FIG. 83 (*a*). Thus, in particular, in the write-once type information storage medium, the post-amble area 526 is not mistakenly damaged at the time of rewriting; protection of the post-amble area 526 at the time of rewriting can be carried out; and the reliability of position detection using the post amble area 526 at the time of data reproduction can be arranged. As another embodiment, as shown in FIG. 82B, the expanded guard field 529 can also be arranged at the beginning of the recording cluster 542. In this case, as is evident from a combination of FIG. 82B and FIGS. 83 (*a*) to 83 (*f*), the expanded guard field 529 immediately precedes a VFO area 522. Thus, at the time of rewriting or additional writing, the VFO area 522 can be sufficiently taken long, and thus, a PLL lead-in time relating to a reference clock at the time of reproduction of a data field 525 can be taken long, making it possible to improve the reliability of reproduction of data recorded in the data field 525. In this way, there is attained advantageous effect that a structure composed of data segments in the case where one or more recording clusters denote writing units is provided, thereby making it possible to facilitate a mixing recording process with respect to the same information storage medium, PC data (PC files) of which a small amount of data is often rewritten many times and AV data (AV file) of which a large amount of data is continuously recorded one time. That is, with respect to data used for a personal computer, a comparatively small amount of data is often rewritten many times. Therefore, a recording method suitable for PC data is obtained by minimally setting data units of rewriting or additional writing. In the present embodiment, as shown in FIG. 56, an ECC block is composed of 32 physical sectors. This, a minimum unit for efficiently carrying out rewriting or additional writing is obtained by carrying out rewriting or additional writing in data segment units including only one ECC block. Therefore, a structure in the present embodiment in which one or more data segments are included in a recording cluster which denotes rewriting units or additional writing units is obtained as a recording structure suitable for PC data (PC files). In AV (Audio Video) data, it is necessary to continuously record a very large amount of video image information and voice information smoothly without any problem. In this case, continuously recorded data is collectively recorded as one recording cluster. At the time of AV data recording, when a random shift amount, a structure in a data segment, or a data segment attribute and the like is switched on a data segment by segment basis configuring one recording cluster, a large amount of time is required for such a switching process, making it difficult to carry out a continuous recording process. In the present embodiment, as shown in FIGS. 82A and 82B, it is possible to provide a recording format suitable for AV data recording for continuously recording a large amount of data by configuring a recording cluster while data segments in the same format (without changing an attribute or a ransom shift amount and without inserting specific information between data segments) are continuously arranged. In addition, a simplified structure in a recording cluster is achieved, and simplified recording control circuit and reproduction detector circuit are achieved, making it possible to reduce the price of an information recording/reproducing apparatus or an information reproducing apparatus. A data structure in recording cluster 540 in which data segments (excluding the expanded guard field 528) in the recording cluster shown in FIGS. 82A and 82B are continuously arranged is completely identical to those of the read-only information storage medium shown in FIG. 73 (*b*) and the write-once type information storage medium shown in FIG. 73 (*c*). In this way, a common data structure is provided among all of the information storage mediums regardless of the read-only type, the write-once type, or the rewritable-type, thus allocating medium compatibility. In addition, a detector circuit of the information recording/reproducing apparatus or the information reproducing apparatus whose compatibility has been arranged can be used in common; high reliability of reproduction can be arranged; and price reduction can be achieved.

By employing the structure shown in FIGS. 82A and 82B, random shift amounts of all the data segments inevitably coincide with each other in the recording cluster. In the rewritable-type information medium, a recording cluster is recorded by random shifting. In the present embodiment, the random shift amounts of all the data segments coincide with each other in the same recording cluster 540. Thus, in the case where reproduction has been carried out across the different data segments from each other in the same recording cluster 540, there is no need for synchronization adjustment (phase resetting) in a VFO area (reference numeral 522 in FIG. 83 (d)), making it possible to simplify a reproduction detector circuit at the time of continuous reproduction and to allocate high reliability of reproduction detection.

FIG. 83 shows a method for recording data to be rewritably recorded in a rewritable-type information storage medium. Now, although a description will be given while focusing on a rewritable-type information storage medium, it should be noted that an additional writing method relevant to a write-once type information storage medium is basically identical to the above recording method. A layout in the recording cluster in a write-once type information storage medium according to the present embodiment will be described in way of example employing a layout shown in FIG. 82A. The present embodiment is not limited thereto, and a layout shown in FIG. 82B may be employed for a rewritable-type information storage medium. In the present embodiment, rewriting relating to rewritable data is carried out in units of the recording clusters 540 and 541 shown in FIGS. 82B and 83 (e). As described later, one recording cluster is composed of one or more data segments 529 to 531 and an expanded guard field 528 arranged at the end. That is, the start position of one recording cluster 631 coincides with that of the data segment 531, and the cluster starts from the VFO area 522. In the case where a plurality of data segments 529 and 530 are continuously recorded, the plurality of data segments 529 and 530 are continuously arranged in the same recording cluster 531. In addition, the buffer area 547 which exists at the end of the data segment 529 and the VFO area 532 which exists at the beginning of a next data segment continuously last, and thus, a phase (of a recording reference clock) at the time of recording) between these areas coincides with one another. When continuous recording terminates, an expanded guard area 528 is arranged at the end position of the recording cluster 540. The data size of this expanded guard area 528 is equal to the size for 24 data bytes as data before modulated.

As is evident from a correlation between FIGS. 83 (a) and 83 (c), rewritable-type guard areas 461 and 462 each include: post amble areas 546 and 536; extra areas 544 and 534; buffer areas 547 and 537; VFO areas 532 and 522; and pre-sync areas 533 and 523, and an expanded guard field 528 is arranged only in location in which continuous recording terminates. The present embodiment is featured in that rewriting or additional writing is carried out so that the expanded guard area 528 and the succeeding VFO area 522 partially overlap each other at a duplicate site 591 at the time of rewriting. By rewriting or additional writing while partial duplication is maintained, it is possible to prevent a gap (area in which no recording mark is formed) from being produced between the recording clusters 540 and 541. In addition, a stable reproduction signal can be detected by eliminating inter-layer cross talk in an information storage medium capable of carrying out recording in a single-sided double recording layer.

The data size which can be rewritten in one data segment in the present embodiment is 67+4+77376+2+4+16=77469 (data bytes). One wobble data unit 560 is 6+4+6+68=84 (wobbles). One physical segment 550 is composed of 17 wobble data units, and a length of seven physical segments 550 to 556 coincides with that of one data segment 531. Thus, 84×17×7=9996 (wobbles) are arranged in the length of one data segment 531. Therefore, from the above formula, 77496/9996=7.75 (data bytes/wobble) corresponds to one wobble.

Figure 84:
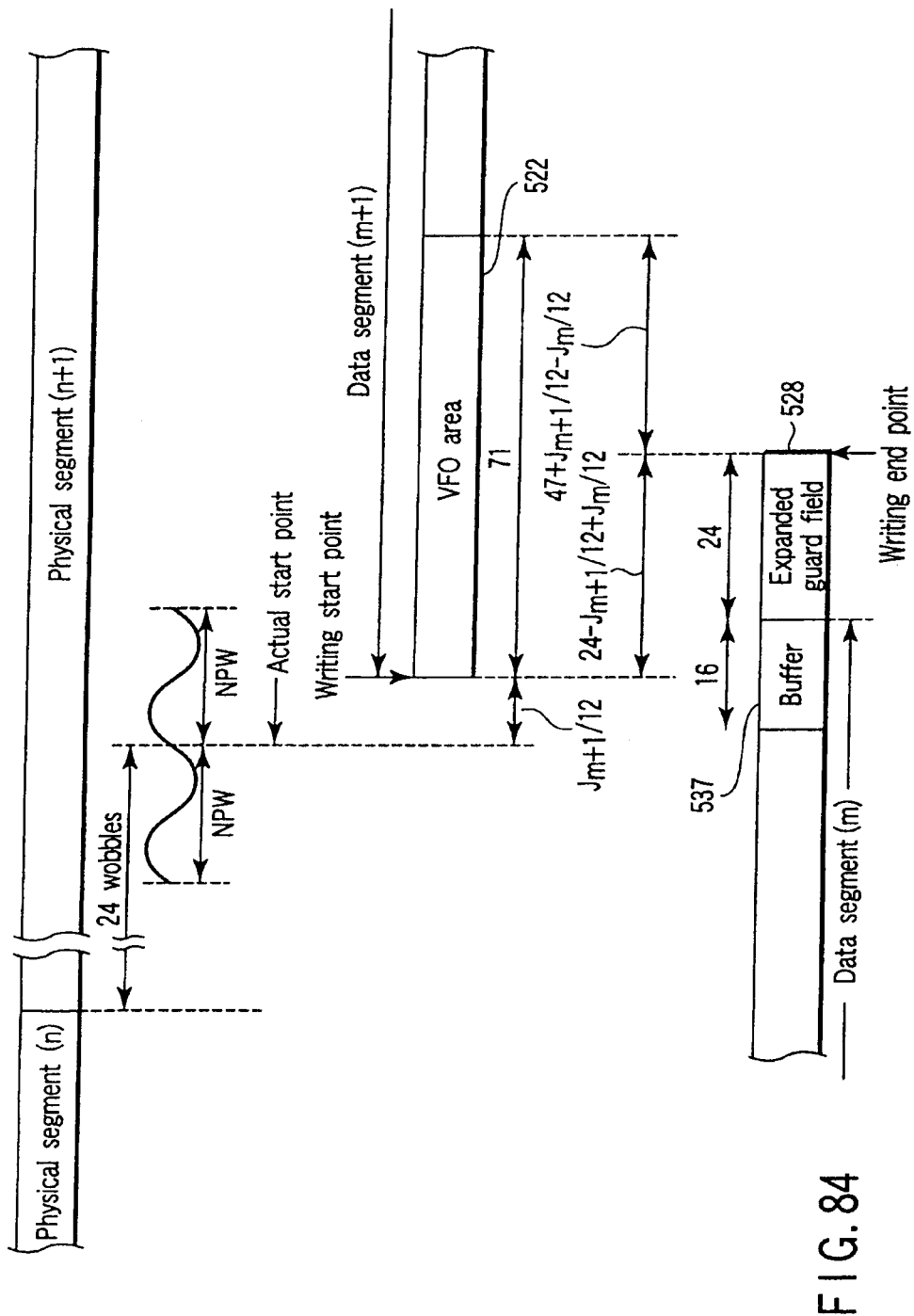
FIG. 84 is an exemplary view of a data random shift of the rewritable data recorded on a rewritable-type information storage medium.

As shown in FIG. 84, an overlap portion of the succeeding VFO area 522 and the expanded guard field 528 follows 24 wobbles from the start position of a physical segment, and the starting 16 wobbles of a physical segment 550 are arranged in a wobble sync area 580, and the subsequent 68 wobbles are arranged in a non-modulation area 590. Therefore, an overlap portion of the VFO area 522 which follows 24 wobbles and the expanded guard field 528 is included in the non-modulation area 590. In this way, the start position of a data segment follows the 24 wobbles from the start position of a physical segment, whereby the overlap portion is included in the non-modulation area 590. In addition, a detection time and a preparation time for recording process of the wobble sync area 580 can be sufficiently taken, and thus, a stable and precise recording process can be guaranteed.

A phase change recording film is used as a recording film of the rewritable-type information storage medium in the present embodiment. In the phase change recording film, degradation of the recording film starts in the vicinity of the rewriting start/end position. Thus, if recording start/recording end at the same position is repeated, there occurs a restriction on the number of rewritings due to the degradation of the recording film. In the present embodiment, in order to alleviate the above described problem, at the time of rewriting, $J_{M+1}/12$ data bytes are shifted as shown in FIG. 84, and the recording start position is shifted at random.

Although the start position of the expanded guard field 528 coincides with that of the VFO area 522 in order to explain a basic concept in FIGS. 83 (c) and 83 (d), strictly, the start position of the VFO area 522 is shifted at random, as shown in FIG. 84, in the present embodiment.

A phase change recording film is used as a recording film in a DVD-RAM disk which is a current rewritable-type information storage medium as well, the start/end positions of recording is shifted at random for the purpose of improving the rewriting count. The maximum shift amount range when random shifting has been carried out in the current DVD-RAM disk is set to 8 data bytes. A channel bit length (as data after modulated, to be recorded in a disk) in the current DVD-RAM disk is set to 0.143 μm on average. In the rewritable-type information storage medium according to the present embodiment, an average length of channel bits is obtained as $(0.087+0.093)/2=0.090$ (μm). In the case where a length of a physical shift range is adjusted to conform with the current DVD-RAM disk, by using the above value, the required minimal length serving as a random shift range in the present embodiment is obtained as:

8 bytes×(0.143 μm/0.090)=12.7 bytes

In the present embodiment, in order to allocate easiness of a reproduction signal detecting process, the unit of random shift amount has been adjusted to conform with "channel bits" after modulated. In the present embodiment, ETM modulation (Eight to Twelve modulation) for converting 8 bits to 12 bits is used, and thus, formula expression which indicates a random shift amount is designated by $J_m/12$ (data bytes) while a data byte is defined as a reference. Using the value of the above formula, a value which can be taken by $J_m$ is 12.7×12=152.4, and thus, $J_m$ ranges 0 to 152. For the above described reason, in the range meeting the above formula, a length of the random shift range coincides with the current DVD-RAM disk, and the rewriting count similar to the current DVD-RAM disk can be guaranteed. In the present embodiment, a margin is slightly provided with respect to the required minimal length in order to allocate the current or more rewriting count, and the length of the random shift range has been set to 14 (data bytes). From these formulas, 14×12=168 is established, and thus, a value which can be taken by $J_m$ has been set in the range of 0 to 167. As described above, the random shift amount is defined in a range which is wider than $J_m/12$ ($0 \leq J_m \leq 154$), whereby a length of a physical range relevant to the random shift amount coincides with that of the current DVD-RAM. Thus, there is attained advantageous effect that the repetition recording count similar to that of the current DVD-RAM can be guaranteed.

In FIG. 83 (c), the lengths of the buffer area 547 and the VFO area 532 in the recording cluster 540 become constant. As is evident from FIG. 82 (a) as well, the random shift amount $J_m$ of all the data segments 529 is obtained as the same value everywhere in the same recording cluster 540. In the case of continuously recording one recording cluster 540 which includes a large amount of data segments, a recording position is monitored from a wobble. That is, a position of the wobble sync area 580 shown in FIGS. 79 (a) to 79 (c) is detected, and, in the non-modulation areas 592 and 593 shown in FIGS. 78 (c) and 78 (d), the check of the recording position on the information storage medium is made at the same time as recording while the number of wobbles is counted. At this time, a wobble slip (recording at a position shifted by one wobble cycle) occurs due to mistaken wobble count or rotation non-uniformity of a rotary motor which rotates the information storage medium, and the recording position on the information storage medium is rarely shifted. The information storage medium according to the present embodiment is featured in that, in the case where a recording position shift generated as described above has been detected, adjustment is made in the rewritable-type guard area 461 shown in FIG. 83 (a), and recording timing correction is carried out in the guard area 461. Now, an H format will be described here. This basic concept is employed in a B format, described later. In FIGS. 83 (a) to 83 (f), although important information for which bit missing or bit duplication cannot be allowed is recorded in a postamble area 546, an extra area 544, and a pre-sync area 533, a specific pattern is repeated in the buffer area 547 and the VFO area 532. Thus, as long as this repetition boundary position is arranged, missing or duplication of only one pattern is allowed. Therefore, in the present embodiment, in particular, adjustment is made in the buffer area 547 or the VFO area 532, and recording timing correction is carried out.

As shown in FIG. 84, in the present embodiment, an actual start point position defined as a reference of position setting is set so as to match a position of wobble amplitude "0" (wobble center). However, the position detecting precision of a wobble is low, and thus, in the present embodiment, the actual start point position allows a shift amount up to a maximum of ±1 data byte", as "±1 max" in FIG. 84 is described.

In FIGS. 83 (a) to 83 (f) and 84, the random shift amount in the data segment 530 is defined as $J_m$ (as described above, the random shift amounts of all the data segments 529 coincide with each other in the recording cluster 540); and the random shift amount of the data segment 531 to be additionally written is defined as $J_{m+1}$. As a value which can be taken by $J_m$ and $J_{m+1}$ shown in the above formula, for example, when an intermediate value is taken, $J_m = J_{m+1} = 84$ is obtained. In the case where the positional precision of an actual start point is sufficiently high, the start position of the expanded guard field 528 coincides with that of the VFO area 522, as shown in FIGS. 83 (c) and 83 (d).

In contrast, after the data segment 530 is recorded at the maximum back position, in the case where the data segment 531 to be additionally written or rewritten has then been recorded in the maximum front position, the start position of the VFO area 522 may enter a maximum 15 data bytes in the buffer area 537. Specific important information is recorded in the extra area 534 that immediately precedes the buffer area 537. Therefore, in the present embodiment, a length of the buffer area 537 requires 16 data bytes or more. In the embodiment shown in FIG. 83 (c), a data size of the buffer area 537 is set to 15 data bytes in consideration of a margin of one data byte.

As a result of a random shift, if a gap occurs between the expanded guard area 528 and the VFO area 522, in the case where a single-sided double recording layer structure has been employed, there occurs an inter-layer crosstalk at the time of reproduction due to that gap. Thus, even if a random shift is carried out, a contrivance is made such that the expanded guard field 528 and the VFO area 522 partially overlap each other, and a gap is not produced. Therefore, in the present embodiment, it is necessary to set the length of the expanded guard field 528 to be equal to or greater than 15 data bytes. The succeeding VFO area 522 sufficiently takes 71 data bytes. Thus, even if an overlap area of the expanded guard field 528 and the VFO area 522 slightly widens, there is no obstacle at the time of signal reproduction (because a time for obtaining synchronization of reproduction reference clocks is sufficiently arranged in the VFO area 522 which does not overlap). Therefore, it is possible to set the value of the expanded guard field 528 to be greater than 15 data bytes. As has already been described, a wobble strip rarely occurs at the time of continuous recording, and a recording position may be shifted by one wobble cycle. One wobble cycle corresponds to 7.75 ($\approx$8) data bytes, and thus, in the present embodiment, a length of the expanded guard field 528 is set to equal to or greater than 23 (=15+8) data bytes. In the embodiment shown in FIG. 83 (c), like the buffer area 537, the length of the expanded guard field 528 is set to 24 data bytes in consideration of a margin of one data byte similarly.

In FIG. 83 (e), it is necessary to precisely set the recording start position of the recording cluster 541. The information recording/reproducing apparatus according to the present embodiment detects this recording start position by using a wobble signal recorded in advance in the rewritable-type or write-once type information storage medium. As shown in FIGS. 78A to 78D, in all areas other than the wobble sync area 580, a pattern changes from NPW to IPW in units of four wobbles. In comparison, in the wobble sync area 580, wobble switching units are partially shifted from four wobbles, and thus, the wobble sync area 580 can detect a position most easily. Thus, the information recording/reproducing apparatus according to the present embodiment detects a position of the wobble sync area 580, and then, carries out preparation for a recording process, and starts recording. Thus, it is necessary to arrange a start position of a recording cluster 541 in a non-modulation area 590 immediately after the wobble sync area 580. FIG. 84 shows the contents of the allocation. The wobble sync area 580 is arranged immediately after switching position of a physical segment. The length of the wobble sync area 580 is defined by 16 wobble cycles. Further, after detecting the wobble sync area 580, eight wobble cycles are required for preparation for the recording process in consideration of a margin. Therefore, as shown in FIG. 84, even in consideration of a ransom shift, it is necessary that the start position of the VFO area 522 which exists at the start position of the recording cluster 541 is arranged rearwardly by 24 wobbles or more from a switching position of a physical segment.

As shown in FIG. 83, a recording process is carried out many times in a duplicate site 591 at the time of rewriting. When rewriting is repeated, a physical shape of a wobble groove or a wobble land changes (is degraded), and the wobble reproduction signal amount is lowered. In the present embodiment, as shown in FIG. 83 (f), a contrivance is made so that a duplicate site 591 at the rewriting or at the time of additional writing is recorded in the non-modulation area 590 instead of arriving in the wobble sync area 580 or wobble address area 586. In the non-modulation area 590, a predetermined wobble pattern (NPW) is merely repeated. Thus, even if a wobble reproduction signal amount is partially degraded, interpolation can be carried out by utilizing the preceding and succeeding wobble reproduction signals. In this way, the position of the duplicate site 591 at the rewriting or at the time of additional writing has been set so as to be included in the non-modulation area 590. Thus, there occurs advantageous effect that a stable wobble detection signal from the wobble address information 610 can be guaranteed while preventing degradation of the wobble reproduction signal amount due to the shape degradation in the wobble sync area 580 or wobble address area 586.

Figure 85:
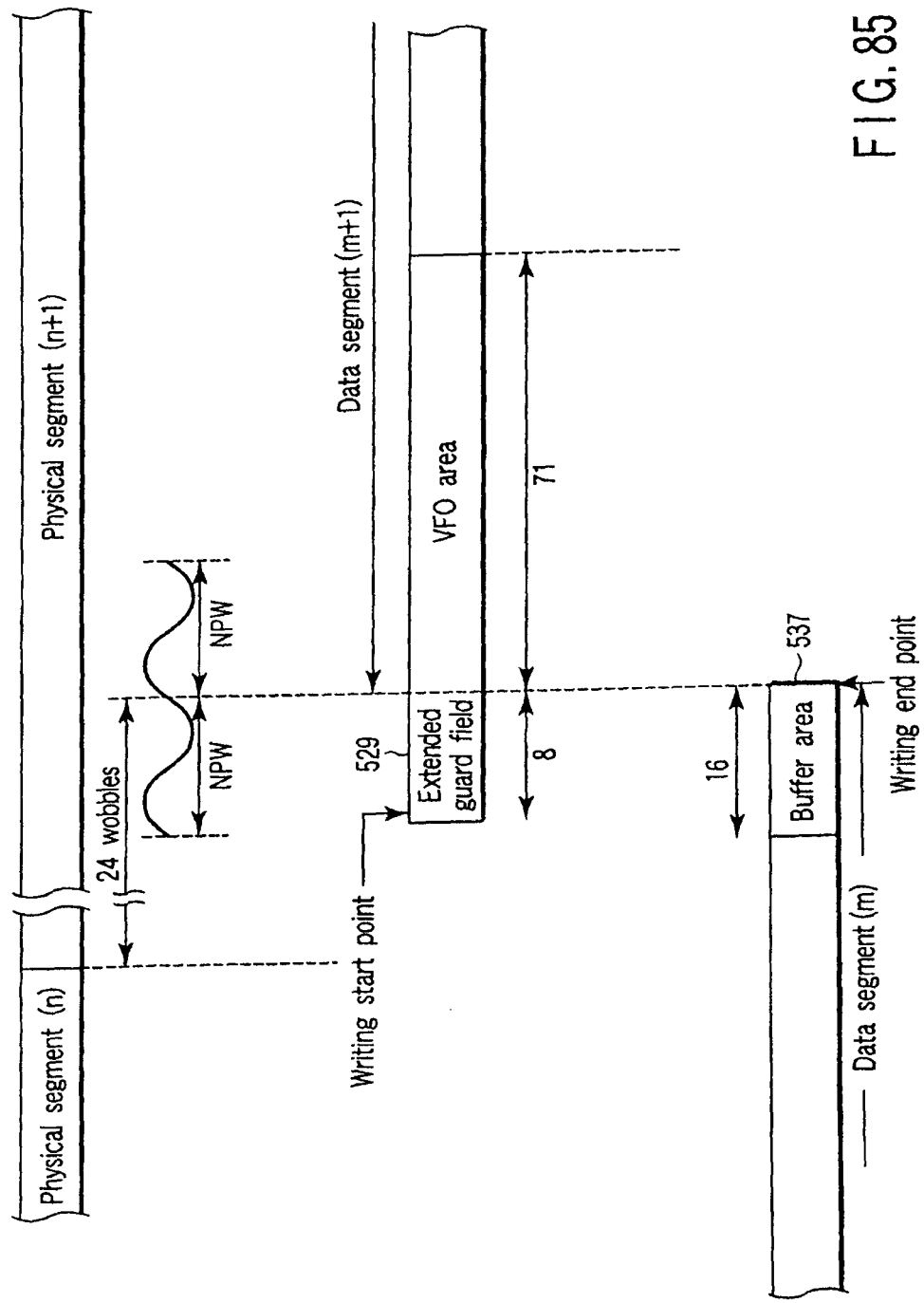
FIG. 85 is an exemplary view of a method for additionally describing write-once type data recorded on a write-once type information storage medium.

Now, FIG. 85 shows an embodiment of a method for additionally writing a write-once type data recorded on a write-once type information storage medium. A position rearwardly of 24 wobbles is defined as a writing start point from the boundary position of physical segment blocks. With respect to data to be newly additionally written, after a VFO area for 71 data bytes has been formed, a data area (data field) in an ECC block is recorded. This writing start point coincides with an end position of the buffer area 537 of recording data recorded immediately before the writing. The backward position at which the expanded guard field 528 has been formed by a length for eight data bytes is obtained as a recording end position of additional writing data (writing end point). Therefore, in the case where data has been additionally written, the data for eight data bytes is recorded to be duplicated at a portion of expanded guard field 529 recorded just before and the VFO area to be newly additionally written.

Chapter 8 Description of B Format
Optical Disk Specification of B Format

FIG. 86 shows specification of an optical disk in a B format using a blue violet laser light source. The optical disks in the B format are classified into rewritable-type (RE disk), read-only (ROM disk), and write-once type (R disk). However, as shown in FIG. 86, common specification other than standard data transfer speed is defined in any type, facilitating the achievement of a drive commonly compatible with a different type. In a current DVD, two disk substrates having thickness of 0.6 nm are adhered to each other. In contrast, a structure is provided such that, in the B format, a recording layer is provided on a disk substrate having disk thickness of 1.1 nm, and the recording layer is covered with a transparent cover layer having thickness of 0.1 nm.

[Error Correction System]

In the B format, there is employed an error correction system capable of efficiently sensing a burst error referred to as a "picket" code. A "picket" is inserted into main data (user data) patterns at predetermined intervals. The main data is protected by strong, efficient Reed Solomon codes. A "picket" is protected by second very strong, efficient Reed Solomon codes other than the main data. During decoding, a picket is first subjected to error correction. Correction information can be used to estimate a position of a burst error in the main data. As a symbol of these positions, there is set a flag called "erasure" utilized when correcting a code word of the main data.

Figure 87:
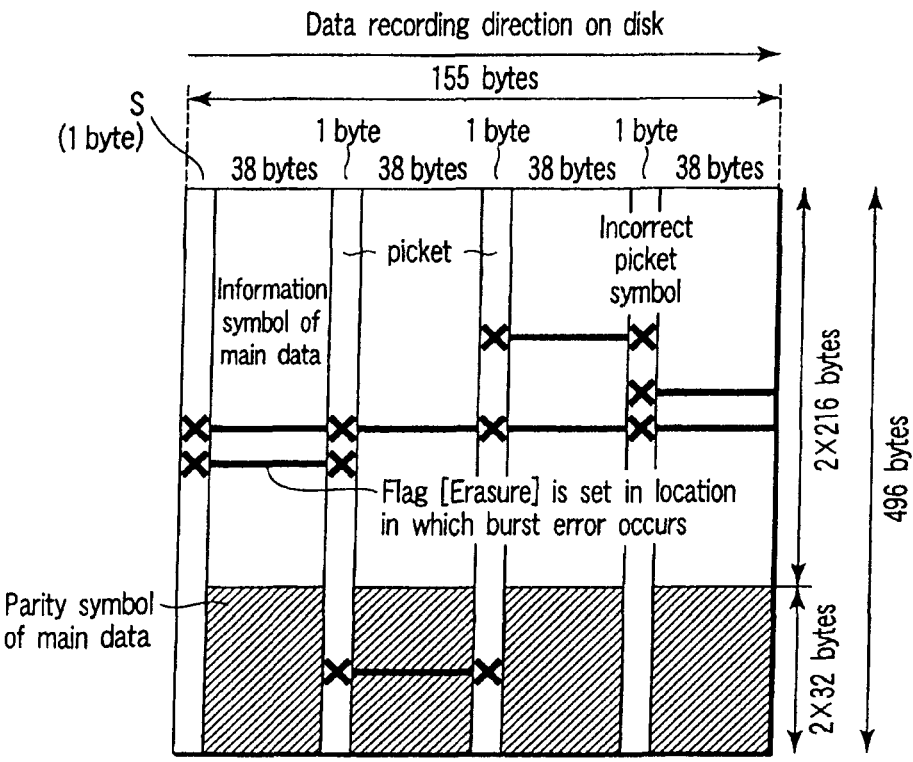
FIG. 87 is a view showing an exemplary configuration of picket codes (error correcting blocks in the B format.

FIG. 87 shows a configuration of a "picket" code (error correction block). An error correction block (ECC block) of the B format is configured while the user data of 64 Kbytes is defined in unit in the same manner as in the H format. This data is protected by very string, Reed Solomon codes LDC (long distance codes).

An LCD consists of 304 cord words. Each code word consists of 216 information symbols and 32 parity symbols. Namely, a code word length has 248 (=216+32) symbols. These code words are interleaved on a 2×2 basis in a vertical direction of ECC blocks, configuring an ECC block of horizontal 152 (=304/2) bytes×vertical 496 (=2×216+2×32) bytes.

A picket interleave length has 155×8 bytes (there are eight correction series of control codes in 496 bytes), and a user data interleave length has 155×2 bytes. The 496 types in the vertical direction are defined in units of recording on a 31×31 row basis. With respect to the parity symbols of the main data, two-groove parity symbols are provided as nests on a one by one row basis.

In the B format, picket codes padded at predetermined intervals have been employed for this ECC block in a "columnar" shape. A burst error is sensed by referring to a state of that error. Specifically, four picket columns have been arranged at equal intervals in one ECC block. An address is also included in a "picket". A "picket" includes its unique parity.

There is a need for correcting symbols in the picket columns, and thus, the "pickets" in the right three columns are subjected to error correction and encoding by means of BIS (burst indicator subcode), and is protected. This BIS consists of 30 information symbols and 32 parity symbols, and a code word length has 62 symbols. It is found that very strong correction capability exists from a ratio between information symbols and parity symbols.

The BIS code word is interleaved and stored in three picket columns each composed of 496 bytes. Here, the number of parity symbols per code word which both of LDS and BIS codes have is equal to 32 symbols. This denotes that LDC and BIS can be decoded by one common Reed Solomon decoder.

When data is decoded, first, a correcting process of picket columns is carried out by means of the BIS. In this manner, a burst error location is estimated, and a flag called "erasure" is set in that location. This flag is utilized when a code word of the main data is corrected.

The information symbols protected by the BIS codes forms additional data channels (side channels) other than the main data. This side channel stores address information. Prepared executive Reed Solomon codes other than the main data are used for error correction of address information. This code consists of five information symbols and four parity symbols. In this manner, it has been possible to grasp an address at a high speed and with a high reliability independent of an error correaction system of the main data.

[Address Format]

In an RE disk, like a CD-R disk, a very thin groove is engraved as a recording track like a spiral. A recording mark is written into a protrusive portion viewed in a laser light beam incident direction from among the irregularities (on-groove recording).

Address information indicating an absolute position on a disk is padded by slightly wobbling (meandering or swinging) this groove like a CD-R disk or the like. Digital data for modulating signal is included, the digital data indicating "1" or "0" in the shape or cycle of wobbling.

Figure 88:
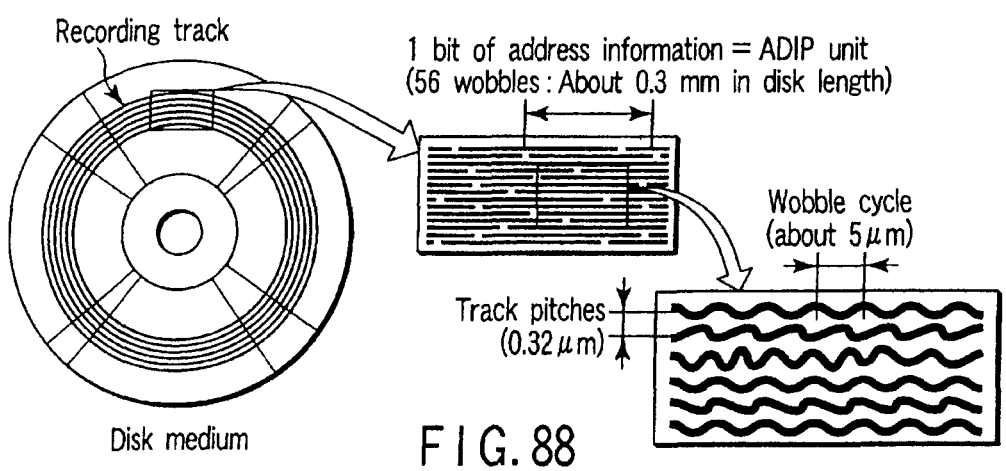
FIG. 88 is an exemplary view of a wobble address in B format.

FIG. 88 shows a wobble system. A wobbling amplitude is slightly ±10 nm in a disk radial direction. 56 wobbles (about 0.3 m in disk length) is obtained as one bit of address information=ADIP unit (described later).

In order to write a fine recording mark without almost any displacement, it is necessary to generate a stable, precise recording clock signal. Therefore, attention has been paid to a system in which a main frequency component of the wobbles is single and a groove is smoothly continuous. If the frequency is single, a stable recording clock signal can be easily generated from a wobble component sampled by a filter.

Timing information or address information is added to a wobble on the basis of this single frequency. "Modulation" is performed for the purpose of this addition. For this modulation system, a system in which an error is unlikely to occur is selected even if a variety of variations specific to an optical disk occur.

The following four variations of wobble signals generated in an optical disk are summarized on a factor by factor basis:

(1) Disk noise: A variation in a surface shape which occurs with a groove portion (surface roughness) at the time of manufacturing, noise generated in a recording film, and crosstalk noise leaks from recorded data:

(2) Wobble shift: A phenomenon that detection sensitivity is lowered by a relative shift of a wobble detection position from a normal position in a recording/reproducing apparatus. This shift is likely to occur immediately after seek operation.

(3) Wobble beat: A crosstalk generated between a track to be recorded and a wobble signal of the adjacent track. In the case where the rotation control system is CLV (constant linear velocity), this beating occurs in the case where a shift occurs with an angle frequency of the adjacent wobbles.

(4) Defect: This is caused by a local defect due to the dust or scratch of a disk surface.

In an RE disk, two different wobble modulation systems are combined in the form such that a synergetic effect is produced under a condition that high durability is provided with respect to all of these different four types of signal variations. In general, this is because the durability relevant to four types of signal variations which is hardly achieved by only one type of modulation system can be obtained without any side effect.

Figure 89:
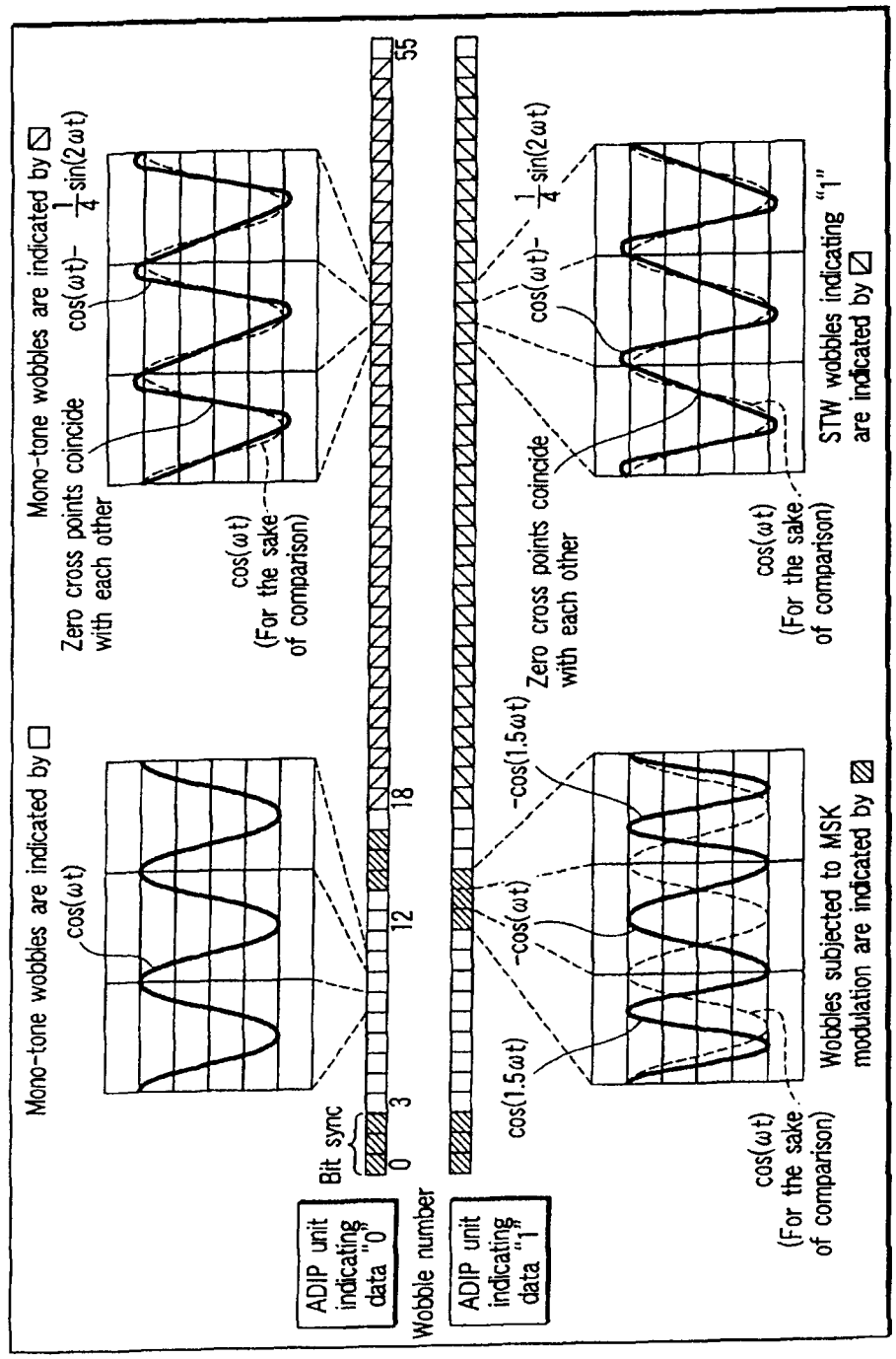
FIG. 89 is an exemplary view showing a detailed structure of a wobble address obtained by combining an MSK system and an STW system with each other.

There are two systems: an MSK (minimum shift keying system; and an STW (saw tooth wobble) system (FIG. 89). The name of the STW comes from the fact that its waveform is like a saw tooth shape.

In the RE disk, one bit of "0" or "1" is expressed by a total of 56 wobbles. These 56 wobbles are referred to as a unit, i.e., an ADIP (address inpre groove) unit. When the ADIP unit is continuously read out by 83 units, an ADIP word indicating one address is obtained. The ADIP word consists of: address information having a 24-bit length; auxiliary data having a 12-bit length; a reference (correction) area; and error correction data. In the RE disk, three ADIP words per one RUB (recording unit block, units of 64 Kbytes) for recording main data have been arranged.

The DIP unit consisting of 56 wobbles is greatly divided into a first half and a latter half. The first half whose wobble numbers range from 0 to 17 is an MSK system; and the latter half whose wobble numbers range from 18 to 55 is a STW system. These systems smoothly communicate with a next ADIP unit. One bit can be expressed by one ADIP unit. Depending on whether "0" or "1" is set, first, in the first half, there is changed a position of a wobble to which MSK system modulation is applied; and, in the latter half, an orientation of a saw tooth shape is changed, thereby making discrimination.

The first-half portion of the MSK system is divided into: a three-wobble area in which MSK modulation has been further performed; and a mono-tone wobble $\cos(\omega t)$ area. First, three wobbles from 0 to 2 always start from at any ADIP unit to which MSK modulation has been applied. This is referred to as a bit sync (identifier indicating start position of ADIP unit).

After this identifier has been passed, continuation of mono-tone wobbles is then obtained. Then, data is indicated according to how many mono-tone wobbles exist up to three wobbles which appear again next and which has been subjected to MSK modulation. Specifically, "0" is set in the case of 11 wobbles, and "1" is set in the case of 9 wobbles. Data is discriminated from each other by means of a shift of two wobbles. The MSK system utilizes a local phase change of a basic wave. In other words, an area in which no phase change occurs is dominant. In the STW system as well, this area is efficiently utilized as a location in which a phase of a basic wave does not change.

An area to which MSK modulation has been applied has a three-wobble length. A phase is restored by setting a frequency at 1.5 times with respect to a mono-tone wobble at the first wobble; setting a frequency equal to that of a mono-tone wobble at the second wobble; and setting a frequency at 1.5 times again at the third wobble. By doing this, the polarity of the second (center) wobble is just inverted with respect to the mono-tone wobble, and this inversion is detected. At the first start point and at the third end point, a phase is just fitted to a mono-tone wobble. Therefore, smooth connection free from a discontinuous portion can be made.

On the other hand, there are two types of waveforms in the latter half STW system. One waveform rapidly rises toward the disk outer periphery side and returns in gentle inclination to the disk center side, and the other waveform rises in gentle inclination, and returns rapidly. The former indicates data "0", and the latter indicates data "1". In one ADIP unit, the same bit is indicated by using both of the MSK system and the STW system, thereby improving data reliability.

When the STW system is mathematically expressed, a secondary harmonic wave $\sin(2\omega t)$ whose amplitude is ¼ is added to or subtracted from a basic wave $\cos(\omega t)$. However, even whichever of "0" and "1" the STW system indicates, a zero cross point is identical to a mono-tone wobble. Namely, its phase is not affected at all when a clock signal is sampled from a basic wave component common to a mono-tone portion in the MSK system.

As described above, the MSK system and the STW system function so as to compensate for weak points of counterparts each other.

Figures 90, 91:
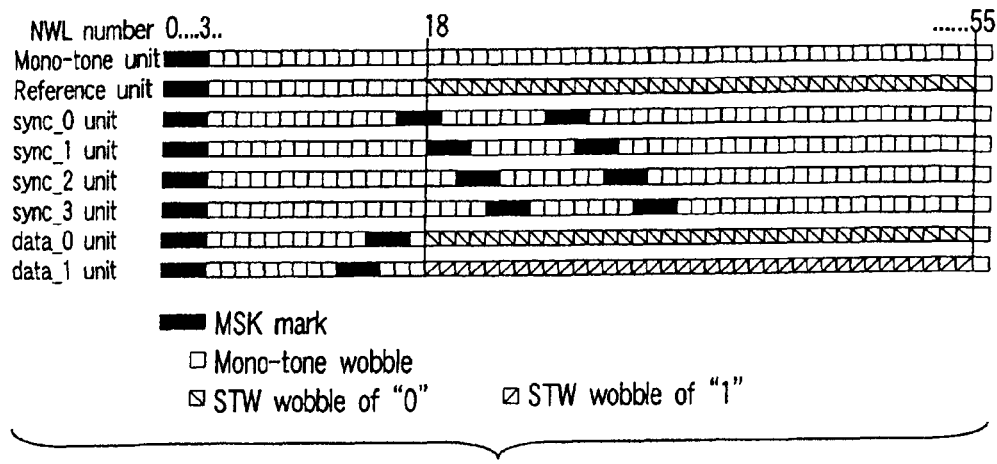
FIG. 90 is an exemplary view showing a unit of 56 wobbles and an ADIP unit expressing a bit of "0" or "1"
FIG. 91 is an exemplary view showing an ADIP word consisting of 83 ADIP units and showing an address.

FIG. 90 shows an ADIP unit. A basic unit of an address wobble form a is an ADIP unit. Each group of 56 NML (nominal wobble length) is referred to as an ADIP unit. One NML is equal to 69 channel bits. An ADIP unit of a different type is defined by inserting a modulation wobble (MSK mark) into a specific position contained in an ADIP unit (refer to FIG. 89). 83 ADIP units are defined as one ADIP word. A minimum segment of data recorded in a disk precisely coincides with three continuous ADIP words. Each ADIP word includes 36 information bits (24 bits of which are address information bits).

Figure 92:
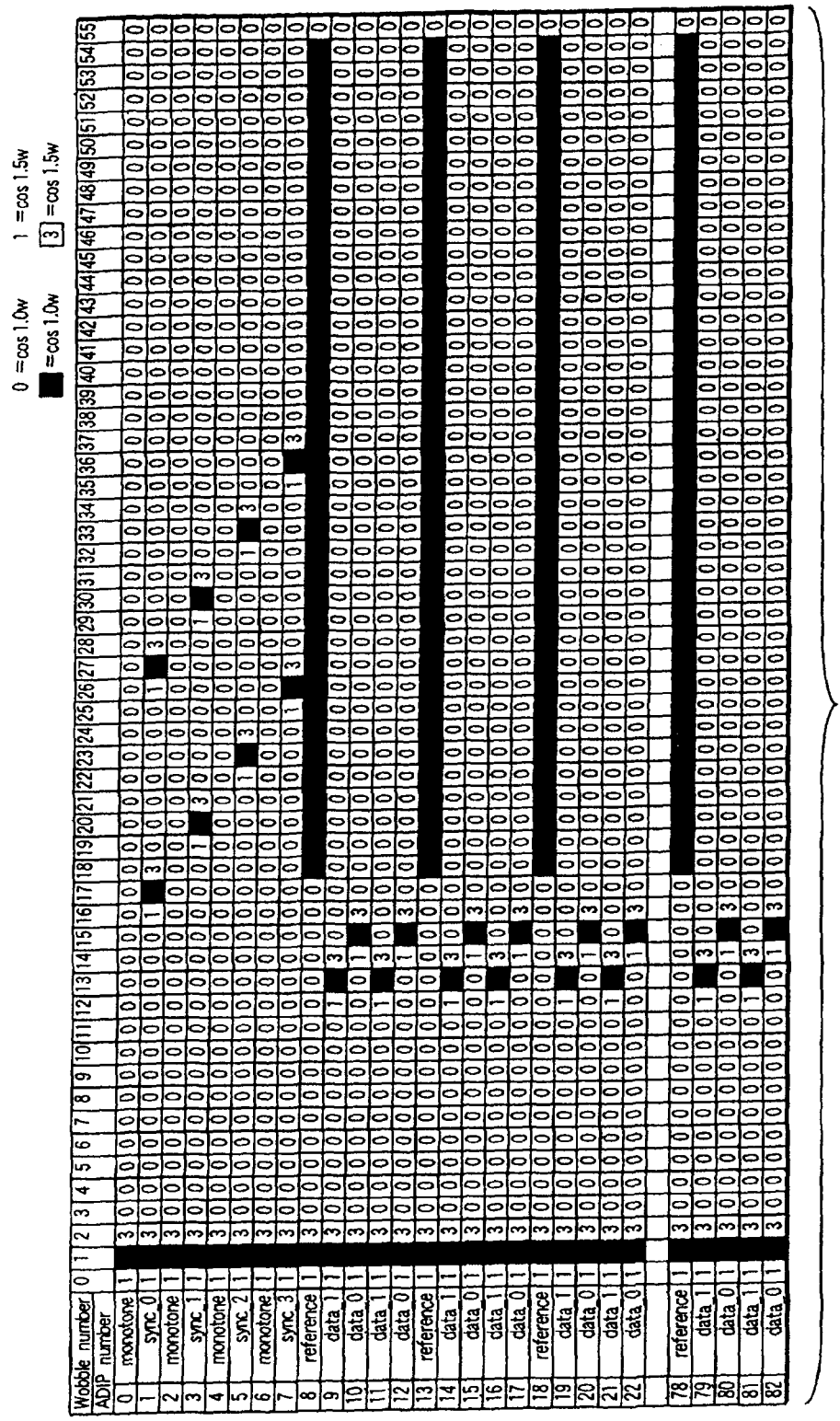
FIG. 92 is an exemplary view showing an ADIP word.

FIGS. 91 and 92 each show a configuration of an ADIP word.

Figures 93, 94:
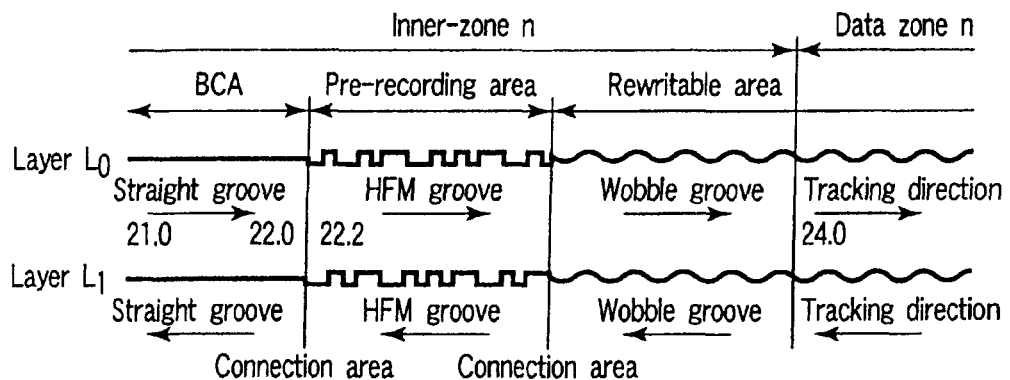
FIG. 93 is an exemplary view showing 15 nibbles contained in an ADIP word.
FIG. 94 is an exemplary view showing a track structure in B format.

One ADIP word includes 15 nibbles, and nine nibbles are information nibbles, as shown in FIG. 93. Other nibbles are used for ADIP error correction. 15 nibbles configure a code word of Reed Solomon codes [15, 9, 7].

A code word consists of nine information nibbles; six information nibbles record address information; and three information nibbles record auxiliary information (for example, disk information).

Reed Solomon codes of [15, 9, 7] are non-systematic, and a hamming distance due to "informed decoding" in knowledge in advance can be increased. The "informed decoding" is such that all code words have distance 7; all cod words of nibble $n_0$ has distance 8 in common; and knowledge in advance relating to $n_0$ increases a hamming distance. Nibble $n_0$ consists of an MSB of a layer index (three bits) and a physical sector number. If nibble $n_0$ is known, distance increases from 7 to 8.

FIG. 94 shows a track structure. A description will be given here with respect to a track structure of the first layer (which is distant from a laser light source) and the second layer of a disk having a single-sided double-layer structure. A groove is provided to enable tracking in a push-pull system. Plural types of track shapes are used. The first layer $L_0$ and the second layer $L_1$ are different from each other in tracking direction. In the first layer, the left to the right of the figure is a tracking direction. In the second layer, the right to the left is a tracking direction. The left side of the figure is a disk inner periphery, and the right side is an outer periphery.

A BCA (burst cutting area) area formed of a first-layer straight groove; a pre-recording area formed of an HFM (High Frequency Modulated) groove; and a wobble groove area in a rewritable area are equivalent to an H-format lead-in area. A wobble groove area in a second-layer rewritable area; a pre-recording area formed of an HFM (High Frequency Modulated) groove; and a BCA area formed of a straight groove are equivalent to an H format lead-out area. However, in the H format, the lead-in area and the lead-out area are recorded in a pre-pit system instead of a groove system. In the HFM groove, a phase is shifted in the first and second layers so as not to produce an inter-layer crosstalk.

Figure 95:
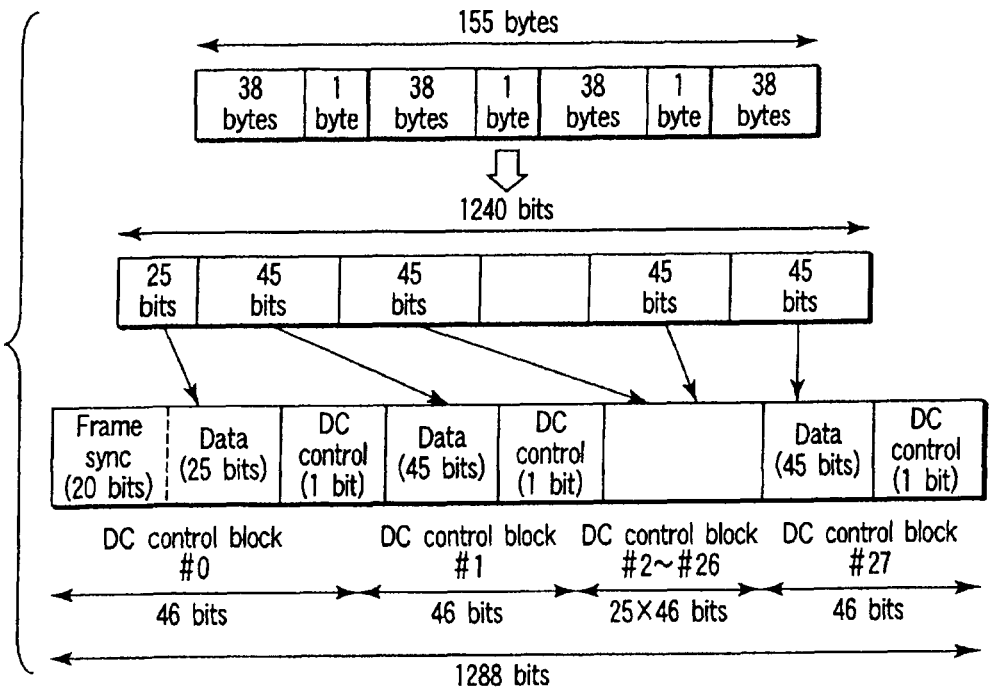
FIG. 95 is an exemplary view showing a recording frame in B format.

FIG. 95 shows a recording frame. As shown in FIG. 87, the user data is recorded on 64 by 64 Kbytes basis. Each row of the ECC cluster is converted into the recording frame by adding frame sync bits and DC control units. The stream of 1240 bits (155 bytes) in each row is converted as follows. Data of 25 bits is arranged at the beginning of the 1240-bit stream, and the subsequent data is divided into data of 45 bits; a frame sync code of 20 bits is added before data of 25 bits; one DC control bit is added after data of 25 bits; and one DC control bit is added after data of 45 bits similarly. A block including data of the first 2 bits is defined as DC control block #0, and the subsequent data of 45 bits and one DC control bit are defined as DC control blocks #1, #2, ... #27. 496 recording frames are referred to as a physical cluster.

A recording frame is subjected to 1-7PP modulation at a rate of ⅔. A modulation rule is applied to 1268 bits excluding the first frame sync code; 1902 channel bits are formed; and a frame sync code of 30 bits is added at the beginning of the entirety. That is, 1932 channel bits (=28 NML) are configured. A channel bit is subjected to NRZI modulation, and the modulated bit is recorded in a disk.

Frame Sync Code Structure

Each physical cluster includes 16 address units.

Each address unit includes 31 recording frames. Each recording frame starts from a frame sync code of 30 channel bits. The first 24 bits of frame sync code violates a 1-7PP modulation rule (including a length which is twice of 9T). The 1-7PP modulation rule uses a (1, 7)PLL modulation system to carry out Parity Preserve/Prohibit RMTR (repeated minimum transition run length). Parity Preserve makes control of a so called DC (direct current) component of a code (decreases a DC component of a code). The remaining six bits of frame sync code changes, and identifies seven frame sync codes FS0, FS1, FS6. These six-bit signs are selected so that a distance relating to a deflection amount is equal to or greater than 2.

Seven frame sync codes make it possible to obtain more detailed positional information than only 16 address units. Of course, it is insufficient to identify 31 recording frames merely by seven different frame sync codes. Therefore, from 31 recording frames, seven frame sync sequences are selected so that each frame can be identified by using a combination between one's own frame sync codes and a frame sync code of each of four preceding frames.

Figure 96A:
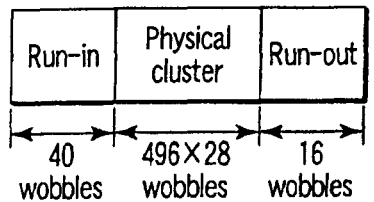
FIGS. 96A and 96B are exemplary views each showing a structure of a recording unit block.
Figure 96B:
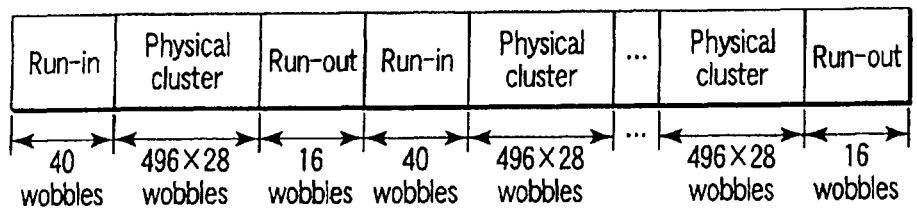

FIGS. 96A and 96B each show a structure of a recording unit block RUB. A recording unit is referred to as a RUB. As shown in FIG. 96A, the RUB is formed of: 40-wobble data run-in; a physical cluster of 496×28 wobbles; and 16-wobble data run-out. Data run-in and data run-out enables sufficient data buffering in order to facilitate completely random overwriting. The RUB may be recorded on a one by one basis or a plurality of RUBS are continuously recorded as shown in FIG. 96B.

Data run-in is mainly formed of a repetition pattern of 3T/3T/2T/2T/5T/5T, and two frame sync codes (FS4 and FS6) are spaced from each other by 40 cbs as an indicator indicating a start position of a next recording unit block.

The data run-out starts at FS0, follows a 9T/9T/9T/9T/9T/9T pattern which indicates the end of data after FS0, and follows a repetition pattern mainly formed of 3T/3T/2T/2T/5T/5T.

FIG. 97 shows a structure of data run-in and data run-out.

FIG. 98 is a view showing allocation of data relating to a wobble address. A physical cluster consists of 496 frames. A total of 56 wobbles (NWLs) of data run-in and data run-out are 2×28 wobbles, and correspond to two recording frames.

One RUB=496+2=498 recording frames

One ADIP unit=56 NWLs=Two recording frames

83 ADIP units=One ADIP word (including one ADIP address)

Three ADIP words=3×83 ADIP units

Three ADIP words=3×83×2=498 recording frames

When data is recorded in a write-once disk, it is necessary to continuously record next data in already recorded data. If a gap occurs with data, reproduction cannot be carried out. Then, in order to record (overwrite) the first data run-in of the succeeding recording frame to be overlapped on the last data run-out of the preceding recording frame, three guard areas are arranged at the end of the data run-out area, as shown in FIGS. 99A and 99B. FIG. 99A shows a case in which only one physical cluster is recorded; and FIG. 99B shows a case in which a plurality of physical clusters are continuously recorded, wherein three guard areas are provided only after run-out of the last cluster. Thus, each of the recording units recorded along, or alternatively, a plurality of recording unit blocks continuously recorded are terminated in three guard areas. These three guard areas guarantees that an unrecorded area does not exist between the two recording unit blocks.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A non-transitory machine readable information storage medium for storing data reproducible by a recording or reproducing apparatus, the non-transitory machine readable information storage medium comprising:
  a control area, said control area being configured to store, within a data structure, information usable by said recording or reproducing apparatus to record or reproduce the data on or from the non-transitory machine readable information storage medium, the data structure being configured to store
- a version corresponding to a specification,
- an extended part version field,
- a revision number of maximum recording speed,
- a revision number of minimum recording speed, and
- information relating to recording power corresponding to each of the revision number of minimum recording speed and the revision number of maximum recording speed.

2. A reproducing method for reproducing data from a non-transitory machine readable information storage medium including a control area, said control area being configured to store, within a data structure, information usable by a recording or reproducing apparatus, the data structure being configured to store
- a version corresponding to a specification,
- an extended part version field,
- a revision number of maximum recording speed,
- a revision number of minimum recording speed, and
- information relating to recording power corresponding to each of the revision number of minimum recording speed and the revision number of maximum recording speed, the method comprising:

irradiating the non-transitory machine readable information storage medium with light; and reproducing the data from the non-transitory machine readable information storage medium.

3. A recording method for recording data on a non-transitory machine readable information storage medium including a control area, said control area being configured to store, within a data structure, information usable by a recording apparatus to record the data on the non-transitory machine readable information storage medium, the data structure being configured to store
- a version corresponding to a specification,
- an extended part version field,
- a revision number of maximum recording speed,
- a revision number of minimum recording speed, and
- information relating to recording power corresponding to each of the revision number of minimum recording speed and the revision number of maximum recording speed, the method comprising:

irradiating the non-transitory machine readable information storage medium with light; and recording the data on the non-transitory machine readable information storage medium.

4. A reproducing apparatus for reproducing data from non-transitory machine readable information storage medium including a control area, said control area being configured to store, within a data structure, information usable by said reproducing apparatus or a recording apparatus, the data structure being configured to store
- a version corresponding to a specification,
- an extended part version field,
- a revision number of maximum recording speed,
- a revision number of minimum recording speed, and
- information relating to recording power corresponding to each of the revision number of minimum recording speed and the revision number of maximum recording speed, the apparatus comprising:

a module configured to irradiate the non-transitory machine readable information storage medium with light and to reproduce the data from the non-transitory machine readable information storage medium.

5. A recording apparatus for recording data on a non-transitory machine readable information storage medium including a control area, said control area being configured to store, within a data structure, information usable by said recording apparatus to record the data on the non-transitory machine readable information storage medium, the data structure being configured to store
- a version corresponding to a specification,
- an extended part version field,
- a revision number of maximum recording speed,
- a revision number of minimum recording speed, and
- information relating to recording power corresponding to each of the revision number of minimum recording speed and the revision number of maximum recording speed, the apparatus comprising:

a module configured to irradiate the non-transitory machine readable information storage medium with light and to record the data on the non-transitory machine readable information storage medium.

* * * * *